(12) United States Patent
Kimura et al.

(10) Patent No.: US 12,555,529 B2
(45) Date of Patent: Feb. 17, 2026

(54) DISPLAY APPARATUS AND ELECTRONIC DEVICE

(71) Applicant: SEMICONDUCTOR ENERGY LABORATORY CO., LTD., Atsugi (JP)

(72) Inventors: Hajime Kimura, Kanagawa (JP); Tatsunori Inoue, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 103 days.

(21) Appl. No.: 18/699,473

(22) PCT Filed: Oct. 14, 2022

(86) PCT No.: PCT/IB2022/059838
§ 371 (c)(1),
(2) Date: Apr. 8, 2024

(87) PCT Pub. No.: WO2023/073479
PCT Pub. Date: May 4, 2023

(65) Prior Publication Data
US 2024/0412689 A1 Dec. 12, 2024

(30) Foreign Application Priority Data

Oct. 27, 2021 (JP) .................................. 2021-175609
Mar. 31, 2022 (JP) .................................. 2022-059831

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/08* (2013.01)

(58) Field of Classification Search
CPC ......... G09G 3/3233; G09G 2300/0426; G09G 2300/0842; G09G 2310/08; G09G 3/20; G09G 2300/0852; G09F 9/30; G09F 9/335
See application file for complete search history.

(56) References Cited

U.S. PATENT DOCUMENTS 7,339,562 B2   3/2008  Ikeda
7,768,485 B2   8/2010  Uchino et al.
(Continued)

FOREIGN PATENT DOCUMENTS

CN    001684558 A   10/2005
CN    103377616 A   10/2013
(Continued)

OTHER PUBLICATIONS

International Search Report (Application No. PCT/IB2022/059838) Dated Jan. 10, 2023.
(Continued)

*Primary Examiner* — Jeff Piziali
(74) *Attorney, Agent, or Firm* — NIXON PEABODY LLP; Jeffrey L. Costellia

(57) ABSTRACT

A display apparatus with high display quality is provided. One embodiment of the present invention is a display apparatus including a pixel and a circuit. The pixel includes a light-emitting device, a driving transistor, first to fourth switches, and a first capacitor. The circuit includes a fifth switch, a sixth switch, and a second capacitor. A gate of the driving transistor is electrically connected to a first terminal of the first switch, a first terminal of the second switch, and a first terminal of the first capacitor. One of a source and a drain of the driving transistor is electrically connected to a second terminal of the first capacitor, a first terminal of the fourth switch, and an anode of the light-emitting device. The other of the source and the drain of the driving transistor is
(Continued)

electrically connected to a second terminal of the second switch and a first terminal of the third switch. A second terminal of the first switch is electrically connected to a first terminal of the second capacitor. A first terminal of the fifth switch is electrically connected to a first terminal of the sixth switch and a second terminal of the second capacitor.

13 Claims, 65 Drawing Sheets

(56) References Cited

U.S. PATENT DOCUMENTS

| | | | |
|---|---|---|---|
| 8,710,749 B2 | 4/2014 | Kimura | |
| 8,957,889 B2 | 2/2015 | Miyake | |
| 9,041,627 B2 | 5/2015 | Uchino et al. | |
| 9,107,247 B2 | 8/2015 | Kitadani et al. | |
| 9,280,931 B2 | 3/2016 | Kimura | |
| 9,305,988 B2 | 4/2016 | Miyake | |
| 9,478,165 B2 | 10/2016 | Kitadani et al. | |
| 9,853,068 B2 | 12/2017 | Miyake | |
| 10,152,919 B2 | 12/2018 | Ota et al. | |
| 10,229,906 B2 | 3/2019 | Yamazaki et al. | |
| 10,332,450 B2 | 6/2019 | Ota et al. | |
| 10,373,983 B2 | 8/2019 | Takahashi et al. | |
| 10,453,873 B2 | 10/2019 | Miyake | |
| 10,769,996 B2 | 9/2020 | Ota et al. | |
| 11,107,406 B2 | 8/2021 | Ota | |
| 11,335,259 B2 | 5/2022 | Ota et al. | |
| 11,417,273 B2 | 8/2022 | Toyotaka et al. | |
| 11,423,844 B2 | 8/2022 | Ikeda et al. | |
| 11,664,391 B2 | 5/2023 | Miyake | |
| 11,798,491 B2 | 10/2023 | Ikeda et al. | |
| 2005/0243036 A1 | 11/2005 | Ikeda | |
| 2013/0063413 A1 | 3/2013 | Miyake | |
| 2013/0285561 A1 | 10/2013 | Kitadani et al. | |
| 2015/0171156 A1 | 6/2015 | Miyake | |
| 2016/0042692 A1 | 2/2016 | Ota et al. | |
| 2020/0135831 A1 | 4/2020 | Bae et al. | |
| 2020/0320930 A1 | 10/2020 | Toyotaka et al. | |
| 2021/0193053 A1 | 6/2021 | Ota et al. | |
| 2023/0261010 A1 | 8/2023 | Miyake | |
| 2024/0062724 A1 | 2/2024 | Ikeda et al. | |

FOREIGN PATENT DOCUMENTS

| | | |
|---|---|---|
| CN | 106205470 A | 12/2016 |
| CN | 111092105 A | 5/2020 |
| CN | 111406280 A | 7/2020 |
| JP | 2005-326828 A | 11/2005 |
| JP | 2013-076994 A | 4/2013 |
| JP | 2013-228531 A | 11/2013 |
| JP | 2015-132816 A | 7/2015 |
| JP | 2016-038425 A | 3/2016 |
| JP | 2016-212444 A | 12/2016 |
| KR | 2006-0047168 A | 5/2006 |
| KR | 2015-0068909 A | 6/2015 |
| KR | 2020-0047834 A | 5/2020 |
| KR | 2020-0096237 A | 8/2020 |
| WO | WO-2019/111137 | 6/2019 |
| WO | WO-2019/220278 | 11/2019 |

OTHER PUBLICATIONS

Written Opinion (Application No. PCT/IB2022/059838) Dated Jan. 10, 2023.

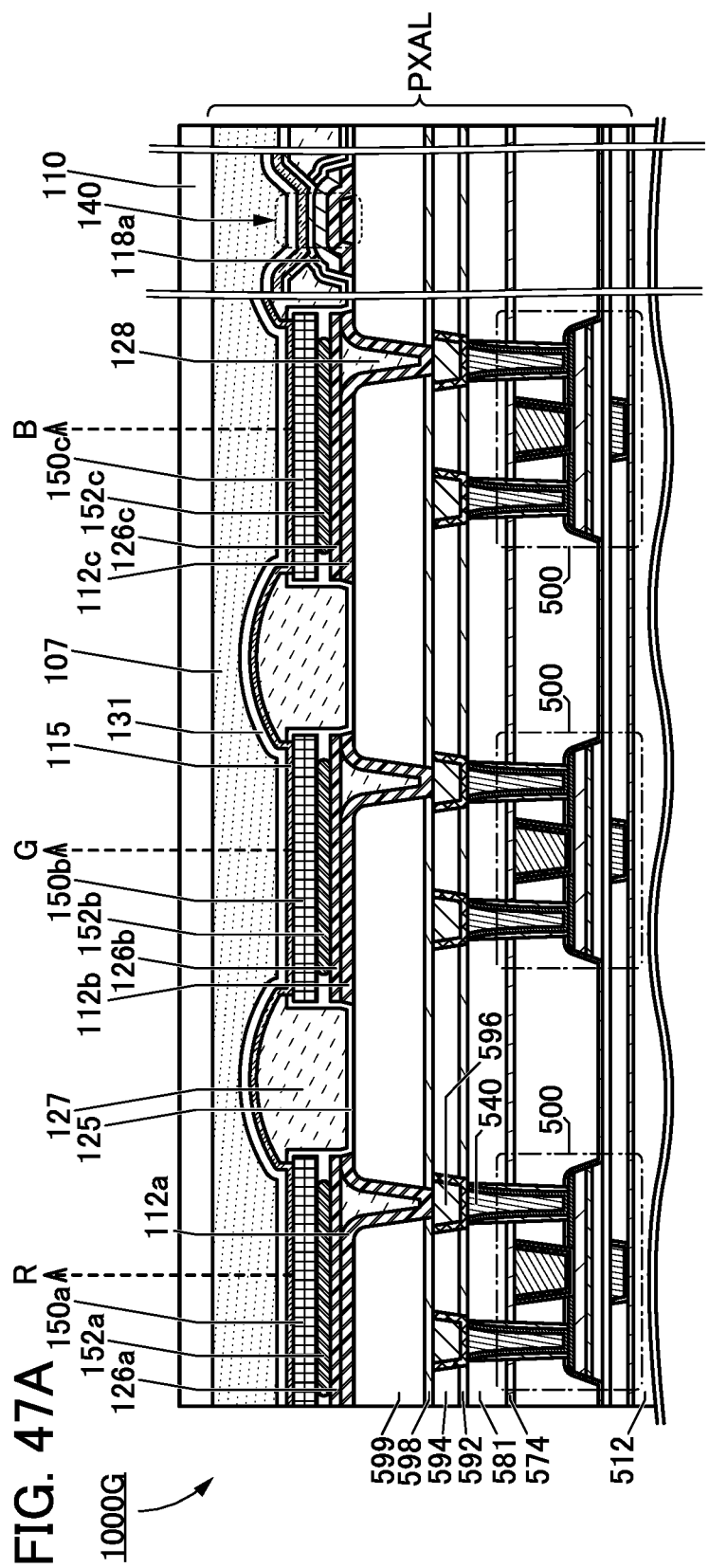
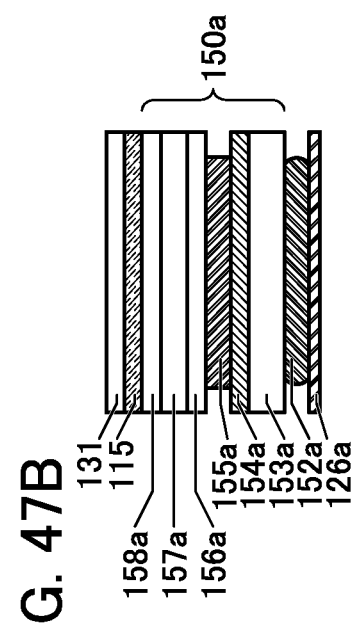

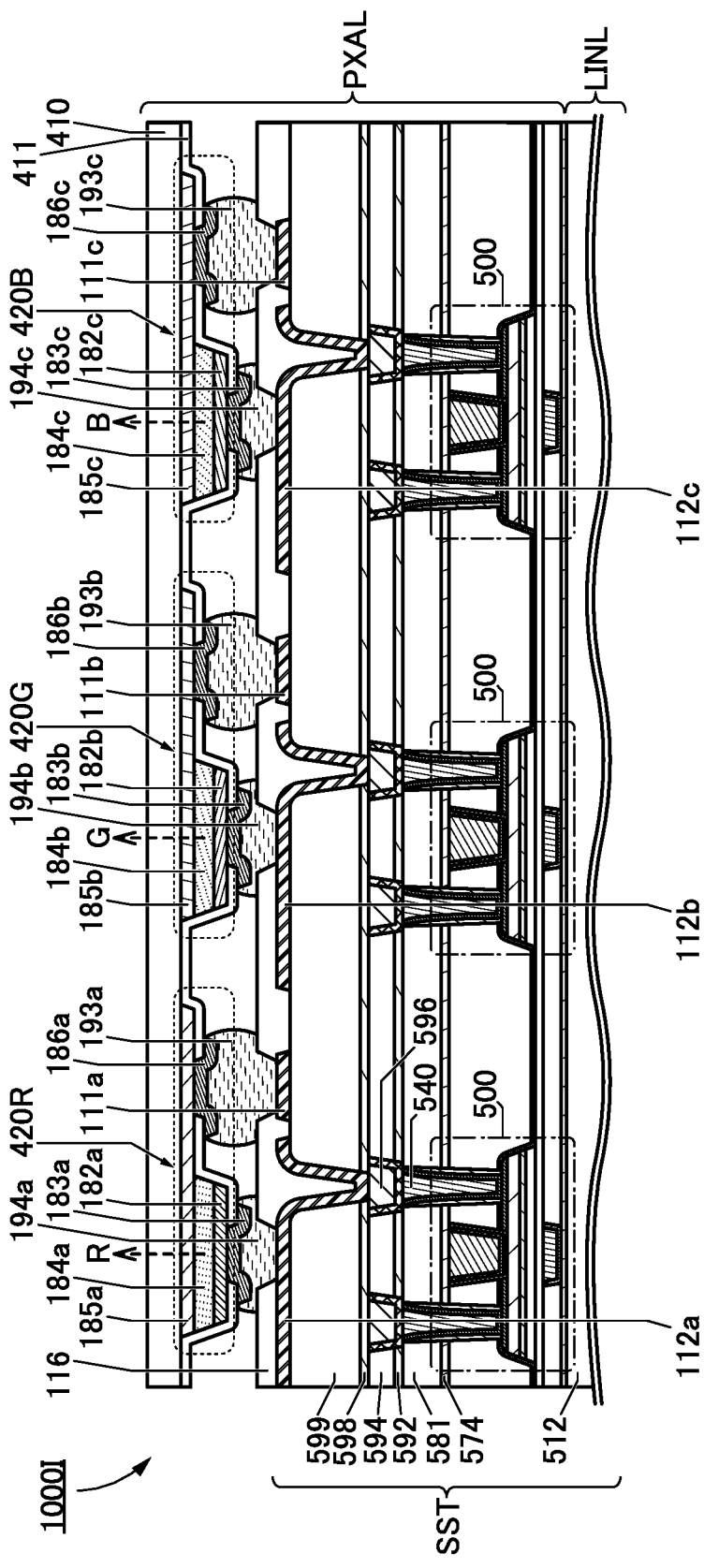

DISPLAY APPARATUS AND ELECTRONIC DEVICE

TECHNICAL FIELD

One embodiment of the present invention relates to a display apparatus and an electronic device.

Note that one embodiment of the present invention is not limited to the above technical field. The technical field of the invention disclosed in this specification and the like relates to an object, a driving method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display apparatus, a liquid crystal display apparatus, a light-emitting apparatus, a power storage device, an imaging device, a memory device, a signal processing device, a processor, an electronic device, a system, a driving method thereof, a manufacturing method thereof, and a testing method thereof.

BACKGROUND ART

Display apparatuses included in, for example, electronic devices for XR (Extended reality or Cross reality) such as VR (virtual reality) or AR (augmented reality), mobile phones such as smartphones, tablet information terminals, laptop personal computers (PCs), and the like have been improved in various aspects in recent years. For example, display apparatuses have been developed to have features such as higher display resolution, higher color reproducibility (NTSC ratio), a smaller driver circuit, and lower power consumption.

In particular, improvement in the pixel density (definition) and the color reproducibility of the display apparatus enables an image to be displayed more clearly and to have enhanced sense of reality. Patent Document 1 discloses a display apparatus with a large number of pixels and high resolution, which includes a light-emitting device containing an organic EL (Electroluminescence) material.

REFERENCE

Patent Document

[Patent Document 1] PCT International Publication No. 2019/220278

SUMMARY OF THE INVENTION

Problems to be Solved by the Invention

In particular, when the definition of a display apparatus including a light-emitting device containing an organic EL material is increased, the area of a region (a light-emitting surface) where the light-emitting device is formed becomes small. When the area of the region of light-emitting devices (the light-emitting surface) is small, the amount of current needed for light emission of the light-emitting device is small, but the allowable current amount is also small. That is, an increase in the definition of light-emitting devices of a display apparatus reduces the amount of current capable of flowing through the light-emitting device; accordingly, a fine control of current amount is necessary for adjusting the luminance of the light-emitting device.

An object of one embodiment of the present invention is to provide a display apparatus in which the amount of current flowing through a light-emitting device can be controlled finely. Another object of one embodiment of the present invention is to provide a display apparatus with high definition. Another object of one embodiment of the present invention is to provide a display apparatus with high display quality. Another object of one embodiment of the present invention is to provide a novel display apparatus. Another object of one embodiment of the present invention is to provide an electronic device including the above display apparatus.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to achieve at least one of the objects listed above and the other objects. Note that one embodiment of the present invention does not necessarily achieve all the objects listed above and the other objects.

Means for Solving the Problems (1)

One embodiment of the present invention is a display apparatus including a pixel and a circuit. The pixel includes a light-emitting device, a driving transistor, a first switch, a second switch, a third switch, a fourth switch, and a first capacitor. The circuit includes a fifth switch, a sixth switch, and a second capacitor. A gate of the driving transistor is electrically connected to a first terminal of the first switch, a first terminal of the second switch, and a first terminal of the first capacitor. One of a source and a drain of the driving transistor is electrically connected to a second terminal of the first capacitor, a first terminal of the fourth switch, and an anode of the light-emitting device. The other of the source and the drain of the driving transistor is electrically connected to a second terminal of the second switch and a first terminal of the third switch. A second terminal of the first switch is electrically connected to a first terminal of the second capacitor. A first terminal of the fifth switch is electrically connected to a first terminal of the sixth switch and a second terminal of the second capacitor.

(2)

Alternatively, one embodiment of the present invention may have the structure in (1) above in which the first switch includes an n-channel first transistor, the second switch includes an n-channel second transistor, the third switch includes an n-channel third transistor, and the fourth switch includes an n-channel fourth transistor. In particular, one of a source and a drain of the first transistor is preferably electrically connected to the first terminal of the first switch, and the other of the source and the drain of the first transistor is preferably electrically connected to the second terminal of the first switch. One of a source and a drain of the second transistor is preferably electrically connected to the first terminal of the second switch, and the other of the source and the drain of the second transistor is preferably electrically connected to the second terminal of the second switch. One of a source and a drain of the third transistor is preferably electrically connected to the first terminal of the third switch, and the other of the source and the drain of the third transistor is preferably electrically connected to a second terminal of the third switch. One of a source and a drain of the fourth transistor is preferably electrically connected to the first terminal of the fourth switch, and the other of the source and the drain of the fourth transistor is preferably electrically connected to a second terminal of the fourth switch.

(3)

Alternatively, one embodiment of the present invention is a display apparatus including a pixel and a circuit, and having a structure different from that in (1) above. The pixel includes a light-emitting device, a driving transistor, a first switch, a second switch, a third switch, a fourth switch, a fifth switch, a first capacitor, and a third capacitor. The circuit includes a sixth switch, a seventh switch, an eighth switch, and a second capacitor. The driving transistor includes a first gate and a second gate. The first gate of the driving transistor is electrically connected to a first terminal of the first switch, a first terminal of the second switch, and a first terminal of the first capacitor. One of a source and a drain of the driving transistor is electrically connected to a second terminal of the first capacitor, a first terminal of the third capacitor, a second terminal of the second switch, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the first switch is electrically connected to a first terminal of the second capacitor and a first terminal of the eighth switch. A first terminal of the sixth switch is electrically connected to a first terminal of the seventh switch and a second terminal of the second capacitor.

(4)

Alternatively, one embodiment of the present invention may have the structure in (3) above in which the first switch includes an n-channel first transistor, the second switch includes an n-channel second transistor, the third switch includes an n-channel third transistor, the fourth switch includes an n-channel fourth transistor, and the fifth switch includes an n-channel fifth transistor. In particular, one of a source and a drain of the first transistor is preferably electrically connected to the first terminal of the first switch, and the other of the source and the drain of the first transistor is preferably electrically connected to the second terminal of the first switch. One of a source and a drain of the second transistor is preferably electrically connected to the first terminal of the second switch, and the other of the source and the drain of the second transistor is preferably electrically connected to the second terminal of the second switch. One of a source and a drain of the third transistor is preferably electrically connected to the first terminal of the third switch, and the other of the source and the drain of the third transistor is preferably electrically connected to a second terminal of the third switch. One of a source and a drain of the fourth transistor is preferably electrically connected to the first terminal of the fourth switch, and the other of the source and the drain of the fourth transistor is preferably electrically connected to a second terminal of the fourth switch. One of a source and a drain of the fifth transistor is preferably electrically connected to the first terminal of the fifth switch, and the other of the source and the drain of the fifth transistor is preferably electrically connected to a second terminal of the fifth switch.

(5)

Alternatively, one embodiment of the present invention is a display apparatus including a pixel and a circuit, and having a structure different from those in (1) and (3) above. The pixel includes a light-emitting device, a driving transistor, a first switch, a third switch, a fourth switch, a fifth switch, a first capacitor, and a third capacitor. The circuit includes a sixth switch, a seventh switch, an eighth switch, and a second capacitor. The driving transistor includes a first gate and a second gate. The first gate of the driving transistor is electrically connected to a first terminal of the first switch and a first terminal of the first capacitor. One of a source and a drain of the driving transistor is electrically connected to a second terminal of the first capacitor, a first terminal of the third capacitor, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the first switch is electrically connected to a first terminal of the second capacitor and a first terminal of the eighth switch. A first terminal of the sixth switch is electrically connected to a first terminal of the seventh switch and a second terminal of the second capacitor.

(6)

Alternatively, one embodiment of the present invention may have the structure in (5) above in which the first switch includes an n-channel first transistor, the third switch includes an n-channel third transistor, the fourth switch includes an n-channel fourth transistor, and the fifth switch includes an n-channel fifth transistor. In particular, one of a source and a drain of the first transistor is preferably electrically connected to the first terminal of the first switch, and the other of the source and the drain of the first transistor is preferably electrically connected to the second terminal of the first switch. One of a source and a drain of the third transistor is preferably electrically connected to the first terminal of the third switch, and the other of the source and the drain of the third transistor is preferably electrically connected to a second terminal of the third switch. One of a source and a drain of the fourth transistor is preferably electrically connected to the first terminal of the fourth switch, and the other of the source and the drain of the fourth transistor is preferably electrically connected to a second terminal of the fourth switch. One of a source and a drain of the fifth transistor is preferably electrically connected to the first terminal of the fifth switch, and the other of the source and the drain of the fifth transistor is preferably electrically connected to a second terminal of the fifth switch.

(7)

One embodiment of the present invention is a display apparatus including a pixel and a circuit. The pixel includes a light-emitting device, a driving transistor, a first switch, a second switch, a third switch, a fourth switch, a first capacitor, and a second capacitor. The circuit includes a fifth switch and a sixth switch. A gate of the driving transistor is electrically connected to a first terminal of the first switch, a first terminal of the second switch, and a first terminal of the first capacitor. One of a source and a drain of the driving transistor is electrically connected to a second terminal of the first capacitor, a first terminal of the fourth switch, and an anode of the light-emitting device. The other of the source and the drain of the driving transistor is electrically connected to a second terminal of the second switch and a first terminal of the third switch. A second terminal of the first switch is electrically connected to a first terminal of the second capacitor. A first terminal of the fifth switch is electrically connected to a first terminal of the sixth switch and a second terminal of the second capacitor.

(8)

Alternatively, one embodiment of the present invention is a display apparatus including a pixel and a circuit, and having a structure different from that in (7) above. The pixel includes a light-emitting device, a driving transistor, a first switch, a second switch, a third switch, a fourth switch, a first capacitor, and a second capacitor. The circuit includes a fifth switch and a sixth switch. A gate of the driving transistor is electrically connected to a first terminal of the second switch, a first terminal of the first capacitor, and a first terminal of the second capacitor. One of a source and a drain of the driving transistor is electrically connected to a second terminal of the first capacitor, a first terminal of the fourth switch, and an anode of the light-emitting device. The other of the source and the drain of the driving transistor is electrically connected to a second terminal of the second switch and a first terminal of the third switch. A second terminal of the second capacitor is electrically connected to a first terminal of the first switch. A first terminal of the fifth switch is electrically connected to a first terminal of the sixth switch and a second terminal of the first switch.

(9)

Alternatively, one embodiment of the present invention is a display apparatus including a pixel and a circuit, and having a structure different from those in (7) and (8) above. The pixel includes a light-emitting device, a driving transistor, a first switch, a second switch, a third switch, a fourth switch, a fifth switch, a first capacitor, and a second capacitor. The circuit includes a sixth switch. A gate of the driving transistor is electrically connected to a first terminal of the second switch, a first terminal of the first capacitor, and a first terminal of the second capacitor. One of a source and a drain of the driving transistor is electrically connected to a second terminal of the first capacitor, a first terminal of the fourth switch, and an anode of the light-emitting device. The other of the source and the drain of the driving transistor is electrically connected to a second terminal of the second switch and a first terminal of the third switch. A second terminal of the second capacitor is electrically connected to a first terminal of the first switch and a first terminal of the fifth switch. A first terminal of the sixth switch is electrically connected to a second terminal of the first switch.

(10)

Alternatively, one embodiment of the present invention is a display apparatus including a pixel and a driver circuit. The pixel includes a light-emitting device, a driving transistor, a first switch, a second switch, a third switch, a fourth switch, a fifth switch, a first capacitor, and a second capacitor. A gate of the driving transistor is electrically connected to a first terminal of the second switch, a first terminal of the first capacitor, and a first terminal of the second capacitor. One of a source and a drain of the driving transistor is electrically connected to a second terminal of the first capacitor, a first terminal of the fourth switch, and an anode of the light-emitting device. The other of the source and the drain of the driving transistor is electrically connected to a second terminal of the second switch and a first terminal of the third switch. A second terminal of the second capacitor is electrically connected to a first terminal of the first switch and a first terminal of the fifth switch. The driver circuit is electrically connected to a second terminal of the first switch. The driver circuit has a function of transmitting an image signal to the second terminal of the first switch.

(11)

Alternatively, one embodiment of the present invention may have the structure in any one of (7) to (10) above in which the first switch includes an n-channel first transistor, the second switch includes an n-channel second transistor, the third switch includes an n-channel third transistor, and the fourth switch includes an n-channel fourth transistor. In particular, one of a source and a drain of the first transistor is preferably electrically connected to the first terminal of the first switch, and the other of the source and the drain of the first transistor is preferably electrically connected to the second terminal of the first switch. One of a source and a drain of the second transistor is preferably electrically connected to the first terminal of the second switch, and the other of the source and the drain of the second transistor is preferably electrically connected to the second terminal of the second switch. One of a source and a drain of the third transistor is preferably electrically connected to the first terminal of the third switch, and the other of the source and the drain of the third transistor is preferably electrically connected to a second terminal of the third switch. One of a source and a drain of the fourth transistor is preferably electrically connected to the first terminal of the fourth switch, and the other of the source and the drain of the fourth transistor is preferably electrically connected to a second terminal of the fourth switch.

(12)

Alternatively, one embodiment of the present invention is a display apparatus including a pixel and a circuit, and having a structure different from those in (7) to (9) above. The pixel includes a light-emitting device, a driving transistor, a first switch, a second switch, a third switch, a fourth switch, a fifth switch, an eighth switch, a first capacitor, a second capacitor, and a third capacitor. The circuit includes a sixth switch and a seventh switch. The driving transistor includes a first gate and a second gate. The first gate of the driving transistor is electrically connected to a first terminal of the first switch, a first terminal of the second switch, a first terminal of the eighth switch, and a first terminal of the first capacitor. One of a source and a drain of the driving transistor is electrically connected to a second terminal of the first capacitor, a first terminal of the third capacitor, a second terminal of the second switch, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the first switch is electrically connected to a first terminal of the second capacitor. A second terminal of the second capacitor is electrically connected to a first terminal of the sixth switch and a first terminal of the seventh switch.

(13)

Alternatively, one embodiment of the present invention is a display apparatus including a pixel and a circuit, and having a structure different from those in (7) to (9) and (12) above. The pixel includes a light-emitting device, a driving transistor, a first switch, a second switch, a third switch, a fourth switch, a fifth switch, an eighth switch, a first capacitor, a second capacitor, and a third capacitor. The circuit includes a sixth switch and a seventh switch. The driving transistor includes a first gate and a second gate. The first gate of the driving transistor is electrically connected to a first terminal of the second switch, a first terminal of the eighth switch, a first terminal of the first capacitor, and a first terminal of the second capacitor. One of a source and a drain of the driving transistor is electrically connected to a second terminal of the first capacitor, a first terminal of the third capacitor, a second terminal of the second switch, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the second capacitor is electrically connected to a first terminal of the first switch. A second terminal of the first switch is electrically connected to a first terminal of the sixth switch and a first terminal of the seventh switch.

(14)

Alternatively, one embodiment of the present invention is a display apparatus including a pixel and a circuit, and having a structure different from those in (7) to (9), (12), and (13) above. The pixel includes a light-emitting device, a driving transistor, a first switch, a second switch, a third switch, a fourth switch, a fifth switch, a sixth switch, an eighth switch, a first capacitor, a second capacitor, and a third capacitor. The circuit includes a seventh switch. The driving transistor includes a first gate and a second gate. The first gate of the driving transistor is electrically connected to a first terminal of the second switch, a first terminal of the eighth switch, a first terminal of the first capacitor, and a first terminal of the second capacitor. One of a source and a drain of the driving transistor is electrically connected to a second terminal of the first capacitor, a first terminal of the third capacitor, a second terminal of the second switch, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the second capacitor is electrically connected to a first terminal of the first switch and a first terminal of the sixth switch. A second terminal of the first switch is electrically connected to a first terminal of the seventh switch.

(15)

Alternatively, one embodiment of the present invention is a display apparatus including a pixel and a driver circuit, and having a structure different from that in (10) above. The pixel includes a light-emitting device, a driving transistor, a first switch, a second switch, a third switch, a fourth switch, a fifth switch, a sixth switch, an eighth switch, a first capacitor, a second capacitor, and a third capacitor. The driving transistor includes a first gate and a second gate. The first gate of the driving transistor is electrically connected to a first terminal of the second switch, a first terminal of the eighth switch, a first terminal of the first capacitor, and a first terminal of the second capacitor. One of a source and a drain of the driving transistor is electrically connected to a second terminal of the first capacitor, a first terminal of the third capacitor, a second terminal of the second switch, a first terminal of the third switch, and a first terminal of the fourth switch. The second gate of the driving transistor is electrically connected to a second terminal of the third capacitor and a first terminal of the fifth switch. A second terminal of the third switch is electrically connected to an anode of the light-emitting device. A second terminal of the second capacitor is electrically connected to a first terminal of the first switch. The driver circuit is electrically connected to a second terminal of the first switch. The driver circuit has a function of transmitting an image signal to the second terminal of the first switch.

(16)

Alternatively, one embodiment of the present invention may have the structure in any one of (12) to (15) above in which the first switch includes an n-channel first transistor, the second switch includes an n-channel second transistor, the third switch includes an n-channel third transistor, the fourth switch includes an n-channel fourth transistor, and the fifth switch includes an n-channel fifth transistor. In particular, one of a source and a drain of the first transistor is preferably electrically connected to the first terminal of the first switch, and the other of the source and the drain of the first transistor is preferably electrically connected to the second terminal of the first switch. One of a source and a drain of the second transistor is preferably electrically connected to the first terminal of the second switch, and the other of the source and the drain of the second transistor is preferably electrically connected to the second terminal of the second switch. One of a source and a drain of the third transistor is preferably electrically connected to the first terminal of the third switch, and the other of the source and the drain of the third transistor is preferably electrically connected to a second terminal of the third switch. One of a source and a drain of the fourth transistor is preferably electrically connected to the first terminal of the fourth switch, and the other of the source and the drain of the fourth transistor is preferably electrically connected to a second terminal of the fourth switch. One of a source and a drain of the fifth transistor is preferably electrically connected to the first terminal of the fifth switch, and the other of the source and the drain of the fifth transistor is preferably electrically connected to a second terminal of the fifth switch.

(17)

Alternatively, one embodiment of the present invention in any one of (1) to (16) above may have a structure in which the light-emitting device includes an organic EL device.

(18)

Alternatively, one embodiment of the present invention is an electronic device including the display apparatus described in (17) above and a housing.

Effect of the Invention

One embodiment of the present invention can provide a display apparatus in which the amount of current flowing through a light-emitting device can be controlled finely. One embodiment of the present invention can provide a display apparatus with high definition. One embodiment of the present invention can provide a display apparatus with high display quality. One embodiment of the present invention can provide a novel display apparatus. One embodiment of the present invention can provide an electronic device including the above display apparatus.

Note that the effects of one embodiment of the present invention are not limited to the effects listed above. The effects listed above do not preclude the existence of other effects. The other effects are effects that are not described in this section and will be described below. The effects that are not described in this section are derived from the description of the specification, the drawings, and the like and can be extracted as appropriate from the description by those skilled in the art. One embodiment of the present invention has at least one of the effects listed above and the other effects. Accordingly, one embodiment of the present invention does not have the effects listed above in some cases.

BRIEF DESCRIPTION OF THE DRAWINGS

FIG. 47A is a schematic cross-sectional view illustrating a structure example of a display apparatus, and FIG. 47B is a schematic cross-sectional view illustrating a structure example of a light-emitting device.

FIG. 51A is a schematic cross-sectional view illustrating a structure example of a display apparatus, and FIG. 51B is a schematic cross-sectional view illustrating a structure example of a substrate provided in a display apparatus and a light-emitting diode over the substrate.

MODE FOR CARRYING OUT THE INVENTION

Figure 1:
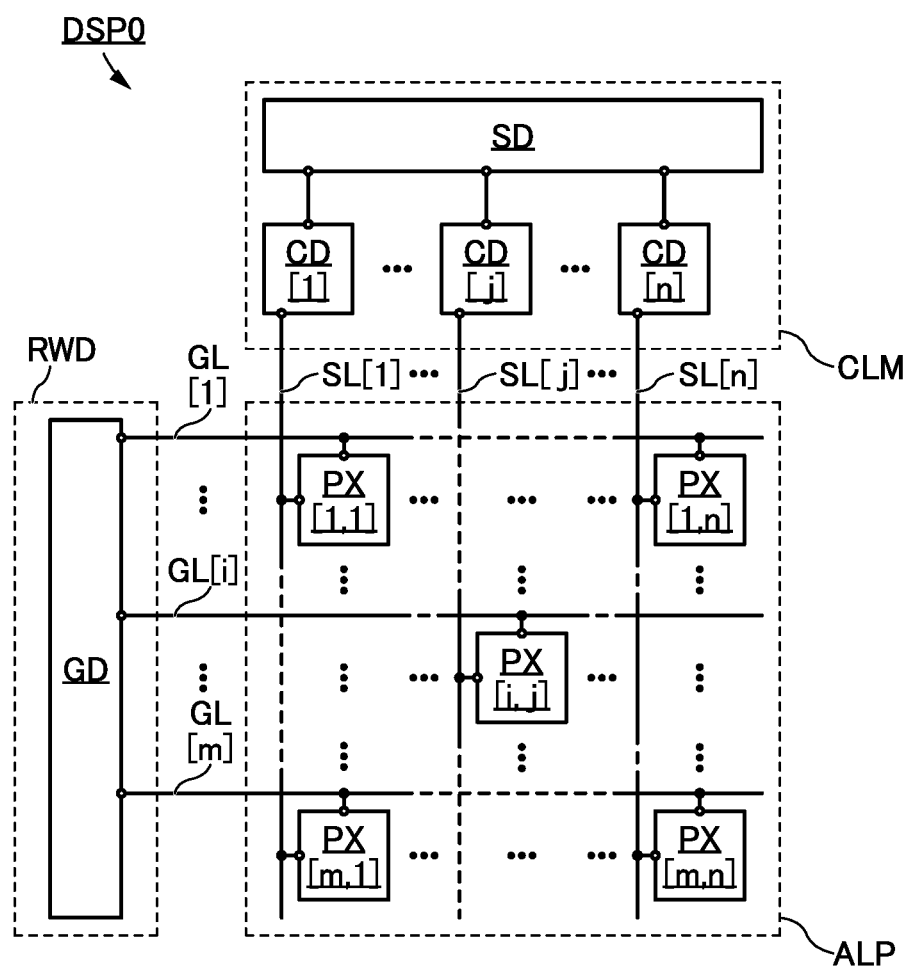
FIG. 1 is a block diagram illustrating a structure example of a display apparatus.

In this specification and the like, a semiconductor device refers to a device that utilizes semiconductor characteristics, and means a circuit including a semiconductor element (e.g., a transistor, a diode, and a photodiode), or a device including the circuit. The semiconductor device also means all devices that can function by utilizing semiconductor characteristics. For example, an integrated circuit, a chip including an integrated circuit, and an electronic component including a chip in a package are each an example of the semiconductor device. Moreover, for example, a memory device, a display apparatus, a light-emitting apparatus, a lighting device, and an electronic device themselves are semiconductor devices or include semiconductor devices in some cases.

In the case where there is description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, and a load) can be connected between X and Y. Note that a switch has a function of being controlled to be turned on or off. That is, the switch has a function of being in a conducting state (on state) or a non-conducting state (off state) to control whether a current flows or not.

In the case where an element and a power supply line (e.g., a wiring supplying VDD (high power supply potential), VSS (low power supply potential), GND (the ground potential), or a desired potential) are both provided between X and Y, X and Y are not defined as being electrically connected. In the case where only a power supply line is provided between X and Y, there is no element between X and Y; therefore, X and Y are directly connected. Accordingly, in the case where only a power supply line is provided between X and Y, X and Y can be expressed as being "electrically connected". However, in the case where an element and a power supply line are both provided between X and Y, X and Y are not defined as being electrically connected, although X and the power supply line are electrically connected (through the element) and Y and the power supply line are electrically connected. Note that in the case where a gate and a source of a transistor are provided between X and Y, X and Y are not defined as being electrically connected. Note that in the case where a gate and a drain of a transistor are provided between X and Y, X and Y are not defined as being electrically connected. That is, in the case where a drain and a source of a transistor are provided between X and Y, X and Y are defined as being electrically connected. Note that in the case where a capacitor is provided between X and Y, X and Y are defined as being electrically connected in some cases and not defined in other cases. For example, in the case where a capacitor is provided between X and Y in a structure of a digital circuit or a logic circuit, X and Y are not defined as being electrically connected in some cases. On the other hand, for example, in the case where a capacitor is provided between X and Y in a structure of an analog circuit, X and Y are defined as being electrically connected in some cases.

For example, in the case where X and Y are functionally connected, one or more circuits that allow functional connection between X and Y (e.g., a logic circuit (e.g., an inverter, a NAND circuit, or a NOR circuit); a signal converter circuit (e.g., a digital-analog converter circuit, an analog-digital converter circuit, or a gamma correction circuit); a potential level converter circuit (e.g., a power supply circuit such as a step-up circuit or a step-down circuit, or a level shifter circuit for changing the potential level of a signal); a voltage source; a current source; a switching circuit; an amplifier circuit (e.g., a circuit that can increase signal amplitude, the amount of current, or the like, an operational amplifier, a differential amplifier circuit, a source follower circuit, or a buffer circuit); a signal generation circuit; a memory circuit; or a control circuit) can be connected between X and Y. For instance, even if another circuit is provided between X and Y, X and Y are regarded as being functionally connected when a signal output from X is transmitted to Y. Note that an explicit description "X and Y are electrically connected" includes the case where X and Y are electrically connected (i.e., the case where X and Y are connected with another element or another circuit provided therebetween) and the case where X and Y are directly connected (i.e., the case where X and Y are connected without another element or another circuit provided therebetween).

It can be expressed as, for example, "X, Y, a source (sometimes called one of a first terminal and a second terminal) of a transistor, and a drain (sometimes called the other of the first terminal and the second terminal) of the transistor are electrically connected to each other, and X, the source of the transistor, the drain of the transistor, and Y are electrically connected to each other in this order". Alternatively, it can be expressed as "a source of a transistor is electrically connected to X; a drain of the transistor is electrically connected to Y; and X, the source of the transistor, the drain of the transistor, and Y are electrically connected to each other in this order". Alternatively, it can be expressed as "X is electrically connected to Y through a source and a drain of a transistor, and X, the source of the transistor, the drain of the transistor, and Y are provided in this connection order". When the connection order in a circuit structure is defined by an expression similar to the above examples, a source and a drain of a transistor can be distinguished from each other to specify the technical scope. Note that these expressions are examples and the expression is not limited to these expressions. Here, each of X and Y denotes an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both of the components that are a wiring and an electrode. Thus, electrical connection in this specification includes, in its category, such a case where one conductive film has functions of a plurality of components.

In this specification and the like, a "resistor" can be, for example, a circuit element having a resistance value higher than 0Ω or a wiring having a resistance value higher than 0Ω. Therefore, in this specification and the like, a "resistor" includes a wiring having a resistance value, a transistor in which a current flows between a source and a drain, a diode, and a coil. Thus, the term "resistor" can sometimes be replaced with the term "resistance", "load", "region having a resistance value", or the like. Conversely, the term "resistance", "load", "region having a resistance value", or the like can sometimes be replaced with the term "resistor". The resistance value can be, for example, preferably higher than or equal to 1 mΩ and lower than or equal to 10Ω, further preferably higher than or equal to 5 mΩ and lower than or equal to 5Ω, still further preferably higher than or equal to 10 mΩ and lower than or equal to 1Ω. For another example, the resistance value may be higher than or equal to 1Ω and lower than or equal to $1 \times 10^9$ Ω.

In this specification and the like, a "capacitor" can be, for example, a circuit element having an electrostatic capacitance value higher than 0 F, a region of a wiring having an electrostatic capacitance value higher than 0 F, parasitic capacitance, or gate capacitance of a transistor. The term "capacitor", "parasitic capacitance", or "gate capacitance" can sometimes be replaced with the term "capacitance". Conversely, the term "capacitance" can sometimes be replaced with the term "capacitor", "parasitic capacitance", or "gate capacitance". In addition, a "capacitor" (including a "capacitor" with three or more terminals) includes an insulator and a pair of conductors between which the insulator is sandwiched. Thus, the term "pair of conductors" of "capacitor" can be replaced with "pair of electrodes", "pair of conductive regions", "pair of regions", or "pair of terminals". In addition, the terms "one of a pair of terminals" and "the other of the pair of terminals" are referred to as a first terminal and a second terminal, respectively, in some cases. Note that the electrostatic capacitance value can be higher than or equal to 0.05 fF and lower than or equal to 10 pF, for example. For another example, the electrostatic capacitance value may be higher than or equal to 1 pF and lower than or equal to 10 μF.

In this specification and the like, a transistor includes three terminals called a gate, a source, and a drain. The gate is a control terminal for controlling the conducting state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" can sometimes be replaced with each other in this specification and the like. In this specification and the like, expressions "one of a source and a drain" (or a first electrode or a first terminal) and "the other of the source and the drain" (or a second electrode or a second terminal) are used in description of the connection relation of a transistor. Depending on the transistor structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, a third gate, for example, in this specification and the like.

In this specification and the like, for example, a transistor with a multi-gate structure having two or more gate electrodes can be given as an example of a transistor. With the multi-gate structure, channel formation regions are connected in series; accordingly, a plurality of transistors are connected in series. Thus, with the multi-gate structure, the amount of off-state current can be reduced, and the withstand voltage of the transistor can be increased (the reliability can be improved). Alternatively, with the multi-gate structure, a drain-source current does not change very much even if drain-source voltage changes at the time of an operation in a saturation region, so that a flat slope of voltage-current characteristics can be obtained. By utilizing the flat slope of the voltage-current characteristics, an ideal current source circuit or an active load having an extremely high resistance value can be obtained. Accordingly, a differential circuit, a current mirror circuit, and the like having excellent properties can be obtained.

In this specification and the like, circuit elements such as a "light-emitting device" and a "light-receiving device" sometimes have polarities called an "anode" and a "cathode". In the case of a "light-emitting device", the "light-emitting device" can sometimes emit light when a forward bias is applied (a positive potential with respect to a "cathode" is applied to an "anode"). In the case of a "light-receiving device", a current is sometimes generated between an "anode" and a "cathode" when a zero bias or a reverse bias is applied (a negative potential with respect to a "cathode" is applied to an "anode") and the "light-receiving device" is irradiated with light. As described above, an "anode" and a "cathode" are sometimes regarded as input/output terminals of the circuit elements such as a "light-emitting device" and a "light-receiving device". In this specification and the like, an "anode" and a "cathode" of the circuit element such as a "light-emitting device" or a "light-receiving device" are sometimes called terminals (a first terminal, a second terminal, and the like). For example, one of an "anode" and a "cathode" is called a first terminal and the other of the "anode" and the "cathode" is called a second terminal in some cases.

The case where a single circuit element is illustrated in a circuit diagram may indicate a case where the circuit element includes a plurality of circuit elements. For example, the case where a single resistor is illustrated in a circuit diagram may indicate a case where two or more resistors are electrically connected to each other in series. For another example, the case where a single capacitor is illustrated in a circuit diagram may indicate a case where two or more capacitors are electrically connected to each other in parallel. For another example, the case where a single transistor is illustrated in a circuit diagram may indicate a case where two or more transistors are electrically connected to each other in series and gates of the transistors are electrically connected to each other. Similarly, for another example, the case where a single switch is illustrated in a circuit diagram may indicate a case where the switch includes two or more transistors, the two or more transistors are electrically connected to each other in series or in parallel, and gates of the transistors are electrically connected to each other.

In this specification and the like, a node can be referred to as a terminal, a wiring, an electrode, a conductive layer, a conductor, an impurity region, or the like depending on the circuit structure and the device structure. Furthermore, a terminal, a wiring, or the like can be referred to as a node.

In this specification and the like, "voltage" and "potential" can be replaced with each other as appropriate. "Voltage" refers to a potential difference from a reference potential, and when the reference potential is a ground potential, for example, "voltage" can be replaced with "potential". Note that the ground potential does not necessarily mean 0 V. Moreover, potentials are relative values, and a potential supplied to a wiring, a potential applied to a circuit or the like, and a potential output from a circuit or the like, for example, change with a change of the reference potential.

In this specification and the like, the terms "high-level potential" and "low-level potential" do not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

"Current" means a charge transfer phenomenon (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer phenomenon (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of current" in a wiring or the like refers to the direction in which a carrier with a positive charge moves, and the amount of current is expressed as a positive value. In other words, the direction in which a carrier with a negative charge moves is opposite to the direction of current, and the amount of current is expressed as a negative value. Thus, in the case where the polarity of current (or the direction of current) is not specified in this specification and the like, the description "current flows from element A to element B" can be rephrased as "current flows from element B to element A". The description "current is input to element A" can be rephrased as "current is output from element A".

Ordinal numbers such as "first", "second", and "third" in this specification and the like are used to avoid confusion among components. Thus, the ordinal numbers do not limit the number of components. In addition, the ordinal numbers do not limit the order of components. In this specification and the like, for example, a "first" component in one embodiment can be referred to as a "second" component in other embodiments or the scope of claims. For another example, a "first" component in one embodiment in this specification and the like can be omitted in other embodiments or the scope of claims.

In this specification and the like, the terms for describing positioning, such as "over" and "under", are sometimes used for convenience to describe the positional relation between components with reference to drawings. The positional relation between components is changed as appropriate in accordance with the direction in which the components are described. Thus, the positional relation is not limited to the terms described in the specification and the like, and can be described with another term as appropriate depending on the situation. For example, the expression "an insulator positioned over (on) the top surface of a conductor" can be replaced with the expression "an insulator positioned under (on) the bottom surface of a conductor" when the direction of a drawing showing these components is rotated by 180°.

Furthermore, the terms "over" and "under" do not necessarily mean that a component is placed directly over or directly under and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B. Similarly, for example, the expression "electrode B above insulating layer A" does not necessarily mean that the electrode B is formed over and in direct contact with the insulating layer A, and does not exclude the case where another component is provided between the insulating layer A and the electrode B. Similarly, for example, the expression "electrode B under insulating layer A" does not necessarily mean that the electrode B is formed under and in direct contact with the insulating layer A, and does not exclude the case where another component is provided between the insulating layer A and the electrode B.

In this specification and the like, components arranged in a matrix and their positional relation are sometimes described using terms such as "row" and "column". The positional relation between components is changed as appropriate in accordance with the direction in which the components are described. Thus, the positional relation is not limited to the terms described in the specification and the like, and can be described with another term as appropriate depending on the situation. For example, the term "row direction" can be replaced with the term "column direction" when the direction of the diagram is rotated by 90°.

In this specification and the like, wirings electrically connect components arranged in a matrix can be extended in a row direction or a column direction. For example, in this specification and the like, in the case of description a "wiring A is extended in a row direction," the wiring A can also be extended in a column direction in some cases. Similarly, in the case where the "wiring A is extended in the column direction," the wiring A can also be extended in the row direction in some cases. That is, the direction in which the wirings that electrically connect components arranged in a matrix are extended is not limited to the direction described in this specification and the like, and can be the row direction or the column direction in some cases.

In this specification and the like, the terms "film" and "layer" can be interchanged with each other depending on the situation. For example, the term "conductive layer" can be changed into the term "conductive film" in some cases. For another example, the term "insulating film" can be changed into the term "insulating layer" in some cases. Alternatively, the terms "film" and "layer" are not used and can be interchanged with another term depending on the case or the situation. For example, the term "conductive layer" or "conductive film" can be changed into the term "conductor" in some cases. For another example, the term "insulating layer" or "insulating film" can be changed into the term "insulator" in some cases.

In this specification and the like, the terms "electrode", "wiring", "terminal", and the like do not limit the functions of such components. For example, an "electrode" is used as part of a "wiring" in some cases, and vice versa. Furthermore, the term "electrode" or "wiring" also includes, for example, the case where a plurality of "electrodes" or "wirings" are formed in an integrated manner. For example, a "terminal" is used as part of a "wiring" or an "electrode" in some cases, and vice versa. Furthermore, the term "terminal" also includes the case where one or more selected from "electrodes", "wirings", and "terminals" are formed in an integrated manner, for example. Therefore, for example, an "electrode" can be part of a "wiring" or a "terminal", and a "terminal" can be part of a "wiring" or an "electrode". Moreover, the term "electrode", "wiring", or "terminal" is sometimes replaced with the term "region" depending on the case.

In this specification and the like, the terms "wiring", "signal line", and "power supply line" can be interchanged with each other depending on the case or the situation. For example, the term "wiring" can be changed into the term "signal line" in some cases. For another example, the term "wiring" can be changed into the term "power supply line" or the like in some cases. Similarly, the term "signal line" or "power supply line" can be changed into the term "wiring" in some cases. The term "power supply line" can be changed into the term "signal line" in some cases. Similarly, the term "signal line" can be changed into the term "power supply line" in some cases. The term "potential" that is applied to a wiring can be changed into the term "signal" depending on the case or the situation. Similarly, the term "signal" can be changed into the term "potential" in some cases.

In this specification and the like, a timing chart is used in some cases to describe an operation method of a semiconductor device. In this specification and the like, the timing chart shows an ideal operation example and a period, a level of a signal (e.g., a potential or a current), and a timing described in the timing chart are not limited unless otherwise specified. In the timing chart described in this specification and the like, the level of a signal (e.g., a potential or a current) input to a wiring (including a node) and a timing can be changed depending on the circumstances. For example, even when two periods are shown to have an equal length, the two periods have different lengths in some cases. Furthermore, for example, even when one of two periods is shown long and the other is shown short, the two periods can have the equal length in some cases, or the one period has a short length and the other has a long length in other cases.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is included in a channel formation region of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

In this specification and the like, a metal oxide containing nitrogen is also collectively referred to as a metal oxide in some cases. A metal oxide containing nitrogen may be called a metal oxynitride.

In this specification and the like, an impurity in a semiconductor refers to, for example, an element other than a main component of a semiconductor layer. For example, an element with a concentration of lower than 0.1 atomic % is an impurity. When an impurity is contained, for example, one or more of an increase in the density of defect states in a semiconductor, a decrease in carrier mobility, and a decrease in crystallinity may occur. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (contained also in water), lithium, sodium, silicon, boron, phosphorus, carbon, and nitrogen. Specifically, in the case where the semiconductor is a silicon layer, examples of an impurity that changes characteristics of the semiconductor include Group 1 elements, Group 2 elements, Group 13 elements, and Group 15 elements (except oxygen and hydrogen).

In this specification and the like, a switch has a function of being in a conducting state (on state) or a non-conducting state (off state) to determine whether a current flows or not. Alternatively, a switch has a function of selecting and changing a current path. Thus, a switch may have two or more terminals through which a current flows, in addition to a control terminal. For example, an electrical switch or a mechanical switch can be used. That is, a switch can be any element capable of controlling a current, and is not limited to a particular element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conducting state" of the transistor refers to a state where a source electrode and a drain electrode of the transistor can be regarded as being electrically short-circuited or a state where a current can be made to flow between the source electrode and the drain electrode. Furthermore, a "non-conducting state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical systems) technology. Such a switch includes an electrode that can be moved mechanically, and operates by controlling conduction and non-conduction with movement of the electrode.

In this specification and the like, a device formed using a metal mask or an FMM (fine metal mask, high-resolution metal mask) may be referred to as a device having an MM (metal mask) structure. In this specification and the like, a device formed without using a metal mask or an FMM may be referred to as a device having an MML (metal maskless) structure.

In this specification and the like, a structure in which light-emitting layers in light-emitting devices of different colors (here, blue (B), green (G), and red (R)) are separately formed or separately patterned may be referred to as an SBS (Side By Side) structure. In this specification and the like, a light-emitting device capable of emitting white light may be referred to as a white-light-emitting device. Note that a combination of white-light-emitting devices with coloring layers (e.g., color filters) enables a full-color display apparatus.

Light-emitting devices can be classified roughly into a single structure and a tandem structure. A device with a single structure includes one light-emitting unit between a pair of electrodes, and the light-emitting unit preferably includes one or more light-emitting layers. When white light emission is obtained using two light-emitting layers, the two light-emitting layers are selected such that emission colors of the light-emitting layers are complementary colors. For example, when an emission color of a first light-emitting layer and an emission color of a second light-emitting layer are complementary colors, a light-emitting device can be configured to emit white light as a whole. When white light emission is obtained using three or more light-emitting layers, a light-emitting device is configured to emit white light as a whole by combining emission colors of the three or more light-emitting layers.

A device having a tandem structure includes two or more light-emitting units between a pair of electrodes, and each light-emitting unit preferably includes one or more light-emitting layers. To obtain white light emission, the structure is made such that light from light-emitting layers of the plurality of light-emitting units can be combined to be white light. Note that a structure for obtaining white light emission is similar to a structure in the case of a single structure. In the device having a tandem structure, an intermediate layer such as a charge-generation layer is suitably provided between the plurality of light-emitting units.

When the above white-light-emitting device (having a single structure or a tandem structure) and the above light-emitting device having an SBS structure are compared to each other, the light-emitting device having an SBS structure can have lower power consumption than the white-light-emitting device. The light-emitting device having an SBS structure is suitably used in the case where the power consumption is required to be low. Meanwhile, the white-light-emitting device is suitable in terms of lower manufacturing cost or higher manufacturing yield because the manufacturing process of the white-light-emitting device is simpler than that of the light-emitting device having an SBS structure.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 85° and less than or equal to 95° is also included. Furthermore, "approximately perpendicular" or "substantially perpendicular" indicates a state where two straight lines are placed at an angle greater than or equal to 60° and less than or equal to 120°.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined as appropriate.

Note that a content (or part of the content) described in one embodiment can be applied to, combined with, or replaced with at least one of another content (or part of the content) in the embodiment and a content (or part of the content) described in one or a plurality of different embodiments.

Note that in each embodiment, a content described in the embodiment is a content described using a variety of diagrams or a content described with text disclosed in the specification.

Note that by combining a diagram (or part thereof) described in one embodiment with at least one of another part of the diagram, a different diagram (or part thereof) described in the embodiment, and a diagram (or part thereof) described in one or a plurality of different embodiments, much more diagrams can be formed.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be interpreted as being limited to the description in the embodiments. Note that in the structures of the invention in the embodiments, the same portions or portions having similar functions are denoted by the same reference numerals in different drawings, and repeated description thereof is omitted in some cases. In perspective views and the like, some components might not be illustrated for clarity of the drawings.

In this specification, a plan view is sometimes used to explain a structure in each embodiment. A plan view is a diagram illustrating the appearance of a plane (section) of a structure cut in the horizontal direction, for example. Hidden lines (e.g., dashed lines) in a plan view can indicate the positional relation between a plurality of components included in a structure or the overlapping relation between the plurality of components. In this specification and the like, the term "plan view" can be replaced with the term "projection view", "top view", or "bottom view". A plane (section) of a structure cut in a direction other than the horizontal direction may be referred to as a plan view depending on circumstances.

In this specification, a cross-sectional view is sometimes used to explain a structure in each embodiment. A cross-sectional view is a diagram illustrating the appearance of a plane (section) of a structure cut in the vertical direction, for example. In this specification and the like, the term "cross-sectional view" can be replaced with the term "front view" or "side view". A plane (section) of a structure cut in a direction other than the vertical direction may be referred to as a cross-sectional view depending on circumstances.

In this specification and the like, when a plurality of components are denoted with the same reference numerals, and in particular need to be distinguished from each other, an identification sign such as "_1", "[n]", or "[m,n]" is sometimes added to the reference numerals. Components denoted with identification signs such as "_1", "[n]", and "[m,n]" in the drawings and the like are sometimes denoted without such identification signs in this specification and the like when the components do not need to be distinguished from each other.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes, values, or the like shown in the drawings. For example, variations in signal, voltage, or current due to noise, variations in signal, voltage, or current due to difference in timing, or the like can be included.

Embodiment 1

In this embodiment, display apparatuses of embodiments of the present invention will be described.

Structure Example 1 of Display Apparatus

FIG. 1 illustrates a display apparatus of one embodiment of the present invention. A display apparatus DSP0 includes a pixel array ALP, a row driver circuit RWD, and a column driver circuit CLM, for example.

The pixel array ALP includes m×n (m is an integer greater than or equal to 1, and n is an integer greater than or equal to 1) pixels PX, for example. In particular, the pixel circuits PX are arranged in a matrix of m rows and n columns in the pixel array ALP. In FIG. 1, a pixel PX[1,1], a pixel PX[m,1], a pixel PX[1,n], a pixel PX[m,n], and a pixel PX[i,j] (i is an integer greater than or equal to 1 and less than or equal to m, and j is an integer greater than or equal to 1 and less than or equal to n) are selectively illustrated as the plurality of pixels PX.

The pixel PX has a function of a display pixel. For example, either a liquid crystal display device or a light-emitting device, or both can be applied to the display pixel. Examples of the light-emitting device include a light-emitting device including an organic EL element (OLED (Organic Light Emitting Diode)), an inorganic EL element, an LED (including a micro LED), a QLED (Quantum-dot Light Emitting Diode), and a semiconductor laser. Note that in the description in this embodiment, the pixel PX includes a light-emitting device containing an organic EL material. In particular, the luminance of light emitted from a light-emitting device capable of high luminance light emission can be, for example, higher than or equal to 500 cd/m$^2$, preferably higher than or equal to 1000 cd/m$^2$ and lower than or equal to 10000 cd/m$^2$, further preferably higher than or equal to 2000 cd/m$^2$ and lower than or equal to 5000 cd/m$^2$.

In the pixel array ALP, a wiring GL[1] to a wiring GL[m] are extended in the row direction, for example. In addition, in the pixel array ALP, a wiring SL[1] to a wiring SL[n] are extended in the column direction, for example.

The pixel PX[i,j] is electrically connected to the wiring GL[i] and the wiring SL[j], for example.

The wiring SL[j] serves as a wiring transmitting an image data signal to the pixel PX[i,j], for example.

Note that one wiring SL is extended per column in the pixel array in FIG. 1; however, the number of wirings SL extended per column is not limited to one. That is, the number of wirings SL extended per column in the pixel array ALP can be two or more.

The wiring GL[i] serves as a wiring transmitting a selection signal for selecting the pixel PX[i,j] that is a supply destination of an image data signal, for example. The wiring GL[i] may also serve as a wiring transmitting a selection signal for selecting the pixel PX[i,j] in order to correct the threshold voltage of a driving transistor included in the pixel PX[i,j], for example. The wiring GL[i] may also serve as a wiring transmitting a control signal (a digital potential) for changing the on state and the off state of a switch included in the pixel PX[i,j].

Note that one wiring GL is extended per row in the pixel array in FIG. 1; however, the number of wirings GL extended per row is not limited to one. That is, the number of wirings GL extended per row in the pixel array ALP may be two or more. For example, the number of wirings GL extended per row can be determined depending on the circuit structure of the pixels PX, and the number of wirings GL may be two or more in accordance with the circuit structure of the pixels PX.

The row driver circuit RWD includes a driver circuit GD, for example.

The driver circuit GD is electrically connected to the wiring GL[1] to the wiring GL[m], for example.

The driver circuit GD has a function of transmitting a selection signal to the plurality of pixels PX, which are supply destinations of an image data signal, arranged in one or more rows selected from the first row to the m-th row in the pixel array ALP. Accordingly, the driver circuit GD may be provided with a demultiplexer. Note that the selection signal can be, for example, an analog potential, a digital potential (a high-level potential or a low-level potential), or a pulse potential. The driver circuit GD may have not only a function of selecting the pixels PX to be the supply destination of an image data signal but also a function of selecting the pixels PX for the purpose of correcting the threshold voltages of the transistors included in the pixels PX. That is, the driver circuit GD may have a function of transmitting a selection signal for correcting the threshold voltages of the transistors included in the pixels PX.

The column driver circuit CLM includes a driver circuit SD and a circuit CD[1] to a circuit CD[n], for example.

Each of the circuit CD[1] to the circuit CD[j] is electrically connected to the driver circuit SD. The circuit CD[j] is electrically connected to the wiring SL[j], for example.

The driver circuit SD has a function of transmitting an image data signal to the pixels PX included in the pixel array ALP, for example. The driver circuit SD may be provided with a demultiplexer depending on the method of transmitting an image data signal. Note that the image data signal can be, for example, an analog potential, a digital potential (a high-level potential or a low-level potential), or a pulse potential.

The circuit CD[j] has functions of level-shifting an image data signal input from the driver circuit SD and transmitting the level-shifted image data signal to the wiring SL[j], for example.

Figure 2:
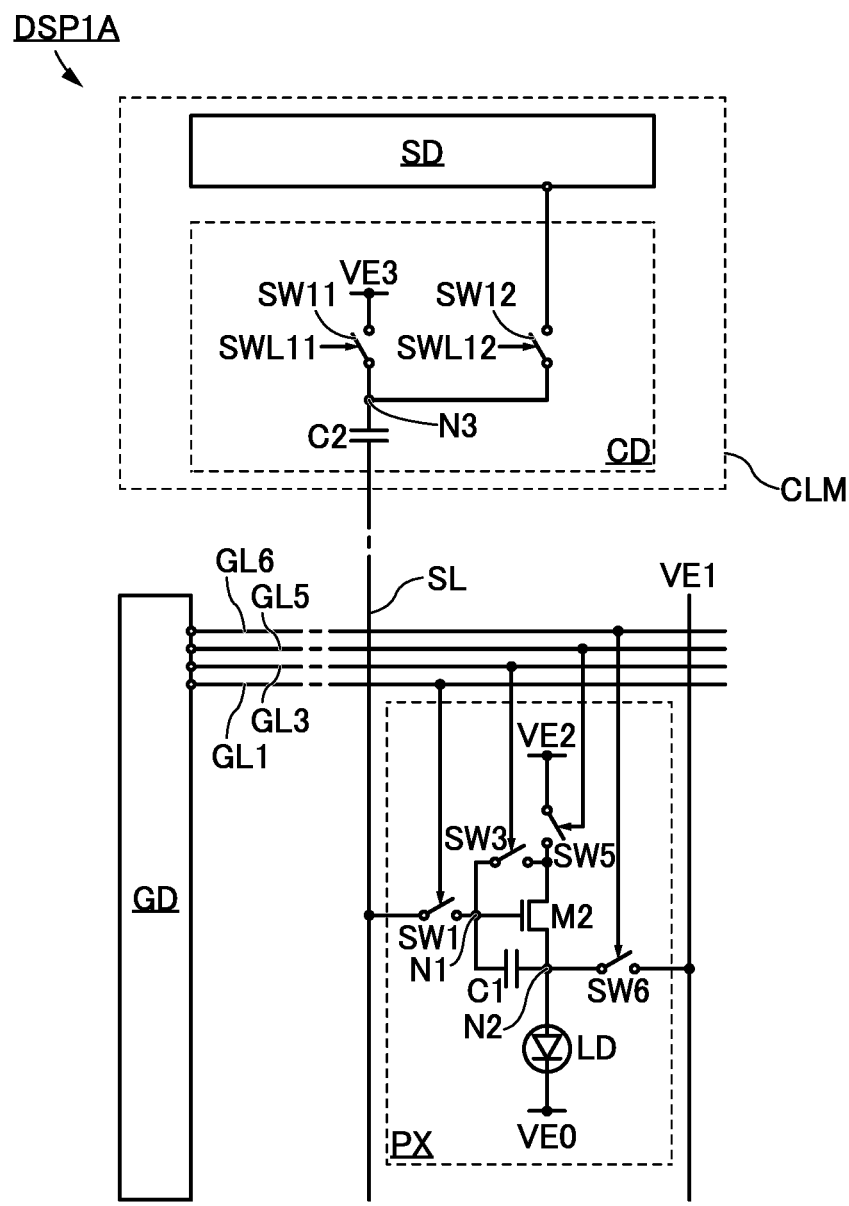
FIG. 2 is a circuit diagram illustrating a structure example of a display apparatus.

Next, structure examples of the pixel PX and the circuit CD are described. A display apparatus DSP1A illustrated in FIG. 2 is an example of the display apparatus DSP0 in FIG. 1. FIG. 2 selectively illustrates one of the plurality of pixels PX included in the pixel array ALP, the driver circuit GD of the row driver circuit RWD to which the pixel PX is electrically connected, and the circuit CD and the driver circuit SD in the column driver circuit CLM.

The pixel PX in the display apparatus DSP1A in FIG. 2 includes a transistor M2, a switch SW1, a switch SW3, a switch SW5, a switch SW6, a capacitor C1, and a light-emitting device LD, for example. The circuit CD includes a switch SW11, a switch SW12, and a capacitor C2. In particular, the transistor M2 serves as a driving transistor in the pixel PX.

An OS transistor is preferably used as the transistor M2, for example. Specifically, examples of a metal oxide included in a channel formation region of the OS transistor include indium oxide, gallium oxide, and zinc oxide. The metal oxide preferably includes one or more kinds selected from indium, an element M, and zinc. The element M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, cobalt, and magnesium. Specifically, the element M is preferably one or more kinds selected from aluminum, gallium, yttrium, and tin.

It is particularly preferable that an oxide containing indium (In), gallium (Ga), and zinc (Zn) (also referred to as IGZO) be used as the metal oxide used for the semiconductor layer. Alternatively, it is preferable to use an oxide containing indium, tin, and zinc (also referred to as ITZO (registered trademark)). Alternatively, it is preferable to use an oxide containing indium, gallium, tin, and zinc. Alternatively, it is preferable to use an oxide containing indium (In), aluminum (Al), and zinc (Zn) (also referred to as IAZO). Alternatively, it is preferable to use an oxide containing indium (In), aluminum (Al), gallium (Ga), and zinc (Zn) (also referred to as IAGZO). Note that the OS transistor will be described in detail in Embodiment 5.

A transistor other than the OS transistor may be used as the transistor M2. For example, a transistor including silicon in a channel formation region (hereinafter referred to as a Si transistor) can be employed as the transistor M2. As the silicon, single crystal silicon, amorphous silicon (sometimes referred to as hydrogenated amorphous silicon), microcrystalline silicon, or polycrystalline silicon (including low-temperature polycrystalline silicon) can be used, for example.

Examples of a transistor that can be used as the transistor M2 other than the OS transistor and the Si transistor include a transistor including germanium in a channel formation region, a transistor including a compound semiconductor, such as zinc selenide, cadmium sulfide, gallium arsenide, indium phosphide, gallium nitride, or silicon germanium, in a channel formation region, a transistor including a carbon nanotube in a channel formation region, and a transistor including an organic semiconductor in a channel formation region.

Although the transistor M2 illustrated in FIG. 2 is an n-channel transistor, the transistor M2 may be a p-channel transistor depending on conditions or circumstances. In the case where the n-channel transistor is replaced with a p-channel transistor, a potential or the like input to the pixel PX needs to be changed as appropriate so that the pixel PX operates normally. Note that the same applies to transistors described in other parts of the specification and transistors illustrated in the drawings other than FIG. 2. In this embodiment, a structure and operation of the pixel PX are described on the assumption that the transistor M2 is an n-channel transistor.

The transistor M2 preferably operates such that a current depending on not a source-drain voltage but a gate-source voltage flows between a source and a drain. In other words, the transistor M2 in the on state preferably operates in a saturation region. By making the transistor M2 operate in the saturation region, the amount of current flowing through the transistor M2 can be determined by the gate-source voltage. By making the transistor M2 operate in the saturation region, a drain current does not change largely even when the source-drain voltage of the transistor M2 changes. That is, the amount of current flowing through the transistor M2 is determined in accordance with the gate-source voltage, in which case the transistor M2 can make a stable current flow between an anode and a cathode of the light-emitting device LD. Depending on circumstances, the transistor M2 in the on state may operate in a linear region. Alternatively, the transistor M2 may operate in a subthreshold region.

Note that the above description of the transistor applies to not only the transistor M2 but also transistors described in other parts of the specification and transistors illustrated in the drawings.

As each of the switch SW1, the switch SW3, the switch SW5, the switch SW6, the switch SW11, and the switch SW12, an electrical switch such as an analog switch or a transistor can be used, for example. Specifically, the above-described transistors are preferably used as electrical switches serving as the switch SW1, the switch SW3, the switch SW5, the switch SW6, the switch SW11, and the switch SW12, and OS transistors are further preferably used. Note that in the case where electrical switches are used as the switch SW1, the switch SW3, the switch SW5, the switch SW6, the switch SW11, and the switch SW12, other than OS transistors, the transistors that can be used as the transistor M2 can be used. Specifically, as the transistors, Si transistors can be used. Alternatively, mechanical switches may be used as the switch SW1, the switch SW3, the switch SW5, the switch SW6, the switch SW11, and the switch SW12, for example.

Note that each of the switch SW1, the switch SW3, the switch SW5, the switch SW6, the switch SW11, and the switch SW12 illustrated in FIG. 2 in this specification and the like is on when a high-level potential is applied to a control terminal and off when a low-level potential is applied to the control terminal.

The light-emitting device LD in FIG. 2 is a self-luminous light-emitting device including an organic EL element (OLED), for example. Note that the structure of the light-emitting device LD that can be used for the pixel PX will be described in detail in Embodiment 4.

In the pixel PX, a first terminal of the switch SW1 is electrically connected to a gate of the transistor M2, a first terminal of the switch SW3, and a first terminal of the capacitor C1; a second terminal of the switch SW1 is electrically connected to the wiring SL; and a control terminal of the switch SW1 is electrically connected to the wiring GL1. A first terminal of the transistor M2 is electrically connected to a second terminal of the capacitor C1, a first terminal of the switch SW6, and the anode of the light-emitting device LD, and a second terminal of the transistor M2 is electrically connected to a second terminal of the switch SW3 and a first terminal of the switch SW5. A control terminal of the switch SW3 is electrically connected to a wiring GL3. A second terminal of the switch SW5 is electrically connected to a wiring VE2, and a control terminal of the switch SW5 is electrically connected to a wiring GL5. A second terminal of the switch SW6 is electrically connected to a wiring VE1, and a control terminal of the switch SW6 is electrically connected to a wiring GL6. The cathode of the light-emitting device LD is electrically connected to a wiring VE0.

Note that in this embodiment, a point where the first terminal of the switch SW1, the first terminal of the switch SW3, the gate of the transistor M2, and the first terminal of the capacitor C1 are electrically connected is referred to as a node N1. A point where the first terminal of the transistor M2, the second terminal of the capacitor C1, the first terminal of the switch SW6, and the anode of the light-emitting device LD are electrically connected is referred to as a node N2.

In the circuit CD, a first terminal of the capacitor C2 is electrically connected to the wiring SL, and a second terminal of the capacitor C2 is electrically connected to a first terminal of the switch SW11 and a first terminal of the switch SW12. A second terminal of the switch SW11 is electrically connected to a wiring VE3, and a control terminal of the switch SW11 is electrically connected to a wiring SWL11. A second terminal of the switch SW12 is electrically connected to the driver circuit SD, and a control terminal of the switch SW12 is electrically connected to a wiring SWL12.

Note that in this embodiment, the point where the first terminal of the switch SW11, the first terminal of the switch SW12, and the second terminal of the capacitor C2 are electrically connected is referred to as a node N3.

Each of the wiring VE0 to the wiring VE3 functions as a wiring for supplying a constant potential, for example. The constant potentials supplied by the wiring VE0 to the wiring VE3 may be equal to or different from one another. Alternatively, some of the potentials supplied by the wiring VE0 to the wiring VE3 may be equal and the other of the potentials may be different. One or more selected from the wiring VE0 to the wiring VE3 may serve as a wiring for supplying a pulse potential not a constant potential.

In particular, in the pixel PX in FIG. 2, the wiring VE0 preferably serves as a wiring for supplying a potential to the cathode of the light-emitting device LD. The wiring VE2 preferably serves as a wiring for supplying a potential to the anode of the light-emitting device LD.

Note that in the pixel PX in FIG. 2, the cathode of the light-emitting device LD is electrically connected to the wiring VE0, and the anode of the light-emitting device LD is electrically connected to the wiring VE2 through the transistor M2 and the switch SW5; however, the anode of the light-emitting device LD may be electrically connected to the wiring VE0, and the cathode of the light-emitting device LD may be electrically connected to the wiring VE2. That is, in the case where the former light-emitting device LD has an ordered stacked structure, the light-emitting device in the pixel of the display apparatus of one embodiment of the present invention may have an inverted stacked structure. In that case, the wiring VE0 serves as a wiring for supplying a potential to the anode of the light-emitting device LD, and the wiring VE2 serves as a wiring for supplying a potential to the cathode of the light-emitting device LD.

The wiring GL1, the wiring GL3, the wiring GL5, and the wiring GL6 correspond to one of the wiring GL[1] to the wiring GL[m] in FIG. 1. That is, in the case of the circuit structure of the pixel PX illustrated in FIG. 2, the number of wirings GL extended per row of the pixel array ALP is four.

The wiring SWL11 functions as a wiring for transmitting a control signal (a digital potential) switching the state of the switch SW11 between an on state and an off state. Similarly, the wiring SWL12 functions as a wiring for transmitting a control signal (a digital potential) switching the state of the switch SW12 between an on state and an off state.

Example 1 of Operation Method of Display Apparatus

Next, an example of an operation method of the display apparatus DSP1A in FIG. 2 is described.

Figure 3A:
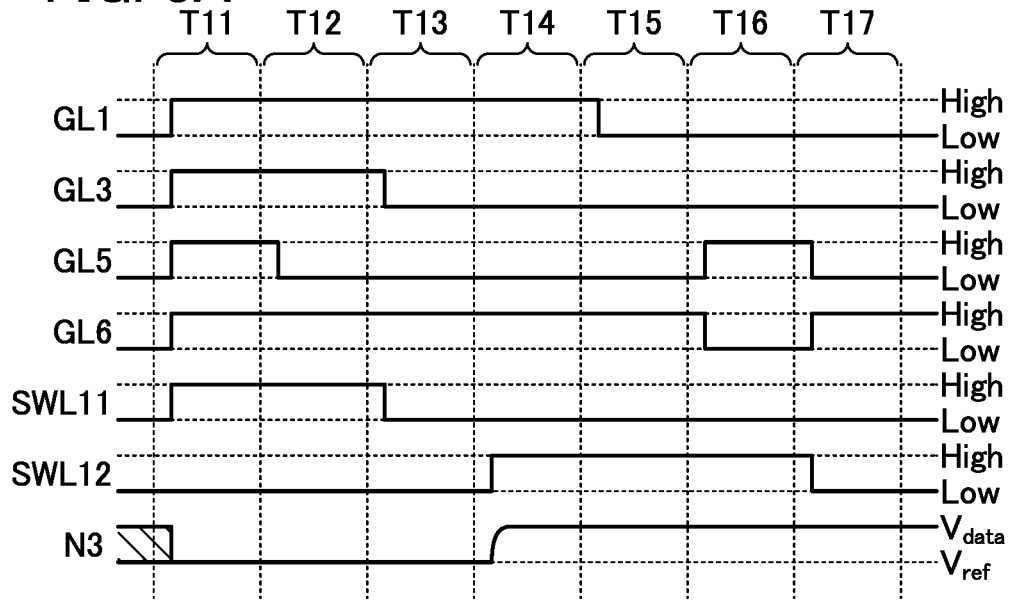
FIG. 3A and FIG. 3B are timing charts showing an operation example of a display apparatus.
Figure 3B:
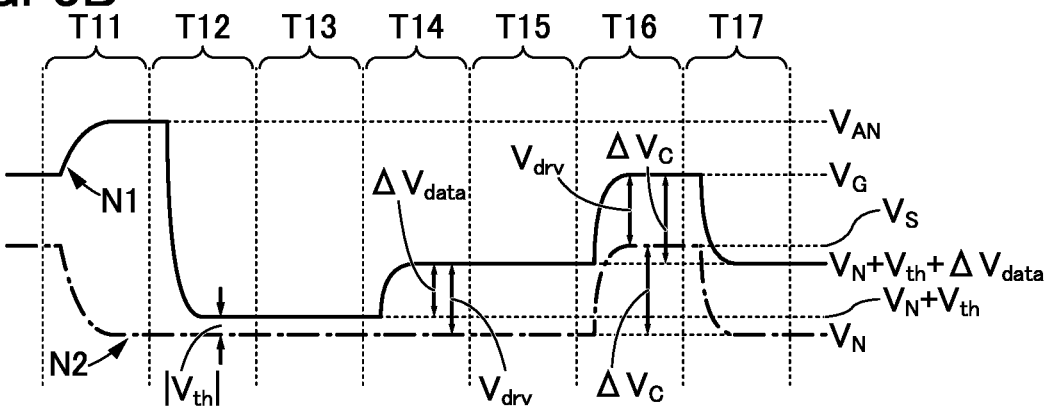

FIG. 3A and FIG. 3B are timing charts showing an example of an operation method of the display apparatus DSP1A. Specifically, the timing chart of FIG. 3A shows potential changes of the wiring GL1, the wiring GL3, the wiring GL5, the wiring GL6, the wiring SWL11, the wiring SWL12, and the node N3 in a period T11 to a period T17. FIG. 3B shows potential changes of the node N1 and the node N2 in the period T11 to the period T17. In FIG. 3B, the change in the potential of the node N1 is indicated by a solid line, and the change in the potential of the node N2 is indicated by a dashed-dotted line. Note that the timing chart of FIG. 3B shows the case where the threshold voltage of the transistor M2 is higher than 0 V.

Note that in FIG. 3A, "High" indicates a high-level potential and "Low" indicates a low-level potential.

The wiring VE1 is supplied with $V_N$ as a constant potential. The wiring VE3 is supplied with $V_{ref}$ as a constant potential. Note that $V_N$ and $V_{ref}$ may be the same potential.

The wiring VE2 is supplied with $V_{AN}$ as a constant potential. The wiring VE0 is supplied with $V_{CT}$ as a constant potential. $V_{AN}$ is a potential higher than $V_{CT}$.

Note that $V_{AN}$ is a potential higher than $V_N$. In addition, a voltage $V_N - V_{CT}$ is a voltage with which the light-emitting device LD does not emit light (a current does not flow between the anode and the cathode of the light-emitting device LD). Therefore, $V_N$ is preferably a potential equal to $V_{CT}$, or a potential lower than $V_{CT}$.

The threshold voltage of the transistor M2 is $V_{th}$. Note that $V_{th}$ is a voltage lower than $V_{AN} - V_N$.

[Before Period T11]

In a period before the period T11, each of the wiring GL1, the wiring GL3, the wiring GL5, the wiring GL6, the wiring SWL11, and the wiring SWL12 is supplied with a low-level potential. Accordingly, each of the control terminals of the switch SW1, the switch SW3, the switch SW5, the switch SW6, the switch SW11, and the switch SW12 is supplied with a low-level potential, whereby these switches are off.

The potentials of the node N1 and the node N2 before the period T11 are not particularly limited. For example, although FIG. 3B shows an example where the potential of the node N1 in the period T11 to be described later is increasing, the potential of the node N1 before the period T11 may be a potential which decreases in the period T11. In addition, for example, although FIG. 3B shows an example where the potential of the node N2 in the period T11 to be described later is decreasing, the potential of the node N2 before the period T11 may be a potential which increases in the period T11.

Before the period T11, the potential of the node N3 is undefined. Thus, the potential of the node N3 before the period T11 is hatched in the timing chart of FIG. 3A.

[Period T11]

In the period T11, each of the wiring GL1, the wiring GL3, the wiring GL5, the wiring GL6, and the wiring SWL11 is supplied with a high-level potential. Accordingly, each of the control terminals of the switch SW1, the switch SW3, the switch SW5, the switch SW6, and the switch SW11 is supplied with a high-level potential, whereby these switches are on.

Since the switch SW1, the switch SW3, and the switch SW5 are on, electrical continuity is established between the wiring VE2 and each of the gate of the transistor M2, the first terminal of the capacitor C1, and the first terminal of the capacitor C2. Thus, the first terminal of the capacitor C2, the gate of the transistor M2, and the first terminal of the capacitor C1 (the node N1) are supplied with the potential $V_{AN}$ from the wiring VE2 (see FIG. 3B).

Since the switch SW6 is on, electrical continuity is established between the wiring VE1 and each of the first terminal of the transistor M2, the second terminal of the capacitor C1, and the anode of the light-emitting device LD. Thus, the first terminal of the transistor M2, the second terminal of the capacitor C1, and the anode of the light-emitting device LD (the node N2) are supplied with the potential $V_{AN}$ from the wiring VE1 (see FIG. 3B).

At this time, the anode-cathode voltage of the light-emitting device LD becomes $V_N-V_{CT}$. As described above, when the anode-cathode voltage of the light-emitting device LD is $V_N-V_{CT}$, the light-emitting device LD does not emit light (a current does not flow between the anode and the cathode of the light-emitting device LD).

Since the potential of each of the gate and the second terminal of the transistor M2 is $V_{AN}$ and the potential of the first terminal of the transistor M2 is $V_N$, the gate-source voltage of the transistor M2 becomes $V_{AN}-V_N$. Since the gate-source voltage $V_{AN}-V_N$ is a voltage higher than $V_{th}$, the transistor M2 is turned on. When a current does not flow between the anode and the cathode of the light-emitting device LD, a current flows between the wiring VE1 and the wiring VE2 with the switch SW5, the transistor M2, and the switch SW6 provided therebetween.

Since the switch SW11 is on, electrical continuity is established between the wiring VE3 and each of the second terminal of the capacitor C2 and the first terminal of the switch SW12. Thus, the second terminal of the capacitor C2 and the first terminal of the switch SW12 (the node N3) are supplied with the potential $V_{ref}$ from the wiring VE3 (see FIG. 3A).

Note that in the period T11 in the timing chart of FIG. 3A, high-level potentials are input to the wiring GL1, the wiring GL3, the wiring GL5, the wiring GL6, and the wiring SWL11 at the same timing; however, the timings for inputting high-level potentials to the wiring GL1, the wiring GL3, the wiring GL5, the wiring GL6, and the wiring SWL11 may be different within the period T11.

[Period T12]

In the period T12, a low-level potential is supplied to the wiring GL5. Thus, a low-level potential is supplied to the control terminal of the switch SW5, whereby the switch SW5 is turned off. Thus, the second terminal of the transistor M2 and the wiring VE2 are brought out of conduction.

Immediately before the switch SW5 is turned off, the gate-source voltage $V_{AN}-V_N$ of the transistor M2 is higher than the threshold voltage $V_{th}$ of the transistor M2, and thus the transistor M2 is on. When the switch SW5 is turned off, the potential $V_{AN}$ is not applied to each of the second terminal of the transistor M2 and the gate of the transistor M2 from the wiring VE2, and positive charge supplied to the node N1 is discharged to the wiring VE1 passing between the first terminal and the second terminal of the transistor M2 and through the switch SW6. Accordingly, the potential of the node N1 is decreased.

The decrease in the potential of the node N1 decreases the gate-source voltage of the transistor M2. When the gate-source voltage of the transistor M2 decreases to the threshold voltage $V_{th}$ of the transistor M2, the transistor M2 is turned off, and discharge of positive charge from the node N1 is stopped. That is, when the potential of the node N1 reaches $V_N+V_{th}$ from $V_{AN}$, the transistor M2 is turned off. Since the transistor M2 is off, the potential of the node N1 does not change from $V_N+V_{th}$ (see FIG. 3B). When the transistor M2 is turned off, the node N1 and the wiring SL are brought into a floating state.

[Period T13]

In the period T13, a low-level potential is supplied to each of the wiring GL3 and the wiring SWL11. Thus, a low-level potential is supplied to each of the control terminals of the switch SW3 and the switch SW11, so that the switch SW3 and the switch SW11 are turned off.

Since the switch SW3 is off, the second terminal of the transistor M2 and each of the first terminal of the capacitor C2, the gate of the transistor M2, and the first terminal of the capacitor C1 are brought out of conduction.

Since the switch SW11 is off, the wiring VE3 and each of the second terminal of the capacitor C2 and the first terminal of the switch SW12 are brought out of conduction. At this time, the node N3 is brought into a floating state.

[Period T14]

In the period T14, a high-level potential is supplied to the wiring SWL12. Thus, a high-level potential is supplied to the control terminal of the switch SW12, whereby the switch SW12 is turned on.

In particular, when the switch SW12 is on, the driver circuit SD transmits an image data signal in accordance with an image displayed on the pixel PX to the second terminal of the capacitor C2 (the node N3) through the switch SW12. Note that the image data signal is a potential $V_{data}$.

Thus, the potential of the node N3 changes from $V_{ref}$ to $V_{data}$. The wiring SL and the node N1 are in a floating state, the potentials of the wiring SL and the node N1 are also changed by the capacitive coupling of the capacitor C2 in accordance with a change in potential of the node N3. The amounts of changes in the potentials of the wiring SL and the node N1 are determined by, for example, electrostatic capacitance of the capacitor C1, electrostatic capacitance of the capacitor C2, gate capacitance of the transistor M2, parasitic capacitance of the switch SW1, parasitic capacitance of the switch SW3, and parasitic capacitance of the wiring SL. In this operation example, for simple description, the description will be made on the assumption that the amounts of changes in the potentials of the wiring SL and the node N1 are determined by the electrostatic capacitance of the capacitor C1 and the electrostatic capacitance of the capacitor C2.

When the electrostatic capacitance of the capacitor C1 is represented by C1 and the electrostatic capacitance of the capacitor C2 is represented by C2, and the potential of the node N3 changes from $V_{ref}$ to $V_{data}$, $\Delta V_{data}=(V_{data}-V_{ref})\times C_2/(C_1+C_2)$ is given to the wiring SL and the node N1 as the amounts of changes in the potentials thereof. Thus, the potentials of the wiring SL and the node N1 are $V_N+V_{th}+\Delta V_{data}$ (see FIG. 3B).

Meanwhile, the second terminal of the capacitor C1 (the node N2) is supplied with the potential $V_N$ from the wiring VE1 before the period T14, and thus the potential of the second terminal of the capacitor C1 (the node N2) remains $V_N$ and does not change even in a period in which the potential of the node N3 changes from $V_{ref}$ to $V_{data}$.

Accordingly, when the gate-source voltage of the transistor M2 in the period T14 is represented by $V_{drv}$, $V_{drv}=$(the potential of the node N1)−(the potential of the node N2)$=V_{th}+\Delta V_{data}$. In other words, in the period T14, a voltage $V_{drv}$ held between the first terminal and the second terminal of the capacitor C1 is set to the sum of the potential $\Delta V_{data}$ corresponding to an image displayed on the pixel PX and the threshold voltage $V_{th}$ of the transistor M2.

Since the gate-source voltage $V_{drv}$ of the transistor M2 is higher than the threshold voltage $V_{th}$ of the transistor M2, the transistor M2 is on. Note that since the switch SW3 and the switch SW5 are off, the second terminal of the transistor M2 and the node N1 are brought out of conduction, and the second terminal of the transistor M2 and the wiring VE2 are brought out of conduction. Thus, no current flows between the first terminal and the second terminal of the transistor M2.

[Period T15]

In the period T15, a low-level potential is supplied to the wiring GL1. Thus, a low-level potential is supplied to the control terminal of the switch SW1, whereby the switch SW1 is turned off.

When the switch SW1 is turned off, the wiring SL and each of the gate of the transistor M2 and the first terminal of the capacitor C1 are brought out of conduction. The switch SW3 has been off since the period T13, so that the potential $V_N+V_{th}+\Delta V_{data}$ is held in the first terminal of the capacitor C1 (the node N1).

[Period T16]

In the period T16, a high-level potential is supplied to the wiring GL5, and a low-level potential is supplied to the wiring GL6. Thus, a high-level potential is supplied to the control terminal of the switch SW5, whereby the switch SW5 is turned on. A low-level potential is supplied to the control terminal of the switch SW6, whereby the switch SW6 is turned off.

Since the switch SW5 is on, electrical continuity is established between the second terminal of the transistor M2 and the wiring VE2. Since the switch SW6 is off, the wiring VE1 and each of the first terminal of the transistor M2 and the second terminal of the capacitor C1 are brought out of conduction. The switch SW3 has been off from the period T13, so that the second terminal of the transistor M2 and the gate of the transistor M2 (the node N1) are brought out of conduction.

Since the gate-source voltage of the transistor M2 is $V_{drv}=V_{th}+\Delta V_{data}$ which is higher than the threshold voltage $V_{th}$ of the transistor M2, the transistor M2 is on.

Thus, a current flows between the wiring VE0 and the wiring VE2 through the switch SW5, the transistor M2, and the light-emitting device LD.

At this time, a voltage $V_{AN}-V_{CT}$ between the wiring VE0 and the wiring VE2 is divided by the transistor M2, the light-emitting device LD, and the switch SW5. In this operation example, the potential of the first terminal of the transistor M2 (the second terminal of the capacitor C1 and the node N2) is increased from $V_N$ to $V_S$ by the operation in the period T16 (see FIG. 3B).

Since the potential of the first terminal of the transistor M2 (the second terminal of the capacitor C1 and the node N2) is increased from $V_N$ to $V_S$, the potential of the gate of the transistor M2 (the first terminal of the capacitor C1 and the node N1) also changes due to capacitive coupling of the capacitor C1. In this operation example, the potential of the gate of the transistor M2 (the first terminal of the capacitor C1 and the node N1) is increased from $V_N+V_{th}+\Delta V_{data}$ to $V_G$ by the operation in the period T16 (see FIG. 3B).

Note that the amount of change in the potential of the node N1 due to the above-described capacitive coupling of the capacitor C1 is determined by the electrostatic capacitance of the capacitor C1, the gate capacitance of the transistor M2, the electrostatic capacitance of the switch SW1, and the parasitic capacitance of the switch SW3. Note that in this operation example, for simple description, the amount of change in the potential of the node N1 is assumed to be equal to the amount of change in the potential of the node N2. That is, when the amount of change in the potential of the node N2 is $\Delta V_C$ $(=V_S-V_N)$, the amount of change in the potential of the node N1 also becomes $\Delta V_C$. This corresponds to the case where the capacitive coupling coefficient in the periphery of the node N1 is 1.

Since $\Delta V_C = V_G - (V_N+V_{th}+\Delta V_{data})$ at the node N1, when the amount of change in the potential of the node N2, $\Delta V_C = V_S - V_N$ is substituted into this formula, $V_G - V_S = V_{th} + \Delta V_{data} = V_{drv}$ is obtained. That is, the gate-source voltage of the transistor M2 in the period T16 does not change from the gate-source voltage in the period T14 after input of an image data signal to the circuit CD.

Here, the case where the transistor M2 operates in a saturation region is considered. The amount of current flowing between the first terminal and the second terminal of the transistor M2 is determined in accordance with the gate-source voltage $V_{drv}$ of the transistor M2. Specifically, an amount I of current flowing between the source and the drain of the transistor operating in the saturation region is proportional to the square of a difference between the gate-source voltage $V_{GS}$ and the threshold voltage $V_{th}$ of the transistor, whereby $I=k(V_{GS}-V_{th})^2$. Note that k is a proportionality constant depending on the transistor structure. By substituting the gate-source voltage $V_{drv}$ of the transistor M2 into $V_{GS}$ in the above formula, $I=k(\Delta V_{data})^2$, and the amount I of current flowing through the transistor M2 does not depend on the threshold voltage $V_{th}$ and is determined by $\Delta V_{data}$.

Accordingly, performing the operation from the period T11 to the period T16 allows the transistor M2 to generate a current that does not depend on the threshold voltage $V_{th}$ of the transistor M2.

Since the potential of the anode of the light-emitting device LD is $V_S$, the anode-cathode potential of the light-emitting device LD is $V_S-V_{CT}$. Furthermore, a current flowing between the source and the drain of the transistor M2 ($I=k(\Delta V_{data})^2$) flows between the anode and the cathode of the light-emitting device LD, whereby the light-emitting device LD emits light. In the case where the light-emitting device LD is an organic EL element, emission luminance of the light-emitting device LD is determined by the amount of current flowing between the anode and the cathode of the light-emitting device LD. In other words, the emission luminance of the light-emitting device LD is determined by the image data signal $V_{data}$ input from the driver circuit SD.

The image data signal $V_{data}$ output from the driver circuit SD changes to $V_{AN}+K\times(V_{data}-V_{ref})$ through the circuit CD. That is, $V_{AN}+K\times(V_{data}-V_{ref})$ is input to the pixel PX. Note that $K=C_2/(C_1+C_2)$. Here, the case where the minimum value of the gray level of the pixel is $V_{data\_min}$, the maximum value of the gray level of the pixel is $V_{data\_max}$, and an image data signal $V_{data}$ has any one of a plurality of potentials $V_{data\_min}$ to $V_{data\_max}$ is considered. The plurality of potentials $V_{data\_min}$ to $V_{data\_max}$ are input to the pixels PX through the circuit CD, and thus change to $V_{AN}+K\times(V_{data\_min}-V_{ref})$ to $V_{AN}+K\times(V_{data\_max}-V_{ref})$.

Figure 4A:
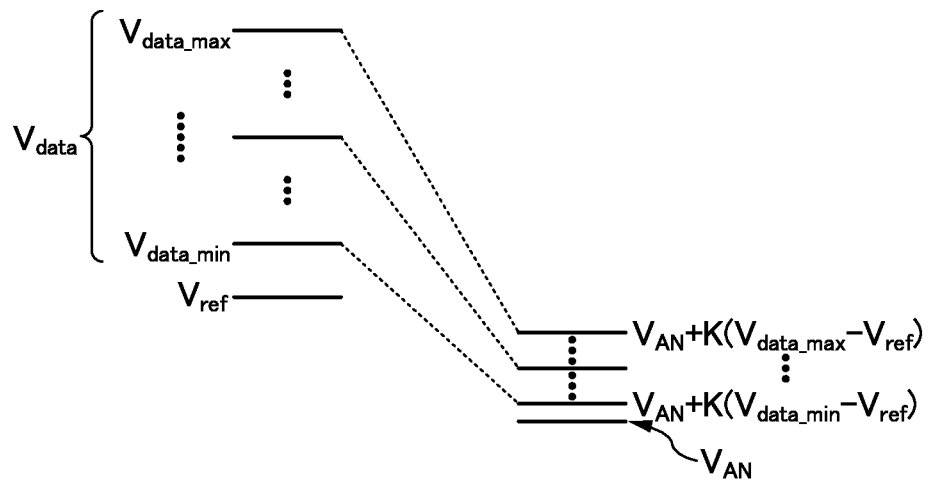
FIG. 4A to FIG. 4C are diagrams each showing a relation between a potential of an image data signal input to a circuit and a potential of the image data signal output from the circuit.

In the case where $V_{ref}$ is lower than $V_{AN}$, the relation between image data signals $V_{data\_min}$ to $V_{data\_max}$ output from the driver circuit SD and $V_{AN}+K\times(V_{data\_min}-V_{ref})$ to $V_{AN}+K\times(V_{data\_max}-V_{ref})$ input to the pixels PX through the circuit CD are shown in FIG. 4A. That is, the image data signals output from the driver circuit SD are input to the pixels PX through the circuit CD, whereby the potential range of the image data signals is narrowed and the potential step size of the image data signal becomes small. Accordingly, potentials of the image data signals input to the pixels PX can be changed finely, and thus the amount of current flowing between the source and the drain of the transistor M2 can be changed finely.

Figure 4B:
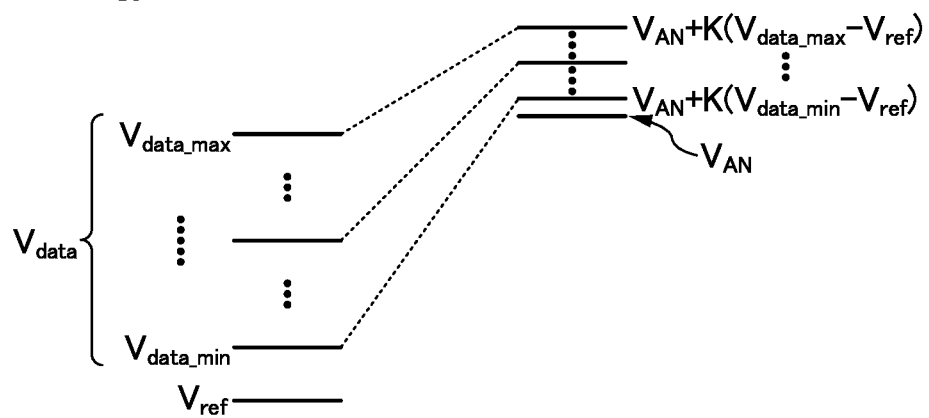

In the case where $V_{ref}$ is higher than $V_{AN}$, the relation between image data signals $V_{data\_min}$ to $V_{data\_max}$ output from the driver circuit SD and $V_{AN}+K\times(V_{data\_min}-V_{ref})$ to $V_{AN}+K\times(V_{data\_max}-V_{ref})$ input to the pixels PX through the circuit CD are shown in FIG. 4B. The amount of current flowing between the source and the drain of the transistor M2 can be changed finely by decreasing the potential step size of the image data signal, which is the same as the relation shown in FIG. 4A.

Figure 4C:
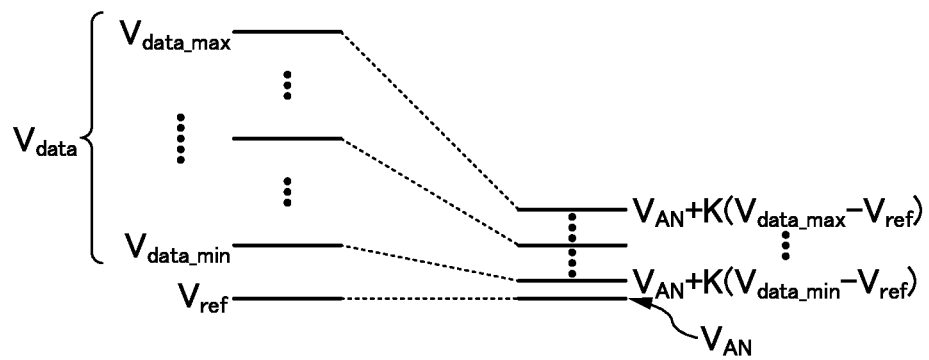

In the case where $V_{ref}$ and $V_{AN}$ are equal to each other, the relation between image data signals $V_{data\_min}$ to $V_{data\_max}$ output from the driver circuit SD and $V_{AN}$+K× ($V_{data\_min}$-$V_{ref}$) to $V_{AN}$+K×($V_{data\_max}$-$V_{ref}$) input to the pixels PX through the circuit CD are shown in FIG. 4C. The amount of current flowing between the source and the drain of the transistor M2 can be changed finely by decreasing the potential step size of the image data signal, which is the same as the relation shown in FIG. 4A and FIG. 4B.

Note that in the period T16 in the timing chart of FIG. 3A, a high level potential and a low-level potential are respectively input to the wiring GL5 and the wiring GL6 at the same timing; however, the timings for inputting potentials to the wiring GL5 and the wiring GL6 may be different within the period T16.

[Period T17]

In the period T17, a low-level potential is supplied to each of the wiring GL5 and the wiring SWL12 and a high-level potential is supplied to the wiring GL6. Thus, a low-level potential is supplied to each of the control terminals of the switch SW5 and the switch SW12, so that the switch SW5 and the switch SW12 are turned off. In addition, a high-level potential is supplied to the control terminal of the switch SW6, so that the switch SW6 is turned on.

Since the switch SW5 is off, the second terminal of the transistor M2 and the wiring VE2 are brought out of conduction. Moreover, since the switch SW6 is on, electrical continuity is established between the wiring VE1 and each of the first terminal of the transistor M2, the second terminal of the capacitor C1, and the anode of the light-emitting device LD. Thus, the first terminal of the transistor M2, the second terminal of the capacitor C1, and the anode of the light-emitting device LD (the node N2) are supplied with the potential $V_N$ from the wiring VE1 (see FIG. 3B).

At this time, the anode-cathode voltage of the light-emitting device LD becomes $V_N$-$V_{CT}$. As described above, when the anode-cathode voltage of the light-emitting device LD is $V_N$-$V_{CT}$, the light-emitting device LD does not emit light (a current does not flow between the anode and the cathode of the light-emitting device LD).

In other words, by performing the operation in the period T17, light emission by the light-emitting device LD can be stopped.

By performing the above-described operations in the period T11 to the period T17, the transistor M2 in the pixel PX can generate a current that does not depend on the threshold voltage $V_{th}$ of the transistor M2, and can supply the current to the light-emitting device LD.

The threshold voltages of driving transistors in the plurality of pixels included in a pixel array of the display apparatus might vary depending on the manufacturing process and manufacturing environment of the display apparatus. That is, although the same image data signal is supplied to different pixels, when the threshold voltages of transistors in the pixels vary, the amounts of currents flowing through the transistors are also different, resulting in different emission luminances of light-emitting devices in the pixels in some cases. As a result, unevenness in emission luminance of the light-emitting devices is caused, which decreases the display quality of an image of the display apparatus.

Meanwhile, the use of the display apparatus DSP1A as one embodiment of the present invention enables the transistor M2 in the pixel PX to generate a current that does not depend on the threshold voltage $V_{th}$ of the transistor M2, which can inhibit generation of unevenness in emission luminance between the light-emitting devices included in the pixels PX in the pixel array ALP. Thus, by using the display apparatus DSP1A, the display quality of the display apparatus DSP1A can be increased.

By performing the above-described operations in the period T11 to the period T17, the amount of current flowing through the light-emitting device LD in the pixel PX of the display apparatus DSP1A can be controlled more finely.

In a display apparatus with high definition, the area of a region where light-emitting devices of pixels in a pixel array are formed (a light-emitting surface) is small. When the area of the region of light-emitting devices (the light-emitting surface) is small, the amount of current needed for light emission of the light-emitting device is small, but the allowable current amount is also small. Therefore, fine current control is necessary in order to precisely control the emission luminance of the light-emitting device.

The use of the display apparatus DSP1A as one embodiment of the present invention can finely control the amount of current flowing through the light-emitting device LD, whereby the emission luminance of the light-emitting device LD in the pixel PX can be adjusted minutely. Accordingly, the use of the display apparatus DSP1A allows the gray levels of an image to be set minutely, whereby the display apparatus DSP1A can have improved display quality. Moreover, the use of the display apparatus DSP1A can reduce the amount of current flowing through the light-emitting device LD, which can inhibit the light-emitting device LD from being broken due to overcurrent.

Example 2 of Operation Method of Display Apparatus

FIG. 3A and FIG. 3B illustrate operation of one of the pixels PX included in the pixel array ALP of the display apparatus DSP1A. Here, operation of the whole pixel array ALP in the display apparatus DSP0 employing the display apparatus DSP1A is described.

Note that since the display apparatus DSP0 employs the display apparatus DSP1A, the circuit CD illustrated in FIG. 2 is employed as each of the circuit CD[1] to the circuit CD[n] in the display apparatus DSP0. Furthermore, the pixel PX in FIG. 2 is employed as each of the pixel PX[1,1] to the pixel PX[m,n].

Figure 5:
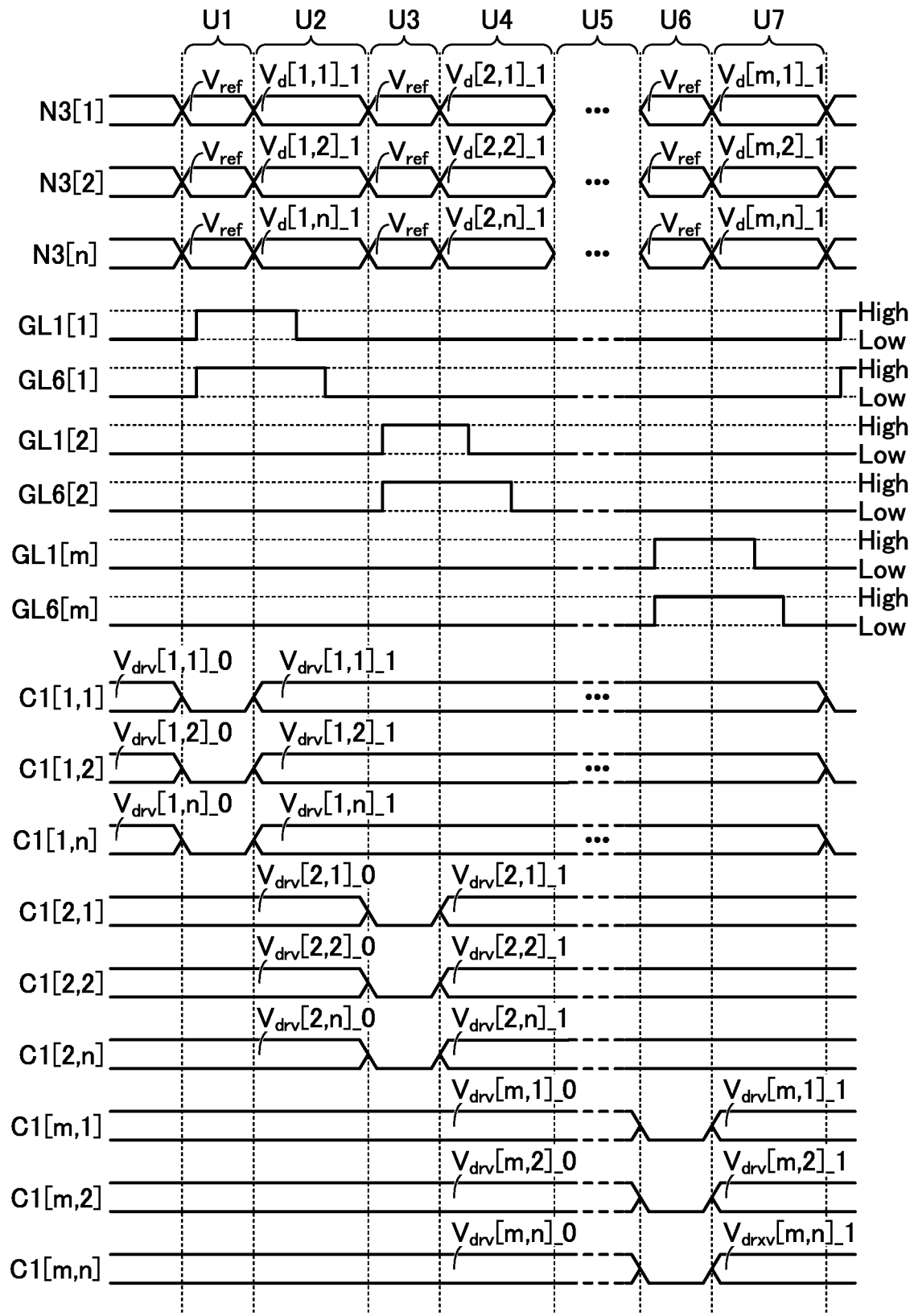
FIG. 5 is a timing chart showing an operation example of a display apparatus.

FIG. 5 is a timing chart showing an example of a method of writing image data to the plurality of pixels PX included in the pixel array ALP of the display apparatus DSP0.

The timing chart of FIG. 5 shows changes in potentials of a node N3[1], a node N3[2], a node N3[n], a wiring GL1[1], a wiring GL6[1], a wiring GL1[2], a wiring GL6[2], a wiring GL1[m], and a wiring GL6[m] and changes in image data held between first terminals and second terminals of a capacitor C1[1,1], a capacitor C1[1,2], a capacitor C1[1,n], a capacitor C1[2,1], a capacitor C1[2,2], a capacitor C1[2,n], a capacitor C1[m,1], a capacitor C1[m,2], and a capacitor C1[m,n] from a period U1 to a period U7 inclusive and the vicinity thereof.

Note that the node N3[1] corresponds to the node N3 included in the circuit CD[1] in the display apparatus DSP0. Similarly, the node N3[2] corresponds to the node N3 included in a circuit CD[2] (not illustrated in FIG. 1) in the display apparatus DSP0, and the node N3[n] corresponds to the node N3 included in the circuit CD[n] in the display apparatus DSP0.

The wiring GL1[1] corresponds to the wiring GL1 in FIG. 2 extended in the first row in the pixel array ALP of the display apparatus DSP0. Similarly, the wiring GL1[2] corresponds to the wiring GL1 in FIG. 2 extended in the second row in the pixel array ALP of the display apparatus DSP0, and the wiring GL1[$m$] corresponds to the wiring GL1 in FIG. 2 extended in the m-th row in the pixel array ALP of the display apparatus DSP0.

The capacitor C1[1,1] corresponds to the capacitor C1 in FIG. 2 in the pixel PX[1,1] included in the pixel array ALP of the display apparatus DSP0. Similarly, the capacitor C1[1,2] corresponds to the capacitor C1 in FIG. 2 in the pixel PX[1,2] (not illustrated in FIG. 1) included in the pixel array ALP of the display apparatus DSP0, and the capacitor C1[1,$n$] corresponds to the capacitor C1 in FIG. 2 in the pixel PX[1,$n$] included in the pixel array ALP of the display apparatus DSP0. A capacitor C1[$i,j$] hereinafter corresponds to the capacitor C1 in FIG. 2 in the pixel PX[i,j] included in the pixel array ALP of the display apparatus DSP0.

In each of the period U1, the period U3, and the period U6 in the timing chart of FIG. 5, operation in the period T11 to the period T13 in the timing chart of FIG. 3 is performed on the plurality of pixels PX positioned in a certain row. In each of the period U2, the period U4, and the period U7 in the timing chart of FIG. 5, operation in the period T14 to the period T17 in the timing chart of FIG. 3A is performed on the plurality of pixels PX positioned in a certain row.

Before the period U1, voltage $V_{drv}$[1,1]_0 is held in the capacitor C1[1,1], voltage $V_{drv}$[1,2]_0 is held in the capacitor C1[1,2], voltage $V_{drv}$[1,$n$]_0 is held in the capacitor C1[1,$n$], voltage $V_{drv}$[2,1]_0 is held in the capacitor C1[2,1], voltage $V_{drv}$[2,2]_0 is held in the capacitor C1[2,2], voltage $V_{drv}$[2,$n$]_0 is held in the capacitor C1[2,$n$], voltage $V_{drv}$[m,1]_0 is held in the capacitor C1[$m$,1], voltage $V_{drv}$[m,2]_0 is held in the capacitor C1[$m$,2], and voltage $V_{drv}$[m,n]_0 is held in the capacitor C1[$m,n$]. Note that $V_{drv}$[i,j] corresponds to $V_{drv}$ in the pixel PX[i,j] in the timing chart of FIG. 3B.

Before the period U1, a low-level potential is input to each of the wiring GL1[1] to the wiring GL1[$m$]. Thus, a low-level potential is supplied to each of the control terminals of the switches SW1 in all the pixels PX in the pixel array ALP, whereby the switches SW1 in all the pixels PX are turned off. This operation makes currents flow between anodes and cathodes of the light-emitting devices LD in all the pixels PX in the pixel array ALP, whereby the light-emitting devices LD emit light.

In the period U1, the operation in the period T11 to the period T13 in the timing chart of FIG. 3A is performed on the pixel PX[1,1] to the pixel PX[1,$n$] positioned in the first row in the pixel array ALP. Thus, the potentials of the node N3[1] to the node N3[$n$] become $V_{ref}$.

In the period U1, a high-level potential is input to the wiring GL1[1]. Thus, a high-level potential is supplied to each of the control terminals of the switches SW1 in the pixel PX[1,1] to the pixel PX[1,$n$] positioned in the first row in the pixel array ALP, whereby the switches SW1 in the pixel PX[1,1] to the pixel PX[1,$n$] are turned on.

In the period U1, a high-level potential is input to the wiring GL6[1]. Thus, a high-level potential is supplied to each of the control terminals of the switches SW6 in the pixel PX[1,1] to the pixel PX[1,$n$] positioned in the first row in the pixel array ALP, whereby the switches SW6 in the pixel PX[1,1] to the pixel PX[1,$n$] are turned on. Through this operation, a current does not flow between the anodes and the cathodes of the light-emitting devices LD in the pixel PX[1,1] to the pixel PX[1,$n$], whereby the light-emitting devices LD do not emit light.

The operation in the period Ti i to the period T13 in the timing chart of FIG. 3A initializes, before the period U1, the voltages $V_{drv}$[1,1]_0 to $V_{drv}$[1,$n$]_0 held in the capacitor C1[1,1] to the capacitor C1[1,$n$] included in the pixel PX[1,1] to the pixel PX[1,$n$], and a voltage for correcting the threshold voltage of the transistor M2 is written to each of the capacitor C1[1,1] to the capacitor C1[1,$n$]. Note that the voltage for correcting is not shown in the capacitor C1[1,1], the capacitor C1[1,2], and the capacitor C1[1,$n$] in the period U1 in FIG. 5.

In the period U2, the operation in the period T14 to the period T17 in the timing chart of FIG. 3A is performed on the pixel PX[1,1] to the pixel PX[1,$n$] positioned in the first row in the pixel array ALP. At this time, for example, potentials $V_d$[1,1]_1 to $V_d$[1,$n$]_1 are input to the node N3[1] to the node N3[$n$] as signals corresponding to image data written to the pixel PX[1,1] to the pixel PX[1,$n$]. Note that $V_d$[1,1]_1 to $V_d$[1,$n$]_1 correspond to $V_{data}$ in the description of FIG. 3A and FIG. 3B.

Through the operation in the period T14 to the period T17 in the timing chart of FIG. 3A, potentials obtained by level-shifting $V_d$[1,1]_1 to $V_d$[1,$n$]_1 are input to first terminals of the capacitor C1[1,1] to the capacitor C1[1,$n$] included in the pixel PX[1,1] to the pixel PX[1,$n$], respectively. Thus, $V_{drv}$[,1]_1 to $V_{drv}$[1,$n$]_1 are held in the capacitor C1[1,1] to the capacitor C1[1,$n$], respectively, as the potentials corresponding to the image data.

After that, a low-level potential is input to the wiring GL1[1]. Thus, a low-level potential is supplied to each of the control terminals of the switches SW1 in the pixel PX[1,1] to the pixel PX[1,$n$] positioned in the first row in the pixel array ALP, whereby the switches SW1 in the pixel PX[1,1] to the pixel PX[1,$n$] are turned off.

In the period U2, after a low-level potential is supplied to the wiring GL1[1], a low-level potential is input to the wiring GL6[1]. Thus, a low-level potential is supplied to each of the control terminals of the switches SW6 in the pixel PX[1,1] to the pixel PX[1,$n$] positioned in the first row in the pixel array ALP, whereby the switches SW6 in the pixel PX[1,1] to the pixel PX[1,$n$] are turned off. Through this operation, a current flows between the anodes and the cathodes of the light-emitting devices LD in the pixel PX[1,1] to the pixel PX[1,$n$], whereby the light-emitting devices LD emit light with luminance depending on the current amount. Note that the current amount is determined in accordance with the gate-source voltage of the transistor M2, i.e., voltage held in the capacitor C1, as described in FIG. 3A and FIG. 3B. That is, the light-emitting device LD in the pixel PX[1,1] emits light with luminance depending on the voltage $V_{drv}$[1,1]_, the light-emitting device LD in the pixel PX[1,2] emits light with luminance depending on the voltage $V_{drv}$[1,2]_1, and the light-emitting device LD in the pixel PX[1,$n$] emits light with luminance depending on the voltage $V_{drv}$[1,$n$]_1.

In the period U3, the operation in the period T11 to the period T13 in the timing chart of FIG. 3A is performed on the pixel PX[2,1] to the pixel PX[2,$n$] (not illustrated in FIG. 1) positioned in the second row in the pixel array ALP. Thus, the potentials of the node N3[1] to the node N3[$n$] become $V_{ref}$.

In the period U3, a high-level potential is input to the wiring GL1[2]. Thus, a high-level potential is supplied to each of the control terminals of the switches SW1 in the pixel PX[2,1] to the pixel PX[2,$n$] positioned in the second row in the pixel array ALP, whereby the switches SW1 in the pixel PX[2,1] to the pixel PX[2,$n$] are turned on.

In the period U3, a high-level potential is input to the wiring GL6[2]. Thus, a high-level potential is supplied to each of the control terminals of the switches SW6 in the pixel PX[2,1] to the pixel PX[2,n] positioned in the second row in the pixel array ALP, whereby the switches SW6 in the pixel PX[2,1] to the pixel PX[2,n] are turned on. Through this operation, a current does not flow between the anodes and the cathodes of the light-emitting devices LD in the pixel PX[2,1] to the pixel PX[2,n], whereby the light-emitting devices LD do not emit light.

The operation in the period T11 to the period T13 in the timing chart of FIG. 3A initializes, before the period U3, the voltages $V_{drv}[2,1]\_0$ to $V_{drv}[2,n]\_0$ held in the capacitor C1[2,1] to the capacitor C1[2,n] included in the pixel PX[2,1] to the pixel PX[2,n], and a voltage for correcting the threshold voltage of the transistor M2 is written to each of the capacitor C1[2,1] to the capacitor C1[2,n]. Note that the voltage for correcting is not shown in the capacitor C1[2,1], the capacitor C1[2,2], and the capacitor C1[2,n] in the period U3 in FIG. 5.

In the period U4, the operation in the period T14 to the period T17 in the timing chart of FIG. 3A is performed on the pixel PX[2,1] to the pixel PX[2,n] positioned in the second row in the pixel array ALP. At this time, for example, potentials $V_d[2,1]\_1$ to $V_d[2,n]\_1$ are input to the node N3[1] to the node N3[n] as signals corresponding to image data written to the pixel PX[2,1] to the pixel PX[2,n]. Note that $V_d[2,1]\_1$ to $V_d[2,n]\_1$ correspond to $V_{data}$ in the description of FIG. 3A and FIG. 3B.

Through the operation in the period T14 to the period T17 in the timing chart of FIG. 3A, potentials obtained by level-shifting $V_d[2,1]\_1$ to $V_d[2,n]\_1$ are input to first terminals of the capacitor C1[2,1] to the capacitor C1[2,n] included in the pixel PX[2,1] to the pixel PX[2,n], respectively. Thus, $V_{drv}[2,1]\_1$ to $V_{drv}[2,n]\_1$ are held in the capacitor C1[2,1] to the capacitor C1[2,n], respectively, as the potentials corresponding to the image data.

After that, a low-level potential is input to the wiring GL1[2]. Thus, a low-level potential is supplied to each of the control terminals of the switches SW1 in the pixel PX[2,1] to the pixel PX[2,n] positioned in the second row in the pixel array ALP, whereby the switches SW1 in the pixel PX[2,1] to the pixel PX[2,n] are turned off.

In the period U4, after a low-level potential is supplied to the wiring GL1[2], a low-level potential is input to the wiring GL6[2]. Thus, a low-level potential is supplied to each of the control terminals of the switches SW6 in the pixel PX[2,1] to the pixel PX[2,n] positioned in the second row in the pixel array ALP, whereby the switches SW6 in the pixel PX[2,1] to the pixel PX[2,n] are turned off. Through this operation, a current flows between the anodes and the cathodes of the light-emitting devices LD in the pixel PX[2,1] to the pixel PX[2,n], whereby the light-emitting devices LD emit light with luminance depending on the current amount. Note that the current amount is determined in accordance with the gate-source voltage of the transistor M2, i.e., voltage held in the capacitor C1, as described in FIG. 3A and FIG. 3B. That is, the light-emitting device LD in the pixel PX[2,1] emits light with luminance depending on the voltage $V_{drv}[2,1]\_1$, the light-emitting device LD in the pixel PX[2,2] emits light with luminance depending on the voltage $V_{drv}[2,2]\_1$, and the light-emitting device LD in the pixel PX[2,n] emits light with luminance depending on the voltage $V_{drv}[2,n]\_1$.

In the period U5, image data is written to the pixels PX in the third row to the (m−1)th row as in the period U1 and the period U2 (the period U3 and the period U4). Note that writing of image data to the pixels PX in the period U5 is sequentially performed per row.

In the period U6, the operation in the period T11 to the period T13 in the timing chart of FIG. 3A is performed on the pixel PX[m,1] to the pixel PX[m,n] positioned in the m-th row in the pixel array ALP. Thus, the potentials of the node N3[1] to the node N3[n] become $V_{ref}$.

In the period U6, a high-level potential is input to the wiring GL1[m]. Thus, a high-level potential is supplied to each of the control terminals of the switches SW1 in the pixel PX[m,1] to the pixel PX[m,n] positioned in the m-th row in the pixel array ALP, whereby the switches SW1 in the pixel PX[m,1] to the pixel PX[m,n] are turned on.

In the period U6, a high-level potential is input to the wiring GL6[m]. Thus, a high-level potential is supplied to each of the control terminals of the switches SW6 in the pixel PX[m,1] to the pixel PX[m,n] positioned in the m-th row in the pixel array ALP, whereby the switches SW6 in the pixel PX[m,1] to the pixel PX[m,n] are turned on. Through this operation, a current does not flow between the anodes and the cathodes of the light-emitting devices LD in the pixel PX[m,1] to the pixel PX[m,n], whereby the light-emitting devices LD do not emit light.

The operation in the period Ti i to the period T13 in the timing chart of FIG. 3A initializes, before the period U6, the voltages $V_{drv}[m,1]\_0$ to $V_{drv}[m,n]\_0$ held in the capacitor C1[m,1] to the capacitor C1[m,n] included in the pixel PX[m,1] to the pixel PX[m,n], and a voltage for correcting the threshold voltage of the transistor M2 is written to each of the capacitor C1[1,1] to the capacitor C1[1,n]. Note that the voltage for correcting is not shown in the capacitor C1[m,1], the capacitor C1[m,2], and the capacitor C1[m,n] in the period U6 in FIG. 5.

In the period U7, the operation in the period T14 to the period T17 in the timing chart of FIG. 3A is performed on the pixel PX[m,1] to the pixel PX[m,n] positioned in the m-th row in the pixel array ALP. At this time, for example, potentials $V_d[m,1]\_1$ to $V_d[m,n]\_1$ are input to the node N3[1] to the node N3[n] as signals corresponding to image data written to the pixel PX[m,1] to the pixel PX[m,n]. Note that $V_d[m,1]\_1$ to $V_d[m,n]\_1$ correspond to $V_{data}$ in the description of FIG. 3A and FIG. 3B.

Through the operation in the period T14 to the period T17 in the timing chart of FIG. 3A, potentials obtained by level-shifting $V_d[m,1]\_1$ to $V_d[m,n]\_1$ are input to first terminals of the capacitor C1[m,1] to the capacitor C1[m,n] included in the pixel PX[m,1] to the pixel PX[m,n], respectively. Thus, $V_{drv}[m,1]\_1$ to $V_{drv}[m,n]\_1$ are held in the capacitor C1[m,1] to the capacitor C1[m,n], respectively, as the potentials corresponding to the image data.

After that, a low-level potential is input to the wiring GL1[m]. Thus, a low-level potential is supplied to each of the control terminals of the switches SW1 in the pixel PX[m,1] to the pixel PX[m,n] positioned in the m-th row in the pixel array ALP, whereby the switches SW1 in the pixel PX[m,1] to the pixel PX[m,n] are turned off.

In the period U7, after a low-level potential is supplied to the wiring GL1[3], a low-level potential is input to the wiring GL6[m]. Thus, a low-level potential is supplied to each of the control terminals of the switches SW6 in the pixel PX[m,1] to the pixel PX[m,n] positioned in the m-th row in the pixel array ALP, whereby the switches SW6 in the pixel PX[m,1] to the pixel PX[m,n] are turned off. Through this operation, a current flows between the anodes and the cathodes of the light-emitting devices LD in the pixel PX[m,1] to the pixel PX[m,n], whereby the light-emitting devices LD emit light with luminance depending on the current amount. Note that the current amount is determined in accordance with the gate-source voltage of the transistor M2, i.e., voltage held in the capacitor C1, as described in FIG. 3A and FIG. 3B. That is, the light-emitting device LD in the pixel PX[m,1] emits light with luminance depending on the voltage $V_{drv}[m,1]\_1$, the light-emitting device LD in the pixel PX[m,2] (not illustrated in FIG. 1) emits light with luminance depending on the voltage $V_{drv}[m,2]\_1$, and the light-emitting device LD in the pixel PX[m,n] emits light with luminance depending on the voltage $V_{drv}[m,n]\_1$.

As described above, by performing the operation in the period U1 to the period U7, the display apparatus DSP0 employing the display apparatus DSP1A can display an image. The image displayed on the display apparatus DSP0 can be updated every time the operation in the period U1 to the period U7 is repeated.

The operation method of the above-described display apparatus DSP0 is not limited to the operation method of the display apparatus of one embodiment of the present invention. For example, the operation method of the display apparatus of one embodiment of the present invention may employ an image displaying method in which the display apparatus DSP0 in FIG. 1 makes a light-emitting device in the pixel PX emit light in a pulsed manner in one frame period by control of the on state and the off state of a switch included in the pixel PX, control of voltage supplied to the pixel PX, or both. Conversely, the display apparatus DSP0 in FIG. 1 can make the light-emitting device in the pixel PX not emit light in periods other than the period in which the light-emitting device in the pixel PX emits light, in one frame period. That is, the display apparatus DSP0 can perform image display and operation of displaying black (referred to as Duty driving) in one frame period.

In the case where the display apparatus DSP0 in FIG. 1 displays moving images, the frame frequency of the display apparatus DSP0 may be greater than or equal to 30 Hz, greater than or equal to 60 Hz, greater than or equal to 120 Hz, greater than or equal to 165 Hz, or greater than or equal to 240 Hz. In the case where the display apparatus DSP0 in FIG. 1 displays a still image, the frame frequency of the display apparatus DSP0 may be less than or equal to 10 Hz, less than or equal to 5 Hz, less than or equal to 1 Hz, less than or equal to 0.5 Hz, or less than or equal to 0.1 Hz.

Layout Example of Display Apparatus

Figure 6A:
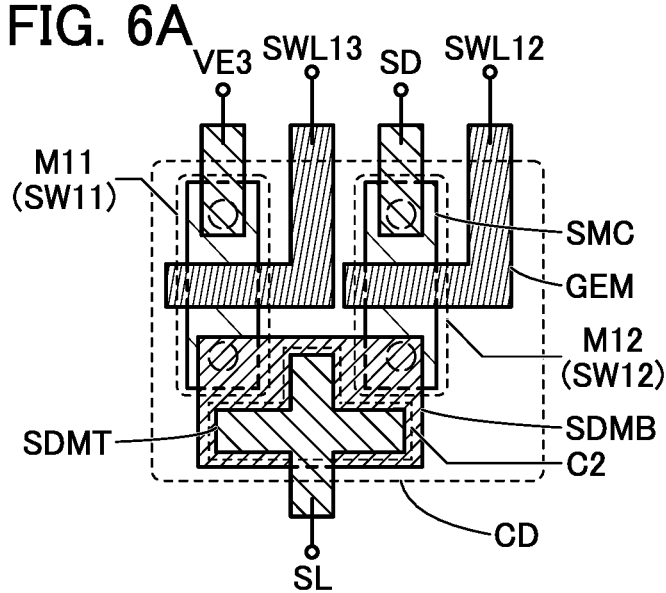
FIG. 6A and FIG. 6B are plan views illustrating layout examples of circuits.
Figure 6B:
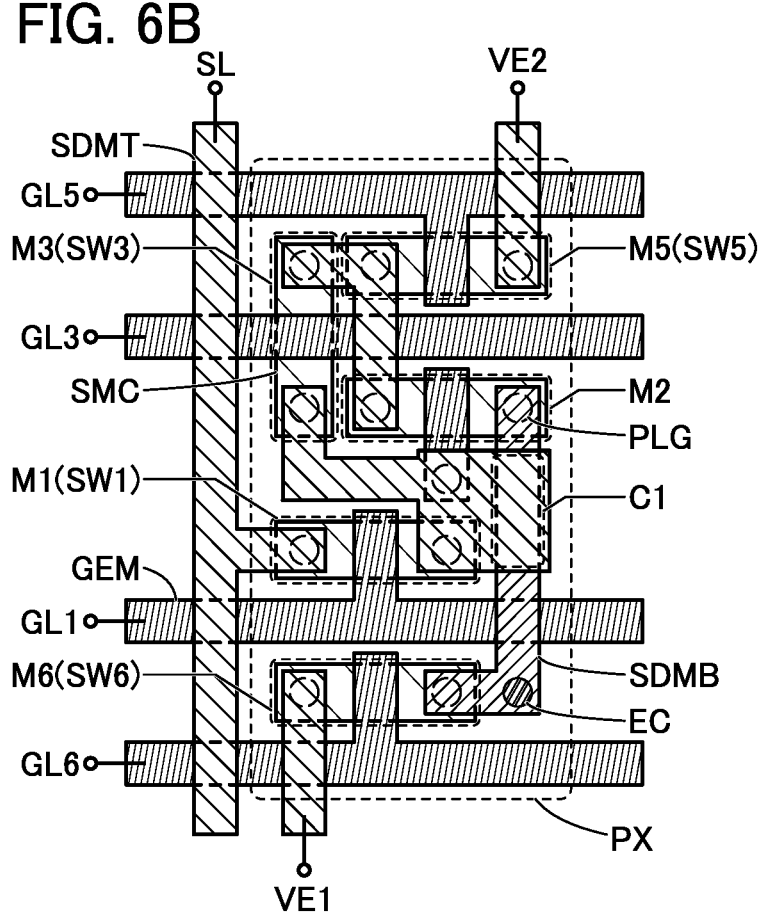

FIG. 6A and FIG. 6B are layouts (plan views) each illustrating a circuit structure example of part of the display apparatus DSP1A in FIG. 2. FIG. 6A illustrates a layout of the circuit CD and FIG. 6B illustrates a layout of the pixel PX.

In the layout in FIG. 6A, a transistor M11 is used as the switch SW11 included in the circuit CD in FIG. 1, and a transistor M12 is used as the switch SW12 included in the circuit CD in FIG. 1. In the layout in FIG. 6B, a transistor M1 is used as the switch SW1 included in the pixel PX in FIG. 1, a transistor M3 is used as the switch SW3 included in the pixel PX in FIG. 1, a transistor M5 is used as the switch SW5 included in the pixel PX in FIG. 1, and a transistor M6 is used as the switch SW6 included in the pixel PX in FIG. 1.

The display apparatus DSP1A in FIG. 6A and FIG. 6B includes a conductor GEM, a conductor SDMB, a conductor SDMT, a semiconductor SMC, and a conductor PLG. Note that insulators included in the display apparatus DSP1A are not illustrated in FIG. 6A and FIG. 6B.

The semiconductor SMC is positioned below the conductor GEM, for example. The conductor GEM is positioned below the conductor SDMB, for example. The conductor SDMB is positioned below the conductor SDMT, for example. That is, in the circuit CD and the pixel PX in FIG. 6A and FIG. 6B, the semiconductor SMC, the conductor GEM, the conductor SDMB, and the conductor SDMT are formed in this order.

Part of the conductor GEM serves as gates (sometimes referred to as first gates) of the transistor M1, the transistor M2, the transistor M3, the transistor M5, the transistor M6, the transistor M11, and the transistor M12, for example.

The semiconductor SMC, the conductor GEM, the conductor SDMB, and the conductor SDMT can be formed by a photolithography method, for example. Specifically, for example, in the case where the conductor GEM is formed, a conductive material to be the conductor GEM is formed by one or more methods selected from a sputtering method, a chemical vapor deposition (CVD) method, a PLD (Pulsed Laser Deposition) method, and an atomic layer deposition (ALD) method, and then a desired pattern is formed by a photolithography method. The semiconductor SMC, the conductor SDMB, and the conductor SDMT can also be formed in a manner similar to the above.

Furthermore, insulators may be provided between the semiconductor SMC and the conductor GEM, between the conductor GEM and the conductor SDMB, and between the conductor SDMB and the conductor SDMT. In particular, an insulator provided between the semiconductor SMC and the conductor GEM serves as a gate insulating film (sometimes referred to as a first gate insulating film or a front gate insulating film) in some cases.

The conductor PLG serving as a wiring or a plug is provided each between the semiconductor SMC and the conductor SDMB, between the semiconductor SMC and the conductor SDMT, and between the conductor GEM and the conductor SDMT. The conductor PLG is formed, for example, in such a manner that an opening portion is formed in the insulator, and the opening portion is filled with a conductive material to be the conductor PLG. Note that after the formation of the conductor PLG, planarization may be performed by planarization treatment using chemical mechanical polishing or the like to align the levels of film surfaces of the conductor PLG and peripheral insulators.

Each of the transistor M1, the transistor M2, the transistor M3, the transistor M5, the transistor M6, the transistor M11, and the transistor M12 illustrated in FIG. 6A and FIG. 6B includes part of the semiconductor SMC, part of the conductor GEM, part of the insulator, and part of the conductor PLG, for example.

The capacitor C1 and the capacitor C2 illustrated in FIG. 6A and FIG. 6B each include part of the conductor SDMB and part of the conductor SDMT. Specifically, each of the capacitor C1 and the capacitor C2 has a region where part of the conductor SDMB and part of the conductor SDMT overlap with each other. That is, in each of the capacitor C1 and the capacitor C2, the part of the conductor SDMB serves as one of a pair of electrodes, and the part of the conductor SDMT serves as the other of the pair of electrodes. Note that an insulator with high dielectric constant is preferably provided between the conductor SDMB and the conductor SDMT which are included in the capacitor C1 and the capacitor C2.

A conductor EC illustrated in FIG. 6B is formed over the conductor SDMB, for example. The conductor EC serves as a wiring or a plug for electrically connecting the conductor SDMB and the anode of the light-emitting device LD (not illustrated in FIG. 6B) positioned above the conductor SDMT.

Note that the layouts of the display apparatus of one embodiment of the present invention are not limited to FIG. 6A and FIG. 6B. The layout of the display apparatus of one embodiment of the present invention may be FIG. 6A or FIG. 6B on which some modification is performed as appropriate.

Figure 7:
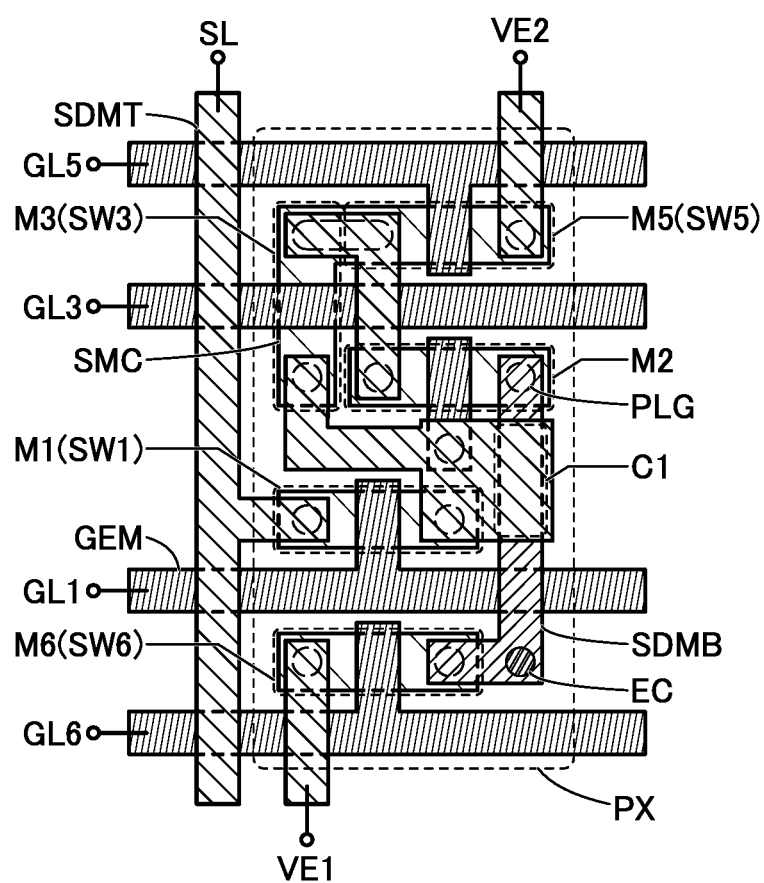
FIG. 7 is a plan view illustrating a layout example of a circuit.

FIG. 7 illustrates a modification example of FIG. 6B. The layout of the pixel PX illustrated in FIG. 7 is different from the layout of the pixel PX in FIG. 6B in that the semiconductor SMC included in the transistor M3 and the semiconductor SMC included in the transistor M5 are not separated from each other but are formed as one continuous semiconductor film.

Since the semiconductor SMC included in the transistor M3 and the semiconductor SMC included in the transistor M5 are formed as one continuous semiconductor film in FIG. 7, one conductor PLG is formed over a region including one of a source and a drain of the transistor M3 corresponding to the second terminal of the switch SW3 and one of a source and a drain of the transistor M5 corresponding to the first terminal of the switch SW5.

By not separating semiconductor films but forming one continuous semiconductor film as illustrated in FIG. 7, the distance where a current flows between one of the source and the drain of the transistor M3 and one of the source and the drain of the transistor M5 can be shortened. Accordingly, the value of the resistance between one of the source and the drain of the transistor M3 and one of the source and the drain of the transistor M5 can be small, leading to a reduction in power consumption.

Furthermore, as films of not only a semiconductor but also a conductor and an insulator are processed by finer patterns, processing defects of the films are easily caused. By not separating the semiconductors SMC between one of the source and the drain of the transistor M3 and one of the source and the drain of the transistor M5 as illustrated in FIG. 7, a processing defect at the time of separating the semiconductors SMC between one of the source and the drain of the transistor M3 and one of the source and the drain of the transistor M5 can be prevented in some cases.

Modification Example 1 of Display Apparatus

Note that the pixel in the above-described display apparatus of one embodiment of the present invention is not limited to the pixel PX illustrated in FIG. 2. The display apparatus of one embodiment of the present invention may include the pixel PX in FIG. 2 on which some modification is performed as appropriate.

Figure 8A:
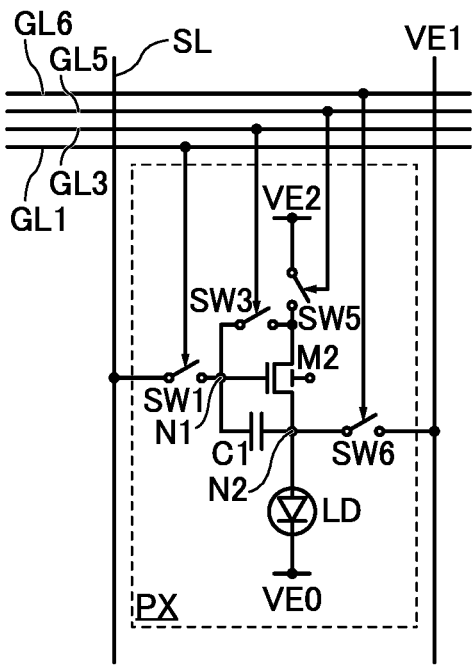
FIG. 8A to FIG. 8C are circuit diagrams illustrating structure examples of a pixel included in a display apparatus.

FIG. 8A illustrates a modification example of the pixel PX in FIG. 2. The pixel PX illustrated in FIG. 8A is different from the pixel PX in FIG. 2 in that the transistor M2 has a back gate.

Specifically, the transistor M2 illustrated in FIG. 8A is a transistor including gates over and under a channel; the transistor M2 includes a first gate and a second gate. For convenience, the first gate is referred to as a gate (sometimes referred to as a front gate) and the second gate is referred to as a back gate so that they are distinguished from each other, but the first gate and the second gate can be interchanged; thus, the term "gate" can be replaced with the term "back gate". Similarly, the term "back gate" can be replaced with the term "gate". As a specific example, a connection structure in which "a gate is electrically connected to a first wiring and a back gate is electrically connected to a second wiring" can be replaced with a connection structure in which "a back gate is electrically connected to a first wiring and a gate is electrically connected to a second wiring".

The pixel PX of the display apparatus of one embodiment of the present invention does not depend on the connection structure of a back gate of a transistor. In FIG. 8A, the back gate of the transistor M2 is illustrated. The connection of the back gate is not illustrated, and the destination to which the back gate is electrically connected can be determined at the design stage. For example, in a transistor including a back gate, a gate and the back gate may be electrically connected to each other to increase the on-state current of the transistor. In other words, the gate and the back gate of the transistor M2 may be electrically connected to each other. Alternatively, for example, in a transistor including a back gate, a wiring electrically connected to an external circuit or the like may be provided and a fixed potential or a variable potential may be supplied to the back gate of the transistor with the external circuit or the like to change the threshold voltage or the like of the transistor or to reduce the off-state current of the transistor. Note that the same applies to a transistor described in other parts of the specification and a transistor illustrated in other drawings than FIG. 8A.

Figure 8B:
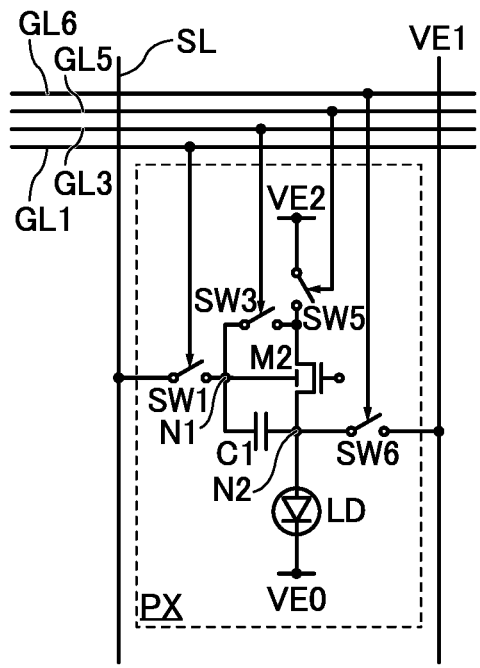

Although the pixel PX in FIG. 8A has a structure in which the gate of the transistor M2 is electrically connected to the first terminal of the switch SW3, the first terminal of the switch SW1, and the first terminal of the capacitor C1, the pixel PX may have a structure in which not the gate of the transistor M2 but the back gate of the transistor M2 is electrically connected to the first terminal of the switch SW3, the first terminal of the switch SW1, and the first terminal of the capacitor C1, as illustrated in FIG. 8B.

Figure 8C:
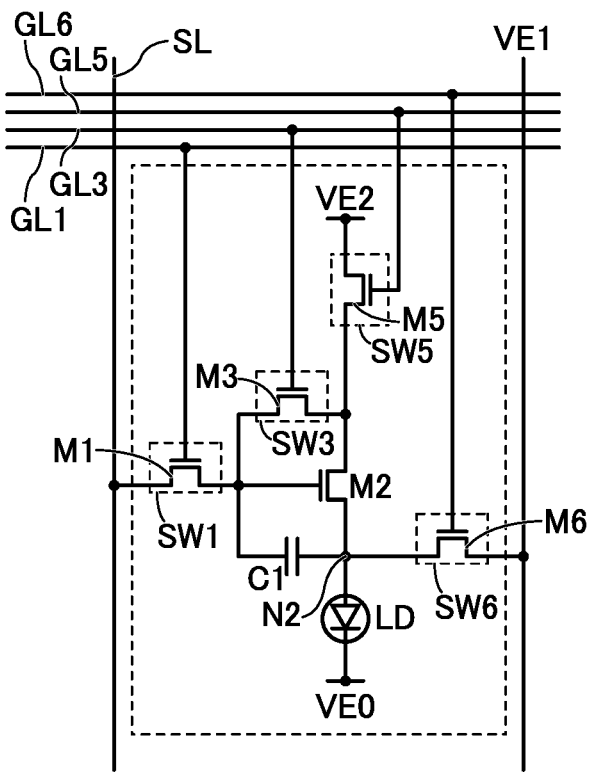

As described above, an electrical switch such as a transistor can be used as each of the switch SW1, the switch SW3, the switch SW5, and the switch SW6 included in the pixel PX illustrated in FIG. 2. Specifically, the pixel PX can have a structure in which the switch SW1 includes the transistor M1, the switch SW3 includes the transistor M3, the switch SW5 includes the transistor M5, and the switch SW6 includes the transistor M6, as illustrated in FIG. 8C. Note that as each of the transistor M1, the transistor M3, the transistor M5, and the transistor M6, a transistor usable as the transistor M2 can be used.

As described above, in the display apparatus DSP1A in FIG. 2, the potential of the image data signal is changed by the capacitor C1 in the pixel PX and the capacitor C2 outside the pixel PX. For example, in the case where voltage for correcting the threshold voltage of the transistor M2 is written to the capacitor C1, due to a change in the potential of the node N2, a potential obtained by multiplying the change in the potential of the node N2 by $C_1/(C_1+C_2)$ is added to the potential of the node N1; as a result, the voltage for correcting the threshold voltage of the transistor M2 written to the capacitor C1 is shifted in some cases (in the case where the change in the potential of the node N2 is the same as the change in the potential of the node N1, the voltage for correcting the threshold voltage of the transistor M2 written to the capacitor C1 is not shifted). In the display apparatus DSP1A in FIG. 2, however, according to the timing charts of FIG. 3A and FIG. 3B, the potential of the node N2 is not changed in periods other than the period T11, the period T16, and the period T17, and the node N1 and the first terminal of the capacitor C2 are brought out of conduction in the period T16 and the period T17; therefore, the change in the potential of the node N1 due to the change in the potential of the node N2 is not influenced by the capacitor C2. That is, in the case where the potential of the node N2 changes, the amount of change in the potential of the node N1 is almost equal to the amount of change in the potential of the node N2.

Modification Example 2 of Display Apparatus

Figure 9:
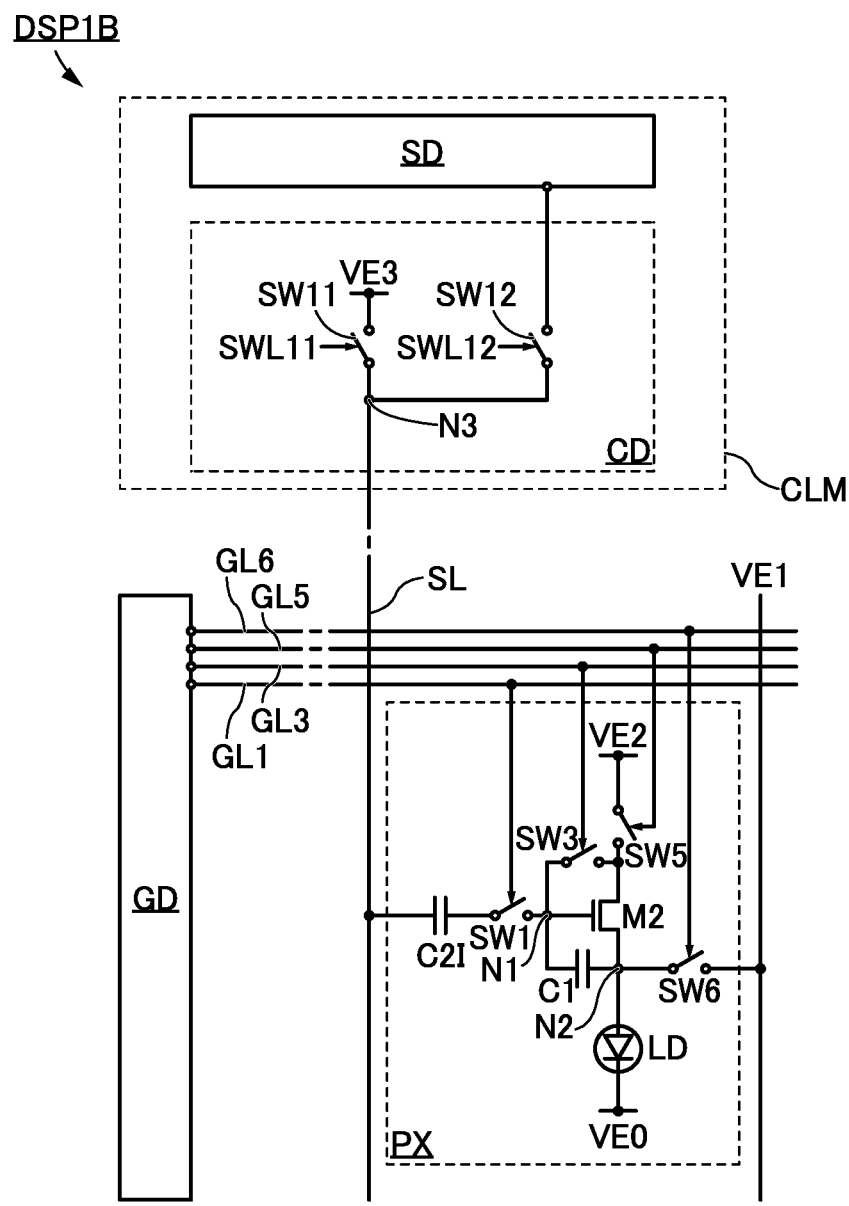
FIG. 9 is a circuit diagram illustrating a structure example of a display apparatus.

Next, FIG. 9 illustrates an example of the display apparatus DSP0 in FIG. 1 which is different from the display apparatus DSP1A. A display apparatus DSP1B illustrated in FIG. 9 is a modification example of the display apparatus DSP1A in FIG. 2, and different from the display apparatus DSP1A in that a capacitor C2I is provided in the pixel PX and the capacitor C2 is not provided in the circuit CD.

Therefore, for portions of the display apparatus DSP1B in common with the display apparatus DSP1A, the description of the display apparatus DSP1A is referred to.

In the display apparatus DSP1B, a first terminal of the capacitor C2I is electrically connected to the second terminal of the switch SW1. A second terminal of the capacitor C2I is electrically connected to the wiring SL.

The first terminal of the switch SW11 is electrically connected to the wiring SL and the first terminal of the switch SW12.

Note that in the display apparatus DSP1B, the point where the first terminal of the switch SW11, the first terminal of the switch SW12, and the capacitor C2I are electrically connected is referred to as the node N3. Note that in the description of this structure example of the display apparatus DSP1B, the node N3 can be replaced with the wiring SL in some cases.

In the display apparatus DSP1B, the capacitor C2I corresponds to the capacitor C2 in the display apparatus DSP1A. In other words, the display apparatus DSP1B has a structure in which the capacitor C2 included in the circuit CD in the display apparatus DSP1A is provided in the pixel PX as the capacitor C2I. For this reason, the operation method of the display apparatus DSP1B can be described in some cases in such a manner that the capacitor C2 in the operation method of the display apparatus DSP1A is replaced with the capacitor C2I.

The display apparatus DSP1B can correct the threshold voltage of the transistor M2 in the pixel PX to display an image on the pixel PX by employing the operation method similar to that of the display apparatus DSP1A.

Note that the structure of the display apparatus of one embodiment of the present invention is not limited to the structure of the display apparatus DSP1B. The structure of the display apparatus of one embodiment of the present invention may be the structure of the display apparatus DSP1B on which some modification is performed as appropriate.

Figure 10:
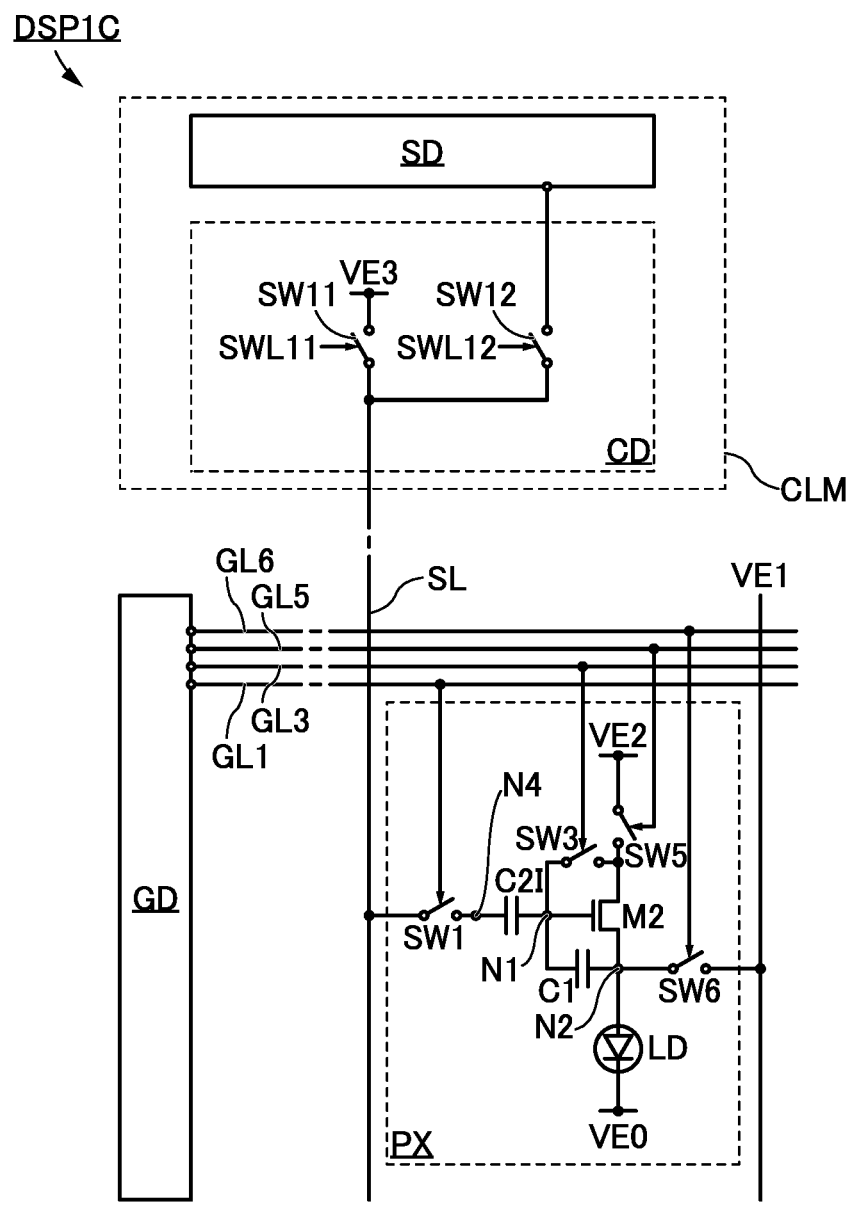
FIG. 10 is a circuit diagram illustrating a structure example of a display apparatus.

FIG. 10 illustrates a modification example of the display apparatus DSP1B in FIG. 9. A display apparatus DSP1C illustrated in FIG. 10 is different from the display apparatus DSP1B in FIG. 9 in that the second terminal of the switch SW1 is electrically connected not to the first terminal of the capacitor C2I but to the wiring SL, the first terminal of the switch SW1 is electrically connected not to the gate of the transistor M2, the first terminal of the switch SW3, and the first terminal of the capacitor C1 but to the second terminal of the capacitor C2I, and the first terminal of the capacitor C2I is electrically connected to the gate of the transistor M2, the first terminal of the switch SW3, and the first terminal of the capacitor C1.

In other words, in an electrical path between the wiring SL and the wiring VE0 in the display apparatus DSP1B, the capacitor C2I, the switch SW1, the capacitor C1, and the light-emitting device LD are provided in this order, whereas, in an electrical path between the wiring SL and the wiring VE0 in the display apparatus DSP1C, the switch SW1, the capacitor C2I, the capacitor C1, and the light-emitting device LD are provided in this order.

Note that in this specification and the like, a point where the first terminal of the switch SW1 and the second terminal of the capacitor C2I are electrically connected is referred to as a node N4.

In the display apparatus DSP1C, the capacitor C2I corresponds to the capacitor C2 in the display apparatus DSP1A. In the display apparatus DSP1C, the node N4 corresponds to the node N3 in the display apparatus DSP1A. In other words, the display apparatus DSP1C has a structure in which the capacitor C2 included in the circuit CD in the display apparatus DSP1A is provided in the pixel PX as the capacitor C2I. For this reason, the operation method of the display apparatus DSP1C can be described in some cases in such a manner that the capacitor C2 and the node N3 in the operation method of the display apparatus DSP1A are replaced with the capacitor C2I and the node N4, respectively.

The display apparatus DSP1C can correct the threshold voltage of the transistor M2 in the pixel PX to display an image on the pixel PX by employing the operation method similar to that of the display apparatus DSP1A.

Figure 11:
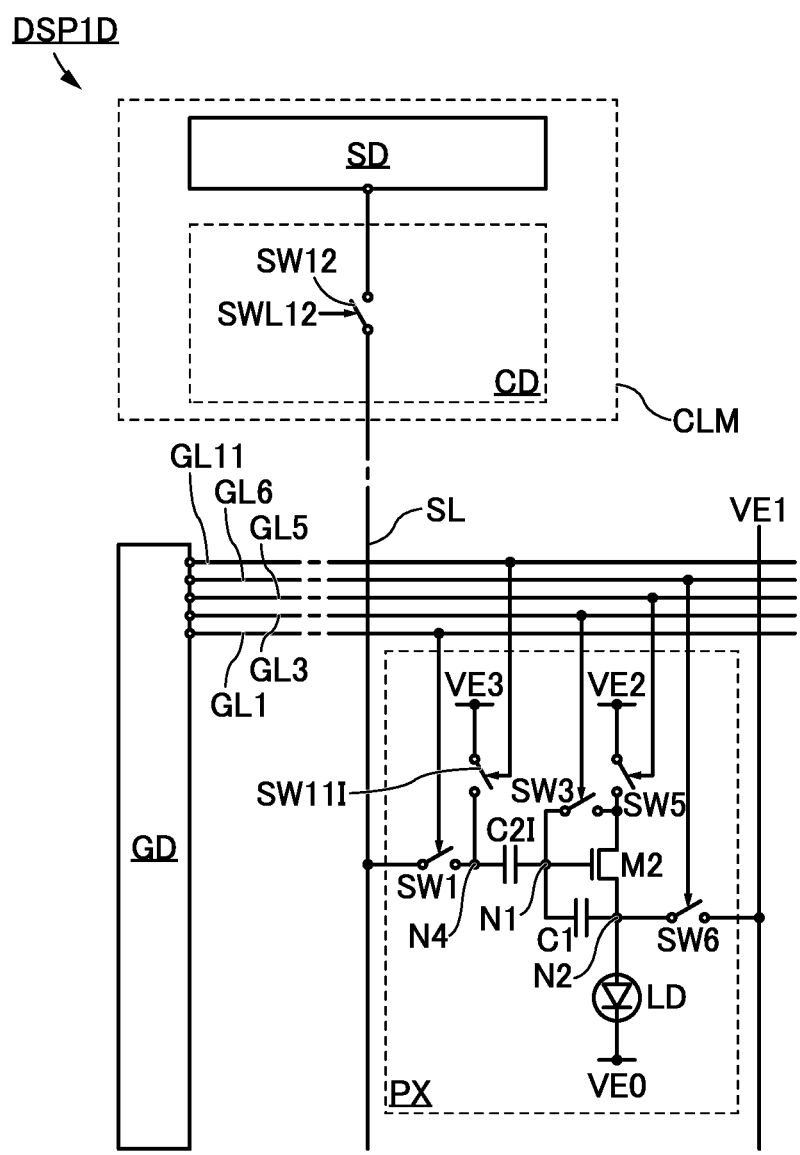
FIG. 11 is a circuit diagram illustrating a structure example of a display apparatus.

FIG. 11 illustrates another modification example of the display apparatus DSP1A, which is different from the display apparatus DSP1C in FIG. 10. A display apparatus DSP1D illustrated in FIG. 11 is another modification example of the display apparatus DSP1C in FIG. 10, and different from the display apparatus DSP1C in that a switch SW11I is provided in the pixel PX and the switch SW11 is not provided in the circuit CD. That is, the display apparatus DSP1D illustrated in FIG. 11 is different from the display apparatus DSP1A in that the switch SW11I and the capacitor C2I are provided in the pixel PX and the switch SW11 and the capacitor C2 are not provided in the circuit CD.

In the display apparatus DSP1D, a first terminal of the switch SW11I is electrically connected to the first terminal of the switch SW1 and the second terminal of the capacitor C2I.

A second terminal of the switch SW11I is electrically connected to the wiring VE3. A control terminal of the switch SW11I is electrically connected to a wiring GL11.

The first terminal of the capacitor C2I is electrically connected to the first terminal of the switch SW3, the first terminal of the capacitor C1, and the gate of the transistor M2. The second terminal of the switch SW1 is electrically connected to the wiring SL.

The first terminal of the switch SW12 is electrically connected to the wiring SL.

The wiring GL11 together with the wiring GL1, the wiring GL3, the wiring GL5, and the wiring GL6 correspond to one of the wiring GL[1] to the wiring GL[m] in FIG. 1. That is, in the case of the circuit structure of the pixel PX illustrated in FIG. 11, the number of wirings GL extended per row of the pixel array ALP is five.

In the display apparatus DSP1D, the capacitor C2I corresponds to the capacitor C2 in the display apparatus DSP1A. The switch SW11I corresponds to the switch SW11 in the display apparatus DSP1A. The wiring GL11 corresponds to the wiring SWL11 in the display apparatus DSP1A. The node N4 corresponds to the node N3 in the display apparatus DSP1A. In other words, the display apparatus DSP1D has a structure in which the switch SW11 and the capacitor C2 included in the circuit CD in the display apparatus DSP1A are provided in the pixel PX as the switch SW11I and the capacitor C2I. For this reason, the operation method of the display apparatus DSP1D can be described in some cases in such a manner that the switch SW11, the capacitor C2, the node N3, and the wiring SWL11 in the operation method of the display apparatus DSP1A are replaced with the switch SW11I, the capacitor C2I, the node N4, and the wiring GL11, respectively.

The display apparatus DSP1D can correct the threshold voltage of the transistor M2 in the pixel PX to display an image on the pixel PX by employing the operation method similar to that of the display apparatus DSP1A.

As described in the operation method of the display apparatus DSP1A, a potential supplied by the wiring VE2 and a potential supplied by the wiring VE3 can be equal to each other.

In that case, the wiring VE2 and the wiring VE3 may be one wiring. As an example, FIG. 12 illustrates a display apparatus DSP1DA in which the wiring VE3 serves as the wiring VE2 and the wiring VE3 in the display apparatus DSP1D.

As described in the operation method of the display apparatus DSP1A, a potential supplied by the wiring VE1 and a potential supplied by the wiring VE3 can be equal to each other. In that case, the wiring VE1 and the wiring VE3 may be one wiring. As an example, FIG. 13 illustrates a display apparatus DSP1DB in which the wiring VE1 serves as the wiring VE1 and the wiring VE3 in the display apparatus DSP1D.

Figure 12:
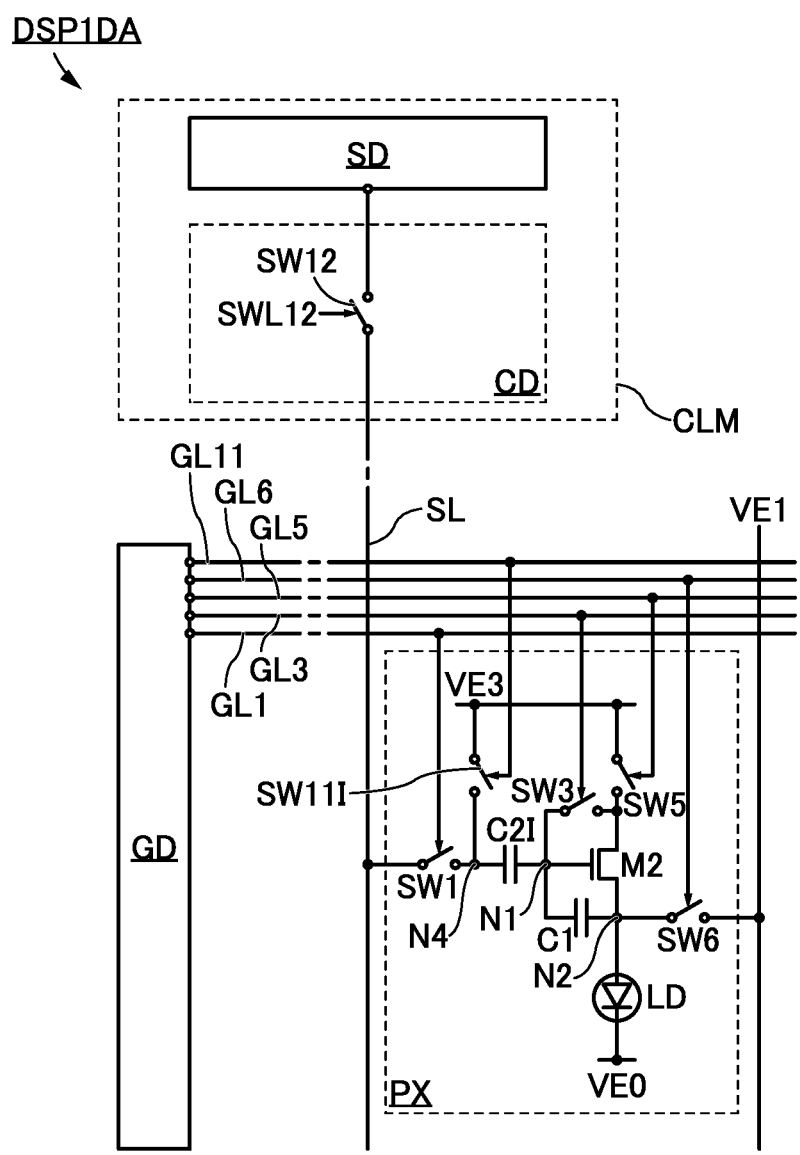
FIG. 12 is a circuit diagram illustrating a structure example of a display apparatus.
Figure 13:
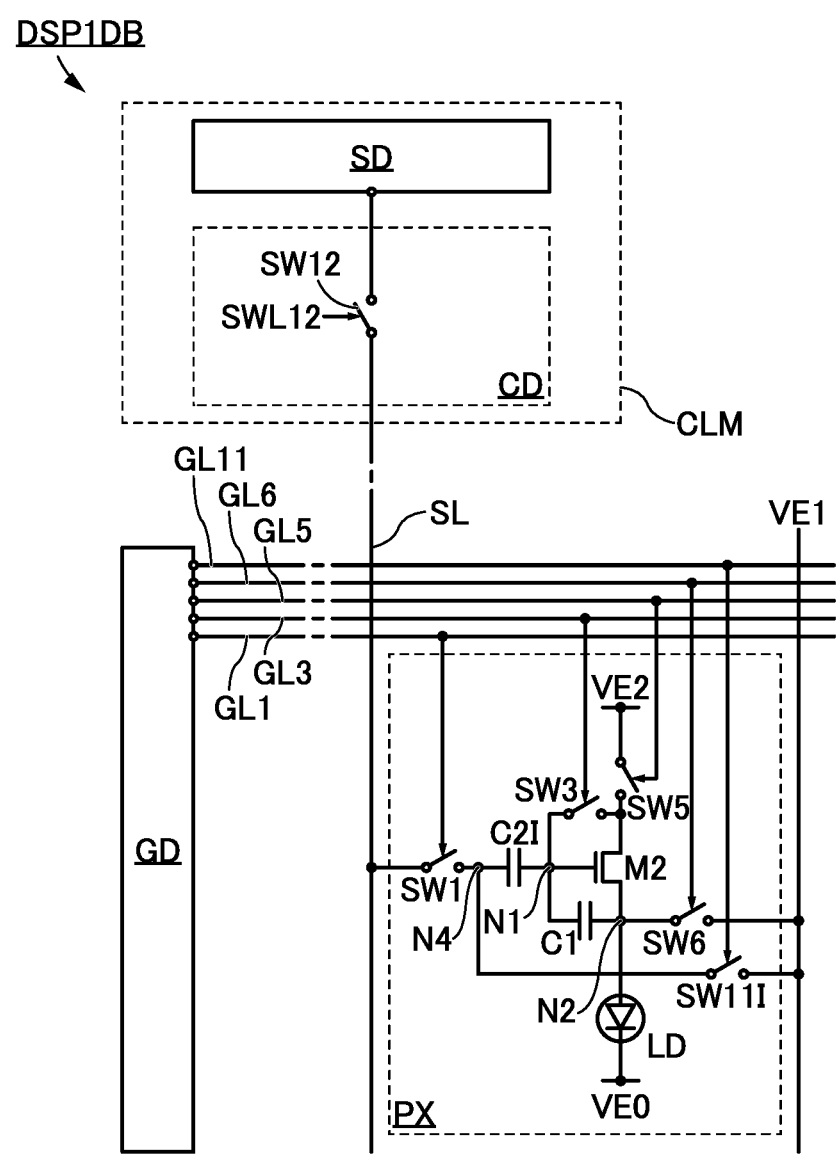
FIG. 13 is a circuit diagram illustrating a structure example of a display apparatus.
Figure 14:
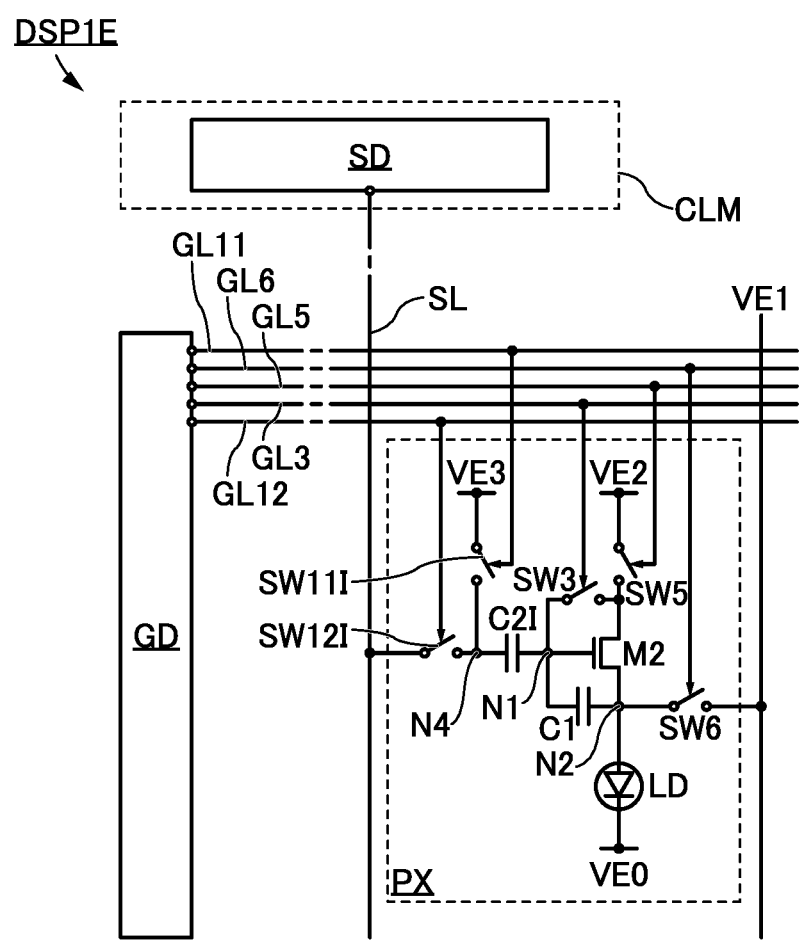
FIG. 14 is a circuit diagram illustrating a structure example of a display apparatus.

FIG. 14 illustrates another modification example of the display apparatus DSP1A, which is different from the display apparatus DSP1B in FIG. 9, the display apparatus DSP1C in FIG. 10, the display apparatus DSP1D in FIG. 11, the display apparatus DSP1DA in FIG. 12, and the display apparatus DSP1DB in FIG. 13. A display apparatus DSP1E illustrated in FIG. 14 is another modification example of the display apparatus DSP1D in FIG. 11, and different from the display apparatus DSP1D in that the switch SW12 is not provided in the circuit CD. That is, the display apparatus DSP1E illustrated in FIG. 14 is different from the display apparatus DSP1A in that the switch SW11I, a switch SW12I, and the capacitor C2I are provided in the pixel PX and the circuit CD is not provided.

Note that in the display apparatus DSP1E, for convenience, the switch SW1 in the display apparatus DSP1D is denoted by the switch SW12I, and the wiring GL1 in the display apparatus DSP1D is denoted by a wiring GL12.

In the display apparatus DSP1E, the driver circuit SD is electrically connected to the wiring SL, and the wiring SL is electrically connected to a second terminal of the switch SW12I.

The switch SW12I provided in the display apparatus DSP1E can also serve as the switch SW1 provided in the pixel PX in the display apparatus DSP1D. Accordingly, the structure of the display apparatus DSP1D can be changed to a structure in which the switch SW12 is not provided in the circuit CD as in the display apparatus DSP1E in FIG. 14.

The operation method of the display apparatus DSP1E can be described in some cases in such a manner that the switch SW11, the capacitor C2, the node N3, the wiring SWL11, and the wiring SWL12 in the operation method of the display apparatus DSP1A are replaced with the switch SW11I, the capacitor C2I, the node N4, the wiring GL11, and the wiring GL12, respectively. Note that the signal supplied by the wiring GL1 in the display apparatus DSP1A is not necessarily considered in the display apparatus DSP1E.

Modification Example 3 of Display Apparatus

Figure 15:
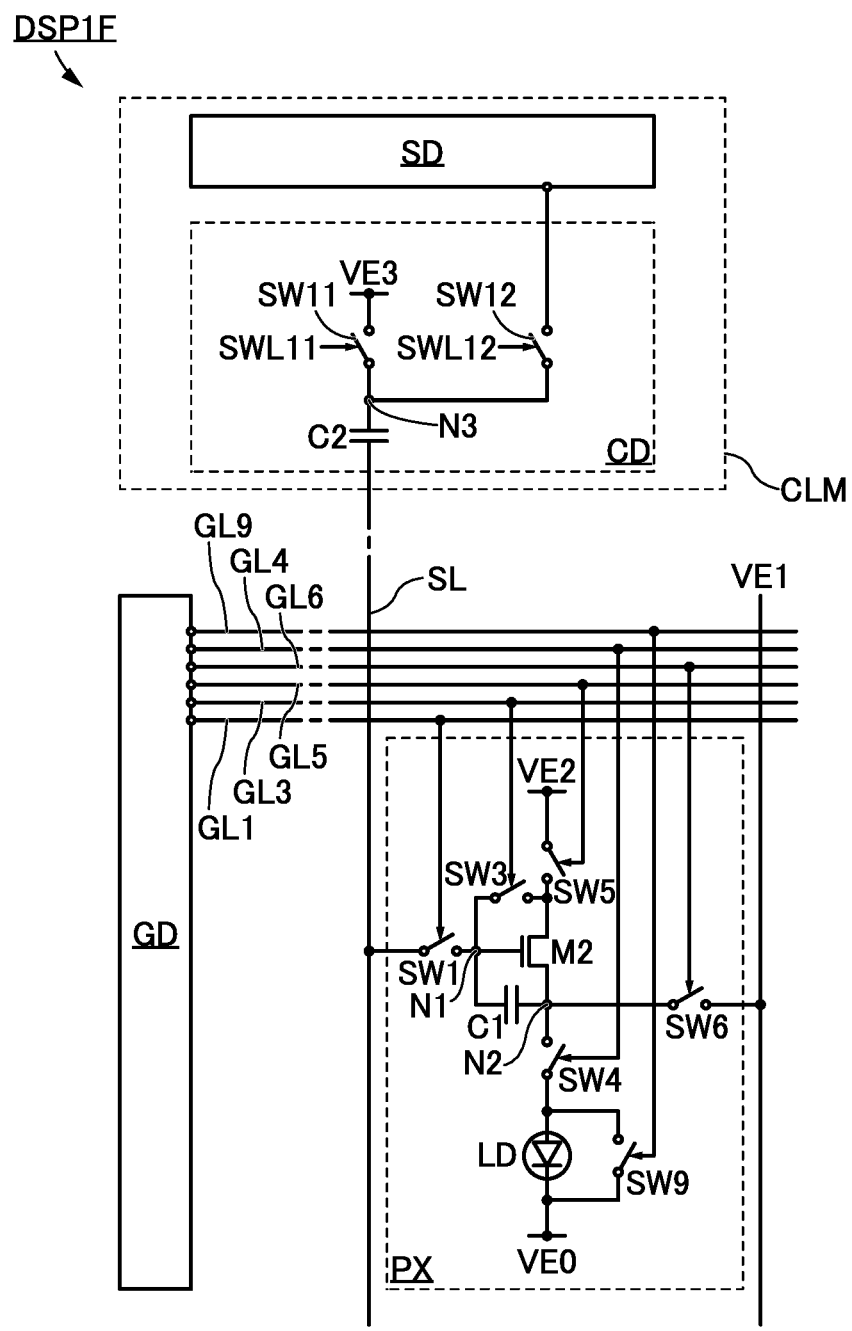
FIG. 15 is a circuit diagram illustrating a structure example of a display apparatus.

Next, FIG. 15 illustrates an example of the display apparatus DSP0 in FIG. 1 which is different from the display apparatus DSP1A to the display apparatus DSP1E. A display apparatus DSP1F illustrated in FIG. 15 is a modification example of the display apparatus DSP1A in FIG. 2, and different from the display apparatus DSP1A in that a switch SW4 is provided between the light-emitting device LD and each of the second terminal of the capacitor C1, the first terminal of the transistor M2, and the first terminal of the switch SW6 so as to be electrically connected in series thereto and a switch SW9 is provided so as to be electrically connected in parallel to the light-emitting device LD.

As each of the switch SW4 and the switch SW9, a switch that can be used as the switch SW1, the switch SW3, the switch SW5, the switch SW6, the switch SW11, or the switch SW12 can be used, for example. Each of the switch SW4 and the switch SW9 are each on when a high-level potential is applied to a control terminal and off when a low-level potential is applied to the control terminal.

A first terminal of the switch SW4 is electrically connected to the second terminal of the capacitor C1, the first terminal of the transistor M2, and the first terminal of the switch SW6. A second terminal of the switch SW4 is electrically connected to the anode of the light-emitting device LD and a first terminal of the switch SW9. The control terminal of the switch SW4 is electrically connected to a wiring GL4.

A second terminal of the switch SW9 is electrically connected to the cathode of the light-emitting device LD and the wiring VE0. The control terminal of the switch SW9 is electrically connected to a wiring GL9.

In the display apparatus DSP1F in FIG. 15, the wiring GL4 and the wiring GL9 together with the wiring GL1, the wiring GL3, the wiring GL5, and the wiring GL6 correspond to one of the wiring GL[1] to the wiring GL[m] in FIG. 1. That is, in the case of the circuit structure of the pixel PX illustrated in FIG. 15, the number of wirings GL extended per row of the pixel array ALP is six.

Next, an example of an operation method of the display apparatus DSP1F in FIG. 15 is described.

Figure 16:
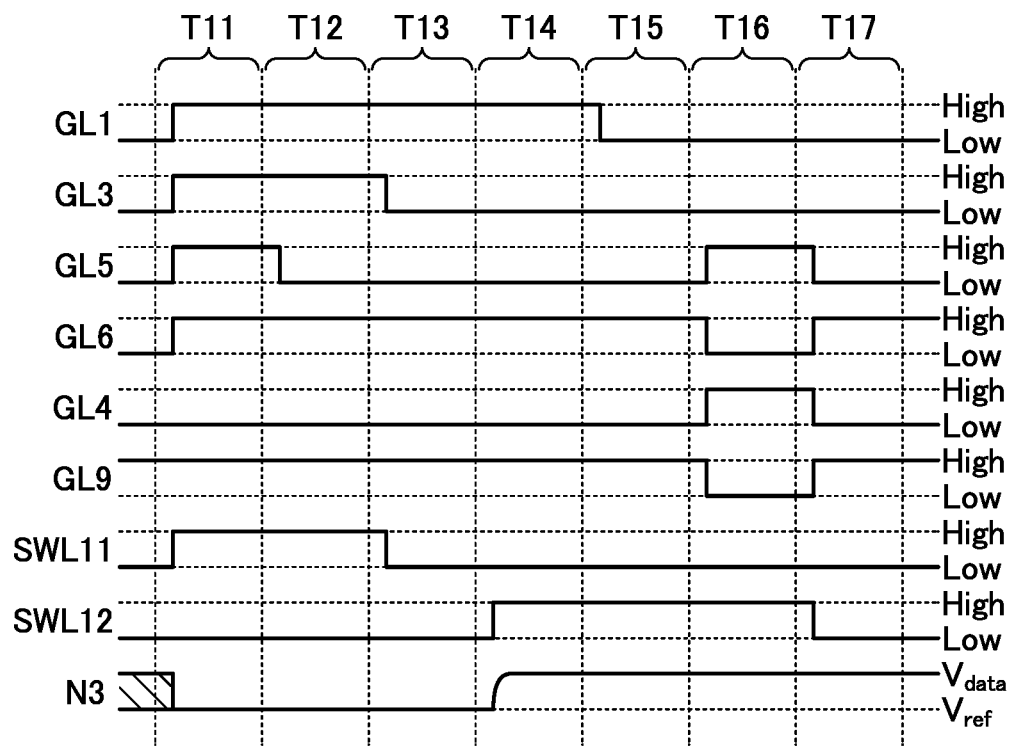
FIG. 16 is a timing chart showing an operation example of a display apparatus.

FIG. 16 is a timing chart showing an example of an operation method of the display apparatus DSP1F. Specifically, the timing chart of FIG. 16 is a modification example of the timing chart of FIG. 3A, and corresponds to a timing chart obtained by adding a change in the potential of the wiring GL4 and the wiring GL9 to the timing chart of FIG. 3A. Therefore, for operations in the display apparatus DSP1F other than the change in the potentials of the wiring GL4 and the wiring GL9, description of the timing chart of FIG. 3A is referred to.

In the period T16, a high-level potential is supplied to the wiring GL4, and a low-level potential is supplied to the wiring GL9. Thus, a high-level potential is supplied to the control terminal of the switch SW4, whereby the switch SW4 is turned on. A low-level potential is supplied to the control terminal of the switch SW9, whereby the switch SW9 is turned off.

That is, in the period T16, the anode of the light-emitting device LD and each of the wiring VE0 and the cathode of the light-emitting device LD are brought out of conduction, so that a potential $V_{CT}$ is not supplied from the wiring VE0 to the anode of the light-emitting device LD through the switch SW9. In contrast, in the period T16, since the switch SW5 and the switch SW4 are on, a current from the wiring VE2 flows through the anode of the light-emitting device LD. Thus, the light-emitting device LD emits light.

In the period T11 to the period T15 and the period T17, a low-level potential is supplied to the wiring GL4, and a high-level potential is supplied to the wiring GL9. Thus, a low-level potential is supplied to the control terminal of the switch SW4, whereby the switch SW4 is turned off. A high-level potential is supplied to the control terminal of the switch SW9, whereby the switch SW9 is turned on.

That is, in the period T11 to the period T15 and the period T17, electrical continuity is established between the anode of the light-emitting device LD and each of the wiring VE0 and the cathode of the light-emitting device LD, and thus the anode-cathode voltage of the light-emitting device LD becomes 0 V. Since the switch SW4 is off, a current does not flow between the node N2 and the anode of the light-emitting device LD through the switch SW4.

In particular, although the period T11 to the period T15 and the period T17 are originally periods in which the light-emitting device LD does not emit light, by turning on the switch SW9 in these periods, charges accumulated in the anode of the light-emitting device LD can be discharged to the wiring VE0 through the switch SW9. That is, in the period in which the light-emitting device LD does not emit light, the display apparatus DSP1F can discharge charges accumulated in the anode of the light-emitting device LD at a higher speed than the display apparatuses not including the switch SW9 (e.g., the display apparatus DSP1A to the display apparatus DSP1E). This can shift the emission state of the light-emitting device LD to the quenching state more rapidly.

Note that this embodiment can be combined with any of the other embodiments in this specification as appropriate.

Embodiment 2

In this embodiment, a display apparatus of one embodiment of the present invention that is different from the above-described display apparatus DSP1A will be described.

Structure Example 1 of Display Apparatus

Figure 17:
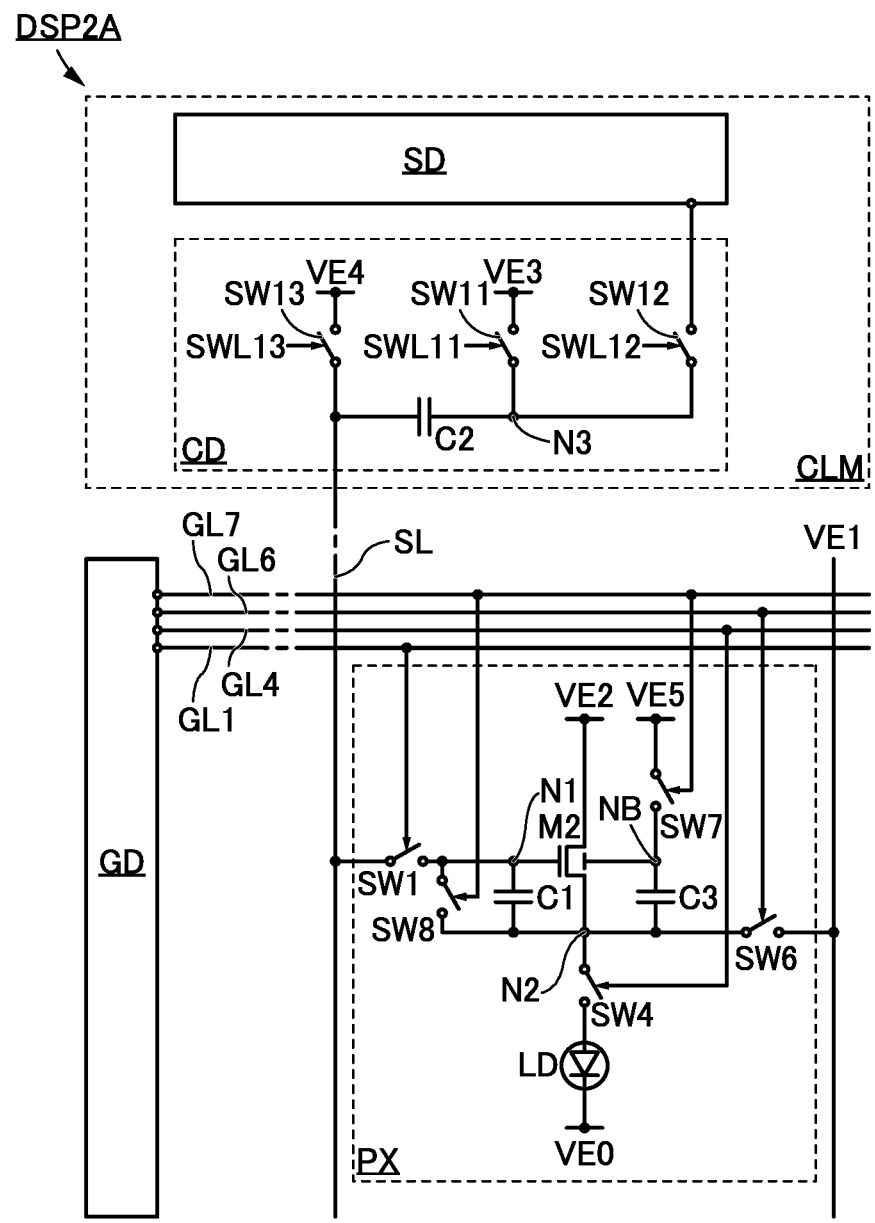
FIG. 17 is a circuit diagram illustrating a structure example of a display apparatus.

FIG. 17 illustrates structure examples of the pixel PX and the circuit CD which can be used for the display apparatus DSP0 in FIG. 1 described in Embodiment 1. In a display apparatus DSP2A illustrated in FIG. 17, as in FIG. 2, one of the plurality of pixels PX included in the pixel array ALP, the driver circuit GD of the row driver circuit RWD to which the pixel PX is electrically connected, and the circuit CD and the driver circuit SD in the column driver circuit CLM are selectively illustrated.

The pixel PX in the display apparatus DSP2A in FIG. 17 includes the transistor M2, the switch SW1, the switch SW4, the switch SW6, a switch SW7, a switch SW8, the capacitor C1, a capacitor C3, and the light-emitting device LD, for example. The circuit CD includes the switch SW11, the switch SW12, a switch SW13, and the capacitor C2.

Note that as the transistor M2 illustrated in FIG. 17, a transistor usable as the transistor M2 illustrated in FIG. 2 can be used. Note that the transistor M2 in FIG. 17 is different from the transistor M2 in FIG. 2 in including a back gate.

As the switch SW1, the switch SW4, the switch SW6, the switch SW7, the switch SW8, the switch SW11, the switch SW12, and the switch SW13 illustrated in FIG. 17, switches usable as the switch SW1, the switch SW3, the switch SW5, the switch SW6, the switch SW11, and the switch SW12 illustrated in FIG. 2 can be used.

Each of the switch SW1, the switch SW4, the switch SW6, the switch SW7, the switch SW8, the switch SW11, the switch SW12, and the switch SW13 illustrated in FIG. 17 in this specification and the like is on when a high-level potential is applied to a control terminal and off when a low-level potential is applied to the control terminal.

For the light-emitting device LD, the description of the light-emitting device LD in Embodiment 1 is referred to.

In the pixel PX, the first terminal of the switch SW1 is electrically connected to the gate of the transistor M2, a first terminal of the switch SW8, and the first terminal of the capacitor C1; the second terminal of the switch SW1 is electrically connected to the wiring SL; and the control terminal of the switch SW1 is electrically connected to the wiring GL1. The first terminal of the transistor M2 is electrically connected to the first terminal of the switch SW4, the first terminal of the switch SW6, a second terminal of the switch SW8, the second terminal of the capacitor C1, and a first terminal of the capacitor C3; the second terminal of the transistor M2 is electrically connected to the wiring VE2; and the back gate of the transistor M2 is electrically connected to a second terminal of the capacitor C3 and a first terminal of the switch SW7. The second terminal of the switch SW4 is electrically connected to the anode of the light-emitting device LD, and the control terminal of the switch SW4 is electrically connected to the wiring GL4. The second terminal of the switch SW6 is electrically connected to the wiring VE1, and the control terminal of the switch SW6 is electrically connected to the wiring GL6. A second terminal of the switch SW7 is electrically connected to a wiring VE5, and a control terminal of the switch SW7 is electrically connected to a wiring GL7. The cathode of the light-emitting device LD is electrically connected to the wiring VE0.

Note that in this embodiment, a point where the first terminal of the switch SW1, the first terminal of the switch SW8, the gate of the transistor M2, and the first terminal of the capacitor C1 are electrically connected is referred to as the node N1. A point where the first terminal of the transistor M2, the second terminal of the capacitor C1, the first terminal of the capacitor C3, the first terminal of the switch SW4, the first terminal of the switch SW6, and the second terminal of the switch SW8 are electrically connected is referred to as the node N2. A point where the back gate of the transistor M2, the second terminal of the capacitor C3, and the first terminal of the switch SW7 are electrically connected is referred to as a node NB.

In the circuit CD, the first terminal of the capacitor C2 is electrically connected to the wiring SL and a first terminal of the switch SW13, and the second terminal of the capacitor C2 is electrically connected to the first terminal of the switch SW11 and the first terminal of the switch SW12. The second terminal of the switch SW11 is electrically connected to the wiring VE3, and the control terminal of the switch SW11 is electrically connected to the wiring SWL11. The second terminal of the switch SW12 is electrically connected to the driver circuit SD, and the control terminal of the switch SW12 is electrically connected to the wiring SWL12. A second terminal of the switch SW13 is electrically connected to a wiring VE4, and a control terminal of the switch SW13 is electrically connected to a wiring SWL13.

Note that in this embodiment, the point where the first terminal of the switch SW11, the first terminal of the switch SW12, and the second terminal of the capacitor C2 are electrically connected is referred to as the node N3.

Each of the wiring VE0 to the wiring VE5 functions as a wiring for supplying a constant potential, for example. The constant potentials supplied by the wiring VE0 to the wiring VE5 may be equal to or different from one another. Alternatively, some of the potentials supplied by the wiring VE0 to the wiring VE5 may be equal and the other of the potentials may be different. One or more selected from the wiring VE0 to the wiring VE5 may serve as a wiring for supplying a pulse potential not a constant potential.

In particular, in the pixel PX in FIG. 17, the wiring VE0 preferably serves as a wiring for supplying a potential to the cathode of the light-emitting device LD. The wiring VE2 preferably serves as a wiring for supplying a potential to the anode of the light-emitting device LD.

Note that in the case where the light-emitting device LD provided for the pixel PX in FIG. 17 has an ordered stacked structure, the light-emitting device LD in FIG. 17 may have an inverted stacked structure. In that case, the wiring VE0 serves as a wiring for supplying a potential to the anode of the light-emitting device LD, and the wiring VE2 serves as a wiring for supplying a potential to the cathode of the light-emitting device LD.

The wiring GL1, the wiring GL4, the wiring GL6, and the wiring GL7 correspond to one of the wiring GL[1] to the wiring GL[m] in FIG. 1. That is, in the case of the circuit structure of the pixel PX illustrated in FIG. 17, the number of wirings GL extended per row of the pixel array ALP is four.

For the wiring SWL11 and the wiring SWL12, the description of the wiring SWL11 and the wiring SWL12 illustrated in FIG. 2 is referred to. The wiring SWL13 functions as a wiring for transmitting a control signal (a digital potential) switching the state of the switch SW13 between an on state and an off state.

Example 1 of Operation Method of Display Apparatus

Next, an example of an operation method of the display apparatus DSP2A in FIG. 17 is described.

Figure 18A:
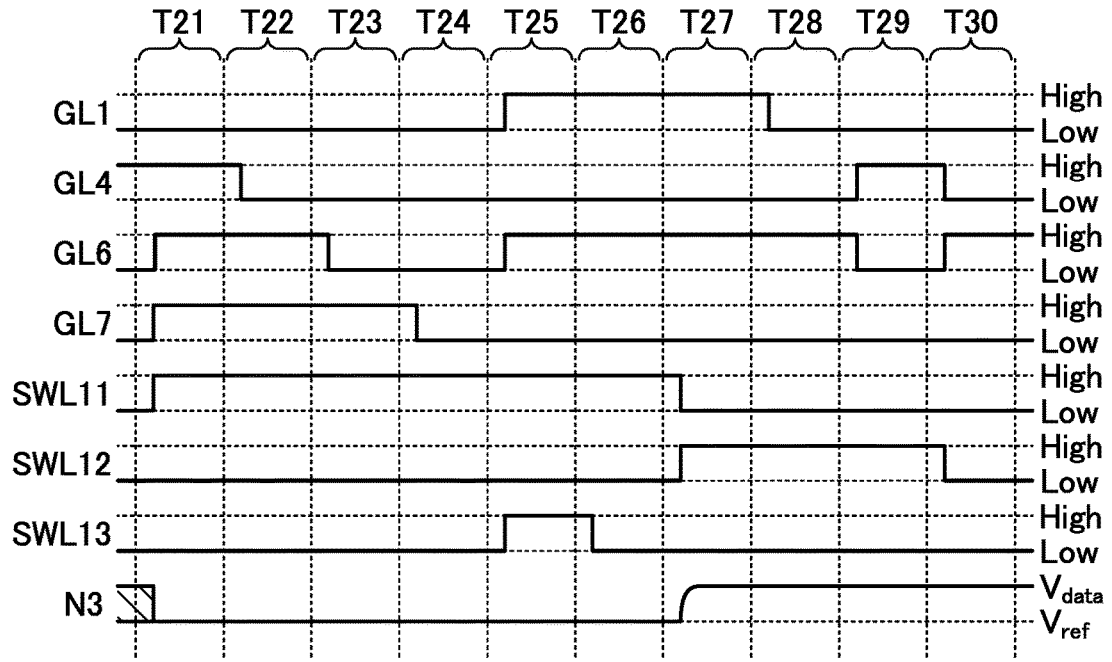
FIG. 18A to FIG. 18C are timing charts showing an operation example of a display apparatus.
Figure 18B:
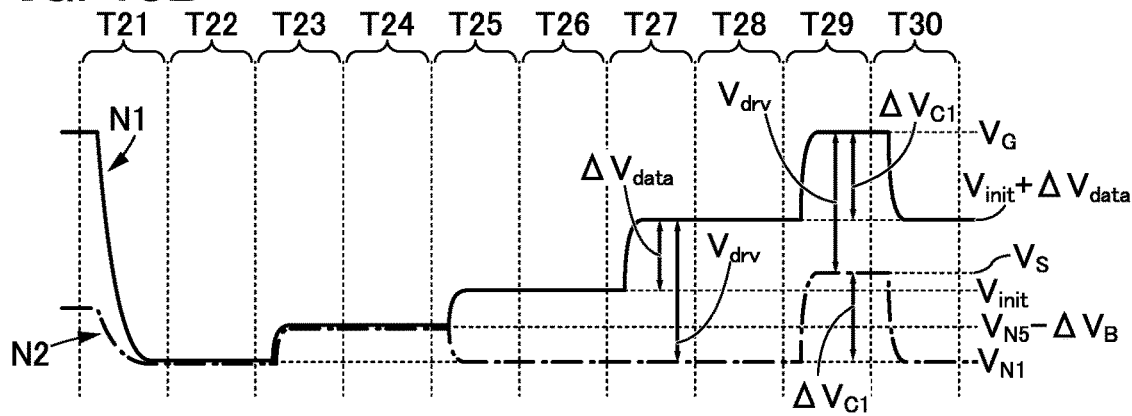
Figure 18C:
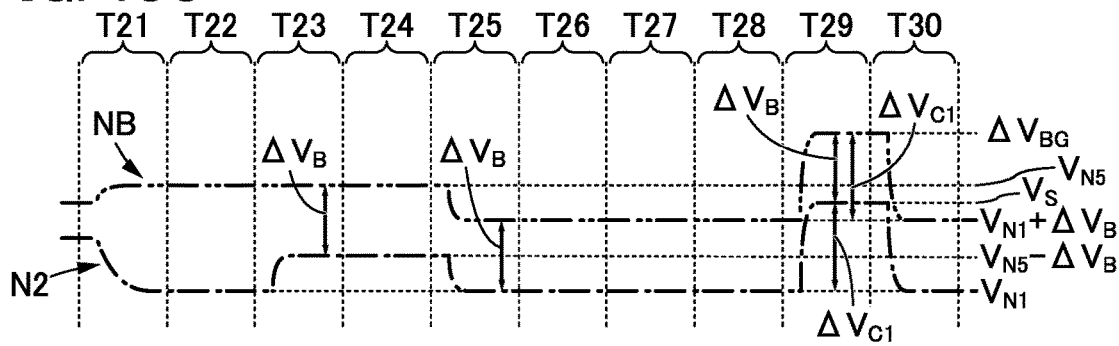

FIG. 18A to FIG. 18C are timing charts showing an example of an operation method of the display apparatus DSP1A. Specifically, the timing chart of FIG. 18A shows potential changes of the wiring GL1, the wiring GL4, the wiring GL6, the wiring GL7, the wiring SWL11, the wiring SWL12, the wiring SWL13, and the node N3 in a period T21 to a period T30. FIG. 18B shows potential changes of the node N1 and the node N2 in the period T21 to the period T30, and FIG. 18C shows potential changes of the node N2 and the node NB in the period T21 to the period T30. In FIG. 18B and FIG. 18C, the change in the potential of the node N1 is indicated by a solid line, the change in the potential of the node N2 is indicated by a dashed-dotted line, and the change in the potential of the node NB is indicated by a dashed-double dotted line.

Note that in FIG. 18A, "High" indicates a high-level potential and "Low" indicates a low-level potential.

The wiring VE1 is supplied with $V_{N1}$ as a constant potential. The wiring VE3 is supplied with $V_{ref}$ as a constant potential. The wiring VE5 is supplied with $V_{N5}$ as a constant potential. Note that although $V_{N1}$ is a potential lower than $V_{N5}$ in FIG. 18C, $V_{N1}$ may be a potential equal to $V_{N5}$ or may be a potential lower than $V_{N5}$.

In addition, $V_{N5}$ is preferably a potential with which the threshold voltage of the transistor M2 becomes lower than 0 V when the back gate-source voltage of the transistor M2 is $V_{N5}-V_{N1}$.

The wiring VE2 is supplied with $V_{AN}$ as a constant potential. The wiring VE0 is supplied with $V_{CT}$ as a constant potential. $V_{AN}$ is a potential higher than $V_{CT}$.

Note that $V_{AN}$ is a potential higher than $V_{N1}$. In addition, the voltage $V_{N1}-V_{CT}$ is a voltage with which the light-emitting device LD does not emit light (a current does not flow between the anode and the cathode of the light-emitting device LD). Therefore, $V_{N1}$ is preferably a potential equal to $V_{CT}$, or a potential lower than $V_{CT}$.

[Before Period T21]

In a period before the period T21, each of the wiring GL1, the wiring GL6, the wiring GL7, the wiring SWL11, the wiring SWL12, and the wiring SWL13 is supplied with a low-level potential. Accordingly, each of the control terminals of the switch SW1, the switch SW6, the switch SW7, the switch SW8, the switch SW11, the switch SW12, and the switch SW13 is supplied with a low-level potential, whereby these switches are off.

Before the period T21, a high-level potential is supplied to the wiring GL4. Thus, a high-level potential is supplied to the control terminal of the switch SW4, whereby the switch SW4 is turned on.

Before the period T21, the potential of the node N3 is undefined. Thus, the potential of the node N3 before the period T21 is hatched in the timing chart of FIG. 18A.

Since the switch SW4 is on, in the case where the gate-source voltage of the transistor M2 is higher than the threshold voltage of the transistor M2, a current flows between the wiring VE2 and the wiring VE0 through the transistor M2, the switch SW4, and the light-emitting device LD. Therefore, the light-emitting device LD emits light in some cases before the period T21.

[Period T21]

In the period T21, each of the wiring GL6, the wiring GL7, and the wiring SWL11 is supplied with a low-level potential. Accordingly, each of the control terminals of the switch SW6, the switch SW7, the switch SW8, and the switch SW11 is supplied with a high-level potential, whereby these switches are on.

Since the switch SW6 and the switch SW8 are on, electrical continuity is established between the wiring VE1 and each of the gate of the transistor M2, the first terminal of the transistor M2, the first terminal of the capacitor C1, the second terminal of the capacitor C1, and the first terminal of the capacitor C3. Thus, the gate of the transistor M2 and the first terminal of the capacitor C1 (the node N1) and the first terminal of the transistor M2, the second terminal of the capacitor C1, and the first terminal of the capacitor C3 (the node N2) are supplied with the potential $V_{N1}$ from the wiring VE1 (see FIG. 18B and FIG. 18C).

Since the switch SW7 is on, electrical continuity is established between the wiring VE5 and each of the back gate of the transistor M2 and the second terminal of the capacitor C3. Thus, the back gate of the transistor M2 and the second terminal of the capacitor C3 (the node NB) are supplied with the potential $V_{N5}$ from the wiring VE5 (see FIG. 18C).

At this time, since the switch SW4 is on, the potential $V_{N1}$ from the wiring VE1 is supplied to the anode of the light-emitting device. Thus, the anode-cathode voltage of the light-emitting device LD becomes $V_{N1}-V_{CT}$. As described above, when the anode-cathode voltage of the light-emitting device LD is $V_{N1}-V_{CT}$, the light-emitting device LD does not emit light (a current does not flow between the anode and the cathode of the light-emitting device LD). When the transistor M2 is on, a current flows from the wiring VE2 to the wiring VE1 through the transistor M2 and the switch SW6.

Since the switch SW11 is on, electrical continuity is established between the wiring VE3 and each of the second terminal of the capacitor C2 and the first terminal of the switch SW12. Thus, the second terminal of the capacitor C2 and the first terminal of the switch SW12 (the node N3) are supplied with the potential $V_{ref}$ from the wiring VE3 (see FIG. 18A).

Note that in the period T21 in the timing chart of FIG. 18A, high-level potentials are input to the wiring GL6, the wiring GL7, and the wiring SWL11 at the same timing; however, the timings for inputting high-level potentials to the wiring GL6, the wiring GL7, and the wiring SWL11 may be different within the period T21.

[Period T22]

In the period T22, a low-level potential is supplied to the wiring GL4. Thus, a low-level potential is supplied to the control terminal of the switch SW4, whereby the switch SW4 is turned off. Thus, the anode of the light-emitting device LD and each of the first terminal of the transistor M2, the second terminal of the capacitor C1, and the first terminal of the capacitor C3 are brought out of conduction.

[Period T23]

In the period T23, a low-level potential is supplied to the wiring GL6. Thus, a low-level potential is supplied to the control terminal of the switch SW6, whereby the switch SW6 is turned off.

Since the potential of each of the gate of the transistor M2 and the first terminal of the transistor M2 is $V_{N1}$, the gate-source voltage of the transistor M2 becomes 0 V. When the threshold voltage of the transistor M2 is lower than 0 V, the transistor M2 is turned on.

Immediately before the switch SW6 is turned off, the back gate-source voltage of the transistor M2 is $V_{N5}-V_{N1}$. When the switch SW6 is turned off, the potential $V_{N1}$ is not applied to each of the first terminal of the transistor M2 and the gate of the transistor M2 from the wiring VE1, and positive charge is charged to each of the node N1 and the node N2 from the wiring VE2 passing between the first terminal and the second terminal of the transistor M2 and through the switch SW8. Accordingly, the potentials of the node N1 and the node N2 are increased.

The increases in the potentials of the node N1 and the node N2 decrease the back gate-source voltage of the transistor M2. Due to the decrease in the back gate-source voltage of the transistor M2, when the threshold voltage $V_{th}$ of the transistor M2 reaches 0 V, which is the gate-source voltage of the transistor M2, the transistor M2 is turned off, so that charging of positive charge from the wiring VE2 is stopped. The back gate-source voltage at this time is referred to as $\Delta V_S$. Since the switch SW7 is on and the potential of the node NB is $V_{N5}$, each of the potentials of the node N1 and the node N2 at this time becomes $V_{N5}-\Delta V_B$. When the transistor M2 is turned off, charging of positive charge from the wiring VE2 is stopped, so that the potentials of the node N1 and the node N2 do not change from $V_{N5}-\Delta V_B$ (see FIG. 18B and FIG. 18C). When the transistor M2 is turned off, the node N1 and the node N2 are brought into a floating state.

[Period T24]

In the period T24, a low-level potential is supplied to the wiring GL7. Thus, a low-level potential is supplied to each of the control terminal of the switch SW7 and a control terminal of the switch SW8, so that the switch SW7 and the switch SW8 are turned off.

Since the switch SW7 is off, the wiring VE5 and each of the second terminal of the capacitor C3 and the back gate of the transistor M2 are brought out of conduction. At this time, the node NB is brought into a floating state. Thus, the voltage $\Delta V_S$ between the first terminal and the second terminal of the capacitor C3 can be held.

Since the switch SW8 is off, the first terminal of the capacitor C1 and the gate of the transistor M2 are brought out of conduction, and the second terminal of the capacitor C1, the first terminal of the transistor M2, and the first terminal of the capacitor C3 are brought out of conduction. At this time, the node N1 and the node N2 are brought into a floating state.

[Period T25]

In the period T25, a high-level potential is supplied to each of the wiring GL1, the wiring GL6, and the wiring SWL13. Thus, a high-level potential is supplied to each of the control terminals of the switch SW1, the switch SW6, and the switch SW13, so that the switch SW1, the switch SW6, and the switch SW12 are turned on.

Since the switch SW1 and the switch SW13 are on, electrical continuity is established between the wiring VE4 and each of the gate of the transistor M2, the first terminal of the capacitor C1, and the wiring SL. Thus, the gate of the transistor M2, the first terminal of the capacitor C1 (the node N1), and the wiring SL are supplied with the potential Vinit from the wiring VE4 (see FIG. 18B).

Since the switch SW6 is on, electrical continuity is established between the wiring VE1 and each of the first terminal of the transistor M2, the second terminal of the capacitor C1, and the first terminal of the capacitor C3. Thus, the first terminal of the transistor M2, the second terminal of the capacitor C1, and the first terminal of the capacitor C3 (the node N2) are supplied with the potential $V_{N1}$ from the wiring VE1 (see FIG. 18B and FIG. 18C).

Here, since the potentials of the first terminal of the transistor M2, the second terminal of the capacitor C1, and the first terminal of the capacitor C3 (the node N2) change from $V_{N5}-\Delta V_B$ to $V_{N1}$, the potential of the back gate of the transistor M2 (the second terminal of the capacitor C3 and the node NB) also changes due to capacitive coupling of the capacitor C3. In this operation example, the potential of the back gate of the transistor M2 (the second terminal of the capacitor C3 and the node NB) is decreased from $V_{N5}$ to $V_{N1}-\Delta V_B$ by the operation in the period T25 (see FIG. 18C). This corresponds to the case where the capacitive coupling coefficient in the vicinity of the node NB is 1.

[Period T26]

In the period T26, a low-level potential is supplied to the wiring SWL13. Thus, a low-level potential is supplied to the control terminal of the switch SW13, whereby the switch SW13 is turned off.

Since the switch SW13 is off, the wiring VE4 and each of the gate of the transistor M2, the first terminal of the capacitor C1 (the node N1), and the wiring SL are brought out of conduction. At this time, the gate of the transistor M2, the first terminal of the capacitor C1 (the node N1), and the wiring SL are brought into a floating state.

[Period T27]

In the period T27, a low-level potential is supplied to the wiring SWL11 and a high-level potential is supplied to the wiring SWL12. Thus, a low-level potential is supplied to the control terminal of the switch SW11, so that the switch SW11 is turned off. In addition, a high-level potential is supplied to the control terminal of the switch SW12, so that the switch SW12 is turned on.

In particular, when the switch SW12 is on, the driver circuit SD transmits an image data signal in accordance with an image displayed on the pixel PX to the second terminal of the capacitor C2 (the node N3) through the switch SW12. Note that the image data signal is a potential $V_{data}$.

Thus, the potential of the node N3 changes from $V_{ref}$ to $V_{data}$. The wiring SL and the node N1 are in a floating state, the potentials of the wiring SL and the node N1 are also changed by the capacitive coupling of the capacitor C2 in accordance with a change in potential of the node N3. The amounts of changes in the potentials of the wiring SL and the node N1 are determined by, for example, electrostatic capacitance of the capacitor C1, electrostatic capacitance of the capacitor C2, gate capacitance of the transistor M2, parasitic capacitance of the switch SW1, parasitic capacitance of the switch SW8, and parasitic capacitance of the wiring SL. In this operation example, for simple description, the description will be made on the assumption that the amounts of changes in the potentials of the wiring SL and the node N1 are determined by the electrostatic capacitance of the capacitor C1 and the electrostatic capacitance of the capacitor C2.

When the electrostatic capacitance of the capacitor C1 is represented by $C_1$ and the electrostatic capacitance of the capacitor C2 is represented by $C_2$, and the potential of the node N3 changes from $V_{ref}$ to $V_{data}$, $\Delta V_{data}=(V_{data}-V_{ref})\times C_2/(C_1+C_2)$ is given to the wiring SL and the node N1 as the amounts of changes in the potentials thereof. Thus, the potentials of the wiring SL and the node N1 are $V_{init}+\Delta V_{data}$ (see FIG. 18B).

Meanwhile, the second terminal of the capacitor C1 (the node N2) is supplied with the potential $V_{N1}$ from the wiring VE1 before the period T27, and thus the potential of the second terminal of the capacitor C1 (the node N2) remains $V_{N1}$ and does not change even in a period in which the potential of the node N3 changes from $V_{ref}$ to $V_{data}$.

Accordingly, when the gate-source voltage of the transistor M2 in the period T27 is represented by $V_{drv}$, $V_{drv}=$(the potential of the node N1)−(the potential of the node N2)$=V_{init}+\Delta V_{data}-V_{N1}$. Thus, in the period T27, a voltage held between the first terminal and the second terminal of the capacitor C1 is $V_{drv}=V_{init}+\Delta V_{data}-V_{N1}$.

Since the gate-source voltage $V_{drv}$ of the transistor M2 is higher than the threshold voltage (0 V) of the transistor M2, the transistor M2 is on. Note that since the switch SW4 and the switch SW8 are off and the switch SW6 is on, a current flows between the wiring VE2 and the wiring VE1 through the transistor M2 and the switch SW6.

[Period T28]

In the period T28, a low-level potential is supplied to the wiring GL1. Thus, a low-level potential is supplied to the control terminal of the switch SW1, whereby the switch SW1 is turned off.

When the switch SW1 is turned off, the wiring SL and each of the gate of the transistor M2 and the first terminal of the capacitor C1 are brought out of conduction. The switch SW8 has been off since the period T24, so that the potential $V_{init}+\Delta V_{data}$ is held in the first terminal of the capacitor C1 (the node N1).

[Period T29]

In the period T29, a high-level potential is supplied to the wiring GL4, and a low-level potential is supplied to the wiring GL6. Thus, a high-level potential is supplied to the control terminal of the switch SW4, whereby the switch SW4 is turned on. A low-level potential is supplied to the control terminal of the switch SW6, whereby the switch SW6 is turned off.

Since the switch SW4 is on, electrical continuity is established between the first terminal of the transistor M2 and the anode of the light-emitting device LD. Since the switch SW6 is off, the wiring VE1 and each of the first terminal of the transistor M2, the second terminal of the capacitor C1, and the first terminal of the capacitor C3 are brought out of conduction. The switch SW8 has been off from the period T24, so that the first terminal of the transistor M2 (the node N2) and the gate of the transistor M2 (the node N1) are brought out of conduction.

The gate-source voltage of the transistor M2 is $V_{drv}=V_{init}+\Delta V_{data}$. Since $V_{drv}$ is higher than the threshold voltage (0 V) of the transistor M2, the transistor M2 is on.

Thus, a current flows between the wiring VE0 and the wiring VE2 through the transistor M2, the switch SW4, and the light-emitting device LD.

At this time, a voltage $V_{AN}-V_{CT}$ between the wiring VE0 and the wiring VE2 is divided by the transistor M2, the light-emitting device LD, and the switch SW4. In this operation example, the potential of the first terminal of the transistor M2 (the second terminal of the capacitor $C_1$, the first terminal of the capacitor C3, and the node N2) is increased from $V_{N1}$ to $V_S$ by the operation in the period T29 (see FIG. 18B and FIG. 18C).

Since the potential of the first terminal of the transistor M2 (the second terminal of the capacitor C1 and the node N2) is increased from $V_{N1}$ to $V_S$, the potential of the gate of the transistor M2 (the first terminal of the capacitor C1 and the node N1) also changes due to capacitive coupling of the capacitor C1. In this operation example, the potential of the gate of the transistor M2 (the first terminal of the capacitor C1 and the node N1) is increased from $V_{init}+\Delta V_{data}$ to $V_G$ by the operation in the period T29 (see FIG. 18B).

Note that the amount of change in the potential of the node N1 due to the above-described capacitive coupling of the capacitor C1 is determined by the electrostatic capacitance of the capacitor C1, the gate capacitance of the transistor M2, and the parasitic capacitance of the switch SW1. Note that in this operation example, for simple description, the amount of change in the potential of the node N1 is assumed to be equal to the amount of change in the potential of the node N2. That is, when the amount of change in the potential of the node N2 is $\Delta V_{C1}(=V_S-V_{N1})$, the amount of change in the potential of the node N1 also becomes $\Delta V_{C1}$. This corresponds to the case where the capacitive coupling coefficient in the periphery of the node N1 is 1.

Since $\Delta V_{C1}=V_G-(V_{init}+\Delta V_{data})$ at the node N1, when the amount of change in the potential of the node N2, $\Delta V_{C1}=V_S-V_{N1}$ is substituted into this formula, $V_G-V_S=V_{init}+\Delta V_{data}-V_{N1}=V_{drv}$ is obtained. That is, the gate-source voltage of the transistor M2 in the period T29 does not change from that after input of an image data signal to the circuit CD in the period T27.

Since the potential of the first terminal of the transistor M2 (the second terminal of the capacitor C1 and the node N2) is increased from $V_{N1}$ to $V_S$, the potential of the back gate of the transistor M2 (the second terminal of the capacitor C3 and the node NB) also changes due to capacitive coupling of the capacitor C3. In this operation example, when the capacitive coupling coefficient in the periphery of the node N3 is 1, the potential of the back gate of the transistor M2 (the second terminal of the capacitor C3 and the node NB) is increased from $V_{N1}+\Delta V_B$ to $V_{N1}+\Delta V_B+$ $\Delta V_{C1}$ by the operation in the period T29 (see FIG. 18C; note that $V_{BG}=V_{N1}+\Delta V_B+\Delta V_{C1}$ in FIG. 18C). Note that here, the back gate-source voltage of the transistor M2 remains $\Delta V_S$ and does not change, so that the threshold voltage of the transistor M2 remains 0 V.

Here, the case where the transistor M2 operates in a saturation region is considered. The amount of current flowing between the first terminal and the second terminal of the transistor M2 is determined in accordance with the gate-source voltage $V_{drv}$ of the transistor M2. Specifically, an amount I of current flowing between the source and the drain of the transistor operating in the saturation region is proportional to the square of a difference between the gate-source voltage $V_{GS}$ and the threshold voltage $V_{th}$ of the transistor, whereby $I=k(V_{GS}-V_{th})^2$. Note that k is a proportionality constant depending on the transistor structure. By substituting the gate-source voltage $V_{drv}$ of the transistor M2 and 0 into $V_{GS}$ and $V_{th}$, respectively, in the above formula, $I=k(V_{init}+\Delta V_{data})^2$, and the amount I of current flowing through the transistor M2 does not depend on the threshold voltage $V_{th}$ and is determined by $V_{init}+\Delta V_{data}$.

Accordingly, performing the operation from the period T21 to the period T30 allows the transistor M2 to generate a current that does not depend on the threshold voltage $V_{th}$ of the transistor M2.

Since the potential of the anode of the light-emitting device LD is $V_S$, the anode-cathode potential of the light-emitting device LD is $V_S-V_{CT}$. Furthermore, a current flowing between the source and the drain of the transistor M2 ($I=k(V_{init}+\Delta V_{data})^2$) flows between the anode and the cathode of the light-emitting device LD, whereby the light-emitting device LD emits light. In the case where the light-emitting device LD is an organic EL element, emission luminance of the light-emitting device LD is determined by the amount of current flowing between the anode and the cathode of the light-emitting device LD. Since $V_{init}$ is a constant potential, the emission luminance of the light-emitting device LD is determined by the image data signal $V_{data}$ input from the driver circuit SD.

As in the description of the potential change shown in FIG. 4A to FIG. 4C, in the case where the minimum value of the gray level of the pixel is $V_{data\_min}$ and the maximum value of the gray level of the pixel is $V_{data\_max}$, an image data signal $V_{data}$ output from the driver circuit SD passes through the circuit CD, whereby any one of $V_{init}+K\times(V_{data\_min}-V_{ref})$ to $V_{init}+K\times(V_{data\_max}-V_{ref})$ is input to the pixel PX. Note that $K=C_2/(C_1+C_2)$.

Figure 19A:
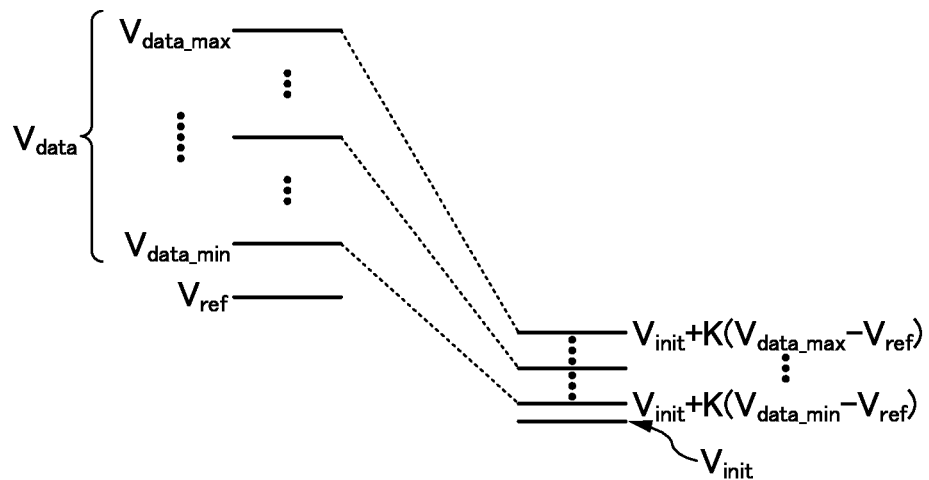
FIG. 19A to FIG. 19C are diagrams each showing a relation between a potential of an image data signal input to a circuit and a potential of the image data signal output from the circuit.
Figure 19B:
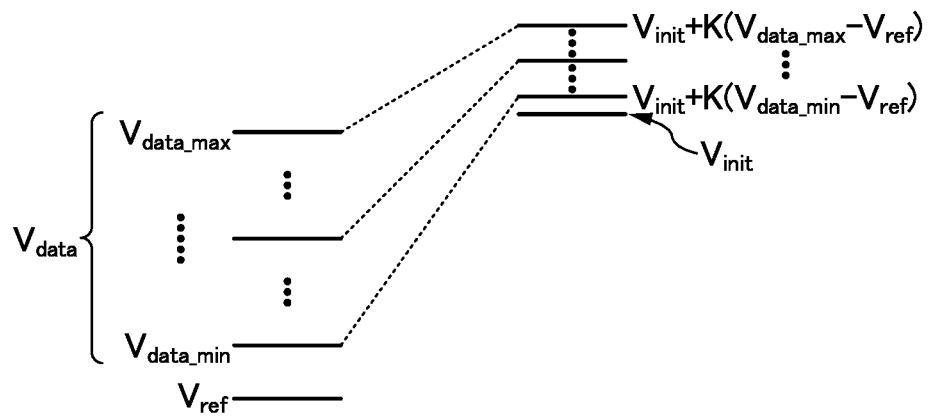
Figure 19C:
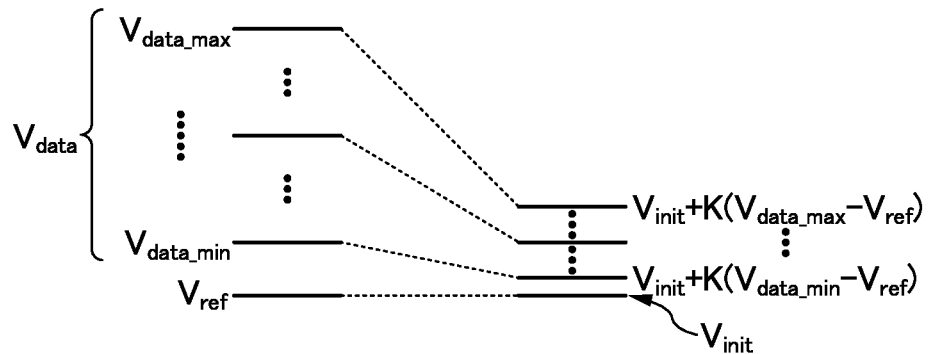

In the case where $V_{ref}$ is lower than $V_{init}$, the relation between image data signals $V_{data\_min}$ to $V_{data\_max}$ output from the driver circuit SD and $V_{init}+K\times(V_{data\_min}-V_{ref})$ to $V_{init}+K\times(V_{data\_max}V_{ref})$ input to the pixels PX through the circuit CD are shown in FIG. 19A. In the case where $V_{ref}$ is higher than $V_{init}$, the relation between image data signals $V_{data\_min}$ to $V_{data\_max}$ output from the driver circuit SD and $V_{init}+K\times(V_{data\_min}-V_{ref})$ to $V_{init}+K\times(V_{data\_max}V_{ref})$ input to the pixels PX through the circuit CD are shown in FIG. 19B. In the case where $V_{ref}$ is equal to $V_{init}$, the relation between image data signals $V_{data\_min}$ to $V_{data\_max}$ output from the driver circuit SD and $V_{init}+K\times(V_{data\_min}-V_{ref})$ to $V_{init}+K\times(V_{data\_max}-V_{ref})$ input to the pixels PX through the circuit CD are shown in FIG. 19C.

That is, as in FIG. 4A to FIG. 4C, the image data signals output from the driver circuit SD are input to the pixels PX through the circuit CD, whereby the potential range of the image data signals is narrowed and the potential step size of the image data signal becomes small. Accordingly, potentials of the image data signals input to the pixels PX can be changed finely, and thus the amount of current flowing between the source and the drain of the transistor M2 can be changed finely.

Note that in the period T29 in the timing chart of FIG. 18A, a high level potential and a low-level potential are respectively input to the wiring GL4 and the wiring GL6 at the same timing; however, the timings for inputting potentials to the wiring GL4 and the wiring GL6 may be different within the period T29.

[Period T30]

In the period T30, a low-level potential is supplied to each of the wiring GL4 and the wiring SWL12 and a high-level potential is supplied to the wiring GL6. Thus, a low-level potential is supplied to each of the control terminals of the switch SW4 and the switch SW12, so that the switch SW4 and the switch SW12 are turned off. In addition, a high-level potential is supplied to the control terminal of the switch SW6, so that the switch SW6 is turned on.

Since the switch SW4 is off, the second terminal of the transistor M2 and the light-emitting device LD are brought out of conduction. Since the switch SW6 is on, electrical continuity is established between the wiring VE1 and each of the first terminal of the transistor M2, the second terminal of the capacitor C1, the first terminal of the capacitor C3, and the anode of the light-emitting device LD. Thus, the first terminal of the transistor M2, the first terminal of the capacitor C1, and the anode of the light-emitting device LD (the node N2) are supplied with the potential $V_{N1}$ from the wiring VE1 (see FIG. 18B and FIG. 18C).

At this time, the anode-cathode voltage of the light-emitting device LD becomes $V_{N1}-V_{CT}$. As described above, when the anode-cathode voltage of the light-emitting device LD is $V_{N1}-V_{CT}$, the light-emitting device LD does not emit light (a current does not flow between the anode and the cathode of the light-emitting device LD).

In other words, by performing the operation in the period T30, light emission by the light-emitting device LD can be stopped.

As in the display apparatus DSP1A in Embodiment 1, by performing the above-described operations in the period T21 to the period T30, the transistor M2 in the pixel PX can generate a current that does not depend on the threshold voltage $V_{th}$ of the transistor M2, and can supply the current to the light-emitting device LD.

As in the display apparatus DSP1A in Embodiment 1, through the above-described operations in the period T21 to the period T30, the amount of current flowing through the light-emitting device LD in the pixel PX of the display apparatus DSP2A can be controlled more finely.

Example 2 of Operation Method of Display Apparatus

FIG. 18A to FIG. 18C illustrate operation of one of the pixels PX included in the pixel array ALP of the display apparatus DSP2A. Here, operation of the whole pixel array ALP in the display apparatus DSP0 employing the display apparatus DSP2A is described.

The overall operation of the pixel array ALP of the display apparatus DSP0 employing the display apparatus DSP2A can be the same as the overall operation of the pixel array ALP of the display apparatus DSP0 employing the display apparatus DSP1A described in Embodiment 1. That is, the timing chart of FIG. 5 can be employed as an example of the overall operation of the pixel array ALP of the display apparatus DSP0 employing the display apparatus DSP2A. Portions of the operation, which are different from the overall operation of the pixel array ALP of the display apparatus DSP0 employing the display apparatus DSP1A described in Embodiment 1, are described below, and for the other portions, description in Embodiment 1 is referred to.

The node N3[1] corresponds to the node N3 included in the circuit CD[1] in the display apparatus DSP0. Similarly, the node N3[2] corresponds to the node N3 included in the circuit CD[2] (not illustrated in FIG. 1) in the display apparatus DSP0, and the node N3[n] corresponds to the node N3 included in the circuit CD[n] in the display apparatus DSP0.

The wiring GL1[1] corresponds to the wiring GL1 in FIG. 17 extended in the first row in the pixel array ALP of the display apparatus DSP0. Similarly, the wiring GL1[2] corresponds to the wiring GL1 in FIG. 17 extended in the second row in the pixel array ALP of the display apparatus DSP0, and the wiring GL1[m] corresponds to the wiring GL1 in FIG. 17 extended in the m-th row in the pixel array ALP of the display apparatus DSP0.

The wiring GL6[1] corresponds to the wiring GL6 in FIG. 17 extended in the first row in the pixel array ALP of the display apparatus DSP0. Similarly, the wiring GL6[2] corresponds to the wiring GL6 in FIG. 17 extended in the second row in the pixel array ALP of the display apparatus DSP0, and the wiring GL1[m] corresponds to the wiring GL6 in FIG. 17 extended in the m-th row in the pixel array ALP of the display apparatus DSP0.

The capacitor C1[1,1] corresponds to the capacitor C1 in FIG. 17 in the pixel PX[1,1] included in the pixel array ALP of the display apparatus DSP0. Similarly, the capacitor C1[1,2] corresponds to the capacitor C1 in FIG. 17 in the pixel PX[1,2] (not illustrated in FIG. 1) included in the pixel array ALP of the display apparatus DSP0, and the capacitor C1[1,n] corresponds to the capacitor C1 in FIG. 17 in the pixel PX[1,n] included in the pixel array ALP of the display apparatus DSP0. A capacitor C1[i,j] hereinafter corresponds to the capacitor C1 in FIG. 17 in the pixel PX[i,j] included in the pixel array ALP of the display apparatus DSP0.

In each of the period U1, the period U3, and the period U6 in the timing chart of FIG. 5, operation in the period T21 to the period T26 in the timing chart of FIG. 18A is performed on the plurality of pixels PX positioned in a certain row. In each of the period U2, the period U4, and the period U7 in the timing chart of FIG. 5, operation in the period T27 to the period T30 in the timing chart of FIG. 18A is performed on the plurality of pixels PX positioned in a certain row.

As described above, by performing the operation in the period U1 to the period U7, the display apparatus DSP0 employing the display apparatus DSP2A can display an image. The image displayed on the display apparatus DSP0 can be updated every time the operation in the period U1 to the period U7 is repeated.

Layout Example of Display Apparatus

Figure 20:
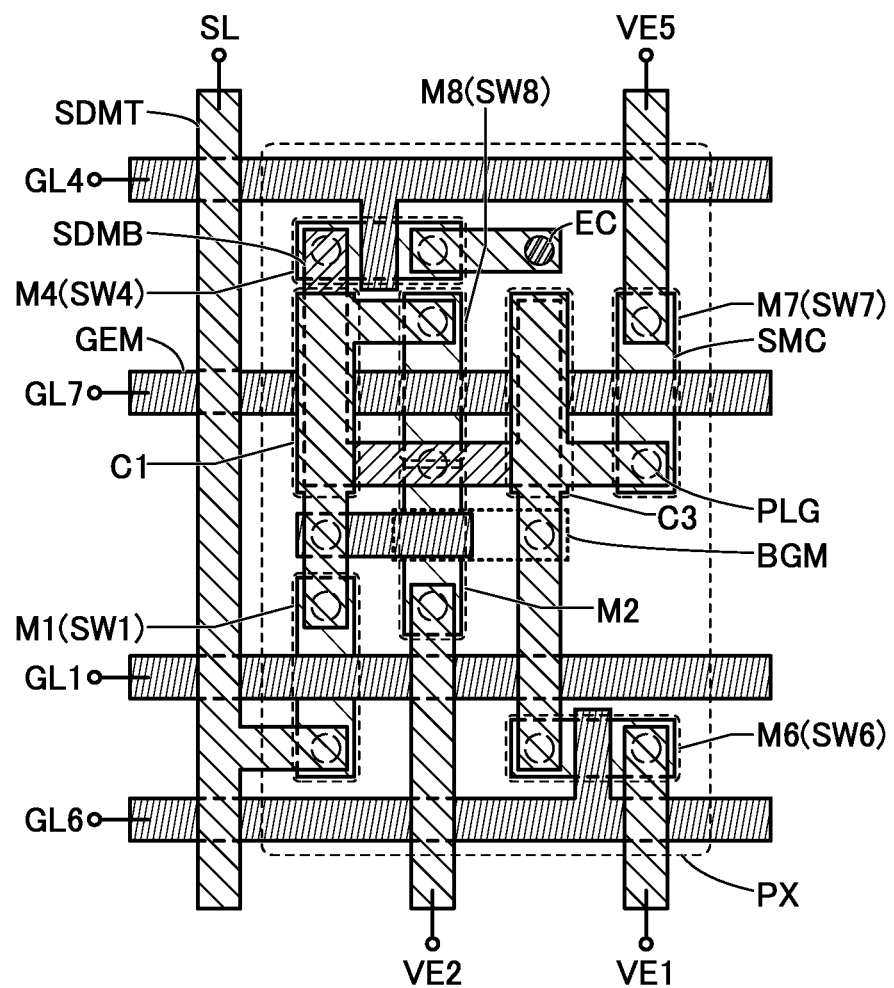
FIG. 20 is a plan view illustrating a layout example of a circuit.

FIG. 20 is a layout (plan view) illustrating a circuit structure example of part of the display apparatus DSP2A in FIG. 17. Specifically, FIG. 20 illustrates a layout of the pixel PX. For the layout of the circuit CD in the display apparatus DSP2A, the layout in FIG. 6A is referred to, for example.

In the layout in FIG. 20, the transistor M1 is used as the switch SW1 included in the pixel PX in FIG. 17, the transistor M4 is used as the switch SW4 included in the pixel PX in FIG. 17, the transistor M6 is used as the switch SW6 included in the pixel PX in FIG. 17, the transistor M7 is used as the switch SW7 included in the pixel PX in FIG. 17, and a transistor M8 is used as the switch SW8.

In FIG. 20, the pixel PX includes a conductor BGM, the conductor GEM, the conductor SDMB, the conductor SDMT, the semiconductor SMC, and the conductor PLG. Note that insulators included in the display apparatus DSP2A are not illustrated in FIG. 20.

The conductor BGM is positioned below the semiconductor SMC, for example. The semiconductor SMC is positioned below the conductor GEM, for example. The conductor GEM is positioned below the conductor SDMB, for example. The conductor SDMB is positioned below the conductor SDMT, for example. That is, in the circuit CD and the pixel PX in FIG. 20, the conductor BGM, the semiconductor SMC, the conductor GEM, the conductor SDMB, and the conductor SDMT are formed in this order.

Part of the conductor GEM serves as gates (sometimes referred to as first gates) of the transistor M1, the transistor M2, the transistor M4, the transistor M6, the transistor M7, and the transistor M8, for example. Part of the conductor BGM serves as the back gate (sometimes referred to as a second gate) of the transistor M2, for example.

The conductor BGM, the semiconductor SMC, the conductor GEM, the conductor SDMB, and the conductor SDMT can be formed by a photolithography method, for example. Specifically, for example, in the case where the conductor GEM is formed, a conductive material to be the conductor GEM is formed by one or more methods selected from a sputtering method, a CVD method, a PLD method, and an ALD method, and then a desired pattern is formed by a photolithography method. The conductor BGM, the semiconductor SMC, the conductor SDMB, and the conductor SDMT can also be formed in a manner similar to the above.

Furthermore, insulators may be provided between the conductor BGM and the semiconductor SMC, between the semiconductor SMC and the conductor GEM, between the conductor GEM and the conductor SDMB, and between the conductor SDMB and the conductor SDMT. In particular, an insulator provided between the semiconductor SMC and the conductor GEM serves as a first gate insulating film (sometimes referred to as a front gate insulating film) in some cases. An insulator provided between the conductor BGM and the semiconductor SMC serves as a second gate insulating film (sometimes referred to as a back gate insulating film) in some cases.

The conductor PLG serving as a wiring or a plug is provided each between the conductor BGM and the conductor SDMT, between the semiconductor SMC and the conductor SDMB, between the semiconductor SMC and the conductor SDMT, and between the conductor GEM and the conductor SDMT. The conductor PLG is formed, for example, in such a manner that an opening portion is formed in the insulator, and the opening portion is filled with a conductive material to be the conductor PLG. Note that after the formation of the conductor PLG, planarization may be performed by planarization treatment using chemical mechanical polishing or the like to align the levels of film surfaces of the conductor PLG and peripheral insulators.

Each of the transistor M1, the transistor M2, the transistor M4, the transistor M6, the transistor M7, and the transistor M8 illustrated in FIG. 20 includes part of the semiconductor SMC, part of the conductor GEM, part of the insulator, and part of the conductor PLG, for example. Furthermore, the transistor M2 includes part of the conductor BGM, for example.

The capacitor C1 and the capacitor C3 illustrated in FIG. 20 each include part of the conductor SDMB and part of the conductor SDMT. Specifically, each of the capacitor C1 and the capacitor C3 has a region where part of the conductor SDMB and part of the conductor SDMT overlap with each other. That is, in each of the capacitor C1 and the capacitor C3, the part of the conductor SDMB serves as one of a pair of electrodes, and the part of the conductor SDMT serves as the other of the pair of electrodes. Note that an insulator with high dielectric constant is preferably provided between the conductor SDMB and the conductor SDMT which are included in the capacitor C1 and the capacitor C3.

The conductor EC illustrated in FIG. 20 is formed over the conductor SDMT, for example. The conductor EC serves as a wiring or a plug for electrically connecting the conductor SDMT and the anode of the light-emitting device LD (not illustrated in FIG. 20) positioned above the conductor SDMT.

Modification Example 1 of Display Apparatus

Note that the pixel in the above-described display apparatus of one embodiment of the present invention is not limited to the pixel PX illustrated in FIG. 17. The pixel of the display apparatus of one embodiment of the present invention may have a structure of the pixel PX in FIG. 17 on which some modification is performed as appropriate.

Figure 21:
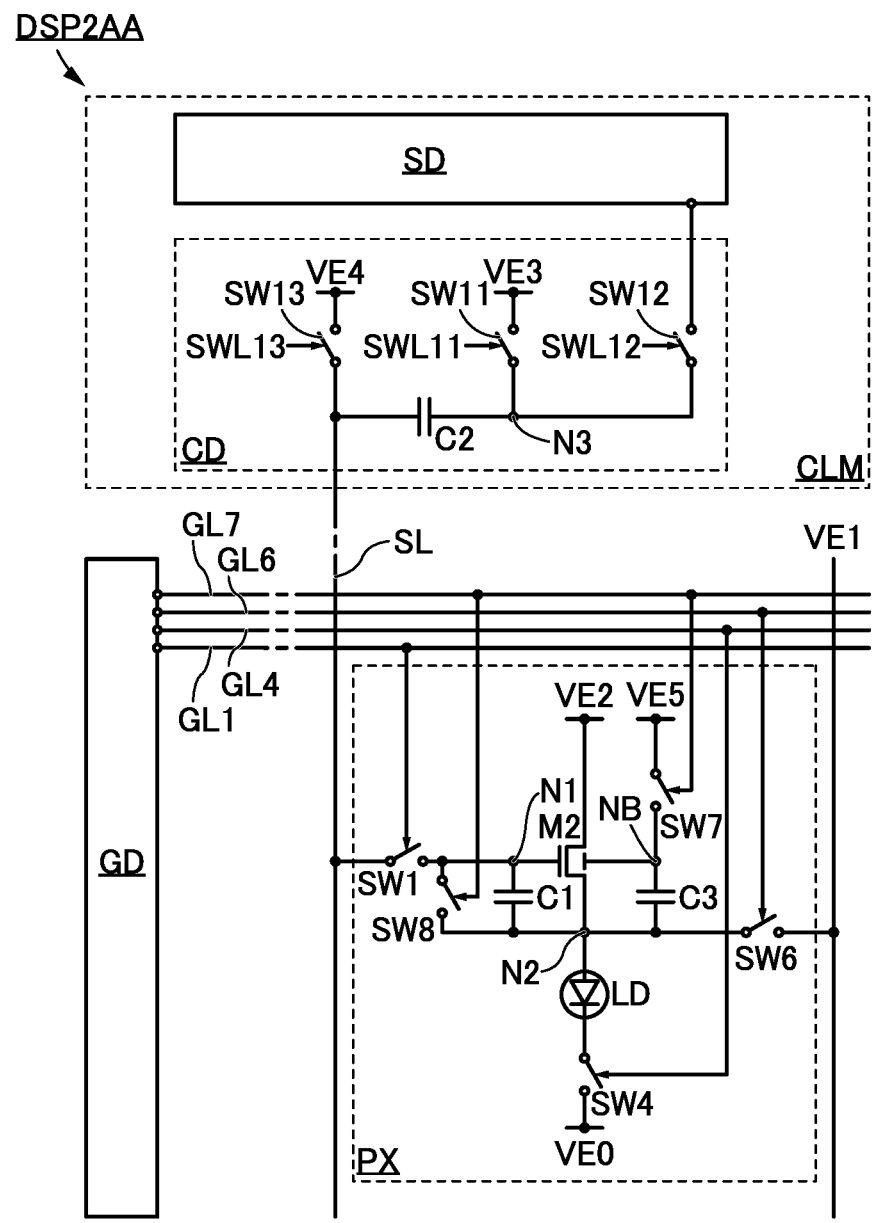
FIG. 21 is a circuit diagram illustrating a structure example of a display apparatus.

FIG. 21 illustrates a modification example of the pixel PX in FIG. 17. The pixel PX of a display apparatus DSP2AA illustrated in FIG. 21 is different from the pixel PX of the display apparatus DSP2A in FIG. 17 in that the anode of the light-emitting device LD is electrically connected to the first terminal of the switch SW6, the second terminal of the switch SW8, the first terminal of the transistor M2, the second terminal of the capacitor C1, and the first terminal of the capacitor C3; the cathode of the light-emitting device LD is electrically connected to the first terminal of the switch SW4; and the second terminal of the switch SW4 is electrically connected to the wiring VE0. That is, the pixel PX of the display apparatus DSP2AA illustrated in FIG. 21 has a structure obtained by interchanging the positions of the switch SW4 of the pixel PX and the light-emitting device LD in FIG. 17.

For the operation method of the display apparatus DSP2AA in FIG. 21, an operation method similar to that of the display apparatus DSP2A in FIG. 17 described above is referred to. By employing the operation method similar to that of the display apparatus DSP2A in FIG. 17, the effect similar to that obtained with the display apparatus DSP2A can be obtained with the display apparatus DSP2AA.

Figure 22:
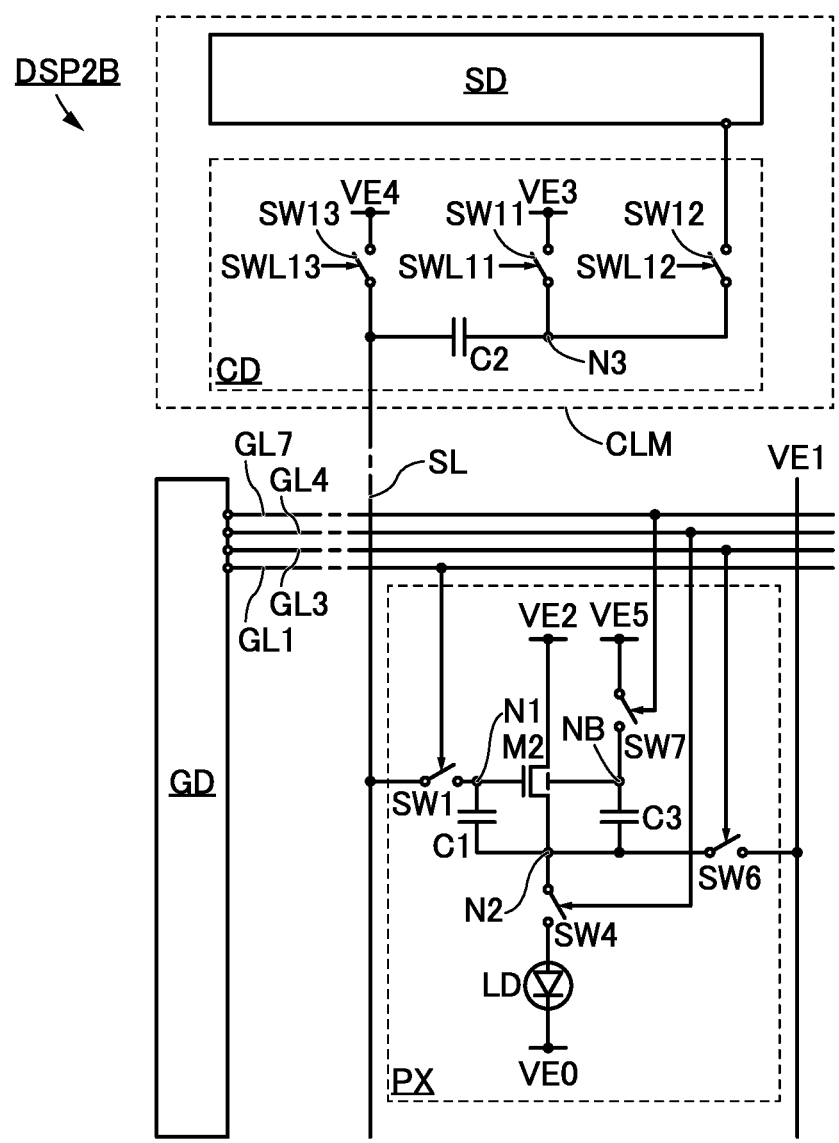
FIG. 22 is a circuit diagram illustrating a structure example of a display apparatus.

FIG. 22 illustrates a modification example of the pixel PX in FIG. 17, which is different from the pixel PX in FIG. 21. The pixel PX of a display apparatus DSP2B illustrated in FIG. 22 is different from the pixel PX of the display apparatus DSP2A in FIG. 17 in not being provided with the switch SW8.

Therefore, the operation method of the display apparatus DSP2B in FIG. 22 is partly different from the operation method of the display apparatus DSP2A. A difference between the operation method of the display apparatus DSP2B and the operation method of the display apparatus DSP2A is described below.

In FIG. 18A, the switch SW1 of the display apparatus DSP2B is on in the period T21 and off in the period T23. In FIG. 18A, the switch SW13 of the display apparatus DSP2B is on in the period T21 and off in the period T24. Note that the switch SW13 of the display apparatus DSP2B may be on by the period T25.

In the case of operating the display apparatus DSP2B, the potential $V_{init}$ supplied from the wiring VE4 is a potential equal to $V_{N1}$, which is a potential supplied from the wiring VE1.

Operations in the period T25 and subsequent periods may be substantially the same as those of the display apparatus DSP2A in FIG. 18A.

By operating the display apparatus DSP2B in the above-described manner, the effect similar to that obtained with the display apparatus DSP2A in the case where $V_{init}$ and $V_{N1}$ are equal to each other can be obtained with the display apparatus DSP2B.

Modification Example 2 of Display Apparatus

Note that the circuit CD in the above-described display apparatus of one embodiment of the present invention is not limited to the circuit CD illustrated in FIG. 17. The circuit CD of the display apparatus of one embodiment of the present invention may have a structure of the circuit CD in FIG. 17 on which some modification is performed as appropriate.

Figure 23A:
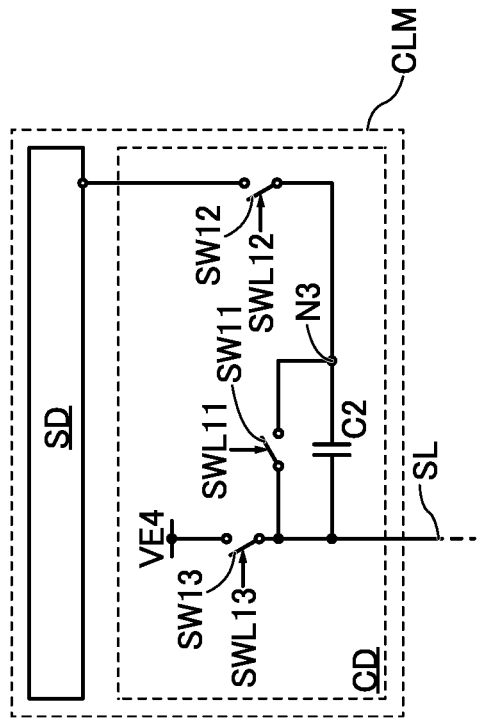
FIG. 23A to FIG. 23D are circuit diagrams illustrating structure examples of a circuit included in a display apparatus.

For example, in the case where the potential $V_{ref}$ supplied to the wiring VE3 and the potential $V_{init}$ supplied to the wiring VE4 are equal to each other in the display apparatus DSP2A in FIG. 17, the structure of the circuit CD of the display apparatus DSP2A in FIG. 17 may be changed to the structure of the circuit CD illustrated in FIG. 23A.

The circuit CD illustrated in FIG. 23A is different from that of the display apparatus DSP2A illustrated in FIG. 17 in that the second terminal of the switch SW11 is electrically connected not to the wiring VE3 but to the wiring VE4. Although not illustrated, the display apparatus DSP2A may have a structure in which the second terminal of the switch SW11 and the second terminal of the switch SW13 are electrically connected to the wiring VE3.

The display apparatus DSP2A including the circuit CD in FIG. 23A can operate in a manner similar to that in the timing chart of FIG. 18A.

Figure 23B:
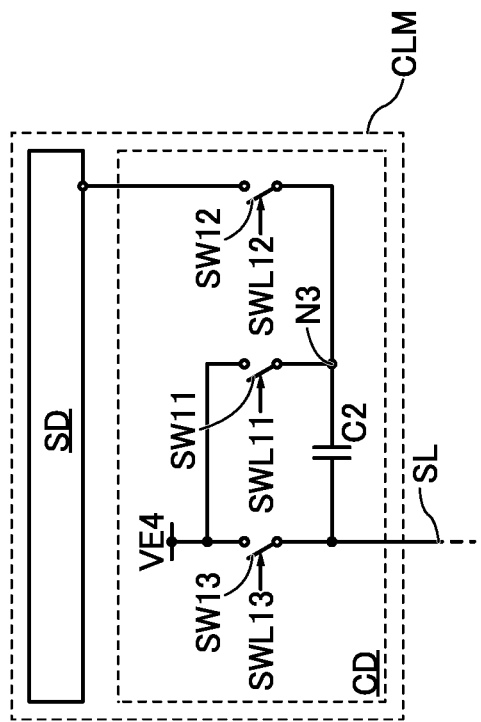

The structure of the circuit CD in FIG. 23A may be changed to the structure of the circuit CD in FIG. 23B. The circuit CD in FIG. 23B is different from the circuit CD in FIG. 23A in that the second terminal of the switch SW11 is electrically connected not to the wiring VE4 but to the first terminal of the switch SW13, the first terminal of the capacitor C2, and the wiring SL.

Note that in the operation of the circuit CD in FIG. 23B, for example, the switch SW11 and the switch SW13 are turned on and the potentials of the node N3 and the wiring SL are each set to $V_{init}$ ($=V_{ref}$) in the period for correcting the threshold voltage of the transistor M2 (the period T21 to the period T26 in the timing chart of FIG. 18A), and then the switch SW11 and the switch SW13 are turned off before an image data signal is input from the driver circuit SD to the circuit CD (after the period T27 in the timing chart of FIG. 18A).

For example, a capacitor may be newly added to the circuit CD illustrated in FIG. 23A. Specifically, as illustrated in the circuit CD in FIG. 23C, a capacitor C4 may be provided in the circuit CD, and a first terminal of the capacitor C4 may be electrically connected to the first terminal of the switch SW13, the first terminal of the capacitor C2, and the wiring SL. A second terminal of the capacitor C4 is electrically connected to a wiring VE6.

The wiring VE6 serves as a wiring for supplying a constant potential, for example. Note that the constant potential supplied by the wiring VE6 may be the same as or different from a constant potential supplied by any of the wiring VE0 to the wiring VE5.

Figure 23C:
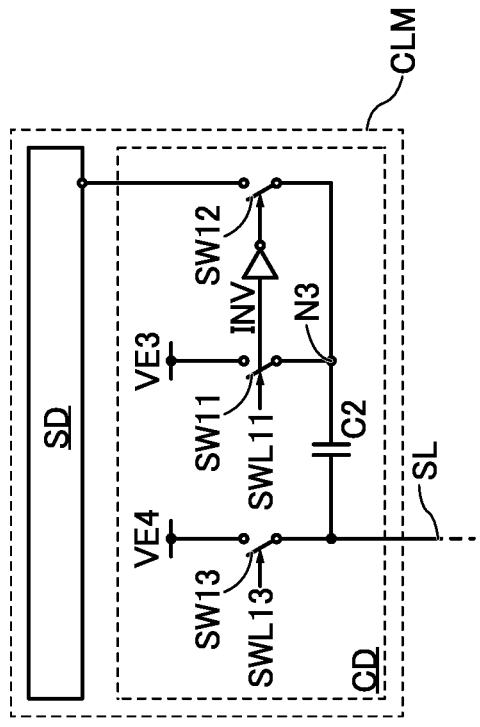

Adding the capacitor C4 to the circuit CD as illustrated in FIG. 23C can further reduce the amounts of changes in the potentials of the wiring SL and the node due to the change in the potential of the node N3 in the period T27 in the timing chart of FIG. 18A. Specifically, when the electrostatic capacitance of the capacitor C4 is represented by $C_4$, the amounts of changes in the potentials of the wiring SL and the node due to the change in the potential of the node N3 is a value obtained by multiplying the change in the potential of the node N3 by $C_2/(C_1+C_2+C_4)$.

Although the capacitor C4 is provided inside the circuit CD in FIG. 23C, the capacitor C4 may be provided outside the circuit CD. Specifically, for example, the wiring SL may be electrically connected to the first terminal of the capacitor C4, and the wiring VE6 may be electrically connected to the second terminal of the capacitor C4 as in a display apparatus DSP2C illustrated in FIG. 24.

Figure 24:
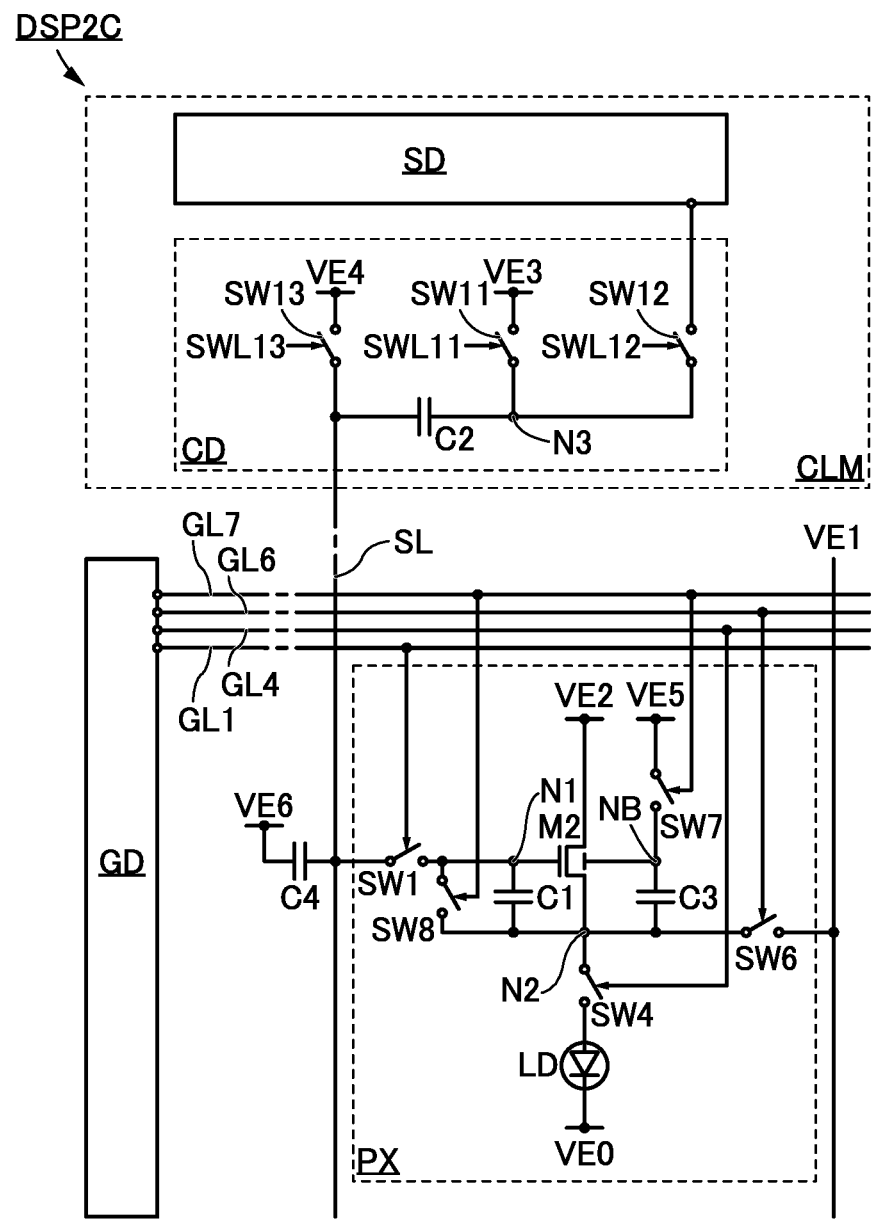
FIG. 24 is a circuit diagram illustrating a structure example of a display apparatus.

Although not illustrated, some of the capacitor and the plurality of switches included in any of all the circuits CD described in this specification, the drawings, and the like may be provided outside the circuit CD, like the capacitor C4 and the wiring VE6 illustrated in FIG. 24. That is, the structure of the circuit CD of one embodiment of the present invention is not limited to that shown in this specification, the drawings, and the like; for example, some of circuit elements included in any of the circuits CD shown in this specification, the drawings, and the like can be provided outside the circuit CD.

Figure 23D:
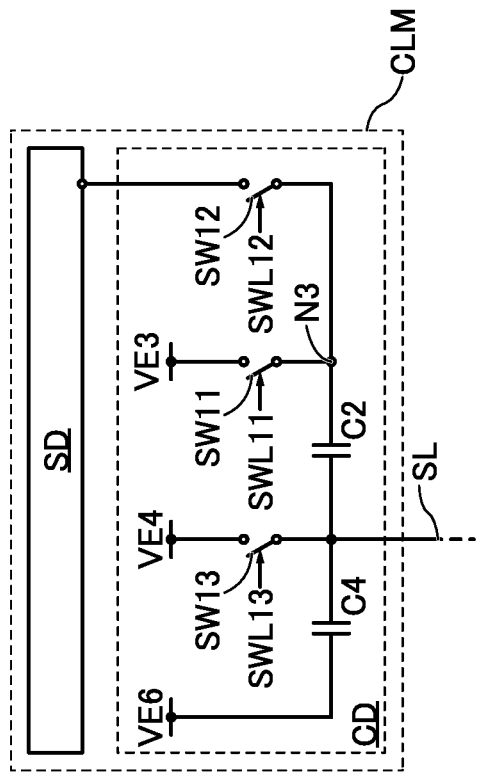

For example, the structure of the circuit CD in the display apparatus DSP2A in FIG. 17 can be changed to the structure of the circuit CD in FIG. 23D. The circuit CD in FIG. 23D is different from the circuit CD in FIG. 23A in that an inverter circuit INV is included and the control terminal of the switch SW12 is electrically connected not to the wiring SWL12 but to the wiring SWL11.

When the display apparatus DSP2A in FIG. 17 includes the circuit CD illustrated in FIG. 23D, the wiring SWL12 does not need to be provided, which can reduce the circuit area of the display apparatus DSP2A.

Although not illustrated, in the case where a switch that is turned off when a high-level potential is supplied to its control terminal and turned on when a low-level potential is supplied to its control terminal is used as the switch SW12, the control terminal of the switch SW12 may be electrically connected to the wiring SWL11 not through the inverter circuit INV.

Modification Example 3 of Display Apparatus

Figure 25:
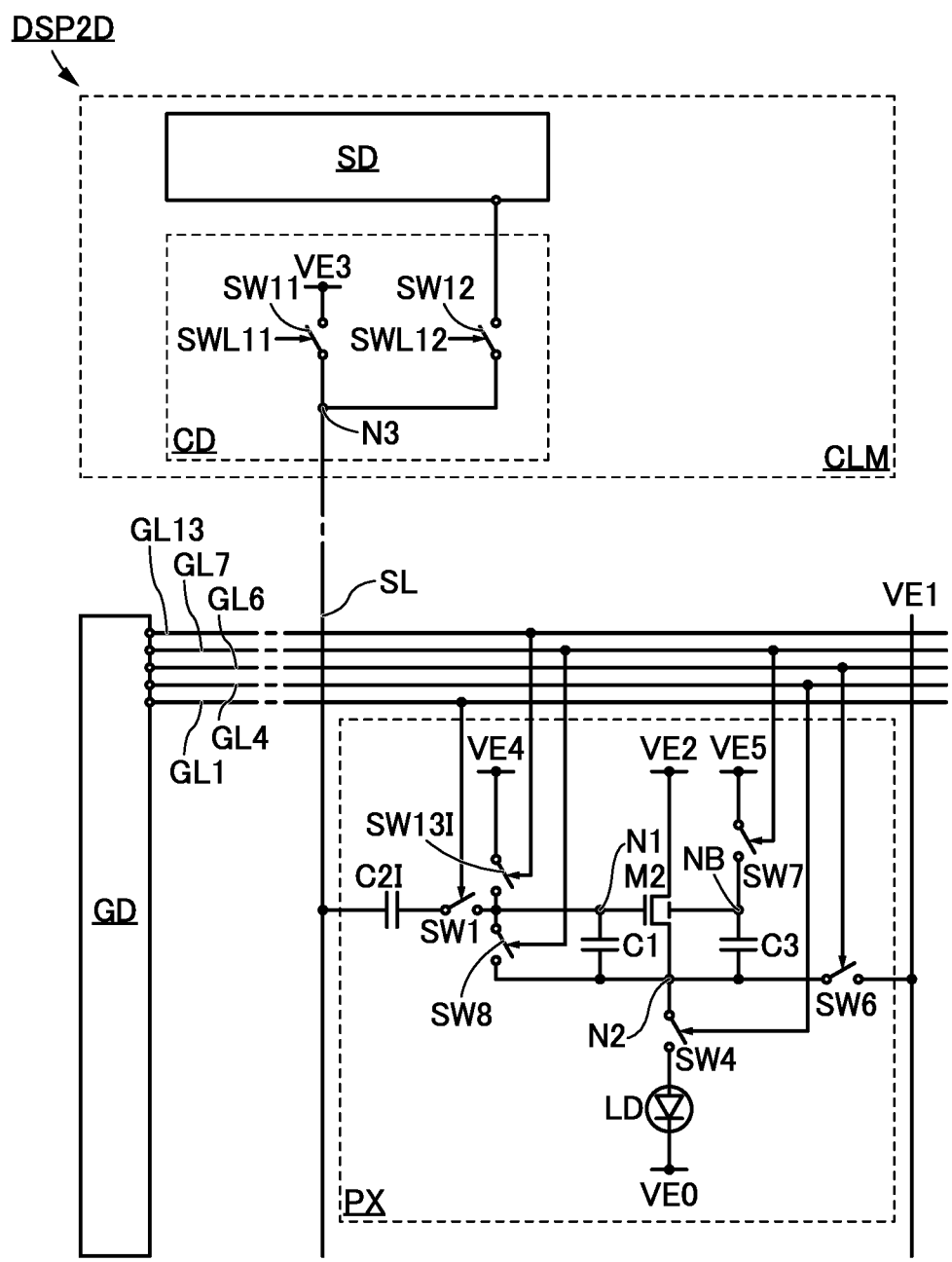
FIG. 25 is a circuit diagram illustrating a structure example of a display apparatus.

Next, FIG. 25 illustrates an example of the display apparatus DSP0 in FIG. 1 which is different from the display apparatus DSP2A to the display apparatus DSP2C. A display apparatus DSP2D illustrated in FIG. 25 is a modification example of the display apparatus DSP2A in FIG. 17, and different from the display apparatus DSP2A in that the capacitor C2I and a switch SW13I are provided in the pixel PX and the capacitor C2 and the switch SW13 are not provided in the circuit CD.

Therefore, for portions of the display apparatus DSP2D in common with the display apparatus DSP2A, the description of the display apparatus DSP2A is referred to.

As the switch SW13I, a switch that can be used as the switch SW13 can be used, for example. Each of the switch SW13I is on when a high-level potential is applied to a control terminal and off when a low-level potential is applied to the control terminal.

In the display apparatus DSP2D, the first terminal of the capacitor C2I is electrically connected to the second terminal of the switch SW1. The second terminal of the capacitor C2I is electrically connected to the wiring SL. A first terminal of the switch SW13I is electrically connected to the first terminal of the switch SW1, the first terminal of the switch SW8, the first terminal of the capacitor C1, and the gate of the transistor M2. A second terminal of the switch SW13I is electrically connected to the wiring VE4, and a control terminal of the switch SW13I is electrically connected to a wiring GL13.

The first terminal of the switch SW11 is electrically connected to the wiring SL and the first terminal of the switch SW12.

Note that in the display apparatus DSP2D, the point where the first terminal of the switch SW11, the first terminal of the switch SW12, and the capacitor C2I are electrically connected is referred to as the node N3. Note that in the description of this structure example of the display apparatus DSP2D, the node N3 can be replaced with the wiring SL in some cases.

The wiring GL13 together with the wiring GL1, the wiring GL4, the wiring GL6, and the wiring GL7 correspond to one of the wiring GL[1] to the wiring GL[m] in FIG. 1. That is, in the case of the circuit structure of the pixel PX illustrated in FIG. 25, the number of wirings GL extended per row of the pixel array ALP is five.

In the display apparatus DSP2D, the capacitor C2I corresponds to the capacitor C2 in the display apparatus DSP2A. In the display apparatus DSP2D, the switch SW13I corresponds to the switch SW13 in the display apparatus DSP2A. In the display apparatus DSP2D, the wiring GL13 corresponds to the wiring SWL13 in the display apparatus DSP2A. In other words, the display apparatus DSP2D has a structure in which the switch SW13 and the capacitor C2 included in the circuit CD in the display apparatus DSP2A are provided in the pixel PX as the switch SW13I and the capacitor C2I. For this reason, the operation method of the display apparatus DSP2D can be described in some cases in such a manner that the capacitor C2, the switch SW13, and the wiring SWL13 in the operation method of the display apparatus DSP2A are replaced with the capacitor C2I, the switch SW13I, and the wiring GL13, respectively.

The display apparatus DSP2D can correct the threshold voltage of the transistor M2 in the pixel PX to display an image on the pixel PX by employing the operation method similar to that of the display apparatus DSP1A.

Note that the structure of the display apparatus of one embodiment of the present invention is not limited to the structure of the display apparatus DSP2D. The structure of the display apparatus of one embodiment of the present invention may be the structure of the display apparatus DSP2D on which some modification is performed as appropriate.

Figure 26:
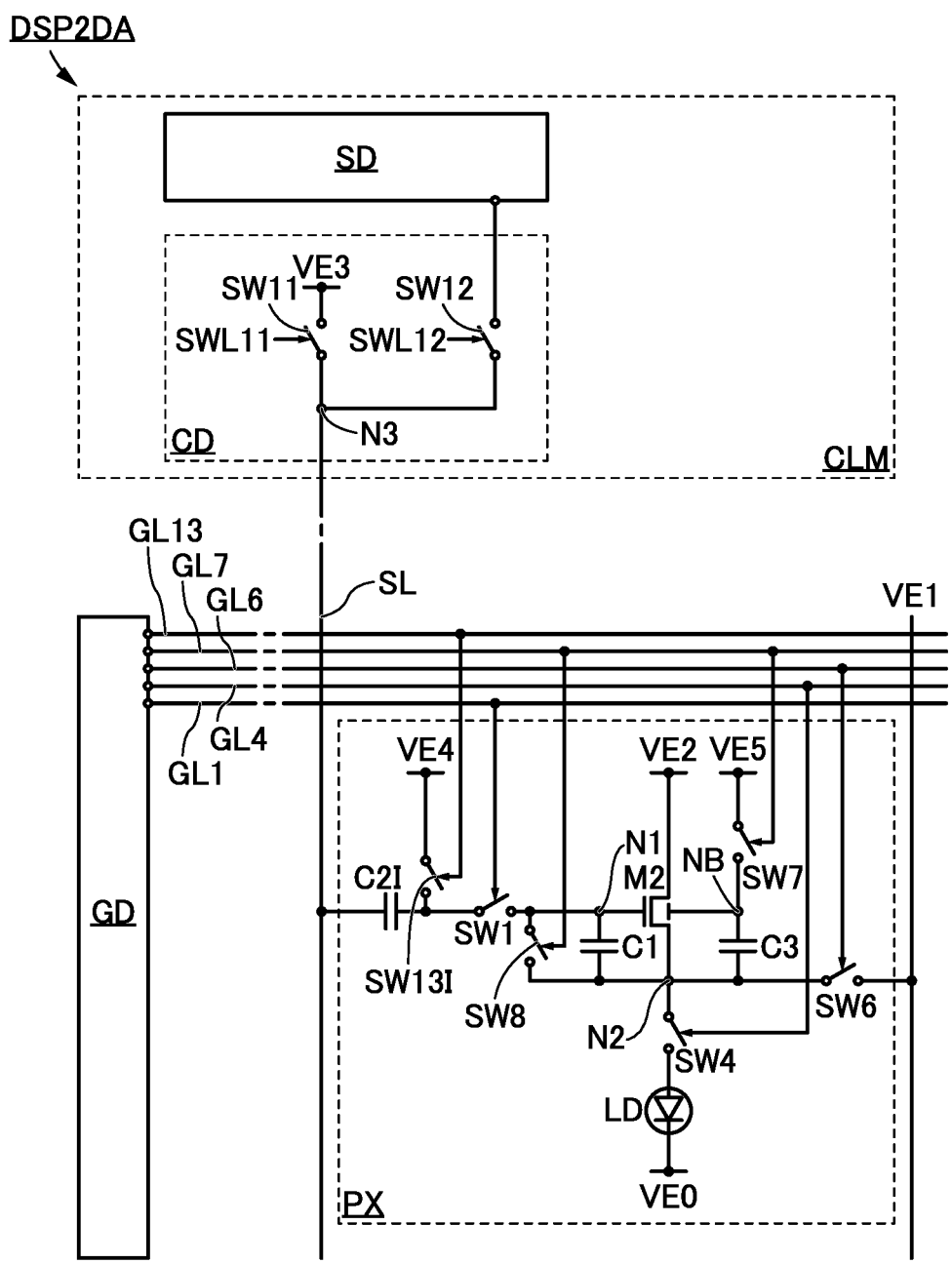
FIG. 26 is a circuit diagram illustrating a structure example of a display apparatus.

FIG. 26 illustrates a modification example of the display apparatus DSP2D in FIG. 25. A display apparatus DSP2DA illustrated in FIG. 26 is different from the display apparatus DSP2D in FIG. 25 in that the first terminal of the switch SW13I is electrically connected not to the first terminal of the switch SW1, the first terminal of the switch SW8, the first terminal of the capacitor C1, and the gate of the transistor M2 but to the second terminal of the switch SW1 and the first terminal of the capacitor C2I.

Even in the case where the structure of the display apparatus DSP2D is changed to the structure of the display apparatus DSP2DA in FIG. 26, the display apparatus DSP2DA can correct the threshold voltage of the transistor M2 in the pixel PX to display an image on the pixel PX by employing the operation method similar to that of the display apparatus DSP1A.

Figure 27:
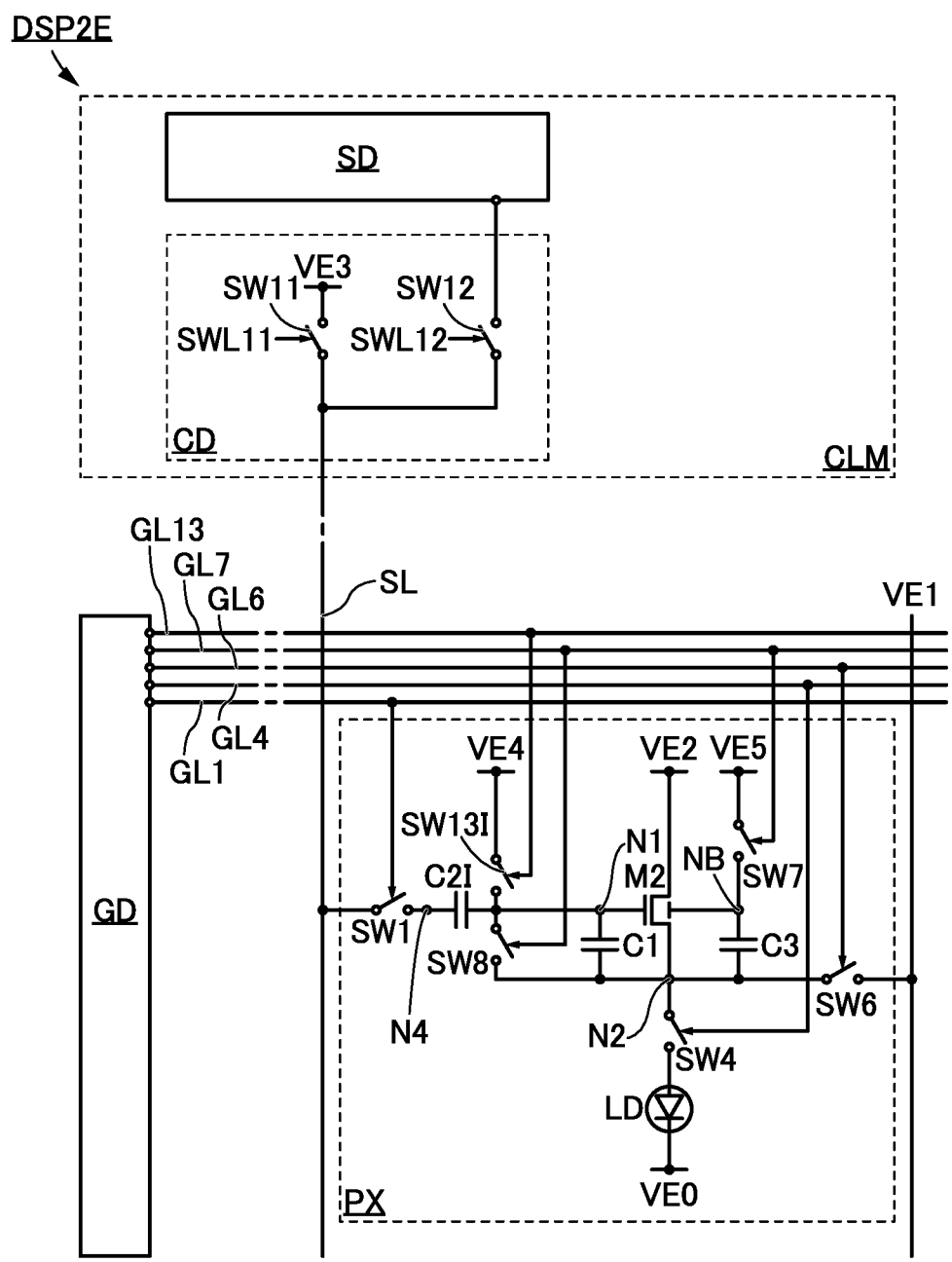
FIG. 27 is a circuit diagram illustrating a structure example of a display apparatus.

FIG. 27 illustrates a modification example of the display apparatus DSP2D in FIG. 25, which is different from the display apparatus DSP2DA in FIG. 26. A display apparatus DSP2E illustrated in FIG. 27 is different from the display apparatus DSP2D in FIG. 25 in that the second terminal of the switch SW1 is electrically connected not to the first terminal of the capacitor C2I but to the wiring SL, the first terminal of the switch SW1 is electrically connected not to the gate of the transistor M2, the first terminal of the switch SW13I, the first terminal of the switch SW8, and the first terminal of the capacitor C1 but to the second terminal of the capacitor C2I, and the first terminal of the capacitor C2I is electrically connected to the gate of the transistor M2, the first terminal of the switch SW13I, the first terminal of the switch SW8, and the first terminal of the capacitor C1.

In other words, in an electrical path between the wiring SL and the wiring VE0 in the display apparatus DSP2D, the capacitor C2I, the switch SW1, the capacitor C1 (or the switch SW8), the switch SW4, and the light-emitting device LD are provided in this order, whereas, in an electrical path between the wiring SL and the wiring VE0 in the display apparatus DSP2E, the switch SW1, the capacitor C2I, the capacitor C1 (or the switch SW8), the switch SW4, and the light-emitting device LD are provided in this order.

Note that in this specification and the like, a point where the first terminal of the switch SW1 and the second terminal of the capacitor C2I are electrically connected is referred to as the node N4.

In the display apparatus DSP2E, the capacitor C2I corresponds to the capacitor C2 in the display apparatus DSP2A. In the display apparatus DSP2E, the switch SW13I corresponds to the switch SW13 in the display apparatus DSP2A. In the display apparatus DSP2E, the wiring GL13 corresponds to the wiring SWL13. In the display apparatus DSP2E, the node N4 corresponds to the node N3 in the display apparatus DSP2A. In other words, the display apparatus DSP2E has a structure in which the switch SW13 and the capacitor C2 included in the circuit CD in the display apparatus DSP2A are provided in the pixel PX as the switch SW13I and the capacitor C2I, respectively. For this reason, the operation method of the display apparatus DSP2E can be described in some cases in such a manner that the capacitor C2, the switch SW13, the wiring SWL13, and the node N3 in the operation method of the display apparatus DSP2A are replaced with the capacitor C2I, the switch SW13I, the wiring GL13, and the node N4, respectively.

The display apparatus DSP2E can correct the threshold voltage of the transistor M2 in the pixel PX to display an image on the pixel PX by employing the operation method similar to that of the display apparatus DSP1A.

Figure 28:
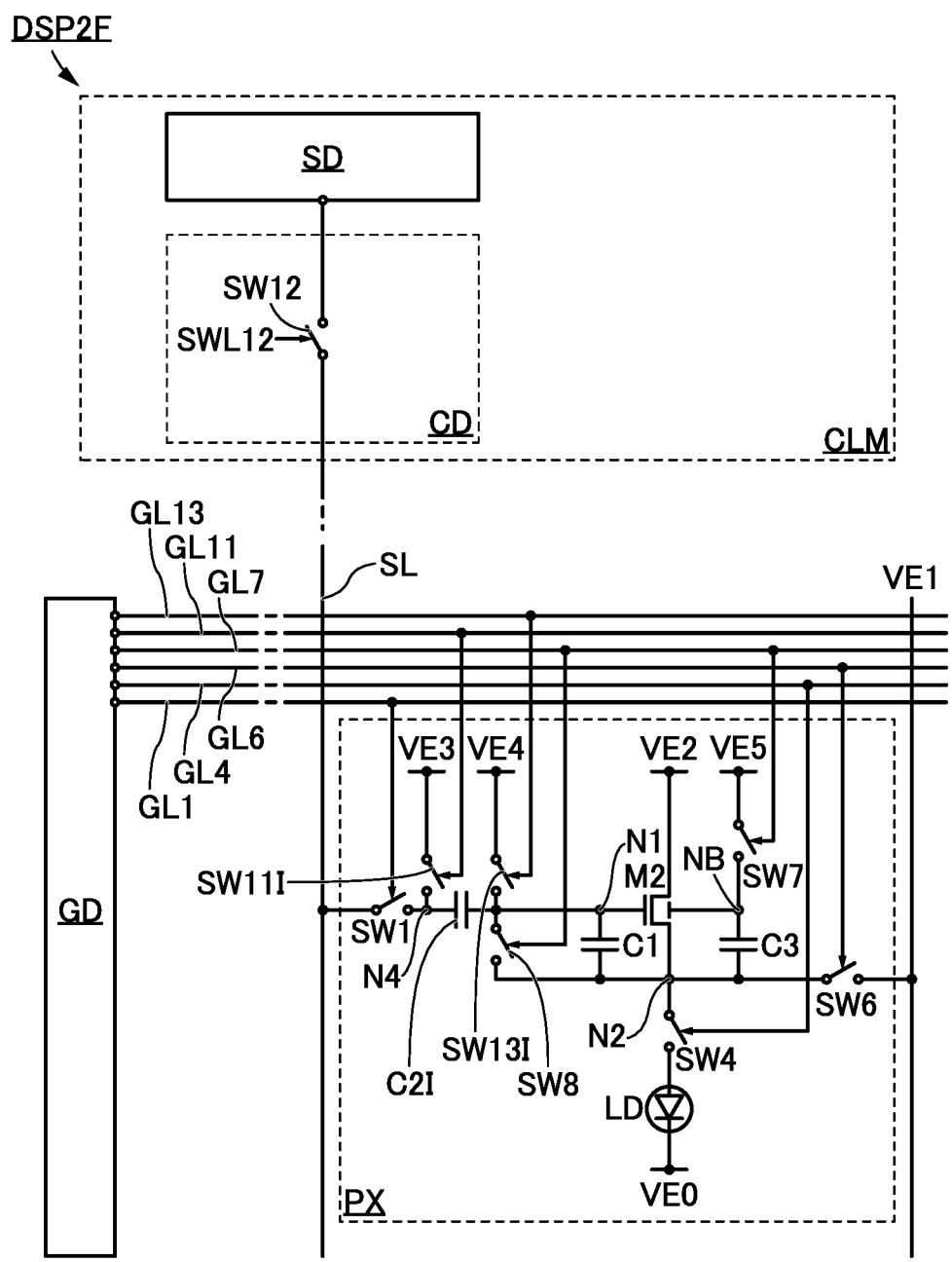
FIG. 28 is a circuit diagram illustrating a structure example of a display apparatus.

FIG. 28 illustrates another modification example of the display apparatus DSP2D, which is different from the display apparatus DSP2DA in FIG. 26 and the display apparatus DSP2E in FIG. 27. A display apparatus DSP2F illustrated in FIG. 28 is another modification example of the display apparatus DSP2E in FIG. 27, and different from the display apparatus DSP2E in that the switch SW11I is provided in the pixel PX and the switch SW11 is not provided in the circuit CD. That is, the display apparatus DSP2F illustrated in FIG. 28 is different from the display apparatus DSP2A in that the switch SW11I, the switch SW13I, and the capacitor C2I are provided in the pixel PX and the switch SW11, the switch SW13, and the capacitor C2 are not provided in the circuit CD.

In the display apparatus DSP2F, the first terminal of the switch SW11I is electrically connected to the first terminal of the switch SW1 and the second terminal of the capacitor C2I. The second terminal of the switch SW11I is electrically connected to the wiring VE3. The control terminal of the switch SW11I is electrically connected to the wiring GL11.

The first terminal of the capacitor C2I is electrically connected to the first terminal of the switch SW8, the first terminal of the switch SW13I, the first terminal of the capacitor C1, and the gate of the transistor M2. The second terminal of the switch SW1 is electrically connected to the wiring SL.

The first terminal of the switch SW12 is electrically connected to the wiring SL.

The wiring GL11 together with the wiring GL1, the wiring GL4, the wiring GL6, the wiring GL7, and the wiring GL13 correspond to one of the wiring GL[1] to the wiring GL[m] in FIG. 1. That is, in the case of the circuit structure of the pixel PX illustrated in FIG. 28, the number of wirings GL extended per row of the pixel array ALP is six.

In the display apparatus DSP2F, the capacitor C2I corresponds to the capacitor C2 in the display apparatus DSP2A. The switch SW11I corresponds to the switch SW11 in the display apparatus DSP2A. The wiring GL11 corresponds to the wiring SWL11 in the display apparatus DSP2A. The switch SW13I corresponds to the switch SW13 in the display apparatus DSP2A. The wiring GL13 corresponds to the wiring SWL13 in the display apparatus DSP2A. The node N4 corresponds to the node N3 in the display apparatus DSP2A. In other words, the display apparatus DSP2F has a structure in which the switch SW11, the switch SW13, and the capacitor C2 included in the circuit CD in the display apparatus DSP2A are provided in the pixel PX as the switch SW11I, the switch SW13I, and the capacitor C2I. For this reason, the operation method of the display apparatus DSP2F can be described in some cases in such a manner that the switch SW11, the switch SW13, the capacitor C2, the node N3, the wiring SWL11, and the wiring SWL13 in the operation method of the display apparatus DSP2A are replaced with the switch SW11I, the switch SW13I, the capacitor C2I, the node N4, the wiring GL11, and the wiring GL13, respectively.

The display apparatus DSP2F can correct the threshold voltage of the transistor M2 in the pixel PX to display an image on the pixel PX by employing the operation method similar to that of the display apparatus DSP2A.

As described in the operation method of the display apparatus DSP2A, potentials supplied by two or more wirings selected from the wiring VE1 to the wiring VE5 can be equal to each other. In that case, the selected wirings may be one wiring.

Figure 29:
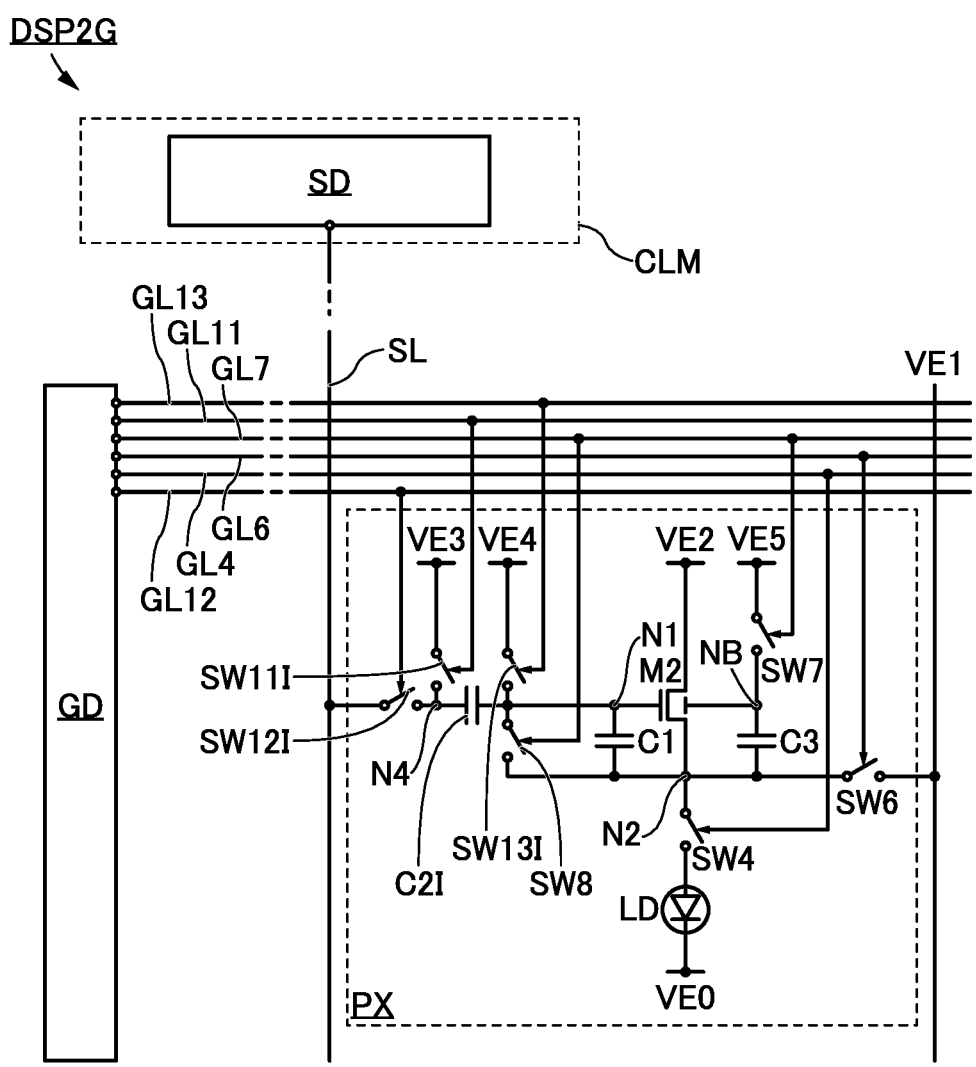
FIG. 29 is a circuit diagram illustrating a structure example of a display apparatus.

FIG. 29 illustrates another modification example of the display apparatus DSP2A, which is different from the display apparatus DSP2B in FIG. 22, the display apparatus DSP2C in FIG. 24, the display apparatus DSP2D in FIG. 25, the display apparatus DSP2DA in FIG. 26, the display apparatus DSP2E in FIG. 27, and the display apparatus DSP2F in FIG. 28. A display apparatus DSP2G illustrated in FIG. 29 is another modification example of the display apparatus DSP2F in FIG. 28, and different from the display apparatus DSP2F in that the switch SW12 is not provided in the circuit CD. That is, the display apparatus DSP2G illustrated in FIG. 29 is different from the display apparatus DSP2A in that the switch SW11I, the switch SW12I, the switch SW13I, and the capacitor C2I are provided in the pixel PX and the circuit CD is not provided.

Note that in the display apparatus DSP2G, for convenience, the switch SW1 in the display apparatus DSP1F is denoted by the switch SW12I, and the wiring GL1 in the display apparatus DSP1F is denoted by the wiring GL12.

In the display apparatus DSP2G, the driver circuit SD is electrically connected to the wiring SL, and the wiring SL is electrically connected to the second terminal of the switch SW12I.

The switch SW12I provided in the display apparatus DSP2G can also serve as the switch SW1 provided in the pixel PX in the display apparatus DSP2D. Accordingly, the structure of the display apparatus DSP2D can be changed to a structure in which the switch SW12 is not provided in the circuit CD as in the display apparatus DSP2G in FIG. 29.

The operation method of the display apparatus DSP2G can be described in some cases in such a manner that the switch SW11, the switch SW13, the capacitor C2, the node N3, the wiring SWL11, the wiring SWL12, and the wiring SWL13 in the operation method of the display apparatus DSP2A are replaced with the switch SW111I, the switch SW13I, the capacitor C2I, the node N4, the wiring GL11, the wiring GL12, and the wiring GL13, respectively. Note that the signal supplied by the wiring GL1 in the display apparatus DSP2A is not necessarily considered in the display apparatus DSP2G.

Modification Example 4 of Display Apparatus

Figure 30:
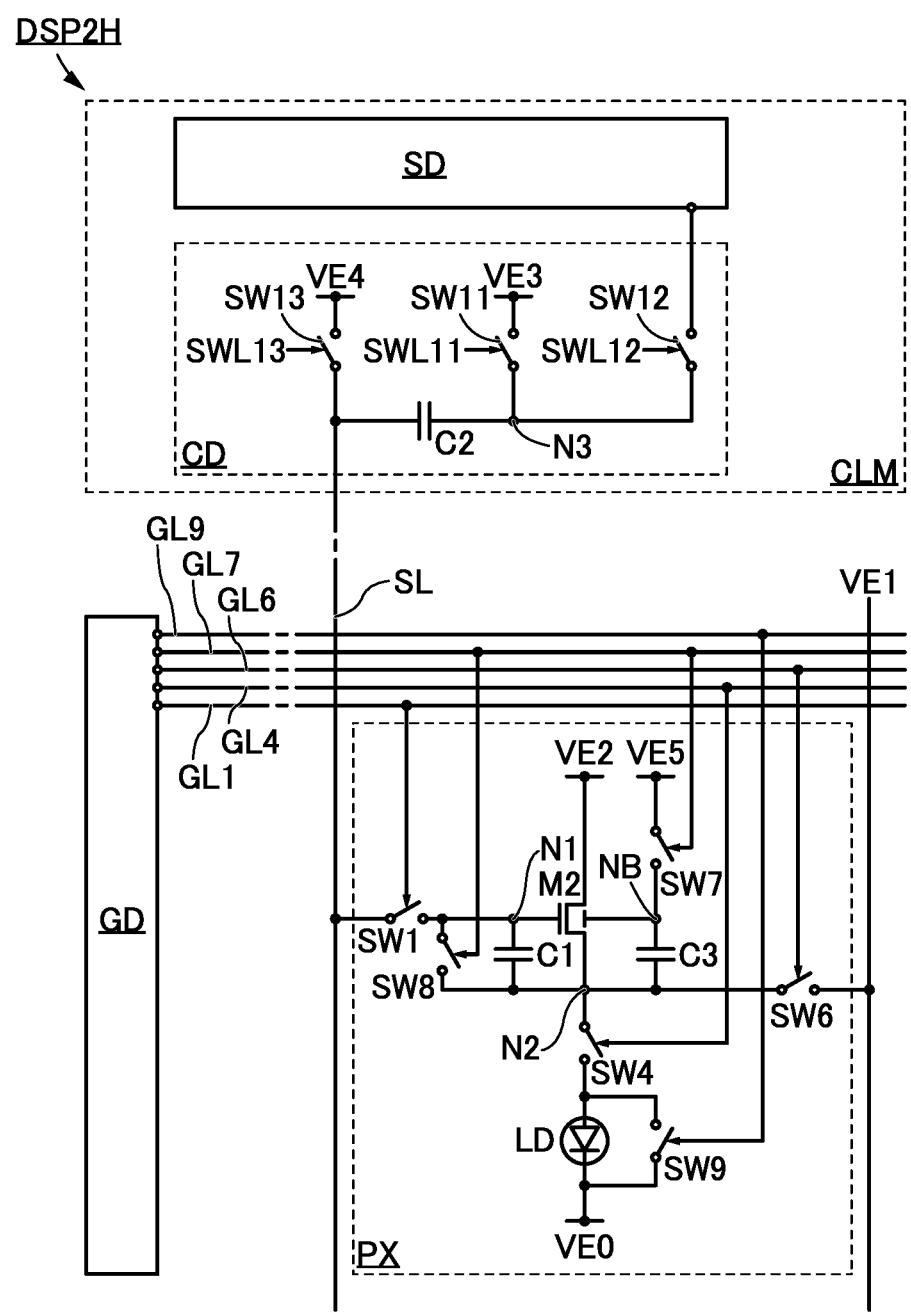
FIG. 30 is a circuit diagram illustrating a structure example of a display apparatus.

Next, FIG. 30 illustrates an example of the display apparatus DSP0 in FIG. 1 which is different from the display apparatus DSP2A to the display apparatus DSP2G. A display apparatus DSP2H illustrated in FIG. 30 is a modification example of the display apparatus DSP2A in FIG. 17, and different from the display apparatus DSP2A in that the switch SW9 is provided to be electrically connected in parallel to the light-emitting device LD.

As each of the switch SW9, a switch that can be used as the switch SW1, the switch SW4, the switch SW6, the switch SW7, or the switch SW8 can be used, for example. The switch SW9 is on when a high-level potential is applied to a control terminal and off when a low-level potential is applied to the control terminal.

The first terminal of the switch SW9 is electrically connected to the second terminal of the switch SW4 and the anode of the light-emitting device LD. The second terminal of the switch SW9 is electrically connected to the cathode of the light-emitting device LD and the wiring VE0. The control terminal of the switch SW9 is electrically connected to the wiring GL9.

In the display apparatus DSP2H in FIG. 30, the wiring GL9 together with the wiring GL1, the wiring GL4, the wiring GL6, and the wiring GL7 correspond to one of the wiring GL[1] to the wiring GL[m] in FIG. 1. That is, in the case of the circuit structure of the pixel PX illustrated in FIG. 30, the number of wirings GL extended per row of the pixel array ALP is five.

Next, an example of an operation method of the display apparatus DSP2H in FIG. 30 is described.

Figure 31:
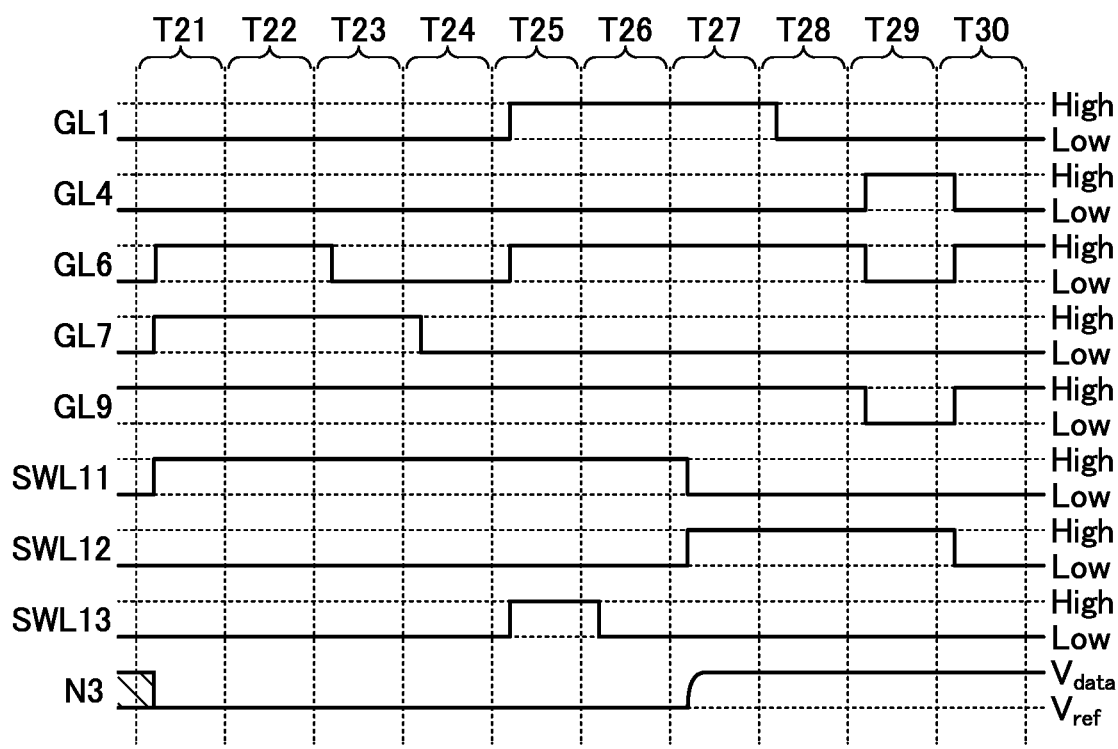
FIG. 31 is a timing chart showing an operation example of a display apparatus.

FIG. 31 is a timing chart showing an example of an operation method of the display apparatus DSP2H. Specifically, the timing chart of FIG. 31 is a modification example of the timing chart of FIG. 18A, and corresponds to a timing chart obtained by adding a change in the potential of the wiring GL9 to the timing chart of FIG. 18A. The change in the potential of the wiring GL4 in the timing chart of FIG. 31 differs from the change in the potential of the wiring GL4 in the timing chart of FIG. 18A. Therefore, for operations in the display apparatus DSP2H other than the change in the potentials of the wiring GL4 and the wiring GL9, description of the timing chart of FIG. 18A is referred to.

In the period T29, a high-level potential is supplied to the wiring GL4, and a low-level potential is supplied to the wiring GL9. Thus, a high-level potential is supplied to the control terminal of the switch SW4, whereby the switch SW4 is turned on. A low-level potential is supplied to the control terminal of the switch SW9, whereby the switch SW9 is turned off.

That is, in the period T29, the anode of the light-emitting device LD and each of the wiring VE0 and the cathode of the light-emitting device LD are brought out of conduction, so that a potential $V_{CT}$ is not supplied from the wiring VE0 to the anode of the light-emitting device LD through the switch SW9. In contrast, in the period T29, since the switch SW4 is on, a current from the wiring VE2 flows through the anode of the light-emitting device LD. Thus, the light-emitting device LD emits light.

In the period T21 to the period T28 and the period T30, a low-level potential is supplied to the wiring GL4, and a high-level potential is supplied to the wiring GL9. Thus, a low-level potential is supplied to the control terminal of the switch SW4, whereby the switch SW4 is turned off. A high-level potential is supplied to the control terminal of the switch SW9, whereby the switch SW9 is turned on.

That is, in the period T21 to the period T28 and the period T30, electrical continuity is established between the anode of the light-emitting device LD and each of the wiring VE0 and the cathode of the light-emitting device LD, and thus the anode-cathode voltage of the light-emitting device LD becomes 0 V. Since the switch SW4 is off, a current does not flow between the node N2 and the anode of the light-emitting device LD through the switch SW4.

In particular, although the period T21 to the period T28 and the period T30 are originally periods in which the light-emitting device LD does not emit light, by turning on the switch SW9 in these periods, charges accumulated in the anode of the light-emitting device LD can be discharged to the wiring VE0 through the switch SW9. That is, in the period in which the light-emitting device LD does not emit light, the display apparatus DSP1F can discharge charges accumulated in the anode of the light-emitting device LD at a higher speed than the display apparatuses not including the switch SW9 (e.g., the display apparatus DSP2A to the display apparatus DSP2G). This can shift the emission state of the light-emitting device LD to the quenching state more rapidly.

Note that a high-level potential is supplied to the wiring GL4 in the period T21 in the timing chart of FIG. 18A, whereas a low-level potential is supplied to the wiring GL4 in the period T21 in the timing chart of FIG. 31. There is the following difference between the operations: a potential from the wiring VE1 is supplied to the anode of the light-emitting device LD to make the light-emitting device LD not emit light in the period T21 in the timing chart of FIG. 18A, and a potential from the wiring VE0 is supplied to the anode of the light-emitting device LD to make the light-emitting device LD not emit light in the period T21 in the timing chart of FIG. 31.

As described above, in each of the display apparatus DSP2A in FIG. 17 and the display apparatus DSP2B in FIG. 22, the potential of the image data signal is changed by the capacitor C1 in the pixel PX and the capacitor C2 outside the pixel PX. For example, in the case where voltage for correcting the threshold voltage of the transistor M2 is written to the capacitor C1, due to a change in the potential of the node N2, a potential obtained by multiplying the change in the potential of the node N2 by $C_1/(C_1+C_2)$ is added to the potential of the node N1; as a result, the voltage for correcting the threshold voltage of the transistor M2 written to the capacitor C1 is shifted in some cases (in the case where the change in the potential of the node N2 is the same as the change in the potential of the node N1, the voltage for correcting the threshold voltage of the transistor M2 written to the capacitor C1 is not shifted). By contrast, as illustrated in the display apparatus DSP2A in FIG. 17 and the display apparatus DSP2B in FIG. 22, when a structure is employed in which a voltage for correcting the threshold voltage of the transistor M2 is written to the capacitor C3, the amount of change in the potential of the node N1 due to the change in the potential of the node N2 can be substantially equal to the amount of change in the potential of the node N2. Thus, a shift in the voltage for correcting the threshold voltage of the transistor M2 written to the capacitor C3 can be suppressed.

In this embodiment, the structure examples of the display apparatus DSP2A, in which the structures of the pixel PX and the circuit CD are different from those described in Embodiment 1, are described. As described above, the structures of the pixel PX and the circuit CD may be changed as appropriate in the display apparatus of one embodiment of the present invention.

Note that this embodiment can be combined with any of the other embodiments in this specification as appropriate.

Embodiment 3

Figure 32A:
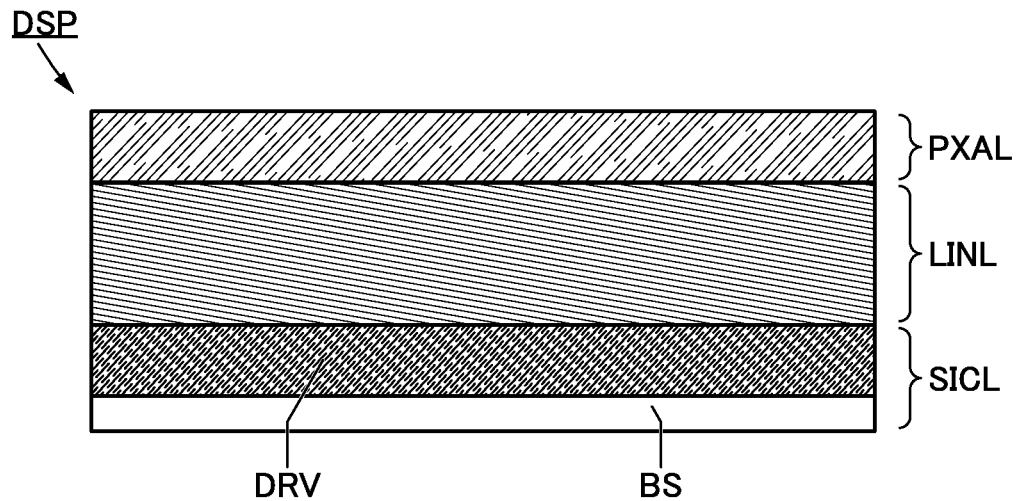
FIG. 32A to FIG. 32C are schematic cross-sectional views illustrating structure examples of a display apparatus.

In this embodiment, another example of the structure of the display apparatus described in the above embodiment will be described. FIG. 32A is a schematic cross-sectional view illustrating an example of the display apparatus described in the above embodiment. A display apparatus DSP includes a pixel layer PXAL, a wiring layer LINL, and a circuit layer SICL, for example.

The wiring layer LINL is provided over the circuit layer SICL, and the pixel layer PXAL is provided over the wiring layer LINL. Note that the pixel layer PXAL overlaps with a region including a driver circuit region DRV to be described later.

The circuit layer SICL includes a substrate BS and the driver circuit region DRV.

As the substrate BS, a single crystal substrate (e.g., a semiconductor substrate formed of silicon or germanium) can be used, for example. Besides such a single crystal substrate, any of the following can be used as the substrate BS: an SOI (Silicon On Insulator) substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, and paper and a base film each including a fibrous material. Examples of the glass substrate include barium borosilicate glass, aluminoborosilicate glass, and soda lime glass. As examples of the flexible substrate, the attachment film, and the base film, the following is given. Examples include plastic typified by polyethylene terephthalate (PET), polyethylene naphthalate (PEN), polyethersulfone (PES), and polytetrafluoroethylene (PTFE). Another example is a synthetic resin such as an acrylic resin. Other examples are polypropylene, polyester, polyvinyl fluoride, and polyvinyl chloride. Other examples are polyamide, polyimide, aramid, an epoxy resin, an inorganic vapor-deposited film, and paper. Note that in the case where the manufacturing process of the display apparatus DSP involves heat treatment, a highly heat-resistant substrate is preferably selected as the substrate BS.

In the description of this embodiment, the substrate BS is a semiconductor substrate containing silicon as a material. Therefore, a transistor included in the driver circuit region DRV can be a transistor including silicon in a channel formation region (hereinafter referred to as a Si transistor).

The driver circuit region DRV is provided over the substrate BS.

The driver circuit region DRV includes, for example, a driver circuit for driving a pixel included in the pixel layer PXAL to be described later. A specific structure example of the driver circuit region DRV will be described later.

The wiring layer LINL is provided over the circuit layer SICL.

For example, a wiring is provided in the wiring layer LINL. The wiring included in the wiring layer LINL functions as, for example, a wiring that electrically connects a driver circuit included in the driver circuit region DRV provided below the wiring layer LINL and a circuit included in the pixel layer PXAL provided above the wiring layer LINL.

The pixel layer PXAL includes a plurality of pixels (e.g., the pixel PX[1,1] to the pixel PX[m,n] in FIG. 1), for example.

Figure 33A:
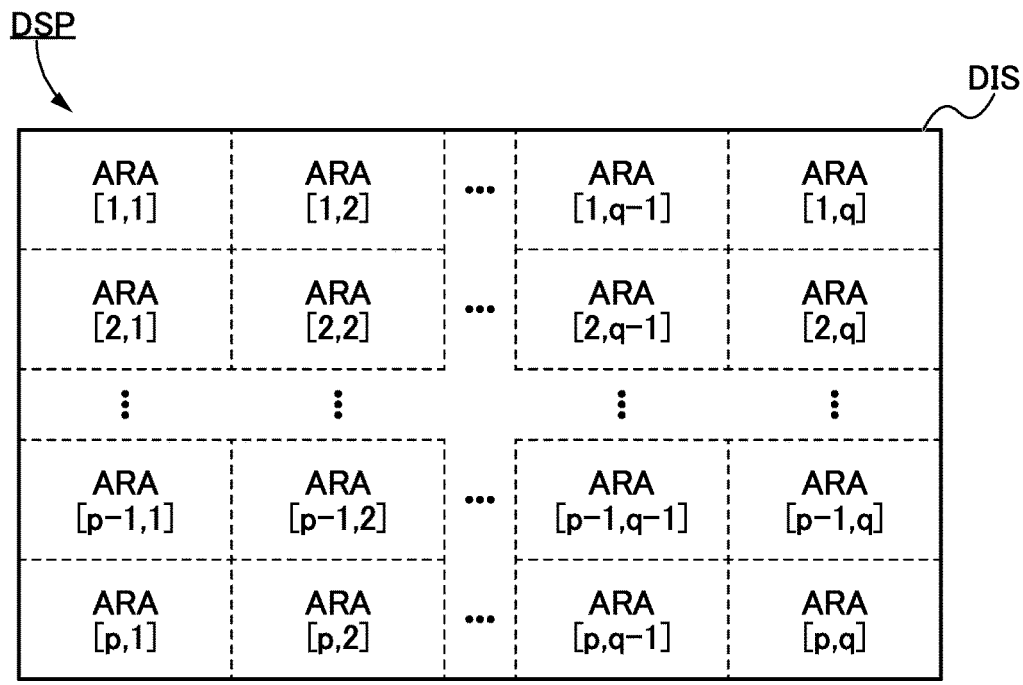
FIG. 33A is a schematic plan view illustrating an example of a display portion of a display apparatus.

FIG. 33A is an example of a plan view of the display apparatus DSP and illustrates only a display portion DIS. Note that the display portion DIS can be a plan view of the pixel layer PXAL.

In the display apparatus DSP in FIG. 33A, the display portion DIS is divided into regions in p rows and q columns (p is an integer greater than or equal to 1, and q is an integer greater than or equal to 1) as an example. Thus, the display portion DIS includes a display region ARA[1,1] to a display region ARA[p,q]. Note that FIG. 33A selectively illustrates the display region ARA[1,1], the display region ARA[2,1], the display region ARA[p−1,1], the display region ARA[p, 1], the display region ARA[1,2], the display region ARA[2, 2], the display region ARA[p−1,2], the display region ARA [p,2], the display region ARA[1,$q$−1], the display region ARA[2,$q$−1], the display region ARA[p−1,q−1], the display region ARA[p,q−1], the display region ARA[1,$q$], the display region ARA[2,$q$], the display region ARA[p−1,q], and the display region ARA[p,q], as an example.

For example, in the case where the display portion DIS is desired to be divided into 32 regions, p=4 and q=8 may be substituted into FIG. 33A. In the case where the display apparatus DSP has a display resolution of 8K4K, the number of display pixels is 7680×4320. In the case where the colors of subpixels of the display portion DIS are three colors, red (R), green (G), and blue (B), the total number of subpixels is 7680×4320×3. Here, in the case where a pixel array of the display portion DIS with a display resolution of 8K4K is divided into 32 regions, the number of display pixels per region is 960×1080, and the number of subpixels per region is 960×1080×3 when the colors of the subpixels of the display apparatus DSP are three colors, red (R), green (G), and blue (B).

Here, in the case where the display portion DIS of the display apparatus DSP in FIG. 33A is divided into regions in p rows and q columns, the driver circuit region DRV included in the circuit layer SICL is considered.

Figure 33B:
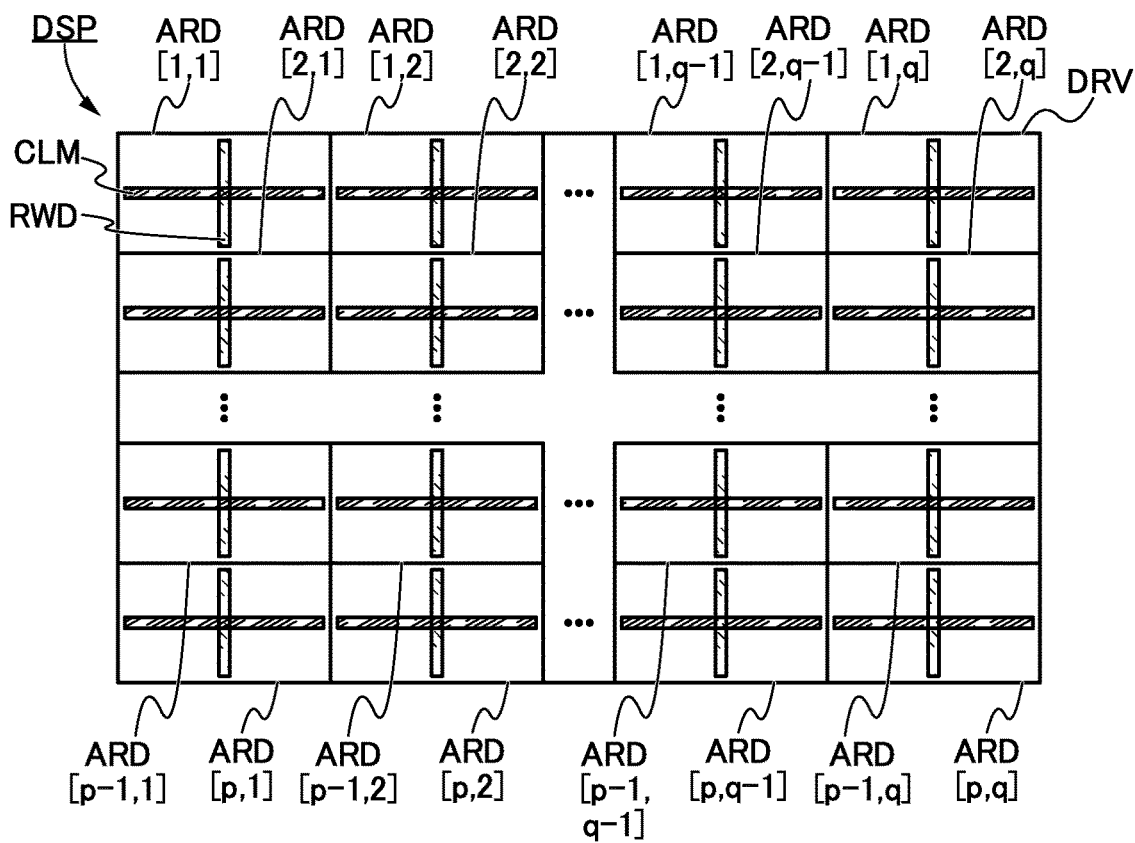
FIG. 33B is a schematic plan view illustrating an example of a driver circuit region of the display apparatus.

FIG. 33B is an example of a plan view of the display apparatus DSP, and illustrates only the driver circuit region DRV included in the circuit layer SICL.

Since the display portion DIS in the display apparatus DSP in FIG. 33A is divided into regions in p rows and q columns, each of the display region ARA[1,1] to the display region ARA[p,q], which are divided from each other, needs a corresponding driver circuit. Specifically, the driver circuit region DRV may also be divided into regions in p rows and q columns and a driver circuit may be provided in each of the divided regions.

The driver circuit region DRV in the display apparatus DSP in FIG. 33B includes regions divided into p rows and q columns. Thus, the driver circuit region DRV includes a circuit region ARD[1,1] to a circuit region ARD[p,q]. Note that FIG. 33B selectively illustrates the circuit region ARD[1,1], the circuit region ARD[2,1], the circuit region ARD[p−1,1], the circuit region ARD[p,1], the circuit region ARD[1,2], the circuit region ARD[2,2], the circuit region ARD[p−1,2], the circuit region ARD[p,2], the circuit region ARD[1,$q$−1], the circuit region ARD[2,$q$−1], the circuit region ARD[p−1,q−1], the circuit region ARD[p,q−1], the circuit region ARD[1,$q$], the circuit region ARD[2,$q$], the circuit region ARD[p−1,q], and the circuit region ARD[p,q], as an example.

Each of the circuit region ARD[1,1] to the circuit region ARD[p,q] includes the column driver circuit CLM and the row driver circuit RWD. For example, the column driver circuit CLM and the row driver circuit RWD included in a circuit region ARD[h,k] (not illustrated in FIG. 33B) positioned in the h-th row and the k-th column (h is an integer greater than or equal to 1 and less than or equal to p, and k is an integer greater than or equal to 1 and less than or equal to q) can drive a plurality of pixels included in the display region ARA[h,k] (not illustrated in FIG. 33A) positioned in the h-th row and the k-th column in the display portion DIS.

The column driver circuit CLM includes, for example, a source driver circuit that transmits an image signal to the plurality of pixels included in the corresponding display region ARA. Thus, like the display apparatus DSP0 in FIG. 1, the display apparatus DSP in FIG. 32A or FIG. 33A preferably has a structure in which the column driver circuit CLM is electrically connected to the wiring SL[1] to the wiring SL[n]. The column driver circuit CLM may include a digital-analog converter circuit that converts digital data of an image signal to analog data.

The row driver circuit RWD includes, for example, a gate driver circuit that selects a plurality of display pixels, which are destinations to which an image signal is transmitted, in the corresponding display region ARA. Thus, like the display apparatus DSP0 in FIG. 1, the display apparatus DSP in FIG. 32A or FIG. 33A preferably has a structure in which the row driver circuit RWD is electrically connected to the wiring GL[1] to the wiring GL[m].

Note that the display apparatus DSP illustrated in FIG. 32A, FIG. 33A, and FIG. 33B has a structure in which the display region ARA[h,k] in the display portion DIS and the circuit region ARD[h,k] overlap with each other, but the display apparatus of one embodiment of the present invention is not limited to this. In the structure of the display apparatus of one embodiment of the present invention, the display region ARA[h,k] and the circuit region ARD[h,k] do not necessarily overlap with each other.

Figure 32B:
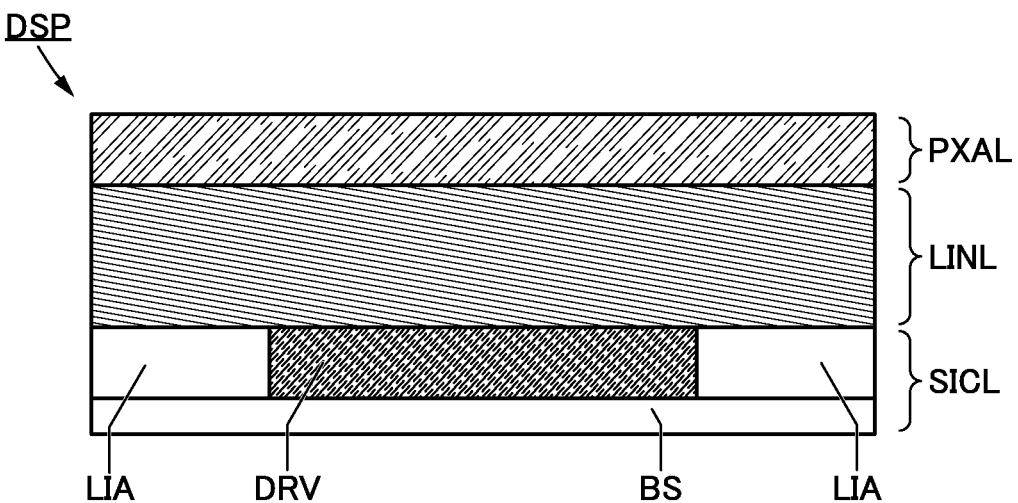

For example, as illustrated in FIG. 32B, the display apparatus DSP may have a structure in which not only the driver circuit region DRV but also a region LIA is provided over the substrate BS.

A wiring is provided in the region LIA, as an example. The wiring included in the region LIA may be electrically connected to the wiring included in the wiring layer LINL. At this time, the display apparatus DSP may have a structure in which the circuit included in the driver circuit region DRV and the circuit included in the pixel layer PXAL are electrically connected to each other through the wiring included in the region LIA and the wiring included in the wiring layer LINL. The display apparatus DSP may have a structure in which the circuit included in the driver circuit region DRV is electrically connected to the wiring or a circuit included in the region LIA through the wiring included in the wiring layer LINL.

The region LIA may include a GPU (Graphics Processing Unit), as an example. In the case where the display apparatus DSP includes a touch panel, the region LIA may include a sensor controller for controlling a touch sensor included in the touch panel. In the case where a liquid crystal element is used as the display element of the display apparatus DSP, a gamma correction circuit may be included. The region LIA may also include a controller having a function of processing an input signal from the outside of the display apparatus DSP. The region LIA may include a voltage generation circuit for generating voltage supplied to the above-described circuit and a driver circuit included in the circuit region ARD.

In the case where a light-emitting device containing an organic EL material is used as the display element of the display apparatus DSP, an EL correction circuit may be included in the region LIA. The EL correction circuit has a function of appropriately adjusting the amount of current input to the light-emitting device containing an organic EL material. Since the emission luminance of the light-emitting device containing an organic EL material is proportional to the amount of current, when the characteristics of a driving transistor electrically connected to the light-emitting device are not favorable, the luminance of light emitted from the light-emitting device might be lower than a desired luminance. For example, the EL correction circuit monitors the amount of current flowing through the light-emitting device and increases the amount of current when the amount of current is smaller than a desired amount, whereby the luminance of light emitted from the light-emitting device can be increased. In contrast, when the amount of current is larger than a desired amount, the amount of current flowing through the light-emitting device may be adjusted to be small.

Figure 34A:
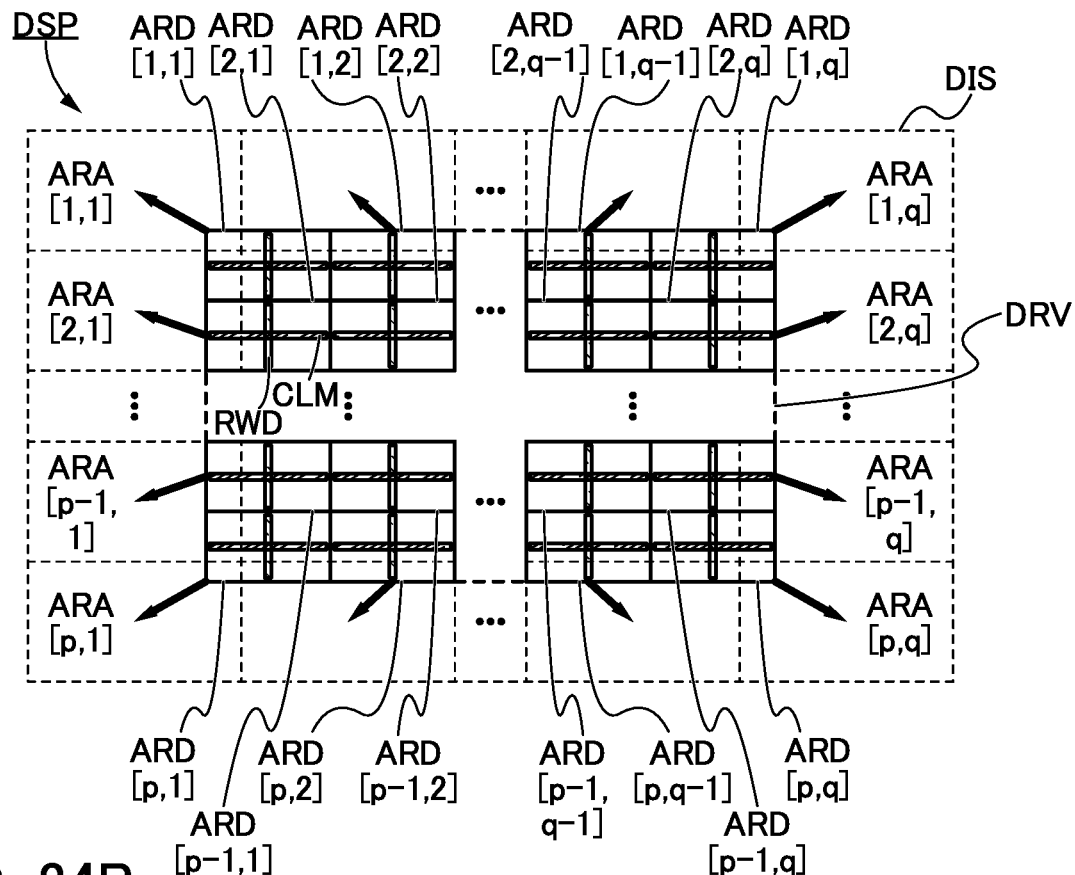
FIG. 34A and FIG. 34B are schematic plan views illustrating structure examples of a display apparatus.
Figure 34B:
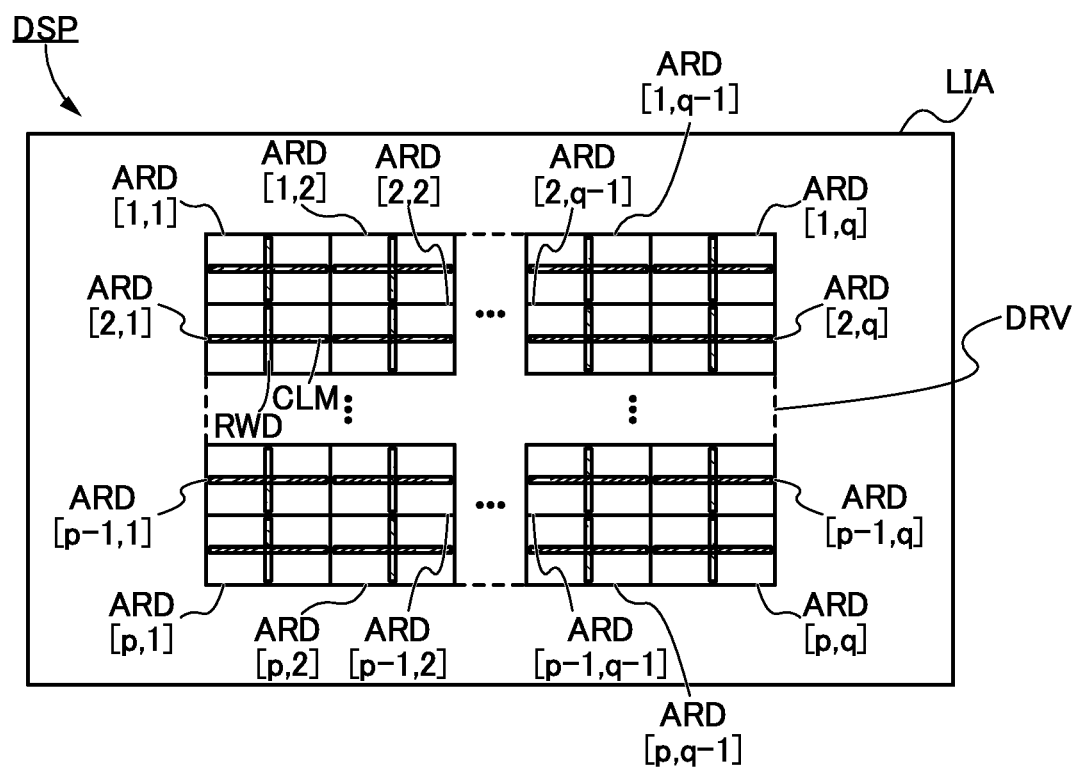

FIG. 34A is an example of a plan view of the display apparatus DSP illustrated in FIG. 32B, and illustrates the driver circuit region DRV denoted by a solid line and the display portion DIS denoted by a dotted line. In the display apparatus DSP in FIG. 34A, as an example, the driver circuit region DRV is surrounded by the region LIA (FIG. 34B illustrates an example of a plan view of the display apparatus DSP in which only the circuit layer SICL is illustrated). Thus, as illustrated in FIG. 34A, the driver circuit region DRV is provided to overlap with the interior of the display portion DIS in the plan view.

In the display apparatus DSP illustrated in FIG. 34A, the display portion DIS is divided into the display region ARA[1,1] to the display region ARA[p,q] and the driver circuit region DRV is divided into the circuit region ARD[1,1] to the circuit region ARD[p,q] as in FIG. 33A.

As illustrated in FIG. 34A, a correspondence between the display region ARA and the circuit region ARD including a driver circuit that drives a pixel included in the display region ARA is shown by a thick arrow. Specifically, a driver circuit included in the circuit region ARD[1,1] drives a pixel included in the display region ARA[1,1], and a driver circuit included in the circuit region ARD[2,1] drives a pixel included in the display region ARA[2,1]. A driver circuit included in the circuit region ARD[p−1,1] drives a pixel included in the display region ARA[p−1,1], and a driver circuit included in the circuit region ARD[p,1] drives a pixel included in the display region ARA[p,1]. A driver circuit included in the circuit region ARD[1,q] drives a pixel included in the display region ARA[1,q], and a driver circuit included in the circuit region ARD[2,q] drives a pixel included in the display region ARA[2,q]. A driver circuit included in the circuit region ARD[p−1,q] drives a pixel included in the display region ARA[p−1,q], and a driver circuit included in the circuit region ARD[p,q] drives a pixel included in the display region ARA[p,q]. That is, although not illustrated in FIG. 34A, a driver circuit included in the circuit region ARD[h,k] positioned in the h-th row and the k-th column drives a pixel included in the display region ARA[h,k].

In FIG. 32B, when the driver circuit included in the circuit region ARD in the circuit layer SICL and the pixel included in the display region ARA in the pixel layer PXAL are electrically connected through a wiring included in the wiring layer LINL, the display apparatus DSP can have a structure in which the display region ARA[h,k] and the circuit region ARD[h,k] do not necessarily overlap with each other. Accordingly, the positional relation between the driver circuit region DRV and the display portion DIS is not limited to the plan view of the display apparatus DSP illustrated in FIG. 34A, and the position of the driver circuit region DRV can be freely determined.

Figure 32C:
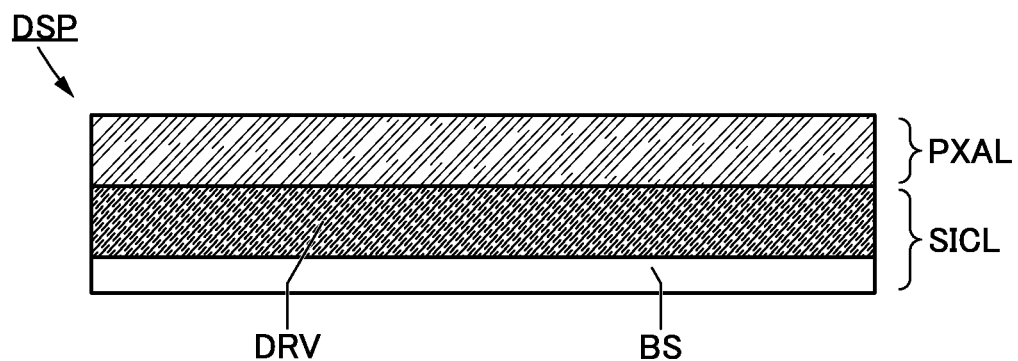

Note that the display apparatus DSP illustrated in FIG. 32A and FIG. 32B has a structure including the wiring layer LINL, but one embodiment of the present invention is not limited thereto. The display apparatus of one embodiment of the present invention may have a structure in which the pixel layer PXAL is provided on the circuit layer SICL as illustrated in FIG. 32C, for example.

In each of the circuit region ARD[1,1] to the circuit region ARD[p,q] illustrated in FIG. 33B and FIG. 34A, the arrangement of the column driver circuit CLM and the row driver circuit RWD is not limited to the structure of the display apparatus of one embodiment of the present invention. Although the column driver circuit CLM and the row driver circuit RWD are arranged to intersect each other (to form a cross) in FIG. 33B and FIG. 34A, the column driver circuit CLM and the row driver circuit RWD may be arranged to form various shapes in each circuit region ARD.

As illustrated in FIG. 33A to FIG. 34B, the display portion DIS is divided into the plurality of display regions ARA and a driver circuit corresponding to each display region ARA is provided, whereby the circuits included in the plurality of display regions ARA can be driven independently. For example, for the display region ARA in which image data is often rewritten, the column driver circuit CLM and the row driver circuit RWD provided for the corresponding circuit region ARD can be driven with a high frame frequency; and for the display region ARA in which image data is not often rewritten, the column driver circuit CLM and the row driver circuit RWD provided for the corresponding circuit region ARD can be driven with a low frame frequency.

Specifically, the column driver circuit CLM and the row driver circuit RWD corresponding to the display region ARA in which image data is often rewritten to display moving images or the like may be driven with a high frame frequency of higher than or equal to 60 Hz, higher than or equal to 120 Hz, higher than or equal to 165 Hz, or higher than or equal to 240 Hz. The column driver circuit CLM and the row driver circuit RWD corresponding to the display region ARA in which image data is not often rewritten to display a still image or the like may be driven with a low frame frequency of lower than or equal to 5 Hz, lower than or equal to 1 Hz, lower than or equal to 0.5 Hz, or lower than or equal to 0.1 Hz. In this manner, the display portion DIS of the display apparatus DSP is divided into the display region ARA[1,1] to the display region ARA[p,q], whereby the rewrite frequency (frame frequency) can be changed depending on an image displayed on the display region ARA. That is, in the display portion DIS of the display apparatus DSP, at least two selected from the display region ARA[1,1] to the display region ARA[p,q] can display images with different frame frequencies.

Figure 35A:
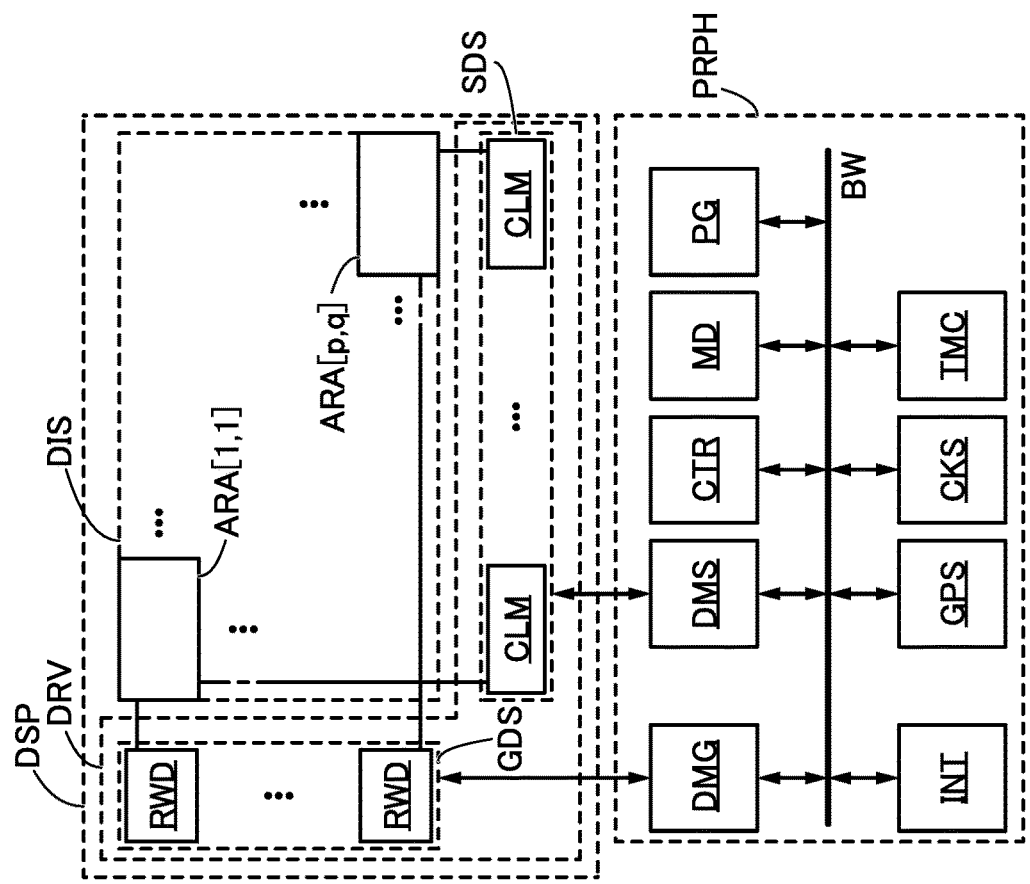
FIG. 35A and FIG. 35B are block diagrams illustrating structure examples of a display apparatus.

Next, examples of components included in the display apparatus DSP will be described. FIG. 35A is a block diagram illustrating an example of the display apparatus DSP in FIG. 32A or FIG. 32B. The display apparatus DSP in FIG. 35A includes the display portion DIS and a peripheral circuit PRPH.

The peripheral circuit PRPH includes a circuit GDS including the plurality of row driver circuits RWD, a circuit SDS including the plurality of column driver circuits CLM, a distribution circuit DMG, a distribution circuit DMS, a control unit CTR, a memory device MD, a voltage generation circuit PG, a timing controller TMC, a clock signal generation circuit CKS, an image processing unit GPS, and an interface INT. Note that the peripheral circuit PRPH can be a circuit included in the circuit layer SICL in FIG. 32A or FIG. 32B, for example.

Note that in the display apparatus DSP, the driver circuit region DRV including the plurality of row driver circuits RWD overlaps with the pixel layer PXAL including the plurality of display regions ARA as illustrated in FIG. 32A to FIG. 34A; however, FIG. 35A illustrates the plurality of row driver circuits RWD arranged in a column outside the display portion DIS, for convenience. Similarly, the driver circuit region DRV including the plurality of column driver circuits CLM overlaps with the pixel layer PXAL including the plurality of display regions ARA; however, FIG. 35A illustrates the plurality of column driver circuits CLM arranged in a row outside the display portion DIS, for convenience.

The peripheral circuit PRPH is included in the circuit layer SICL illustrated in FIG. 32A or FIG. 32B, for example. The circuit GDS and the circuit SDS included in the peripheral circuit PRPH are included in the driver circuit region DRV illustrated in FIG. 32A or FIG. 32B, for example.

In the case of the display apparatus DSP in FIG. 32B, one or more selected from the distribution circuit DMG, the distribution circuit DMS, the control unit CTR, the memory device MD, the voltage generation circuit PG, the timing controller TMC, the clock signal generation circuit CKS, the image processing unit GPS, and the interface INT may be included in the region LIA. Among the above-described circuits, the circuit not included in the region LIA may be electrically connected, as an external circuit, to one or both of the circuit included in the region LIA and the circuit included in the driver circuit region DRV.

The distribution circuit DMG, the distribution circuit DMS, the control unit CTR, the memory device MD, the voltage generation circuit PG, the timing controller TMC, the clock signal generation circuit CKS, the image processing unit GPS, and the interface INT transmit and receive signals mutually through a bus wiring BW.

The interface INT has a function of a circuit for taking image data output from an external device for displaying an image on the display apparatus DSP into the circuit in the peripheral circuit PRPH. Examples of the external device include a recording media player and a nonvolatile memory device such as an HDD (Hard Disk Drive) or an SSD (Solid State Drive). The interface INT may be a circuit that outputs a signal from a circuit inside the peripheral circuit PRPH to a device outside the display apparatus DSP.

In the case where image data is input from the external device to the interface INT by wireless communication, the interface INT can include, for example, one or more selected from an antenna receiving the image data, a mixer, an amplifier circuit, and an analog-digital converter circuit.

The control unit CTR has functions of processing control signals transmitted from the external device through the interface INT and controlling the circuits included in the peripheral circuit PRPH.

The memory device MD has a function of temporarily holding data and an image signal. In that case, the memory device MD serves as a frame memory (sometimes referred to as a frame buffer), for example. The memory device MD may have a function of temporarily holding one or both of data transmitted from the external device through the interface INT and data processed in the control unit CTR. Note that one or both of an SRAM (Static Random Access Memory) and a DRAM (Dynamic Random Access Memory) can be used as the memory device MD.

The voltage generation circuit PG has a function of generating power supply voltages supplied to a pixel circuit included in the display portion DIS and a circuit included in the peripheral circuit PRPH. Note that the voltage generation circuit PG may have a function of selecting a circuit to which a voltage is to be supplied. For example, the voltage generation circuit PG stops supply of voltage to one or more selected from the circuit GDS, the circuit SDS, the image processing unit GPS, the timing controller TMC, and the clock signal generation circuit CKS in a period in which a still image is displayed on the display portion DIS, resulting in a reduction in the total power consumption of the display apparatus DSP.

The timing controller TMC has a function of generating timing signals used in the plurality of row driver circuits RWD included in the circuit GDS and the plurality of column driver circuits CLM included in the circuit SDS. For the generation of the timing signal, a clock signal generated by the clock signal generation circuit CKS can be used.

The image processing unit GPS has a function of performing processing for drawing an image on the display portion DIS. For example, the image processing unit GPS may include a GPU. Specifically, the image processing unit GPS performs pipeline processing in parallel and thus can perform high-speed processing of the image data to be displayed on the display portion DIS. The image processing unit GPS can also have a function of a decoder for decoding an encoded image.

The image processing unit GPS may also have a function of correcting color tone of an image displayed on the display portion DIS. In that case, the image processing unit GPS is preferably provided with one or both of a dimming circuit and a toning circuit. In the case where the display pixel circuit included in the display portion DIS includes an organic EL element, the image processing unit GPS may be provided with an EL correction circuit.

The above-described image correction may be performed using artificial intelligence, for example. For example, a current flowing in the display device included in the pixel (or a voltage applied to the display device) is monitored and acquired, an image displayed on the display portion DIS is acquired with an image sensor, the current (or voltage) and the image are used as input data in an arithmetic operation of the artificial intelligence (e.g., an artificial neural network), and the output result is used to determine whether the image should be corrected.

Such an arithmetic operation of artificial intelligence can be applied to not only image correction but also upconversion of image data. In this case, upconversion of low-resolution image data in accordance with the resolution of the display portion DIS allows a high-display-quality image to be displayed on the display portion DIS.

Note that for the above-described arithmetic operation of artificial intelligence, the GPU included in the image processing unit GPS can be used, for example. That is, the GPU can be used to perform arithmetic operations for various kinds of correction (e.g., color irregularity correction or upconversion).

Note that in this specification and the like, a GPU performing an arithmetic operation of the artificial intelligence is referred to as an AI accelerator. That is, the GPU may be replaced with an AI accelerator in the description in this specification and the like.

The clock signal generation circuit CKS has a function of generating a clock signal. The clock signal generation circuit CKS may be configured to change the frame frequency of a clock signal depending on an image displayed on the display portion DIS, for example.

The distribution circuit DMG has a function of transmitting a signal received from the bus wiring BW to the row driver circuit RWD which drives a pixel included in each of the plurality of display regions ARA, in accordance with the contents of the signal.

The distribution circuit DMS has a function of transmitting a signal received from the bus wiring BW to the column driver circuit CLM which drives a pixel included in each of the plurality of display regions ARA, in accordance with the contents of the signal.

Note that for the display apparatus DSP illustrated in FIG. 35A, LVDS (Low Voltage Differential Signaling) may be employed as digital signal transmission technology. Alternatively, eDP (embedded DisplayPort) or iDP (internal DisplayPort) may be employed.

Although not illustrated in FIG. 35A, a level shifter may be included in the peripheral circuit PRPH. The level shifter has a function of converting a signal input to a circuit into an appropriate level, for example.

Note that the structure of the peripheral circuit PRPH of the display apparatus DSP illustrated in FIG. 35A is an example, and the circuit structure included in the peripheral circuit PRPH may be changed depending on circumstances. For example, in the case where the display apparatus DSP receives driving voltages of circuits from the outside, the display apparatus DSP does not need to generate the driving voltages. In such a case, the display apparatus DSP may have a structure without including the voltage generation circuit PG.

Figure 35B:
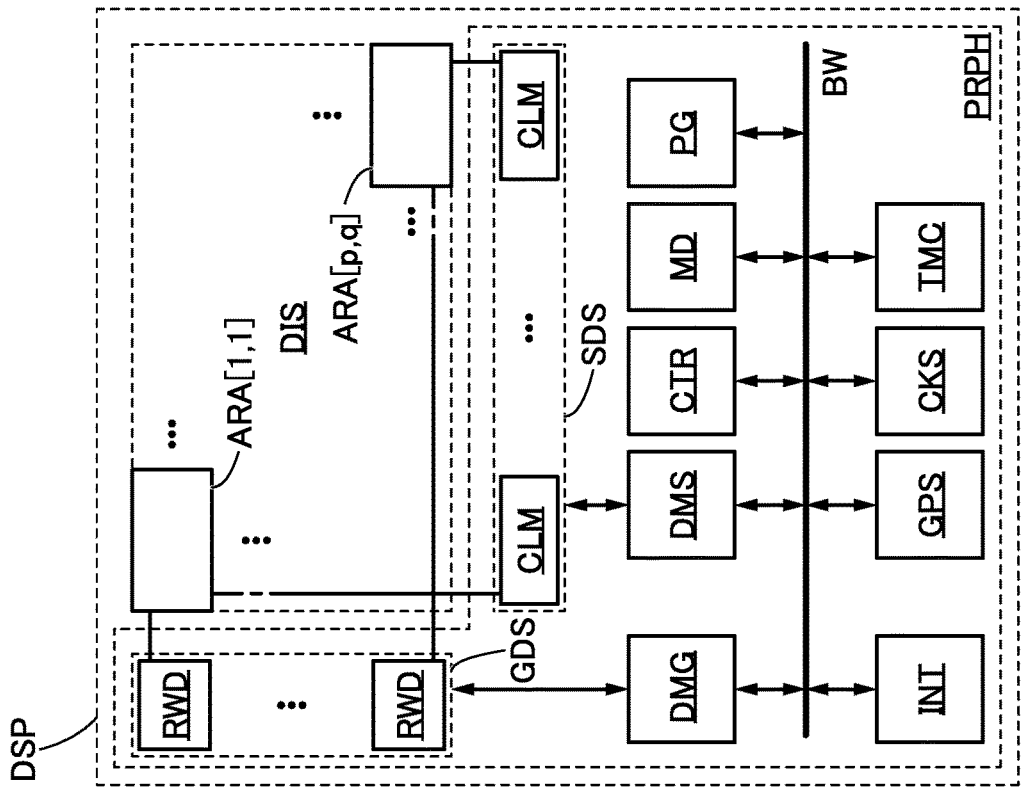

For example, the display apparatus DSP illustrated in FIG. 35A may be configured not to include the distribution circuit DMG, the distribution circuit DMS, the control unit CTR, the memory device MD, the voltage generation circuit PG, the timing controller TMC, the clock signal generation circuit CKS, the image processing unit GPS, and the interface INT. Specifically, as illustrated in FIG. 35B, the peripheral circuit PRPH including the distribution circuit DMG, the distribution circuit DMS, the control unit CTR, the memory device MD, the voltage generation circuit PG, the timing controller TMC, the clock signal generation circuit CKS, the image processing unit GPS, and the interface INT may be provided outside the display apparatus DSP. Although FIG. 35B illustrates the state where signals are transmitted and received between the circuit GDS and the distribution circuit DMG and between the circuit SDS and the distribution circuit DMS, transmission and reception of signals between the circuit GDS and the distribution circuit DMG and between the circuit SDS and the distribution circuit DMS may be performed through the interface INT. The structure of the display apparatus DSP illustrated in FIG. 35B can be employed for the display apparatus DSP in FIG. 32C, for example. Although FIG. 35B illustrates an example where the structure including the distribution circuit DMG, the distribution circuit DMS, the control unit CTR, the memory device MD, the voltage generation circuit PG, the timing controller TMC, the clock signal generation circuit CKS, the image processing unit GPS, and the interface INT is provided outside the display apparatus DSP, one or more selected from the distribution circuit DMG, the distribution circuit DMS, the control unit CTR, the memory device MD, the voltage generation circuit PG, the timing controller TMC, the clock signal generation circuit CKS, the image processing unit GPS, and the interface INT may be electrically connected, as external circuits, to the other circuits included in the driver circuit region DRV.

Note that this embodiment can be combined with any of the other embodiments in this specification as appropriate.

Embodiment 4

In this embodiment, a structure example of a display apparatus of one embodiment of the present invention will be described.

Structure Example 1 of Display Apparatus

Figure 36:
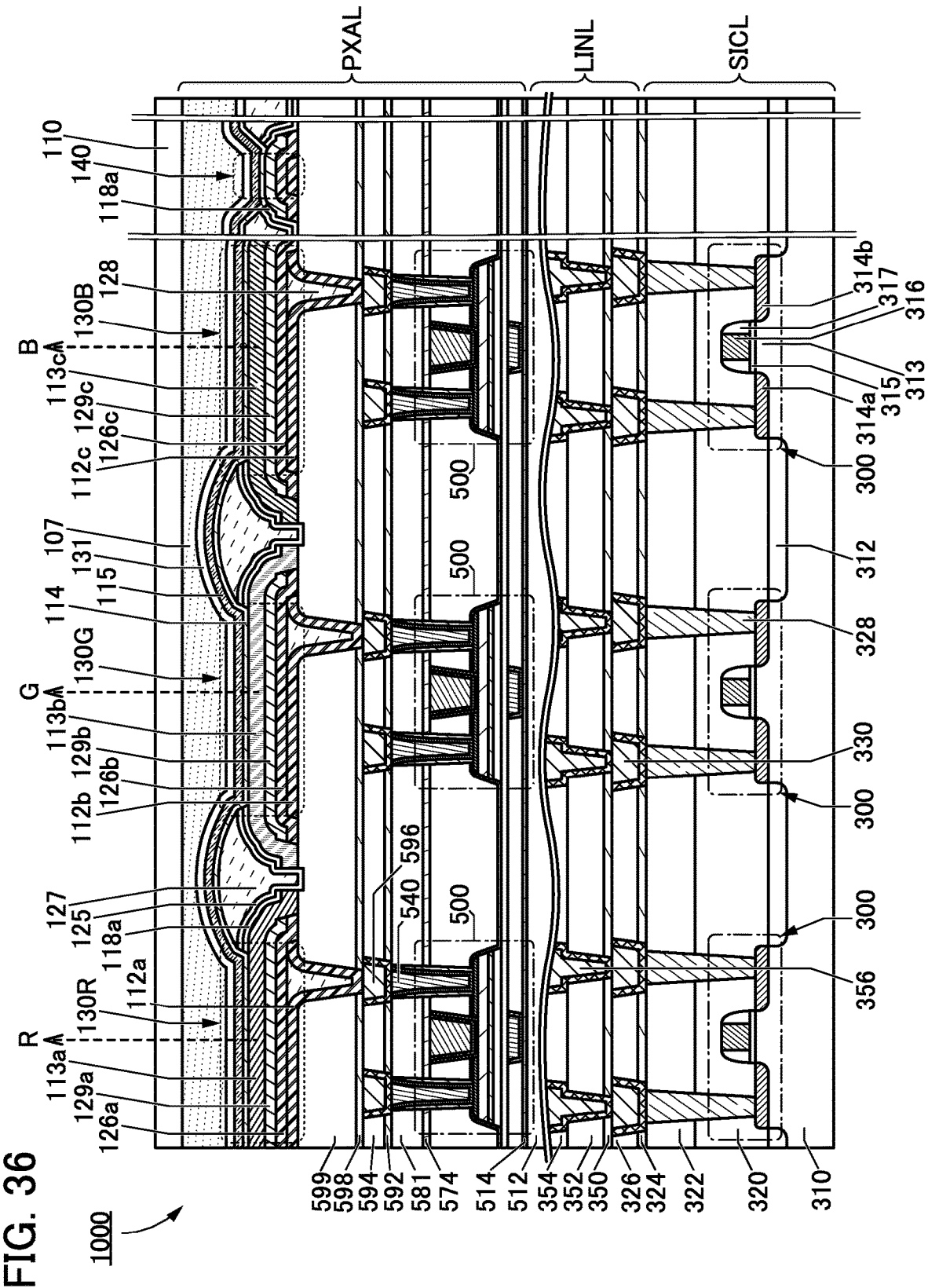
FIG. 36 is a schematic cross-sectional view illustrating a structure example of a display apparatus.

FIG. 36 is a cross-sectional view illustrating an example of a display apparatus of one embodiment of the present invention. A display apparatus 1000 illustrated in FIG. 36 has a structure in which a pixel circuit, a driver circuit, and the like are provided over a substrate 310, for example. Note that the display apparatus DSP0 and the like in FIG. 1 described in the above embodiment can have a structure of the display apparatus 1000 in FIG. 36. The pixel circuit described in this embodiment can be the display pixel circuit described in the above embodiment.

For example, the circuit layer SICL, the wiring layer LINL, and the pixel layer PXAL in the display apparatus DSP illustrated in FIG. 32A and FIG. 32B can be those in the display apparatus 1000 in FIG. 36. The circuit layer SICL includes the substrate 310, for example, and a transistor 300 is formed over the substrate 310. The wiring layer LINL is provided above the transistor 300, and the wiring layer LINL includes a wiring that electrically connects the transistor 300, a transistor 500 to be described later, a light-emitting device 130R, a light-emitting device 130G, and a light-emitting device 130B to be described later, and the like. The pixel layer PXAL is provided above the wiring layer LINL, and the pixel layer PXAL includes, for example, the transistor 500 and a light-emitting device 130 (the light-emitting device 130R, the light-emitting device 130G, and the light-emitting device 130B in FIG. 36).

Thus, the transistor 500 can be a transistor included in the pixel PX described in Embodiment 1 and Embodiment 2. Specifically, for example, the transistor 500 can be the transistor M2 included in the pixel PX illustrated in FIG. 2 or FIG. 17. Alternatively, for example, the transistor 500 can be a transistor included in a switch in the display apparatus DSP1A in FIG. 2 or a transistor included in a switch in the display apparatus DSP1B in FIG. 17.

The light-emitting device 130 can be the light-emitting device LD included in the pixel PX described in Embodiment 1 and Embodiment 2.

Note that the circuit CD illustrated in FIG. 2 or FIG. 17 may be included in the pixel layer PXAL, for example. That is, a transistor included in the circuit CD may have the structure of the transistor 500. The circuit CD illustrated in FIG. 2 or FIG. 17 may be included in the circuit layer SICL, for example. That is, the transistor included in the circuit CD may have the structure of the transistor 300.

As the substrate 310, a substrate that can be used as the substrate BS described in Embodiment 3 can be used, for example. In the case where the manufacturing process of the display apparatus 1000 involves heat treatment, a highly heat-resistant substrate is preferably selected as the substrate 310.

The diagonal size of the display apparatus can be determined depending on the kind and the size of the substrate 310, for example. For example, in the case where a display apparatus with a diagonal size of greater than or equal to 30 inches, greater than or equal to 50 inches, greater than or equal to 70 inches, or greater than or equal to 100 inches is fabricated for a television device or an electronic device for digital signage application, a glass substrate may be used as the substrate 310. In the case where a display apparatus with a diagonal size of less than or equal to 10 inches, less than or equal to 5 inches, less than or equal to 1.5 inches, or less than or equal to 1 inch is fabricated for a device for XR or a wearable information terminal, a semiconductor substrate may be used as the substrate 310.

There is no particular limitation on the screen ratio (aspect ratio) of the display apparatus 1000. For example, the display apparatus 1000 is compatible with a variety of screen ratios such as 1:1 (a square), 4:3, 16:9, 16:10, 21:9, and 32:9.

In the description of this embodiment, the substrate 310 is a semiconductor substrate containing silicon as a material.

The transistor 300 is provided on the substrate 310 and includes an element isolation layer 312, a conductor 316, an insulator 315, an insulator 317, a semiconductor region 313 that is part of the substrate 310, and a low-resistance region 314a and a low-resistance region 314b that function as a source region and a drain region. Thus, the transistor 300 is a Si transistor. Although FIG. 36 illustrates a structure in which one of the source and the drain of the transistor 300 is electrically connected to a conductor 330 and a conductor 356, which are described later, through a conductor 328 described later, the electrical connection in the display apparatus of one embodiment of the present invention is not limited thereto. The display apparatus of one embodiment of the present invention may have a structure in which, for example, a gate of the transistor 300 is electrically connected to the conductor 330 and the conductor 356 through the conductor 328.

The transistor 300 can be a fin type when, for example, the top surface of the semiconductor region 313 and the side surface thereof in the channel width direction are covered with the conductor 316 with the insulator 315 functioning as a gate insulating film therebetween. The effective channel width can be increased in the fin-type transistor 300, so that the on-state characteristics of the transistor 300 can be improved. In addition, contribution of the electric field of the gate electrode can be increased, so that the off-state characteristics of the transistor 300 can be improved.

Note that the transistor 300 may be either a p-channel transistor or an n-channel transistor. Alternatively, a plurality of the transistors 300 may be provided and both the p-channel transistor and the n-channel transistor may be used.

A region of the semiconductor region 313 where a channel is formed, a region in the vicinity thereof, and the low-resistance region 314a and the low-resistance region 314b that function as the source region and the drain region preferably contain a silicon-based semiconductor, specifically, preferably contain single crystal silicon. Alternatively, each of the regions may be formed using germanium, silicon germanium, gallium arsenide, aluminum gallium arsenide, or gallium nitride, for example. A structure using silicon whose effective mass is controlled by applying stress to the crystal lattice and changing the lattice spacing may be employed. Alternatively, the transistor 300 may be a HEMT (High Electron Mobility Transistor) using gallium arsenide and aluminum gallium arsenide, for example.

For the conductor 316 functioning as a gate electrode, a semiconductor material such as silicon containing an element that imparts n-type conductivity, such as arsenic or phosphorus, or an element that imparts p-type conductivity, such as boron or aluminum, can be used. Alternatively, for the conductor 316, a conductive material such as a metal material, an alloy material, or a metal oxide material can be used, for example.

Note that since the work function of a conductor depends on the material of the conductor, the threshold voltage of the transistor can be adjusted by selecting the material of the conductor. Specifically, it is preferable to use one or both of titanium nitride and tantalum nitride as the material of the conductor. Moreover, in order to ensure both conductivity and embeddability, it is preferable to use stacked layers of metal materials of one or both of tungsten and aluminum for the conductor, and it is particularly preferable to use tungsten in terms of heat resistance.

The element isolation layer 312 is provided to separate a plurality of transistors formed on the substrate 310 from each other. The element isolation layer can be formed by, for example, a LOCOS (Local Oxidation of Silicon) method, an STI (Shallow Trench Isolation) method, or a mesa isolation method.

Note that the transistor 300 illustrated in FIG. 36 is an example and the structure is not limited thereto; an appropriate transistor is used in accordance with a circuit structure, a driving method, or the like. For example, the transistor 300 may have a planar structure instead of a fin-type structure.

Over the transistor 300 illustrated in FIG. 36, an insulator 320, an insulator 322, an insulator 324, and an insulator 326 are stacked in this order from the substrate 310 side.

For the insulator 320, the insulator 322, and the insulator 326, one or more selected from silicon oxide, silicon oxynitride, silicon nitride oxide, silicon nitride, aluminum oxide, aluminum oxynitride, aluminum nitride oxide, and aluminum nitride can be used, for example.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

The insulator 322 may have a function of a planarization film for eliminating a level difference caused by the transistor 300 or the like covered with the insulator 320 and the insulator 322. For example, the top surface of the insulator 322 may be planarized by planarization treatment using a chemical mechanical polishing (CMP) method to improve planarity.

For the insulator 324, it is preferable to use an insulating film having a barrier property (referred to as a barrier insulating film) which prevents diffusion of impurities such as water and hydrogen from the substrate 310 or the transistor 300 to a region above the insulator 324 (e.g., the region where the transistor 500, the light-emitting device 130R, the light-emitting device 130G, the light-emitting device 130B, and the like are provided). Accordingly, for the insulator 324, it is preferable to use an insulating material that has a function of inhibiting diffusion of impurities such as a hydrogen atom, a hydrogen molecule, and a water molecule (through which the above impurities are less likely to pass). Furthermore, depending on the situation, for the insulator 324, it is preferable to use an insulating material that has a function of inhibiting diffusion of impurities such as a nitrogen atom, a nitrogen molecule, a nitrogen oxide molecule (e.g., $N_2O$, NO, and $NO_2$), and a copper atom (through which the above oxygen is less likely to pass). In addition, it is preferable that the insulator 324 have a function of inhibiting diffusion of oxygen (e.g., one or both of an oxygen atom and an oxygen molecule).

For the film having a barrier property against hydrogen, silicon nitride formed by a CVD method can be used, for example.

The amount of released hydrogen can be analyzed by thermal desorption spectroscopy (TDS), for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$ in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324.

When a material with a low permittivity is used for an interlayer film, the parasitic capacitance generated between wirings can be reduced.

In addition, the conductor 328, the conductor 330, and the like that are connected to the light-emitting devices and the like provided above the insulator 326 are embedded in the insulator 320, the insulator 322, the insulator 324, and the insulator 326. Note that the conductor 328, the conductor 330, and the like each have a function of a plug or a wiring. A plurality of conductors each having a function of a plug or a wiring are collectively denoted by the same reference numeral in some cases. Moreover, in this specification and the like, a wiring and a plug connected to the wiring may be a single component. That is, part of a conductor functions as a wiring in some cases and part of a conductor functions as a plug in other cases.

As a material of each of plugs and wirings (e.g., the conductor 328 and the conductor 330), a single layer or a stacked layer of one or more conductive materials selected from a metal material, an alloy material, a metal nitride material, and a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used for formation. The use of a low-resistance conductive material can reduce wiring resistance.

A wiring layer may be provided over the insulator 326 and the conductor 330. For example, in FIG. 36, an insulator 350, an insulator 352, and an insulator 354 are provided to be stacked in this order above the insulator 326 and the conductor 330. Furthermore, the conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

Note that like the insulator 324, for example, the insulator 350 is preferably formed using an insulator having a barrier property against one or more selected from hydrogen, oxygen, and water. Like the insulator 326, the insulator 352 and the insulator 354 are preferably formed using an insulator having a relatively low dielectric constant to reduce parasitic capacitance generated between wirings. The insulator 352 and the insulator 354 each have functions of an interlayer insulating film and a planarization film. Furthermore, the conductor 356 preferably includes a conductor having a barrier property against one or more selected from hydrogen, oxygen, and water.

For the conductor having a barrier property against hydrogen, tantalum nitride is preferably used, for example. The use of a stack including tantalum nitride and tungsten that has high conductivity can inhibit diffusion of hydrogen from the transistor 300 while the conductivity of a wiring is kept. In that case, a tantalum nitride layer having a barrier property against hydrogen is preferably in contact with the insulator 350 having a barrier property against hydrogen.

An insulator 512 is provided above the insulator 354 and the conductor 356.

In FIG. 36, the transistor 500 is provided over the insulator 512. For the insulator 512, a substance having a barrier property against one or more selected from oxygen and hydrogen is preferably used. Specifically, for example, for the insulator 512, one or more selected from silicon oxide, silicon oxynitride, silicon nitride oxide, silicon nitride, aluminum oxide, aluminum oxynitride, aluminum nitride oxide, and aluminum nitride may be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

A material similar to that for the insulator 320 can be used for the insulator 512, for example. When a material with a relatively low permittivity is used for these insulators, parasitic capacitance generated between wirings can be reduced. A silicon oxide film or a silicon oxynitride film can be used as the insulator 512, for example.

An insulator 514 is provided over the insulator 512, and the transistor 500 is provided over the insulator 514. An insulator 574 is formed over the transistor 500, and an insulator 581 is formed over the insulator 574.

The insulator 574 and the insulator 581 will be described in detail in Embodiment 5.

As the insulator 514, it is preferable to use a film (film having a barrier property) that inhibits diffusion of impurities such as hydrogen from the substrate 310, a region where the circuit element below the insulator 512 is provided, or the like into a region where the transistor 500 is provided. Thus, silicon nitride formed by a CVD method can be used for the insulator 514, for example.

The transistor 500 illustrated in FIG. 36 is an OS transistor that includes a metal oxide in a channel formation region, as described above. Note that the OS transistor will be described in detail in Embodiment 5.

An insulator 592 and an insulator 594 are formed in this order over the insulator 581.

Furthermore, a conductor 596 is embedded in the insulator 592 and the insulator 594. The conductor 596 has a function of a plug or a wiring that is connected to the transistor 300. Note that the conductor 596 can be provided using a material similar to that for the conductor 328 and the conductor 330.

Note that like the insulator 324, for example, the insulator 592 is preferably formed using an insulator having a barrier property against one or more selected from hydrogen, oxygen, and water. Like the insulator 326, the insulator 594 is preferably formed using an insulator having a relatively low dielectric constant to reduce parasitic capacitance generated between wirings. The insulator 594 has functions of an interlayer insulating film and a planarization film. Furthermore, the conductor 596 preferably includes a conductor having a barrier property against one or more selected from hydrogen, oxygen, and water.

An insulator 598 and an insulator 599 are formed over the insulator 594 and the conductor 596.

Like the insulator 324, for example, the insulator 598 is preferably formed using an insulator having a barrier property against one or more selected from hydrogen, oxygen, and water.

Like the insulator 326, the insulator 599 is preferably formed using an insulator having a relatively low dielectric constant to reduce parasitic capacitance generated between wirings. The insulator 599 has functions of an interlayer insulating film and a planarization film.

The light-emitting device 130R, the light-emitting device 130G, the light-emitting device 130B, and a connection portion 140 are formed over the insulator 599.

The connection portion 140 is referred to as a cathode contact portion in some cases, and is electrically connected to cathode electrodes of the light-emitting device 130R, the light-emitting device 130G, and the light-emitting device 130B. The connection portion 140 in FIG. 36 includes one or more conductors selected from a conductor 112a to a conductor 112c to be described later, at least one of a conductor 126a to a conductor 126c to be described later, one or more conductors selected from a conductor 129a to a conductor 129c to be described later, a common layer 114 to be described later, and a common electrode 115 to be described later.

Note that the connection portion 140 may be provided to surround four sides of the display portion or may be provided in the display portion (e.g., between adjacent light-emitting devices 130).

The light-emitting device 130R includes the conductor 112a, the conductor 126a over the conductor 112a, and the conductor 129a over the conductor 126a. All of the conductor 112a, the conductor 126a, and the conductor 129a can be referred to as a pixel electrode, or one or two of them can be referred to as a pixel electrode.

The light-emitting device 130G includes the conductor 112b, the conductor 126b over the conductor 112b, and the conductor 129b over the conductor 126b. As in the light-emitting device 130R, all of the conductor 112b, the conductor 126b, and the conductor 129b can be referred to as a pixel electrode, or one or two of them can be referred to as a pixel electrode.

The light-emitting device 130B includes the conductor 112c, the conductor 126c over the conductor 112c, and the conductor 129c over the conductor 126c. As in the light-emitting device 130R and the light-emitting device 130G, all of the conductor 112c, the conductor 126c, and the conductor 129c can be referred to as a pixel electrode, or one or two of them can be referred to as a pixel electrode.

For the conductor 112a to the conductor 112c and the conductor 126a to the conductor 126c, a conductive layer functioning as a reflective electrode can be used, for example. For the conductive layer functioning as a reflective electrode, a conductor with high visible-light reflectance such as silver, aluminum, or an alloy film of silver (Ag), palladium (Pd), and copper (Cu) (an Ag—Pd—Cu (APC) film) can be used. The conductor 112a to the conductor 112c and the conductor 126a to the conductor 126c can each be a stacked-layer film in which a pair of titanium films sandwich aluminum (a film in which Ti, Al, and Ti are stacked in this order), or a stacked-layer film in which a pair of indium tin oxide films sandwich silver (a film in which ITO, Ag, and ITO are stacked in this order).

For example, a conductive layer functioning as a reflective electrode may be used for the conductor 112a to the conductor 112c, and a conductor with a high light-transmitting property may be used for the conductor 126a to the conductor 126c. Examples of the conductor with a high light-transmitting property include an alloy of silver and magnesium and indium tin oxide (sometimes referred to as ITO).

A conductive layer functioning as a transparent electrode can be used for the conductor 129a to the conductor 129c. For the conductive layer functioning as a transparent electrode, for example, the above-described conductor with a high light-transmitting property can be used.

A microcavity structure may be provided in the light-emitting device 130 to be described in detail later. The microcavity structure refers to a structure in which the distance between the bottom surface of the light-emitting layer and the top surface of a lower electrode is set to a thickness depending on a wavelength of color of light emitted from the light-emitting layer. In that case, a light-transmitting and light-reflective conductive material is preferably used for the conductor 129a to the conductor 129c serving as an upper electrode (a common electrode), and a light-reflective conductive material is preferably used for the conductor 112a to the conductor 112c and the conductor 126a to the conductor 126c which serve as lower electrodes (pixel electrodes).

The microcavity structure refers to a structure in which the optical distance between the lower electrode and the light-emitting layer is adjusted to be $(2n-1)\lambda/4$ (n is a natural number greater than or equal to 1, and $\lambda$ is a wavelength of emitted light to be amplified). Thus, light that is reflected back by the lower electrode (reflected light) considerably interferes with light that directly enters the upper electrode from the light-emitting layer (incident light). Accordingly, the phases of the reflected light and the incident light each having the wavelength $\lambda$ can be aligned with each other, and the light emitted from the light-emitting layer can be further amplified.

Meanwhile, in the case where the reflected light and the incident light each have a wavelength other than the wavelength $\lambda$, their phases are not aligned with each other, resulting in attenuation without resonation.

The conductor 112a is connected to the conductor 596 embedded in the insulator 594 through an opening formed in the insulator 599. The end portion of the conductor 112a is positioned on the outer side of the end portion of the conductor 126a. The end portion of the conductor 126a and the end portion of the conductor 129a are aligned or substantially aligned with each other.

Since the conductor 112b, the conductor 126b, and the conductor 129b of the light-emitting device 130G and the conductor 112c, the conductor 126c, and the conductor 129c of the light-emitting device 130B are similar to the conductor 112a, the conductor 126a, and the conductor 129a of the light-emitting device 130R, detailed description is omitted.

Depression portions are formed in the conductor 112a, the conductor 112b, and the conductor 112c to cover the openings provided in the insulator 599. A layer 128 is embedded in the depression portions.

The layer 128 has a function of filling the depression portions of the conductor 112a, the conductor 112b, and the conductor 112c. The conductor 126a, the conductor 126b, and the conductor 126c electrically connected to the conductor 112a, the conductor 112b, and the conductor 112c, respectively, are provided over the conductor 112a, the conductor 112b, and the conductor 112c and the layer 128. Thus, regions overlapping with the depression portions of the conductor 112a, the conductor 112b, and the conductor 112c can also be used as the light-emitting regions, increasing the aperture ratio of the pixels.

The layer 128 may be an insulating layer or a conductive layer. Any of a variety of inorganic insulating materials, organic insulating materials, and conductive materials can be used for the layer 128 as appropriate. In particular, the layer 128 is preferably formed using an insulating material.

An insulating layer containing an organic material can be suitably used for the layer 128.

For the layer 128, an acrylic resin, a polyimide resin, an epoxy resin, a polyamide resin, a polyimide-amide resin, a siloxane resin, a benzocyclobutene-based resin, a phenol resin, or a precursor of any of these resins can be used, for example. A photosensitive resin can also be used for the layer 128. As the photosensitive resin, a positive material or a negative material is given.

When a photosensitive resin is used, the layer 128 can be formed through only light-exposure and development steps, reducing the influence of dry etching or wet etching on the surfaces of the conductor 112a, the conductor 112b, and the conductor 112c. When the layer 128 is formed using a negative photosensitive resin, the layer 128 can sometimes be formed using the same photomask (light-exposure mask) as the photomask used for forming the opening in the insulator 599.

Figure 37A:
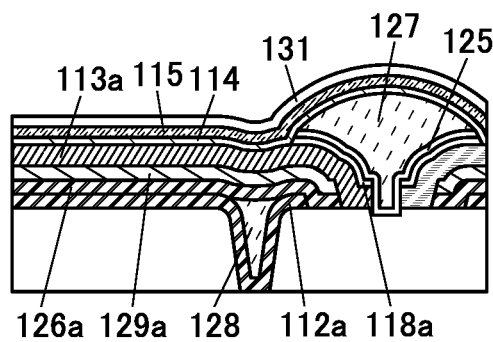
FIG. 37A to FIG. 37C are schematic cross-sectional views each illustrating a region of a structure example of a display apparatus.
Figure 37B:
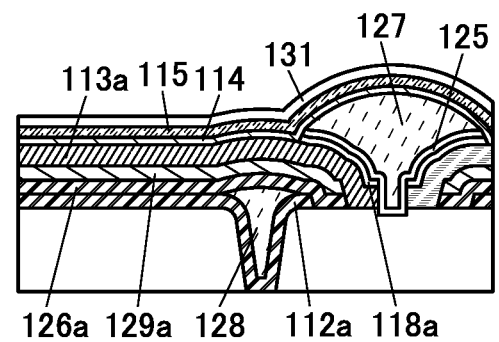
Figure 37C:
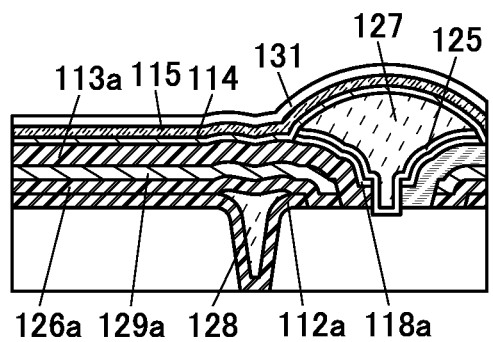

Although FIG. 36 illustrates an example where the top surface of the layer 128 includes a flat portion, the shape of the layer 128 is not particularly limited. FIG. 37A to FIG. 37C illustrate modification examples of the layer 128.

As illustrated in FIG. 37A and FIG. 37C, in the cross-sectional view, the top surface of the layer 128 can have a shape such that its center and the vicinity thereof are recessed, i.e., a shape including a concave surface.

As illustrated in FIG. 37B, in the cross-sectional view, the top surface of the layer 128 can have a shape in which its center and vicinity thereof rise, i.e., a shape including a convex surface.

The top surface of the layer 128 may include one or both of a convex surface and a concave surface. The number of convex surfaces and the number of concave surfaces included in the top surface of the layer 128 are not limited and can each be one or more.

The level of the top surface of the layer 128 and the level of the top surface of the conductor 112a may be the same or substantially the same, or may be different from each other.

For example, the level of the top surface of the layer 128 may be either lower or higher than the level of the top surface of the conductor 112a.

FIG. 37A can be said as an example where the layer 128 fits in the depression portion formed in the conductor 112a. By contrast, as illustrated in FIG. 37C, the layer 128 may exist also outside the depression portion formed in the conductor 112a, that is, the top surface of the layer 128 may extend beyond the depression portion.

The light-emitting device 130R includes a first layer 113a, the common layer 114 over the first layer 113a, and the common electrode 115 over the common layer 114. The light-emitting device 130G includes a second layer 113b, the common layer 114 over the second layer 113b, and the common electrode 115 over the common layer 114. The light-emitting device 130B includes a third layer 113c, the common layer 114 over the third layer 113c, and the common electrode 115 over the common layer 114.

The first layer 113a is formed to cover the top surface and side surface of the conductor 126a and the top surface and side surface of the conductor 129a. Similarly, the second layer 113b is formed to cover the top surface and side surface of the conductor 126b and the top surface and side surface of the conductor 129b. Similarly, the third layer 113c is formed to cover the top surface and side surface of the conductor 126c and the top surface and side surface of the conductor 129c. Accordingly, regions provided with the conductor 126a, the conductor 126b, and the conductor 126c can be entirely used as the light-emitting regions of the light-emitting device 130R, the light-emitting device 130G, and the light-emitting device 130B, respectively, increasing the aperture ratio of the pixels.

In the light-emitting device 130R, the first layer 113a and the common layer 114 can be collectively referred to as an EL layer. Similarly, in the light-emitting device 130G, the second layer 113b and the common layer 114 can be collectively referred to as an EL layer. Similarly, in the light-emitting device 130B, the third layer 113c and the common layer 114 can be collectively referred to as an EL layer.

There is no particular limitation on the structure of the light-emitting device in this embodiment, and the light-emitting device can have a single structure or a tandem structure.

The first layer 113a, the second layer 113b, and the third layer 113c each have an island shape after being processed by a photolithography method. At each of end portions of the first layer 113a, the second layer 113b, and the third layer 113c, an angle between the top surface and side surface is approximately 90°. By contrast, for example, an organic film formed using an FMM (Fine Metal Mask) tends to have a thickness that gradually decreases with decreasing distance to an end portion, and has the top surface forming a slope in an area extending greater than or equal to 1 μm and less than or equal to 10 μm from the end portion, for example; thus, such an organic film has a shape whose top surface and side surface cannot be easily distinguished from each other.

The top surface and side surface of each of the first layer 113a, the second layer 113b, and the third layer 113c are clearly distinguished from each other. Accordingly, as for the first layer 113a and the second layer 113b which are adjacent to each other, one of the side surfaces of the first layer 113a and one of the side surfaces of the second layer 113b face to each other. This applies to a combination of any two of the first layer 113a, the second layer 113b, and the third layer 113c.

The first layer 113a, the second layer 113b, and the third layer 113c each include at least alight-emitting layer. For example, a structure is preferable in which the first layer 113a includes a light-emitting layer that emits red light, the second layer 113b includes a light-emitting layer that emits green light, and the third layer 113c includes a light-emitting layer that emits blue light. Other than the above colors, cyan, magenta, yellow, or white can be employed for the light-emitting layers.

The first layer 113a, the second layer 113b, and the third layer 113c may each include one or more of a hole-injection layer, a hole-transport layer, a hole-blocking layer, a charge-generation layer, an electron-blocking layer, an electron-transport layer, and an electron-injection layer.

The first layer 113a, the second layer 113b, and the third layer 113c may each include a hole-injection layer, a hole-transport layer, a light-emitting layer, and an electron-transport layer, for example. In addition, an electron-blocking layer may be provided between the hole-transport layer and the light-emitting layer. Furthermore, an electron-injection layer may be provided over the electron-transport layer.

In each of the first layer 113a, the second layer 113b, and the third layer 113c an electron-injection layer, an electron-transport layer, a light-emitting layer, and a hole-transport layer may be stacked in this order, for example. In addition, a hole-blocking layer may be provided between the electron-transport layer and the light-emitting layer. Furthermore, a hole-injection layer may be provided over the hole-transport layer.

The first layer 113a, the second layer 113b, and the third layer 113c each preferably include a light-emitting layer and a carrier-transport layer (an electron-transport layer or a hole-transport layer) over the light-emitting layer. Since surfaces of the first layer 113a, the second layer 113b, and the third layer 113c may be exposed in the manufacturing process of the display apparatus, providing the carrier-transport layer over the light-emitting layers inhibits the light-emitting layers from being exposed on the outermost surface, so that damage to the light-emitting layers can be reduced. Accordingly, the reliability of the light-emitting devices and a light-receiving device can be improved.

Alternatively, the first layer 113a, the second layer 113b, and the third layer 113c may each include a first light-emitting unit, a charge-generation layer, and a second light-emitting unit, for example. It is preferable that the first layer 113a include two or more light-emitting units that emit red light, the second layer 113b include two or more light-emitting units that emit green light, and the third layer 113c include two or more light-emitting units that emit blue light, for example.

The second light-emitting unit preferably includes a light-emitting layer and a carrier-transport layer (an electron-transport layer or a hole-transport layer) over the light-emitting layer.

Since the surface of the second light-emitting unit is exposed in the manufacturing process of the display apparatus, providing the carrier-transport layer over the light-emitting layer inhibits the light-emitting layer from being exposed on the outermost surface, so that damage to the light-emitting layer can be reduced. Accordingly, the reliability of the light-emitting device can be improved.

The common layer 114 includes, for example, an electron-injection layer or a hole-injection layer. Alternatively, the common layer 114 may include a stack of an electron-transport layer and an electron-injection layer, or may include a stack of a hole-transport layer and a hole-injection layer. The common layer 114 is shared by the light-emitting device 130R, the light-emitting device 130G, and the light-emitting device 130B.

The common electrode 115 is shared by the light-emitting device 130R, the light-emitting device 130G, and the light-emitting device 130B. As illustrated in FIG. 36, the common electrode 115 shared by the plurality of light-emitting devices is electrically connected to a conductor included in the connection portion 140.

The side surfaces of the first layer 113a, the second layer 113b, and the third layer 113c are covered with the insulator 125 and the insulator 127. The mask layer 118a is positioned between the first layer 113a and the insulator 125. The mask layer 118a is positioned between the second layer 113b and the insulator 125, and the mask layer 118a is positioned between the third layer 113c and the insulator 125. The common layer 114 is provided over the first layer 113a, the second layer 113b, the third layer 113c, the insulator 125, and the insulator 127, and the common electrode 115 is provided over the common layer 114. The common layer 114 and the common electrode 115 are each a continuous film shared by a plurality of light-emitting devices.

The insulator 125 can be an insulating layer containing an inorganic material. As the insulator 125, one or more inorganic insulating films selected from an oxide insulating film, a nitride insulating film, an oxynitride insulating film, and a nitride oxide insulating film can be used, for example. The insulator 125 may have a single-layer structure or a stacked-layer structure.

Examples of the oxide insulating film include a silicon oxide film, an aluminum oxide film, a magnesium oxide film, an indium-gallium-zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, an aluminum oxide film is preferable because it has high selectivity with respect to the EL layer in an etching step and has a function of protecting the EL layer when the later-described insulator 127 is formed. When an inorganic insulating film such as an aluminum oxide film, a hafnium oxide film, or a silicon oxide film is formed by an ALD method as the insulator 125, the insulator 125 can have few pinholes and an excellent function of protecting the EL layer. The insulator 125 may have a stacked-layer structure of a film formed by an ALD method and a film formed by a sputtering method. The insulator 125 may have a stacked-layer structure of an aluminum oxide film formed by an ALD method and a silicon nitride film formed by a sputtering method, for example.

The insulator 125 preferably has a function of a barrier insulating layer against one or both of one of water and oxygen. Alternatively, the insulator 125 preferably has a function of inhibiting diffusion of one or both of water and oxygen. Alternatively, the insulator 125 preferably has a function of capturing or fixing (also referred to as gettering) one or both of water and oxygen.

When the insulator 125 has a function of a barrier insulating layer or a gettering function, entry of impurities (typically, one or both of water and oxygen) that would diffuse into the light-emitting devices from the outside can be inhibited. With this structure, a highly reliable light-emitting device and a highly reliable display panel can be provided.

The insulator 125 preferably has a low impurity concentration. Accordingly, degradation of the EL layer, which is caused by entry of impurities into the EL layer from the insulator 125, can be inhibited. In addition, when the impurity concentration is reduced in the insulator 125, a barrier property against one or both of water and oxygen can be increased. For example, it is desirable that one or both of the hydrogen concentration and the carbon concentration in the insulator 125 be sufficiently low.

As the insulator 127, an insulating layer containing an organic material can be favorably used. As the organic material, a photosensitive organic resin is preferably used; for example, a photosensitive resin composition containing an acrylic resin may be used. The viscosity of the material of the insulator 127 is greater than or equal to 1 cP and less than or equal to 1500 cP, and is preferably greater than or equal to 1 cP and less than or equal to 12 cP. By setting the viscosity of the material of the insulator 127 in the above-described range, the insulator 127 having a tapered shape, which is to be described later, can be formed relatively easily. Note that in this specification and the like, an acrylic resin refers to not only a polymethacrylic acid ester or a methacrylic resin, but also all the acrylic polymer in a broad sense in some cases.

Note that the organic material that can be used for the insulator 127 is not limited to the above as long as the insulator 127 has a tapered side surface as described later. For the insulator 127, an acrylic resin, a polyimide resin, an epoxy resin, an imide resin, a polyamide resin, a polyimide-amide resin, a silicone resin, a siloxane resin, a benzocyclobutene-based resin, a phenol resin, or precursors of these resins can be used in some cases, for example. Alternatively, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin can be employed for the insulator 127 in some cases. For the insulator 127, for example, a photoresist can be used as the photosensitive resin in some cases. Note that as the photosensitive resin, a positive material or a negative material can be used.

For the insulator 127, a material absorbing visible light may be used. When the insulator 127 absorbs light from the light-emitting device, leakage of light (stray light) from the light-emitting device to the adjacent light-emitting device through the insulator 127 can be inhibited. Thus, the display quality of the display panel can be improved. Since the display quality of the display panel can be improved without using a polarizing plate, the weight and thickness of the display panel can be reduced.

Examples of the material absorbing visible light include materials containing pigment of black or the like, materials containing dye, light-absorbing resin materials (e.g., polyimide), and resin materials that can be used for color filters (color filter materials). Using a resin material obtained by stacking or mixing color filter materials of two colors or three or more colors is particularly preferred, in which case the effect of blocking visible light can be enhanced. In particular, mixing color filter materials of three or more colors enables the formation of a black or nearly black resin layer.

For example, the insulator 127 can be formed by a wet deposition method such as spin coating, dipping, spray coating, ink-jetting, dispensing, screen printing, offset printing, doctor blade coating, slit coating, roll coating, curtain coating, or knife coating. Specifically, an organic insulating film that is to be the insulator 127 is preferably formed by spin coating.

The insulator 127 is formed at a temperature lower than the heat resistance temperature of the EL layer. The typical substrate temperature in formation of the insulator 127 is lower than or equal to 200° C., preferably lower than or equal to 180° C., further preferably lower than or equal to 160° C., still further preferably lower than or equal to 150° C., yet still further preferably lower than or equal to 140° C.

The description is made below on the structure of the insulator 127 or the like using the structure of the insulator 127 between the light-emitting device 130R and the light-emitting device 130G as an example. Note that the same applies to the insulator 127 between the light-emitting device 130G and the light-emitting device 130B, the insulator 127 between the light-emitting device 130B and the light-emitting device 130R, and the like. The description made below sometimes using an end portion of the insulator 127 over the second layer 113b as an example applies to an end portion of the insulator 127 over the first layer 113a and an end portion of the insulator 127 over the third layer 113c.

In a cross-sectional view of the display apparatus, the side surface of the insulator 127 preferably has a tapered shape with the taper angle θ1. The taper angle θ1 is an angle formed by the side surface of the insulator 127 and the substrate surface. Note that the taper angle θ1 is not limited to the angle with the substrate surface, and may be an angle formed by the side surface of the insulator 127 and the top surface of the flat portion of the insulator 125 or the top surface of the flat portion of the second layer 113b. When the side surface of the insulator 127 has a tapered shape, the side surface of the insulator 125 and the side surface of the mask layer 118a also have a tapered shape in some cases.

The taper angle θ1 of the insulator 127 is less than 90°, preferably less than or equal to 60°, and further preferably less than or equal to 45°. Such a forward tapered shape of the end portion of the side surface of the insulator 127 can prevent disconnection, local thinning, or the like from occurring in the common layer 114 and the common electrode 115 which are provided over the end portion of the side surface of the insulator 127, leading to film formation with good coverage. The common layer 114 and the common electrode 115 can have improved in-plane uniformity in this manner, whereby the display apparatus can have improved display quality.

The top surface of the insulator 127 preferably has a convex shape in a cross-sectional view of the display apparatus. The top surface of the insulator 127 preferably has a convex shape that bulges gradually toward the center. The insulator 127 preferably has a shape such that the projecting portion at the center portion of the top surface is connected smoothly to the tapered portion of the end portion of the side surface. When the insulator 127 has such a shape, the common layer 114 and the common electrode 115 can be deposited with good coverage over the whole the insulator 127.

The insulator 127 is formed in a region between two EL layers (e.g., a region between the first layer 113a and the second layer 113b). At this time, part of the insulator 127 is placed at a position sandwiched between an end portion of the side surface of one of the EL layers (e.g., the first layer 113a) and an end portion of the side surface of the other of the EL layers (e.g., the second layer 113b).

One end portion of the insulator 127 preferably overlaps with the conductor 126a serving as a pixel electrode, and the other end portion of the insulator 127 preferably overlaps with the conductor 126b serving as a pixel electrode. With such a structure, the end portion of the insulator 127 can be formed over a substantially flat region of the first layer 113a (the second layer 113b). This makes it relatively easy to process the tapered shape of the insulator 127 as described above.

By providing the insulator 127 and the like in the above manner, a disconnected portion and a locally thinned portion can be prevented from being formed in the common layer 114 and the common electrode 115 from a substantially flat region in the first layer 113a to a substantially flat region in the second layer 113b. Thus, between the light-emitting devices, a connection defect caused by the disconnected portion and an increase in electric resistance caused by the locally thinned portion can be inhibited from occurring in the common layer 114 and the common electrode 115.

In the display apparatus of this embodiment, the distance between the light-emitting devices can be short. Specifically, the distance between the light-emitting devices, the distance between the EL layers, or the distance between the pixel electrodes can be less than 10 μm, less than or equal to 8 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus of this embodiment includes a region where a distance between two adjacent island-shaped EL layers is less than or equal to 1 μm, preferably less than or equal to 0.5 μm (500 nm), further preferably less than or equal to 100 nm. The distance between light-emitting devices is shortened in this manner, whereby a display apparatus with high resolution and a high aperture ratio can be provided.

A protective layer 131 is provided over the light-emitting device 130R, the light-emitting device 130G, and the light-emitting device 130B. The protective layer 131 is a film serving as a passivation film for protecting the light-emitting devices 130. Provision of the protective layer 131 covering the light-emitting device can inhibit an impurity such as water and oxygen from entering the light-emitting device, and increase the reliability of the light-emitting device 130.

For the protective layer 131, aluminum oxide, silicon nitride, or silicon nitride oxide can be used, for example.

The protective layer 131 and the substrate 110 are bonded to each other with an adhesive layer 107. A solid sealing structure, a hollow sealing structure, or the like can be employed to seal the light-emitting devices. In FIG. 36, a solid sealing structure is employed in which a space between the substrate 310 and the substrate 110 is filled with the adhesive layer 107. Alternatively, a hollow sealing structure in which the space is filled with an inert gas (e.g., nitrogen or argon) may be employed. Here, the adhesive layer 107 may be provided not to overlap with the light-emitting devices. The space may be filled with a resin other than the frame-shaped adhesive layer 107.

For the adhesive layer 107, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-liquid-mixture-type resin may be used. An adhesive sheet may be used.

The display apparatus 1000 has a top-emission structure. Light from the light-emitting device is emitted toward the substrate 110 side. Thus, for the substrate 110, a material having a high visible-light-transmitting property is preferably used. For example, a substrate having a high visible-light-transmitting property may be selected as the substrate 110 among substrates usable as the substrate 310 and the substrate BS. The pixel electrode contains a material that reflects visible light, and a counter electrode (the common electrode 115) contains a material that transmits visible light.

When the above structure example is applied to a display apparatus, the display apparatus having high resolution and high definition can be achieved. Specifically, for example, a display apparatus with a resolution of HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320) can be achieved in some cases. Furthermore, specifically, for example, a display apparatus with a definition of greater than or equal to 100 ppi, greater than or equal to 300 ppi, greater than or equal to 500 ppi, greater than or equal to 1000 ppi, greater than or equal to 2000 ppi, greater than or equal to 3000 ppi, or greater than or equal to 5000 ppi can be achieved in some cases.

Note that the display apparatus of one embodiment of the present invention is not limited to the structure of the display apparatus 1000 illustrated in FIG. 36. The display apparatus of one embodiment of the present invention may have the structure of the display apparatus 1000 in FIG. 36 on which some modification is performed as appropriate. A modification example of the display apparatus in FIG. 36, which is the display apparatus of one embodiment of the present invention, is described below.

Structure Example 2 of Display Apparatus

Figure 38:
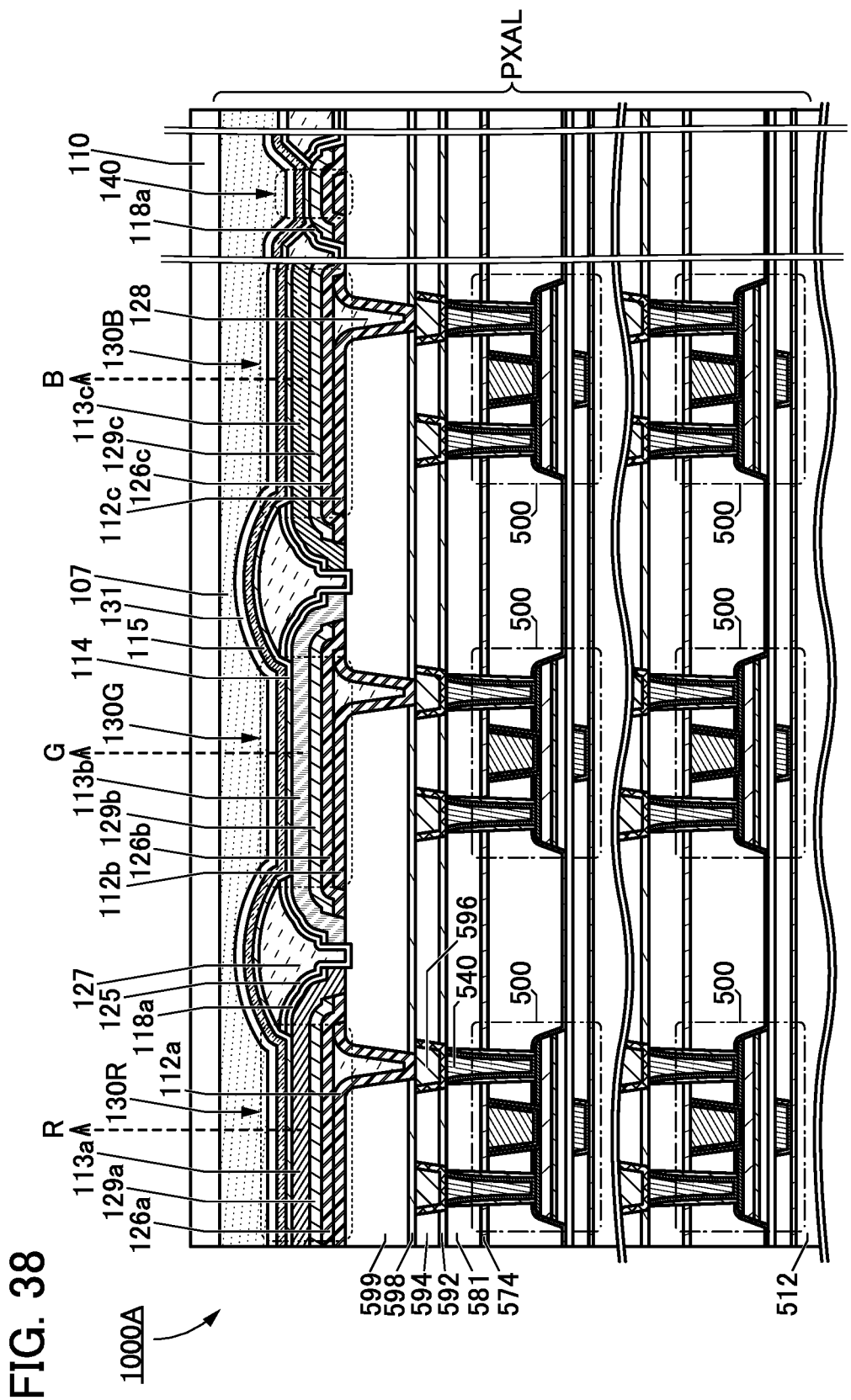
FIG. 38 is a schematic cross-sectional view illustrating a structure example of a display apparatus.

For example, the pixel layer PXAL in the display apparatus 1000 illustrated in FIG. 36 may have a structure in which transistors 500 are stacked in two or more layers. A display apparatus 1000A illustrated in FIG. 38 shows a structure example where the transistors 500 included in the pixel layer PXAL of the display apparatus 1000 in FIG. 36 are stacked in two layers. Note that FIG. 38 illustrates only the pixel layer PXAL in the display apparatus 1000A, and for the circuit layer SICL and the wiring layer LINL, the structure of the display apparatus 1000 in FIG. 36 is referred to.

In the case where the number of transistors included in a pixel is increased in the display apparatus 1000, the structure of the display apparatus 1000A in FIG. 38 can be employed.

Structure Example 3 of Display Apparatus

Figure 39:
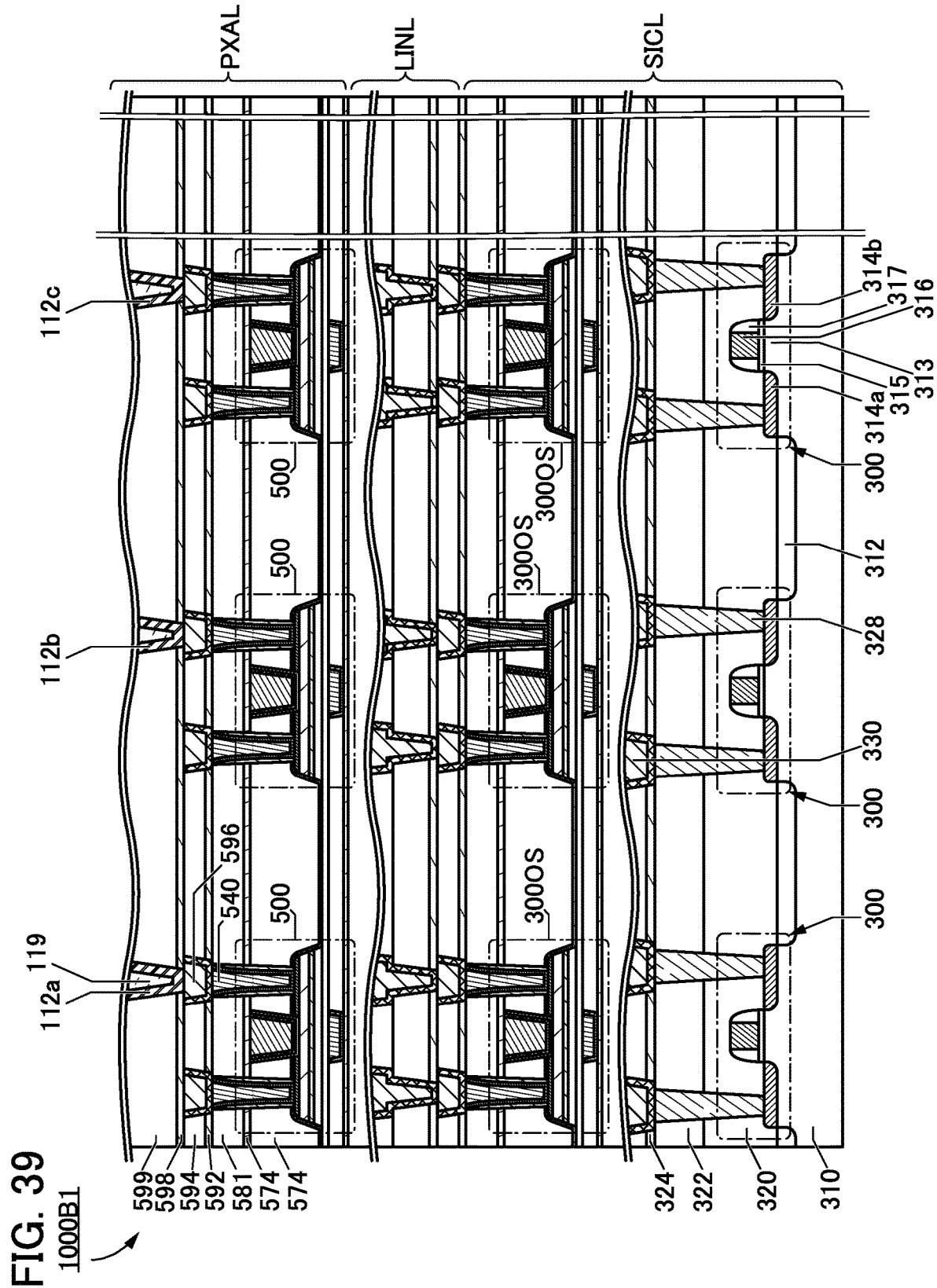
FIG. 39 is a schematic cross-sectional view illustrating a structure example of a display apparatus.

For example, in the circuit layer SICL in the display apparatus 1000 illustrated in FIG. 36, OS transistors may be stacked over the transistors 300. A display apparatus 1000B1 illustrated in FIG. 39 shows a structure example where transistors 3000S, which are OS transistors, are stacked over the transistors 300 in the circuit layer SICL of the display apparatus 1000 in FIG. 36. Note that the display apparatus 1000B1 illustrated in FIG. 39 illustrates the circuit layer SICL, the wiring layer LINL, and only the layer of the pixel layer PXAL including the transistors 500; thus, for the layer of the pixel layer PXAL including light-emitting devices, the structure of the display apparatus 1000 in FIG. 36 is referred to.

Since a p-type semiconductor is difficult to form with use of a metal oxide in terms of mobility and reliability, a circuit formed with OS transistors becomes a single-polarity circuit with n-channel transistors in many cases. In view of this, in the structure of the display apparatus 1000B1 in FIG. 39, an n-channel transistor is used as the transistor 3000S and a p-channel transistor is used as the transistor 300, whereby a circuit included in the circuit layer SICL in FIG. 39 can be a CMOS circuit. In particular, a circuit in which an n-channel transistor is used as the OS transistor and a p-channel transistor is used as the Si transistor is referred to as LTPO in some cases.

For example, the circuit layer SICL in the display apparatus 1000 in FIG. 36 may include OS transistors instead of the transistors 300. A display apparatus 1000B2 illustrated in FIG. 40 shows a structure example where the transistors 3000S, which are OS transistors, are formed in the circuit layer SICL in the display apparatus 1000 in FIG. 36, instead of the transistors 300.

Figure 40:
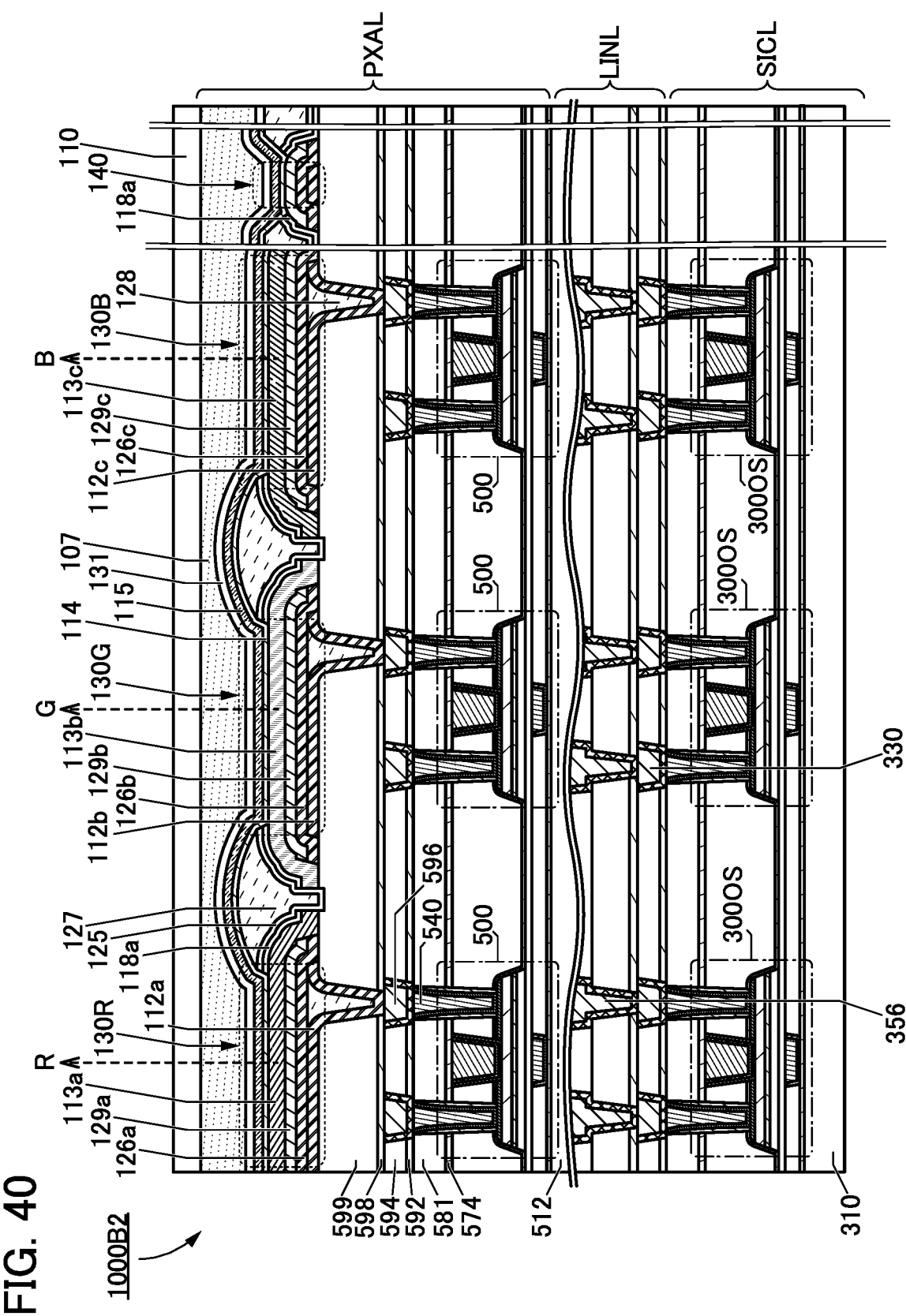
FIG. 40 is a schematic cross-sectional view illustrating a structure example of a display apparatus.

Note that in the display apparatus 1000B2 illustrated in FIG. 40, a substrate other than the semiconductor substrate can also be used as the substrate 310. For example, any of the following can be used as the substrate 310: a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, and paper and a base film each including a fibrous material. Note that in the case where the manufacturing process of the display apparatus includes heat treatment, a highly heat-resistant material is preferably selected for the substrate 310.

For example, the circuit layer SICL in the display apparatus 1000 in FIG. 36 may include a transistor including low-temperature polysilicon in a channel formation region (hereinafter referred to as an LTPS transistor) instead of the transistors 300. A display apparatus 1000B3 illustrated in FIG. 41 shows a structure example where transistors 300LT, which are LTPS transistors, are formed in the circuit layer SICL in the display apparatus 1000 in FIG. 36, instead of the transistors 300.

The transistor 300LT is provided over the substrate 310. The transistor 300LT includes an insulator 361, an insulator 362, an insulator 363, an insulator 364, a conductor 366, a conductor 367, a low-resistance region 368p, a semiconductor region 368i, and a conductor 369. Here, a plurality of layers obtained by processing the same conductive film are shown with the same hatching pattern. In this specification and the like, the low-resistance region 368p and the semiconductor region 368i are collectively referred to as a semiconductor layer 368. In particular, when, for example, low-temperature polysilicon is used as a semiconductor material contained in the semiconductor layer 368, the transistor 300LT can be an LTPS transistor. The LTPS transistor has high field-effect mobility and excellent frequency characteristics.

Figure 41:
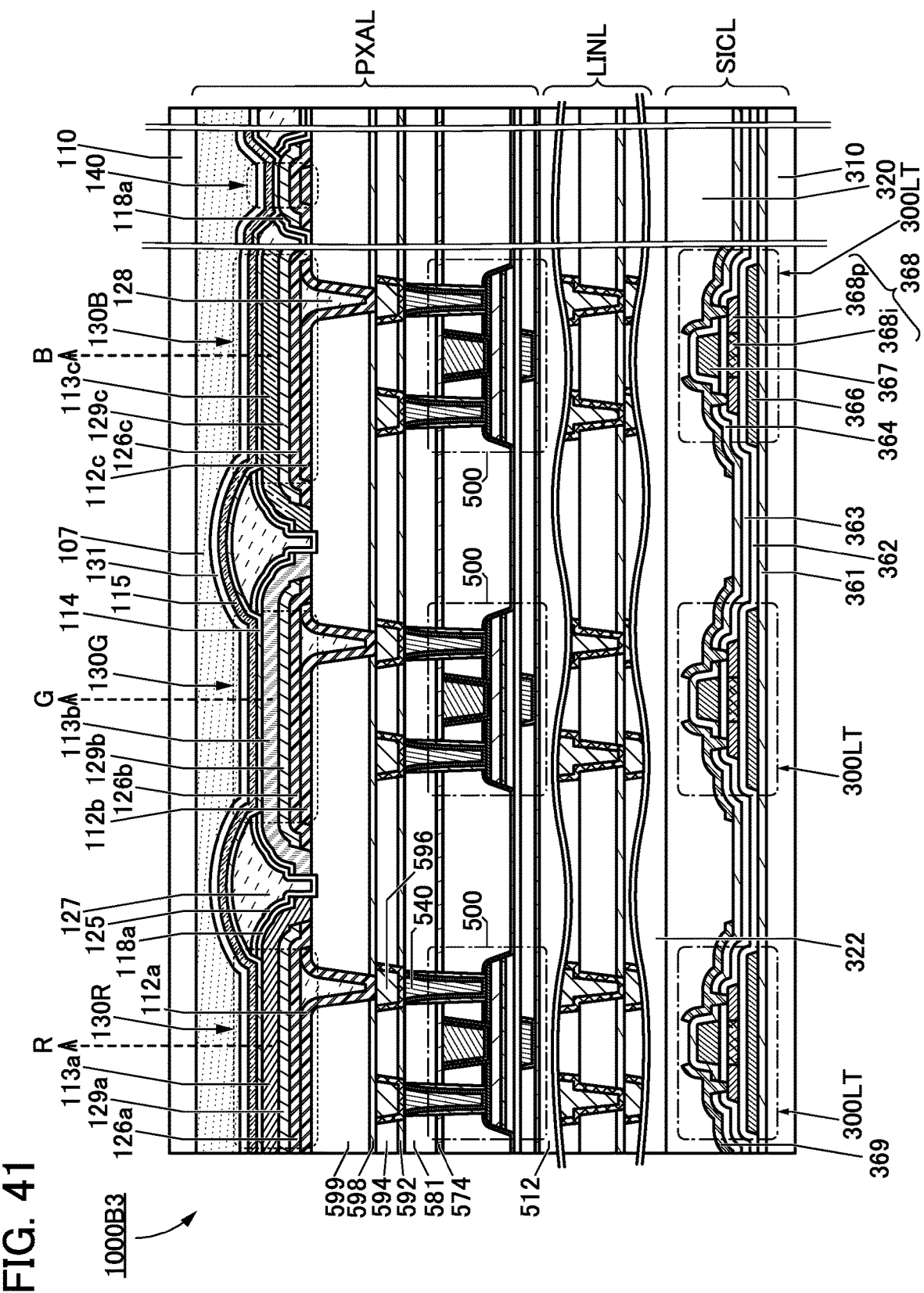
FIG. 41 is a schematic cross-sectional view illustrating a structure example of a display apparatus.

In FIG. 41, the conductor 367 serves as a first gate (sometimes referred to as one of a gate and a back gate) of the transistor 300LT. The conductor 366 serves as a second gate (sometimes referred to as the other of the gate and the back gate) of the transistor 300LT. One of the pair of low-resistance regions 368p in the semiconductor layer 368 serves as one of a source and a drain of the transistor 300LT, and the other of the pair of low-resistance regions 368p in the semiconductor layer 368 serves as the other of the source and the drain of the transistor 300LT. The insulator 363 serves as a first gate insulating film in the transistor 300LT, and the insulator 362 serves as a second gate insulating film in the transistor 300LT.

In FIG. 41, the insulator 361 is formed over the substrate 310. The conductor 366 is formed in a region over the insulator 361. The insulator 362 is formed to cover the insulator 361 and the conductor 366. The semiconductor layer 368 is formed in a region overlapping with the conductor 366 and the insulator 362 and being over the insulator 362. The insulator 363 is formed to cover the insulator 362 and the semiconductor layer 368. The conductor 367 is formed in a region overlapping with the conductor 366, the insulator 362, the semiconductor layer 368, and the insulator 363 and being over the insulator 363. The insulator 364 is formed to cover the insulator 363 and the conductor 367. An opening portion is formed in the insulator 363 and the insulator 364 in regions overlapping with the low-resistance region 368p, and the conductor 369 is formed over the insulator 364 to fill the opening portion.

For the insulator 361, the insulator 362, the insulator 363, and the insulator 364, one or more selected from silicon oxide, silicon oxynitride, silicon nitride oxide, silicon nitride, aluminum oxide, aluminum oxynitride, aluminum nitride oxide, or aluminum nitride may be used.

In particular, a barrier insulating film that inhibits diffusion of impurities (e.g., a metal ion, a metal atom, an oxygen atom, an oxygen molecule, a hydrogen atom, a hydrogen molecule, and a water molecule) from a region below the insulator 361 (e.g., the substrate 310) is preferably used as the insulator 361.

The low-resistance region 368p is a region containing an impurity element. For example, in the case where the transistor 300LT is an n-channel transistor, phosphorus or arsenic is added to the low-resistance region 368p. In contrast, in the case where the transistor 300LT is a p-channel transistor, boron or aluminum is added to the low-resistance region 368p. In addition, in order to control the threshold voltage of the transistor 300LT, the above-described impurity may be added to the semiconductor region 368i.

Note that the transistor 300LT may be either a p-channel transistor or an n-channel transistor. Alternatively, a plurality of the transistors 300LT may be provided in the circuit layer SICL and both the p-channel transistor and the n-channel transistor may be used.

For the conductor 366 and the conductor 367, a metal such as aluminum, titanium, chromium, nickel, copper, yttrium, zirconium, molybdenum, silver, tantalum, or tungsten can be used, for example. Alternatively, for the conductor 366 and the conductor 367, an alloy containing two or more selected from the above metals as its main components can be used. Alternatively, for the conductor 366 and the conductor 367, a light-transmitting conductive material such as indium oxide, indium tin oxide (ITO), indium oxide containing tungsten, indium zinc oxide containing tungsten, indium oxide containing titanium, ITO containing titanium, indium zinc oxide, zinc oxide (ZnO), ZnO containing gallium, or indium tin oxide containing silicon can be used. Alternatively, for the conductor 366 and the conductor 367, silicide (e.g., nickel silicide) or a semiconductor (e.g., polycrystalline silicon or an oxide semiconductor) whose resistance is lowered by, for example, containing an impurity element may be used. Alternatively, for the conductor 366 and the conductor 367, a film containing graphene can be used. The film containing graphene can be formed, for example, by reducing a film containing graphene oxide. Alternatively, a conductive paste (e.g., a conductive paste containing silver, carbon, or copper) or a conductive polymer (e.g., polythiophene) may be used for forming the conductor 366 and the conductor 367. A conductive paste is preferable because it is inexpensive. A conductive polymer is preferable because it is easily applied. Alternatively, the conductor 366, the conductor 367, or both can have a single-layer structure or a stacked-layer structure.

The conductor 369 serves as a wiring electrically connected to the low-resistance region 368p of the transistor 300LT. That is, the conductor 369 serves as a source or a drain of the transistor 300LT. Note that for the conductor 369, any of the materials usable for the conductor 366 and the conductor 367 can be used.

The circuit layer SICL in the display apparatus 1000 illustrated in FIG. 36 may have a structure in which a plurality of substrates are attached to each other, for example. The circuit layer SICL in a display apparatus 1000B4 illustrated in FIG. 42 includes the substrate 310 and a substrate 310A and has a structure in which the upper surface of the substrate 310 and the bottom surface of the substrate 310A are attached to each other. Note that FIG. 42 illustrates the circuit layer SICL and only the layer of the pixel layer PXAL including the transistors 500; thus, for the wiring layer LINL and the layer of the pixel layer PXAL including light-emitting devices, the structure of the display apparatus 1000 in FIG. 36 is referred to.

Figure 42:
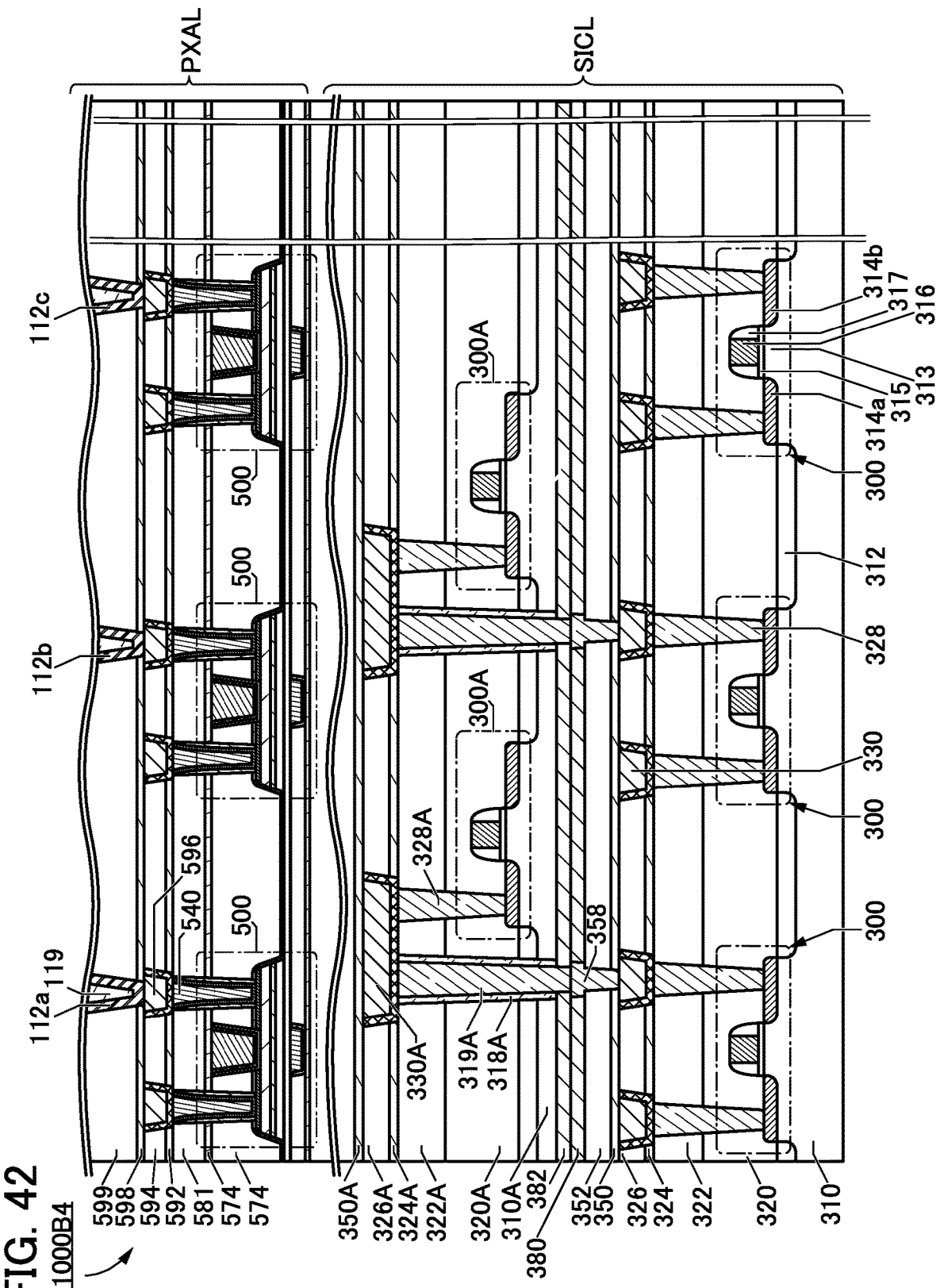
FIG. 42 is a schematic cross-sectional view illustrating a structure example of a display apparatus.

For the components from the substrate 310 to the insulator 326 and the conductor 330 in the display apparatus 1000B4 in FIG. 42, the description of the display apparatus 1000 in FIG. 36 is referred to.

As in the display apparatus 1000 in FIG. 36, the insulator 350 and the insulator 352 are formed in this order over the insulator 326 and the conductor 330.

An opening portion is formed in regions of the insulator 350 and the insulator 352 which overlap with part of the conductor 330, and the conductor 358 is embedded to fill the opening portion. The conductor 358 is also formed over the insulator 352. After that, the conductor 358 is patterned into a form of a wiring, a terminal, or a pad through an etching step or the like.

For the conductor 358, for example, copper, aluminum, tin, zinc, tungsten, silver, platinum, or gold can be used. The conductor 358 preferably contains the same component as the material used for a later-described conductor 319A.

Then, an insulator 380 is deposited to cover the insulator 352 and the conductor 358 and is subsequently subjected to, for example, planarization treatment by a chemical mechanical polishing (CMP) method until the conductor 358 is exposed. In this manner, the conductor 358 can be formed over the substrate 310 as a wiring, a terminal, or a pad.

For the insulator 380, a film that inhibits diffusion of impurities such as water and hydrogen (a film having a barrier property) is preferably used. In other words, for the insulator 380, any of the materials usable for the insulator 324 is preferably used. Like the insulator 326, the insulator 380 may be formed using an insulator having a relatively low dielectric constant to reduce the parasitic capacitance generated between wirings, for example. In other words, for the insulator 380, any of the materials usable for the insulator 326 may be used. The insulator 380 preferably contains the same component as the material used for an insulator 382 to be described later.

Next, the substrate 310A is described. As the substrate 310A, a semiconductor substrate usable as the substrate 310 can be used, for example.

Transistors, insulators, and conductors are formed over the substrate 310A as over the substrate 310. Specifically, transistors 300A are formed over the substrate 310A, an insulator 320A is formed to cover the transistors 300A, and an insulator 322A, an insulator 324A, an insulator 326A, and an insulator 350A are formed in this order over the insulator 320A. Note that for the insulator 320A, a material usable for the insulator 320 can be used. Similarly, for the insulator 322A, a material usable for the insulator 322 can be used; for the insulator 324A, a material usable for the insulator 324 can be used; for the insulator 326A, a material usable for the insulator 326 can be used; and for the insulator 350A, a material usable for the insulator 350 can be used.

Like the conductor 328, a conductor 328A serving as a plug or a wiring is embedded in the insulator 320A and the insulator 322A. Like the conductor 330, a conductor 330A serving as a plug or a wiring is embedded in the insulator 324A and the insulator 326A. Note that for the conductor 328A, a material usable for the conductor 328 can be used, and for the conductor 330A, a material usable for the conductor 330 can be used.

For the components above the insulator 350A in the display apparatus 1000B4, the description of the display apparatus 1000 is referred to.

The insulator 382 is formed on a surface of the substrate 310A opposite to a surface where the transistor 300A is formed. For the insulator 382, a material usable for the insulator 380 can be used, as described above.

In addition to the opening portion in which the conductor 328A is formed, an opening portion is formed in the insulator 320A and the insulator 322A in a region overlapping with the conductor 358. The opening portion formed in the region overlapping with the conductor 358 has the side surface provided with an insulator 318A, and the conductor 319A is formed in a remaining space of the opening portion. In particular, the conductor 319A is sometimes referred to as a TSV (Through Silicon Via).

For the conductor 319A, a material usable for the conductor 358 can be used, as described above. The insulator 318A has a function of insulating the conductor 319A from the substrate 310A, for example. Note that for the insulator 318A, for example, any of the materials usable for the insulator 320 or the insulator 324 is preferably used.

The insulator 380 and the conductor 358 serve as bonding layers for the substrate 310 side, and the insulator 382 and the conductor 319A serve as bonding layers for the substrate 310A side. That is, the insulator 380 and the conductor 358 that are formed over the substrate 310 can be bonded to the insulator 382 and the conductor 319A that are formed on the substrate 310A in a bonding step, for example.

Before the bonding step, for example, planarization treatment is performed to make surfaces of the insulator 380 and the conductor 358 level with each other on the substrate 310 side.

In a similar manner, planarization treatment is performed to make the insulator 382 and the conductor 319A level with each other on the substrate 310A side.

In the bonding step, for bonding of the insulator 380 and the insulator 382, i.e., bonding of insulating layers, hydrophilic bonding or the like can be employed in which, after high planarity is obtained by polishing (e.g., a chemical mechanical polishing (CMP) method), the surfaces are subjected to hydrophilicity treatment with oxygen plasma or the like, arranged in contact with and bonded to each other temporarily, and then dehydrated by heat treatment to perform final bonding.

The hydrophilic bonding can also cause bonding at an atomic level; thus, bonding with excellent mechanical strength can be obtained.

When bonding of the conductor 358 and the conductor 319A, i.e., bonding of the conductors, is performed, a surface activated bonding method can be employed in which an oxide film, a layer adsorbing impurities, and the like on the surface are removed by sputtering treatment or the like and the cleaned and activated surfaces are brought into contact to be bonded to each other. Alternatively, a diffusion bonding method in which the surfaces are bonded to each other by using temperature and pressure together can be employed. Both methods cause bonding at an atomic level; thus, not only electrically but also mechanically excellent bonding can be obtained.

Through the above-described bonding step, the conductor 358 on the substrate 310 side can be electrically connected to the conductor 319A on the substrate 310A side. In addition, mechanically strong connection can be established between the insulator 380 on the substrate 310 side and the insulator 382 on the substrate 310A side.

In the case where the substrate 310 and the substrate 310A are bonded to each other, the insulating layers and the metal layers coexist on their bonding surfaces; thus, the surface activated bonding method and the hydrophilic bonding method are performed in combination, for example.

For example, it is possible to employ a method in which the surfaces are made clean after polishing, the surfaces of the metal layers are subjected to antioxidant treatment and hydrophilicity treatment, and then bonding is performed. Alternatively, hydrophilicity treatment may be performed with the metal layers having surfaces of a hardly oxidizable metal such as gold.

Note that the substrate 310 and the substrate 310A may be bonded by a bonding method different from the above-described methods. For example, as a method for bonding the substrate 310 and the substrate 310A, a flip-chip bonding method may be employed. In the case of employing a flip-chip bonding method, a connection terminal such as a bump may be provided above the conductor 358 on the substrate 310 side or provided below the conductor 319A on the substrate 310A side. Flip-chip bonding can be performed by, for example, injecting a resin containing anisotropic conductive particles between the insulator 380 and the insulator 382 and between the conductor 358 and the conductor 319A, or by using a Sn—Ag solder. Alternatively, an ultrasonic wave bonding method can be employed in the case where the bump and a conductor connected to the bump are gold. To reduce thermal stress or physical stress such as an impact, the above-described flip-chip bonding method may be combined with injection of an underfill agent between the insulator 380 and the insulator 382 and between the conductor 358 and the conductor 319A. Furthermore, a die bonding film may be used in bonding of the substrate 310 and the substrate 310A, for example.

Structure Example 4 of Display Apparatus

Figure 43A:
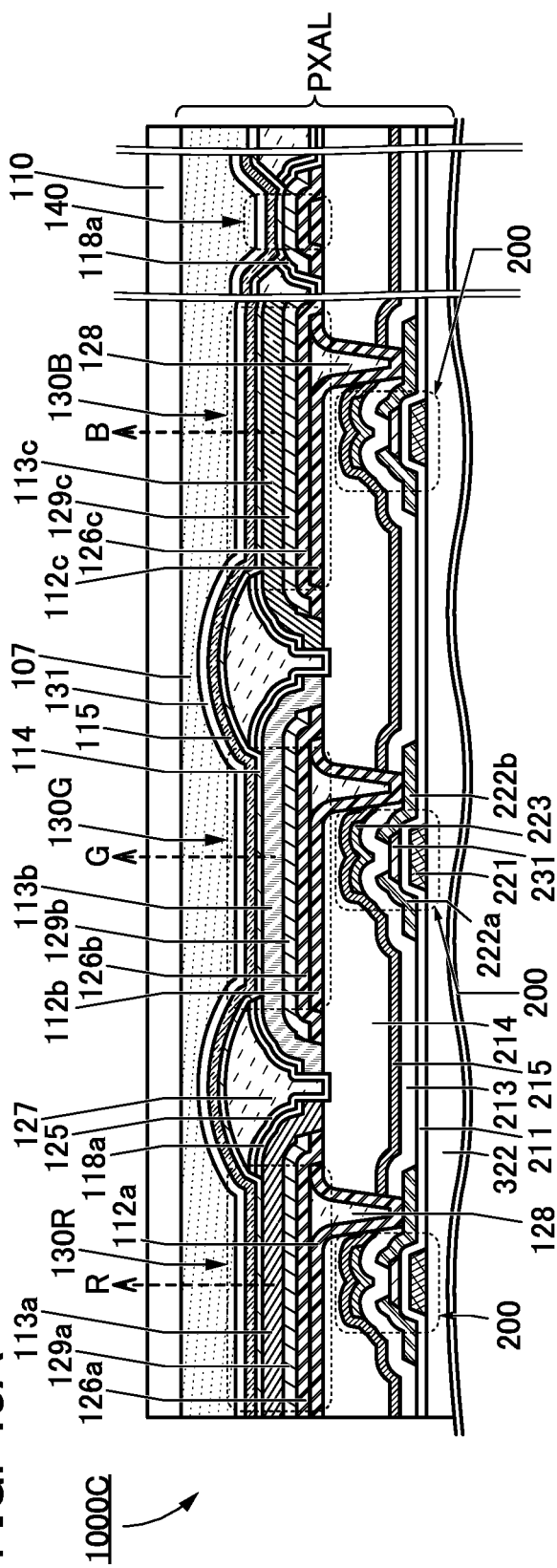
FIG. 43A is a schematic cross-sectional view illustrating a structure example of a display apparatus.

The transistor 500 included in the pixel layer PXAL of the display apparatus 1000 illustrated in FIG. 36 may be a transistor having a different structure, for example. A display apparatus 1000C illustrated in FIG. 43A shows a structure example where a transistor 200 that is a BGTC (Bottom-Gate Top-Contact) transistor is used instead of the transistor 500 in the display apparatus 1000 in FIG. 36. Note that FIG. 43A illustrates only the pixel layer PXAL in the display apparatus 1000C, and for the circuit layer SICL and the wiring layer LINL, the structure of the display apparatus 1000 in FIG. 36 is referred to.

In the display apparatus 1000C in FIG. 43A, the insulator 322 is provided above the wiring layer LINL.

For the insulator 322, a material usable for the insulator 320 can be used.

A plurality of transistors 200 are formed over the insulator 322. The plurality of transistors 200 can be fabricated using the same material in the same step, for example.

An insulator 211, an insulator 213, an insulator 215, and an insulator 214 are provided in this order over the insulator 322. Part of the insulator 211 functions as a gate insulating layer of each transistor. Part of the insulator 213 functions as a gate insulating layer of each transistor. The insulator 215 is provided to cover the transistors. The insulator 214 is provided to cover the transistors and has a function of a planarization layer. Note that the number of gate insulating layers and the number of insulating layers covering the transistors are not limited and may each be one or two or more.

A material through which impurities such as water and hydrogen do not easily diffuse is preferably used for at least one of the insulating layers covering the transistors. This allows the insulating layer to function as a barrier layer. Such a structure can effectively inhibit diffusion of impurities into the transistors from the outside and increase the reliability of a display apparatus.

An inorganic insulating film is preferably used as each of the insulator 211, the insulator 213, and the insulator 215. Examples of the inorganic insulating film include a silicon nitride film, a silicon oxynitride film, a silicon oxide film, a silicon nitride oxide film, an aluminum oxide film, and an aluminum nitride film. As each of the insulator 211, the insulator 213, and the insulator 215, for example, a hafnium oxide film, an yttrium oxide film, a zirconium oxide film, a gallium oxide film, a tantalum oxide film, a magnesium oxide film, a lanthanum oxide film, a cerium oxide film, or a neodymium oxide film may be used. The insulator 211, the insulator 213, and the insulator 215 may have a single-layer structure or a structure (a stacked-layer structure) in which two or more of the above-described insulating films overlap.

An organic insulating layer is suitable as the insulator 214 functioning as a planarization layer. Examples of materials that can be used for the organic insulating layer include an acrylic resin, a polyimide resin, an epoxy resin, a polyamide resin, a polyimide-amide resin, a siloxane resin, a benzocyclobutene-based resin, a phenol resin, and precursors of these resins. The insulator 214 may have a stacked-layer structure of an organic insulating layer and an inorganic insulating layer. The outermost layer of the insulator 214 preferably has a function of an etching protective layer. Accordingly, a depression portion can be prevented from being formed in the insulator 214 at the time of processing the conductor 112*a*, the conductor 126*a*, or the conductor 129*a* described later. Alternatively, a depression portion may be provided in the insulator 214 at the time of processing the conductor 112*a*, the conductor 126*a*, or the conductor 129*a*.

Note that the insulator 214 corresponds to the insulator 599 in the display apparatus 1000 in FIG. 36. For this reason, a method of forming an insulator or a conductor positioned over the insulator 214 in the display apparatus 1000C in FIG. 43 can be described by replacing the insulator 599 with the insulator 214 in the method of forming an insulator or a conductor positioned over the insulator 599 in the display apparatus 1000 in FIG. 36.

Each of the plurality of transistors 200 includes a conductor 221 functioning as a gate, the insulator 211 functioning as a gate insulating layer, a conductor 222*a* and a conductor 222*b* functioning as a source and a drain, a semiconductor layer 231, the insulator 213 functioning as a gate insulating layer, and a conductor 223 functioning as a gate. Here, as in the transistor 300, a plurality of layers obtained by processing the same conductive film are shown with the same hatching pattern. The insulator 211 is positioned between the conductive layer 221 and the semiconductor layer 231. The insulator 213 is positioned between the conductor 223 and the semiconductor layer 231.

There is no particular limitation on the structure of the transistors included in the display apparatus of this embodiment. For example, a planar transistor, a staggered transistor, an inverted staggered transistor, or the like can be used. A top-gate or a bottom-gate transistor structure may be employed. Alternatively, gates may be provided above and below the semiconductor layer where a channel is formed.

The structure in which the semiconductor layer where a channel is formed is provided between two gates is used for the plurality of transistors 200. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

The structure of the transistor 200 is not limited to the structure illustrated in FIG. 43A. For example, a TGSA (Top Gate Self Align) transistor structure illustrated in each of FIG. 43B and FIG. 43C may be employed for the transistor 200 in the display apparatus 1000C in FIG. 43A.

A transistor 200A and a transistor 200B each include the conductor 221 functioning as a gate, the insulator 211 functioning as a gate insulating layer, the semiconductor layer 231 including a channel formation region 231*i* and a pair of low-resistance regions 231*n*, the conductor 222*a* connected to one of the pair of low-resistance regions 231*n*, the conductor 222*b* connected to the other of the pair of the low-resistance regions 231*n*, an insulator 225 functioning as a gate insulating layer, the conductor 223 functioning as a gate, and the insulator 215 covering the conductor 223. The insulator 211 is positioned between the conductor 221 and the channel formation region 231*i*. The insulator 225 is positioned at least between the conductor 223 and the channel formation region 231*i*. Furthermore, an insulator 218 covering the transistor may be provided.

Figure 43B:
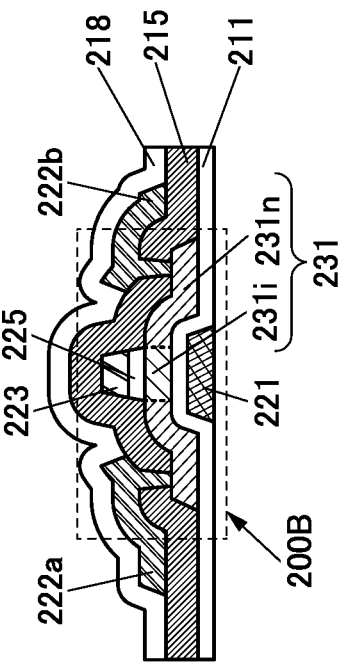
FIG. 43B and FIG. 43C are cross-sectional views illustrating structure examples of transistors.

FIG. 43B illustrates an example of the transistor 200A in which the insulator 225 covers the top surface and the side surface of the semiconductor layer 231. The conductor 222*a* and the conductor 222*b* are connected to the low-resistance regions 231*n* through openings provided in the insulator 225 and the insulator 215. One of the conductor 222*a* and the conductor 222*b* functions as a source, and the other functions as a drain.

Figure 43C:
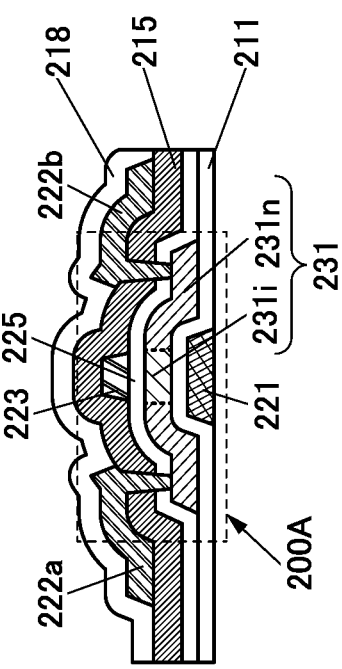

Meanwhile, in the transistor 200B illustrated in FIG. 43C, the insulator 225 overlaps with the channel formation region 231i of the semiconductor layer 231 and does not overlap with the low-resistance regions 231n. The structure illustrated in FIG. 43C can be formed by processing the insulator 225 with the conductor 223 as a mask, for example. In FIG. 43C, the insulator 215 is provided to cover the insulator 225 and the conductor 223, and the conductor 222a and the conductor 222b are connected to the low-resistance regions 231n through the openings in the insulator 215.

Structure Example 5 of Display Apparatus

Figure 44:
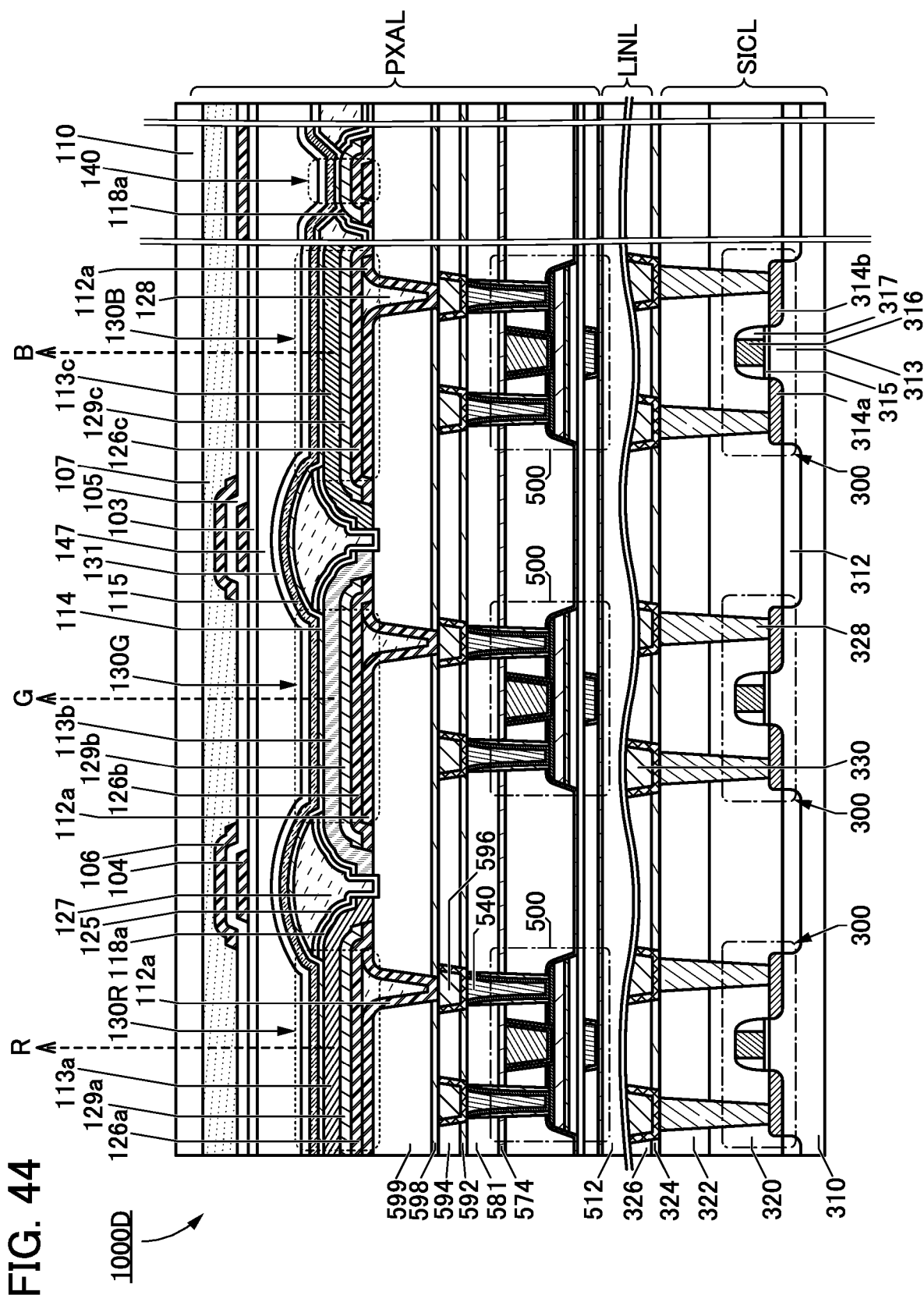
FIG. 44 is a schematic cross-sectional view illustrating a structure example of a display apparatus.

The display apparatus 1000 illustrated in FIG. 36 may be provided with a panel having a touch sensor function (sometimes referred to as a touch panel), for example. In a display apparatus 1000D illustrated in FIG. 44, a resin layer 147, an insulator 103, a conductor 104, an insulator 105, and a conductor 106 are formed in this order over the protective layer 131, for example.

The resin layer 147 preferably contains an organic insulating material. Examples of the organic insulating material include an acrylic resin, a polyimide resin, an epoxy resin, a polyamide resin, a polyimide-amide resin, a siloxane resin, a benzocyclobutene-based resin, a phenol resin, and precursors of these resins.

The insulator 103 preferably contains an inorganic insulating material. Examples of the inorganic insulating material include oxide and nitride such as silicon oxide, silicon oxynitride, silicon nitride oxide, silicon nitride, aluminum oxide, aluminum oxynitride, and hafnium oxide.

The conductor 104 and the conductor 106 serve as electrodes of a touch sensor. In the case of using a mutual capacitive touch sensor, a pulse potential may be supplied to one of the conductor 104 and the conductor 106, and an analog-digital (A-D) converter circuit or a sensing circuit such as a sense amplifier may be electrically connected to the other of the conductor 104 and the conductor 106, for example. In that case, capacitance is formed between the conductor 104 and the conductor 106. When a finger or the like approaches the conductor 104 and the conductor 106, the capacitance changes (specifically, the capacitance is reduced). This change in the capacitance appears, when a pulse potential is supplied to one of the conductor 104 and the conductor 106, as a change in the amplitude of a signal that occurs in the other of the conductor 104 and the conductor 106. Accordingly, the touch and approach of the finger or the like can be sensed.

For the insulator 105, an inorganic insulating film or an organic insulating film can be used, for example. Specifically, for the insulator 105, a resin such as an acrylic resin or an epoxy resin can be used, for example. Alternatively, for the insulator 105, an inorganic insulating material such as silicon oxide, silicon oxynitride, silicon nitride oxide, silicon nitride, or aluminum oxide can be used, for example. Note that the insulator 105 may have either a single-layer structure or a stacked-layer structure.

Structure Example 6 of Display Apparatus

Figure 45:
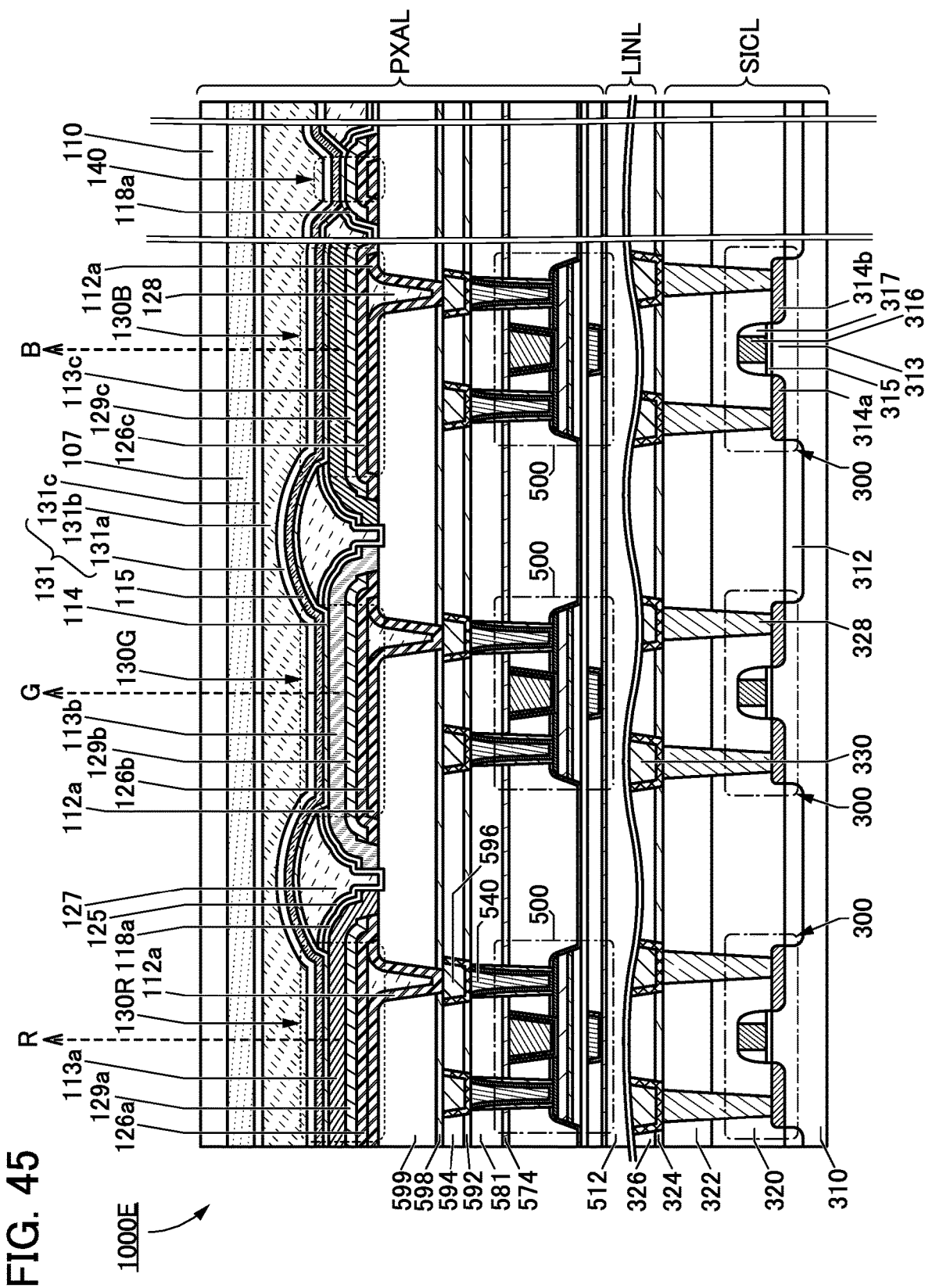
FIG. 45 is a schematic cross-sectional view illustrating a structure example of a display apparatus.

The protective layer 131 in the display apparatus 1000 in FIG. 36 may have a stacked-layer structure of two or more layers, not a single-layer structure, for example. The protective layer 131 may have a three-layer structure that includes an insulator made of an inorganic material as the first layer, an insulator made of an organic material as the second layer, and an insulator made of an inorganic material as the third layer. FIG. 45 illustrates a cross-sectional view illustrating part of a display apparatus 1000E in which the protective layer 131 has a multilayer structure including a protective layer 131a, a protective layer 131b, and a protective layer 131c; an insulator made of an inorganic material is used for the protective layer 131a, an insulator made of an organic material is used for the protective layer 131b, and an insulator made of an inorganic material is used for the protective layer 131c. Note that when an insulator made of an organic material is used for the protective layer 131b as illustrated in FIG. 45, the protective layer 131b can be provided as a planarization film.

Structure Example 7 of Display Apparatus

Figure 46:
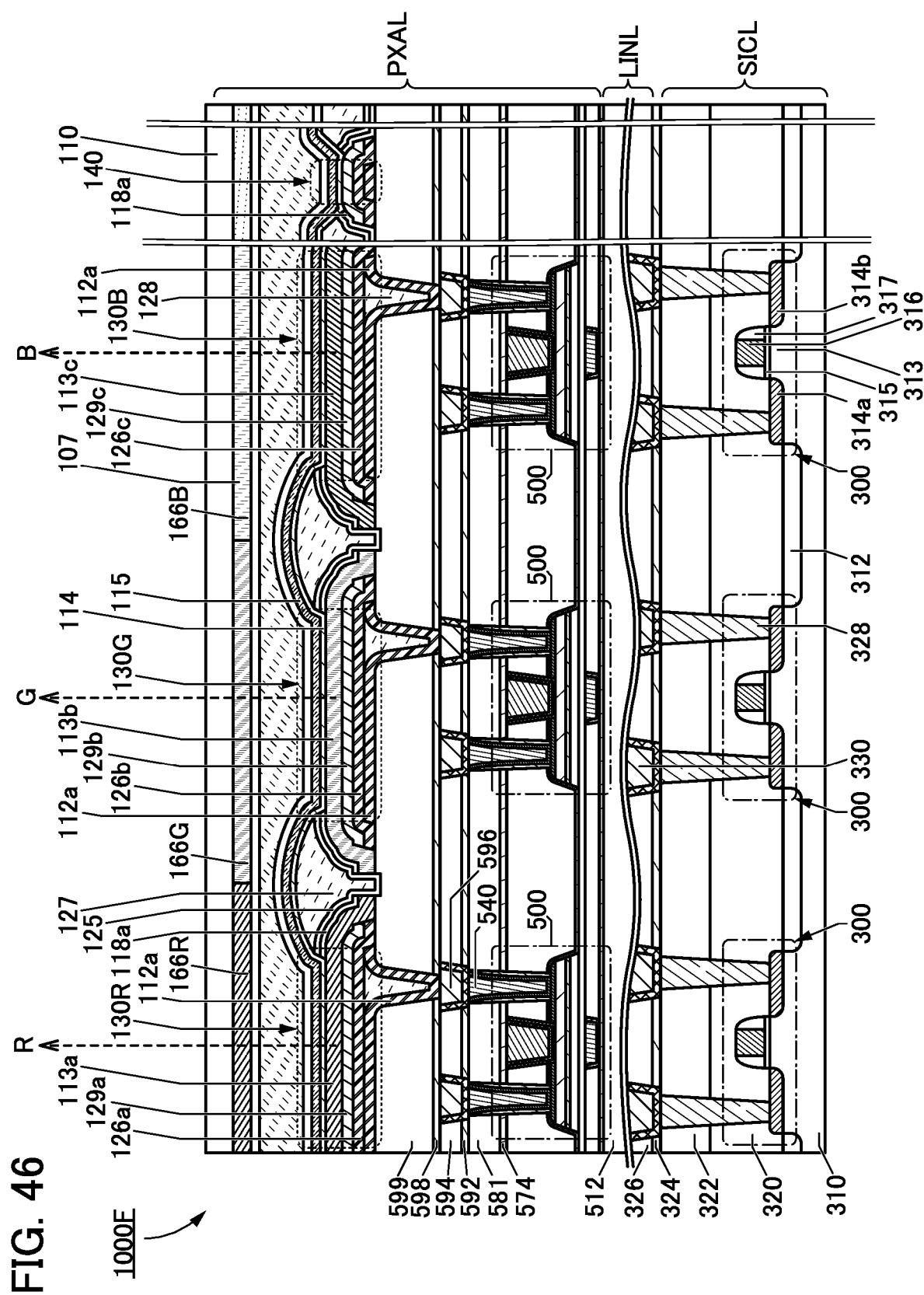
FIG. 46 is a schematic cross-sectional view illustrating a structure example of a display apparatus.

The display apparatus 1000 in FIG. 36 may include, for example, a coloring layer (a color filter) or the like. A display apparatus 1000F illustrated in FIG. 46 includes a coloring layer 166R, a coloring layer 166G, and a coloring layer 166B between the adhesive layer 107 and the substrate 110, for example. Note that the coloring layer 166R, the coloring layer 166G, and the coloring layer 166B can be formed on the substrate 110, for example. In the case where the light-emitting device 130R includes a light-emitting layer that emits red (R) light, the light-emitting device 130G includes alight-emitting layer that emits green (G) light, and the light-emitting device 130B includes a light-emitting layer that emits blue (B) light, the coloring layer 166R is a red coloring layer, the coloring layer 166G is a green coloring layer, and the coloring layer 166B is a blue coloring layer.

Structure Example 8 of Display Apparatus

The display apparatus 1000 in FIG. 36 may include not an organic EL element but a light-emitting device including an LED (including a micro LED), for example. In a display apparatus 1000G in FIG. 47A, a connection layer 152a is provided over the conductor 126a, an LED chip 150a is provided over the connection layer 152a, and the common electrode 115 is provided over the LED chip 150a, for example. Similarly, a connection layer 152b is provided over the conductor 126b, an LED chip 150b is provided over the connection layer 152b, and the common electrode 115 is provided over the LED chip 150b. Similarly, a connection layer 152c is provided over the conductor 126c, an LED chip 150c is provided over the connection layer 152c, and the common electrode 115 is provided over the LED chip 150c.

In the display apparatus 1000G in FIG. 47A, the insulator 125 is formed on the side surfaces of the connection layer 152a and the LED chip 150a, for example. In that case, when an ALD method is employed for forming the insulator 125, the insulator 125 can be formed also between the LED chip 150a and the conductor 126a. The same applies to the insulator 125 between the LED chip 150b and the conductor 126b.

An LED chip is a light-emitting diode in which an electrode serving as a cathode, an electrode serving as an anode, a p-type semiconductor, an n-type semiconductor, and a light-emitting layer are provided over a substrate. Note that in this specification and the like, the term "LED chip" can be replaced with the term "light-emitting diode" in the description in some cases.

Specifically, in this specification and the like, a light-emitting diode whose LED chip area is less than or equal to 10000 $\mu m^2$ is referred to as a micro light-emitting diode, a light-emitting diode whose LED chip area is greater than 10000 $\mu m^2$ and less than or equal to 1 $mm^2$ is referred to as a mini light-emitting diode, and a light-emitting diode whose LED chip area is greater than 1 mm² is referred to as a macro light-emitting diode in some cases. Note that the area of an LED chip here can be, for example, the area of the upper surface or the bottom surface of a substrate 181 in FIG. 49A, FIG. 49C, and FIG. 49D described later. Alternatively, the area of an LED chip can be, for example, the area of the upper surface or the bottom surface of an electrode 183A in FIG. 49B described later.

For example, a light-emitting diode whose LED chip area is less than or equal to 100 µm² can be referred to as a micro light-emitting diode (micro LED chip). As a light-emitting diode usable for an LED package with an area of 1 mm², a micro LED chip or a mini LED chip can be used in some cases, for example.

Any of a micro light-emitting diode, a mini light-emitting diode, and a macro light-emitting diode can be used for the LED package of the display apparatus of one embodiment of the present invention. In particular, the display apparatus of one embodiment of the present invention preferably includes a micro light-emitting diode or a mini light-emitting diode, and more preferably includes a micro light-emitting diode.

In particular, the area of a LED chip of the light-emitting diode is preferably less than or equal to 1 mm², further preferably less than or equal to 10000 µm², still further preferably less than or equal to 3000 µm², even further preferably less than or equal to 700 µm².

The area of a light-emitting region of the light-emitting diode is preferably less than or equal to 1 mm², further preferably less than or equal to 10000 µm², still further preferably less than or equal to 3000 µm², even further preferably less than or equal to 700 µm². Here, the area of the light-emitting region of the light-emitting diode is the area of the top surface or the bottom surface of a light-emitting layer 184 in FIG. 49A to FIG. 49D described later.

In this embodiment, in particular, an example where a micro light-emitting diode is used as a light-emitting diode is described. A micro light-emitting diode having a double heterojunction is described in this embodiment. Note that there is no particular limitation on the light-emitting diode, and for example, a micro light-emitting diode having a quantum well junction or a nanocolumn light-emitting diode may be used.

FIG. 47B illustrates a specific structure example of the LED chip 150*a*. The LED chip 150*a* includes, for example, a substrate 153*a* positioned over the connection layer 152*a*, a connection layer 154*a* positioned over the substrate 153*a*, a conductor 155*a* positioned over the connection layer 154*a*, a semiconductor layer 156*a* positioned over the conductor 155*a*, a light-emitting layer 157*a* positioned over the semiconductor layer 156*a*, and a semiconductor layer 158*a* positioned over the light-emitting layer 157*a*. The LED chip 150*b* and the LED chip 150*c* may have a structure similar to that of the LED chip 150*a*. The LED chip 150*a* to the LED chip 150*c* may have the same structure except for light-emitting layers (colors of light). Note that the common electrode 115 is positioned over the semiconductor layer 158*a*. In addition to the LED chip 150*a*, FIG. 47B also illustrates the conductor 126*a*, the connection layer 152*a*, the common electrode 115, and the protective layer 131.

A conductive material can be used for the connection layer 152*a*. For example, metals such as gold, silver, and tin, an alloy including any of these metals, a conductive film, or a conductive paste can be used for the connection layer 152*a*. For example, gold can be suitably used for the connection layer 152*a*. The connection layer 152*a* can be formed by a printing method, a transfer method, or a discharge method.

As each of the substrate 153*a* and the connection layer 154*a*, for example, a conductive silicon substrate, a silicon carbide (SiC) substrate, a gallium arsenide (GaAs) substrate, a metal substrate, or an alloy substrate can be used. An example of the metal substrate is a substrate including one or more of tungsten, copper, gold, nickel, and titanium. An example of the alloy substrate is a Si—Al alloy substrate.

The conductor 155*a* is electrically connected to the substrate 153*a* through the connection layer 154*a*. For the conductor 155*a*, for example, a conductive layer functioning as a reflective electrode can be used. That is, a material usable for the conductor 112*a* to the conductor 112*c* or the conductor 126*a* to the conductor 126*c* can be used for the conductor 155*a*.

The substrate 153*a* is electrically connected to the conductor 126*a* through the connection layer 152*a*. In the display apparatus 1000G, the connection layer 152*a*, the substrate 153*a*, the connection layer 154*a*, and the conductor 155*a* collectively serve as a pixel electrode.

The light-emitting layer 157*a* is positioned between the semiconductor layer 156*a* and the semiconductor layer 158*a*. The light-emitting layer 157*a* has a function of emitting light by combination of an electron and a hole. An n-type semiconductor layer can be used as one of the semiconductor layer 156*a* and the semiconductor layer 158*a*, and a p-type semiconductor layer can be used as the other. An n-type semiconductor layer, an i-type semiconductor layer, or a p-type semiconductor layer can be used as the light-emitting layer 157*a*. That is, a semiconductor layer can be used as each of the semiconductor layer 156*a*, the light-emitting layer 157*a*, and the semiconductor layer 158*a*. Note that the semiconductor layer 156*a*, the light-emitting layer 157*a*, and the semiconductor layer 158*a* are collectively referred to as an LED layer in some cases.

The LED layer is formed to emit light such as red light, yellow light, green light, blue light, or ultraviolet light. There is no particular limitation on the structure of the LED layer; a homostructure, a heterostructure, a double-heterostructure, or the like having a PN junction or a PIN junction may be used or a MIS (Metal Insulator Semiconductor) junction may be used. The LED layer may have a superlattice structure, a single quantum well structure, or a multi quantum well (MQW) structure. Alternatively, a nanocolumn may be used in the LED layer.

A compound containing a Group 13 element and a Group 15 element can be used for the LED layer, for example. Examples of the Group 13 element include aluminum, gallium, and indium. Examples of the Group 15 element include nitrogen, phosphorus, arsenic, and antimony.

For the LED layer, for example, a compound of gallium and phosphorus, a compound of gallium and arsenic, a compound of gallium, aluminum, and arsenic, a compound of aluminum, gallium, indium, and phosphorus, gallium nitride (GaN), a compound of indium and gallium nitride, or a compound of selenium and zinc can be used.

For example, gallium nitride can be used for an LED layer that emits light in the ultraviolet wavelength range to the blue wavelength range. A compound of indium and gallium nitride can be used for an LED layer that emits light in the ultraviolet wavelength range to the green wavelength range. A compound of aluminum, gallium, indium, and phosphorus or a compound of gallium and arsenic can be used for an LED layer that emits light in the green wavelength range to the red wavelength range. A compound of gallium and arsenic can be used for an LED layer that emits light in the infrared wavelength range.

The display apparatus 1000G includes a plurality of LED chips, but the whole display portion may be composed of a single LED chip.

The display apparatus 1000G has a structure in which a single LED chip emits light of one color, but may have a structure in which a single LED chip emits light of two or more colors.

That is, stacked-layer structures of one of an n-type semiconductor layer and a p-type semiconductor layer, a light-emitting layer, and the other of the n-type semiconductor layer and the p-type semiconductor layer may be provided for different colors in an LED chip included in the display apparatus 1000G.

Figure 48:
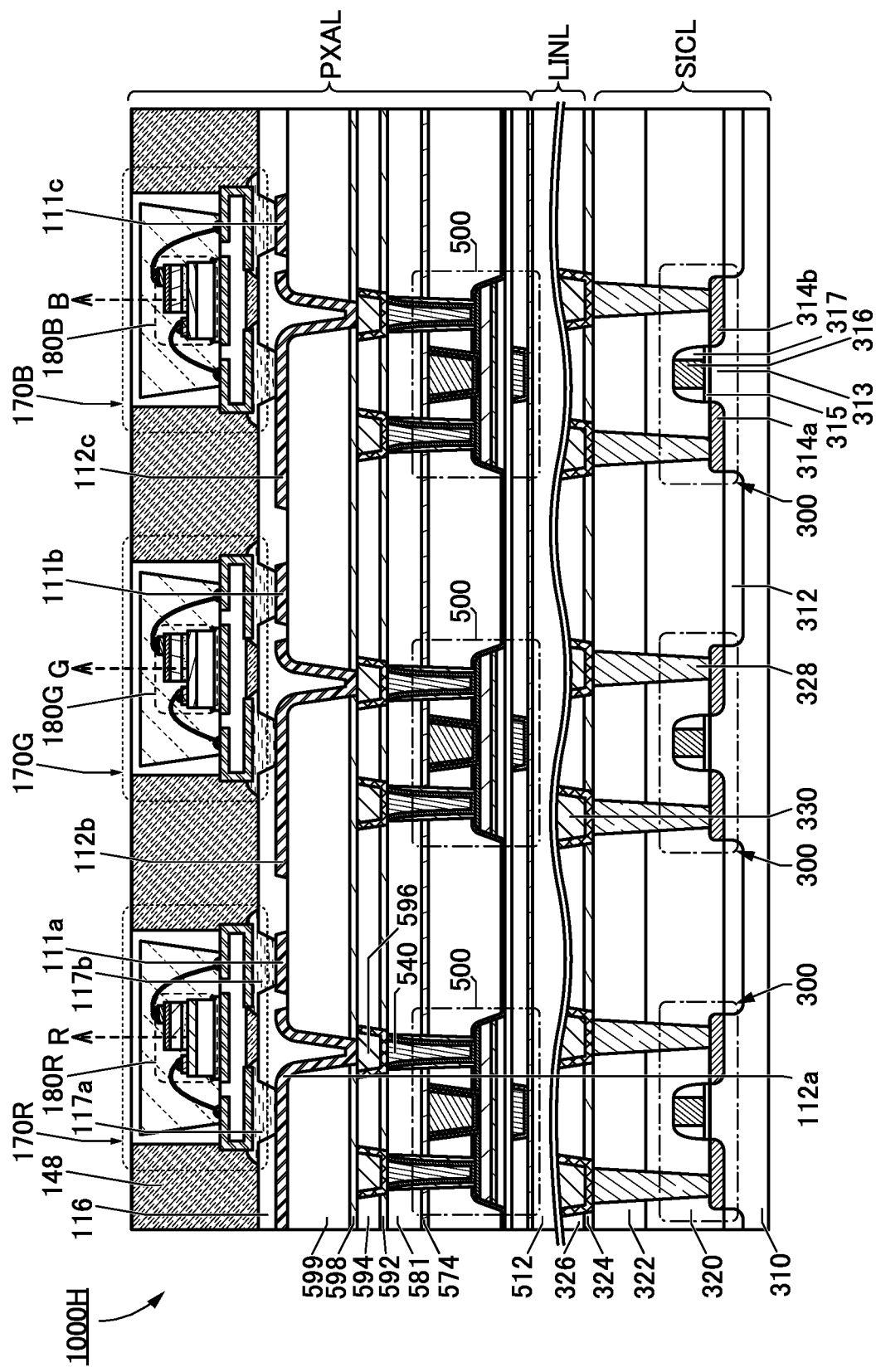
FIG. 48 is a schematic cross-sectional view illustrating a structure example of a display apparatus.

FIG. 48 illustrates a structure of a display apparatus including a light-emitting device including an LED (including a micro LED), which is different from the display apparatus 1000G.

A display apparatus 1000H illustrated in FIG. 48 is different from the display apparatus 1000G in that a packaged LED chip is provided in the display apparatus. Specifically, in the display apparatus 1000H, an LED package 170R, an LED package 170G, and an LED package 170B are provided as light-emitting devices in the pixel layer PXAL.

In the display apparatus 1000H in FIG. 48, a conductor 111*a* to a conductor 111*c* and the conductor 112*a* to the conductor 112*c* are provided over the insulator 599, for example. A protective layer 116 is provided over the conductor 111*a* to the conductor 111*c*, the conductor 112*a* to the conductor 112*c*, and the insulator 599. The protective layer 116 is formed to fill an opening portion of the insulator 599 whose bottom surface is regarded as the conductor 596. In particular, the protective layer 116 is preferably provided to cover end portions of the conductor 111*a* to the conductor 111*c* and the conductor 112*a* to the conductor 112*c*.

For example, a resin such as an acrylic resin, a polyimide resin, an epoxy resin, or a silicone resin is suitably used for the protective layer 116. Providing the protective layer 116 can inhibit a conductor 117*a* and a conductor 117*b* to be described later from being in contact with each other, that is, from being short-circuited. Note that depending on circumstances, the protective layer 116 is not necessarily provided over the insulator 599, the conductor 111*a* to the conductor 111*c*, and the conductor 112*a* to the conductor 112*c*.

Opening portions are formed in the protective layer 116 in regions partly overlapping with the conductor 111*a* to the conductor 111*c* and regions partly overlapping with the conductor 112*a* to the conductor 112*c*. The conductor 117*a* and the conductor 117*b* are provided over the protective layer 116. Specifically, the conductor 117*a* is provided to fill the opening portions of the protective layer 116 in the regions partly overlapping with the conductor 112*a* to the conductor 112*c*, and the conductor 117*b* is provided to fill the opening portions of the protective layer 116 in the regions partly overlapping with the conductor 111*a* to the conductor 111*c*.

For example, a conductive paste including a material such as silver, carbon, or copper or a bump including a material such as gold or solder can be suitably used for the conductor 117*a* and the conductor 117*b*. For each of the conductor 112*a* to the conductor 112*c* (the conductor 111*a* to the conductor 111*c*) and an electrode 172 (an electrode 173) to be described later, which are electrically connected to the conductor 117*a* (the conductor 117*b*), a conductive material having low contact resistance with the conductor 117*a* (the conductor 117*b*) is preferably used. For example, in the case where a silver paste is used for the conductor 117*a* (the conductor 117*b*), an alloy of any of aluminum, titanium, copper, and silver and palladium and copper (Ag—Pd—Cu (APC)) is used as the conductive material usable for the conductor 112*a* to the conductor 112*c* (the conductor 111*a* to the conductor 111*c*) and the electrode 172 (the electrode 173), whereby the contact resistance with the conductor 117*a* (the conductor 117*b*) can be low.

The LED package 170R, the LED package 170G, and the LED package 170B are provided over the conductor 117*a* and the conductor 117*b*. Note that FIG. 49A illustrates specific structure examples of the LED package 170R, the LED package 170G, and the LED package 170B included in the display apparatus 1000H in FIG. 48.

Figure 49A:
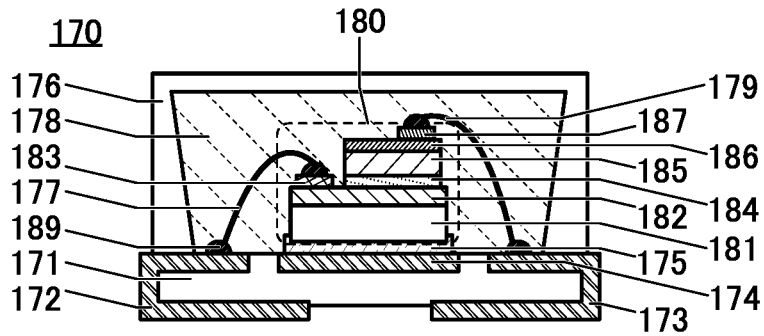
FIG. 49A to FIG. 49D are schematic cross-sectional views each illustrating a structure example of an LED package.

The LED package 170 in FIG. 49A includes a substrate 171, the electrode 172, the electrode 173, a heat sink 174, an adhesive layer 175, a case 176, a wire 177, a wire 179, a sealing layer 178, a ball 189, and an LED chip 180.

The LED chip 180 includes the substrate 181, a semiconductor layer 182, an electrode 183, the light-emitting layer 184, a semiconductor layer 185, an electrode 186, and an electrode 187.

As the substrate 171, a glass epoxy resin substrate, a polyimide substrate, a ceramic substrate, an alumina substrate, or an aluminum nitride substrate can be used, for example.

The electrode 172 and the electrode 173 are formed on the top surface, the side surfaces, and the bottom surface of the substrate 171. Specifically, the electrode 172 formed on the top surface, the side surface, and the bottom surface of the substrate 171 serves as one wiring. Similarly, the electrode 173 formed on the top surface, the side surface, and the bottom surface of the substrate 171 serves as another wiring. Note that electrical continuity is not established between the electrode 172 and the electrode 173.

The substrate 171 is provided with a heat sink 174. The heat sink 174 has a function of releasing heat generated in the LED chip 180, for example.

Note that the electrode 172, the electrode 173, and the heat sink 174 can be formed with the same material. For example, for each of the electrode 172, the electrode 173, and the heat sink 174, one element selected from nickel, copper, silver, platinum, and gold, or an alloy material containing any of the elements at 50% or higher can be used.

The electrode 172, the electrode 173, and the heat sink 174 can be formed in the same step.

The LED chip 180 is attached above the substrate 171 with the adhesive layer 175. Specifically, the substrate 181 of the LED chip 180 is provided to overlap with the heat sink 174 on the substrate 171, with the adhesive layer 175 positioned therebetween. There is no particular limitation on a material of the adhesive layer 175. For example, the use of an adhesive with conductivity as a material of the adhesive layer 175 can increase the heat dissipation property of the LED chip 180.

The substrate 181 can be a single crystal substrate such as a sapphire substrate, a silicon carbide substrate, a silicon substrate, or a gallium nitride substrate, for example.

In the LED chip 180, the semiconductor layer 182 is formed over the substrate 181. The electrode 183 is formed over part of the semiconductor layer 182, and the light-emitting layer 184 is formed over other part of the semiconductor layer 182. The semiconductor layer 185 is formed over the light-emitting layer 184, the electrode 186 is formed over the semiconductor layer 185, and the electrode 187 is formed over part of the electrode 186.

In the LED chip 180, the light-emitting layer 184 is sandwiched between the semiconductor layer 182 and the semiconductor layer 185. In the light-emitting layer 184, electrons and holes are combined to emit light. One of the semiconductor layer 182 and the semiconductor layer 185 is an n-type semiconductor layer, and the other of the semiconductor layer 182 and the semiconductor layer 185 is a p-type semiconductor layer.

In the display apparatus 1000H in FIG. 48, a light-emitting diode included in an LED chip of each of the LED package 170R, the LED package 170G, and the LED package 170B has a stacked-layer structure of a pair of semiconductor layers and a light-emitting layer between the pair of semiconductor layers, and emits red light, green light, or blue light. Thus, the colors of light emitted from the light-emitting diodes of the LED chips can be freely determined separately in the LED package 170R, the LED package 170G, and the LED package 170B. For example, a compound of gallium and phosphorus, a compound of gallium and arsenic, a compound of gallium, aluminum, and arsenic, a compound of aluminum, gallium, indium, and phosphorus, gallium nitride, a compound of indium and gallium nitride, or a compound of selenium and zinc can be used for the stacked-layer structure.

The colors of light emitted from the light-emitting diodes included in the LED chips 180 of the LED packages 170 can be cyan, magenta, yellow, and white in addition to red, green, and blue.

The electrode 183 is electrically connected to the electrode 172 through the wire 177. That is, the electrode 183 serves as a pixel electrode of the light-emitting diode. The electrode 187 is electrically connected to the electrode 173 through the wire 179. That is, the electrode 187 serves as a common electrode of the light-emitting diode.

A wire bonding method can be used as a method of bonding the electrode 183 and the wire 177, a method of bonding the electrode 172 and the wire 177, a method of bonding the electrode 187 and the wire 179, and a method of bonding the electrode 173 and the wire 179, for example. A thermocompression bonding method and an ultrasonic bonding method are kinds of the wire bonding method. In a step of bonding the wire 177 and the wire 179 by the wire bonding method, the ball 189 made of the same material as the wire 179 is formed over the electrode 172, the electrode 173, the electrode 183, and the electrode 187.

For example, a material usable for the conductor 111a to the conductor 111c or the conductor 112a to the conductor 112c is preferably used for each of the electrode 183, the electrode 186, and the electrode 187. In particular, since the light-emitting layer 184 of the LED chip 180 emits light to the upside of the LED package 170, the electrode 186 is preferably a light-transmitting conductive material among the materials usable for the conductor 111a to the conductor 111c and the conductor 112a to the conductor 112c. For the same reason, the electrode 187 is preferably a light-transmitting conductive material among the materials usable for the conductor 111a to the conductor 111c and the conductor 112a to the conductor 112c.

As the wire 177 and the wire 179, a thin metal wire of gold, an alloy containing gold, copper, or an alloy containing copper can be used, for example.

A resin can be used as the material of the case 176. The case 176 does not necessarily cover the top surface of the LED chip 180 as long as the case 176 covers the side surface of the sealing layer 178. That is, for example, the sealing layer 178 may be exposed from the top surface of the LED chip 180. The inner side surface of the case 176, specifically, the periphery of the LED chip 180 (peripheries of the substrate 181, the semiconductor layer 182, the electrode 183, the light-emitting layer 184, the semiconductor layer 185, the electrode 186, and the electrode 187) is preferably provided with a reflector made of ceramics or the like. Part of light emitted by the light-emitting layer 184 of the LED chip 180 is reflected by the reflector, so that a larger amount of light can be extracted from the LED package 170.

The inside of the case 176 is filled with the sealing layer 178. For the sealing layer 178, a resin having a property of transmitting visible light is preferably used. Specifically, for the sealing layer 178, for example, an ultraviolet curable resin such as an epoxy resin or a silicone resin or a visible light curable resin can be used.

A variety of optical members can be provided on surfaces of a resin layer 148, the LED package 170R, the LED package 170G, and the LED package 170B, for example, in the display apparatus 1000H. Examples of the optical members include a polarizing plate, a retardation plate, a light diffusion layer (e.g., a diffusion film), an anti-reflective layer, and a light-condensing film. The surfaces of the resin layer 148, the LED package 170R, the LED package 170G, and the LED package 170B, for example, in the display apparatus 1000H may be provided with a surface protective layer such as an antistatic film suppressing the attachment of a foreign substance, a water repellent film suppressing the attachment of stain, a hard coat film suppressing generation of a scratch in use, or an impact absorption layer. For example, it is preferable to provide, as the surface protective layer, a glass layer or a silica layer ($SiO_x$ layer) because the surface contamination or damage can be inhibited from being generated. For the surface protective layer, DLC (diamond-like carbon), aluminum oxide ($AlO_x$), a polyester-based material, a polycarbonate-based material, or the like may be used. For the surface protective layer, a material having a high transmitting property with respect to visible light is preferably used. For the surface protective layer, a material with high hardness is preferably used.

Next, a structure example of an LED package which can be used as the LED package 170R, the LED package 170G, and the LED package 170B of the display apparatus 1000H and is different from the LED package 170 in FIG. 49A is described.

Figure 49B:
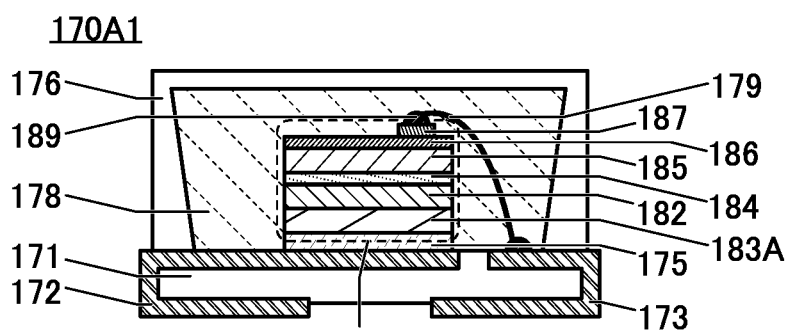

An LED package 170A1 illustrated in FIG. 49B is different from the LED package 170 in FIG. 49A in that an LED chip 180A is provided over the substrate 171. Note that a pixel electrode of the LED chip 180A is bonded not with the wire 177 but with the adhesive layer 175.

The LED package 170A1 in FIG. 49B includes the substrate 171, the electrode 172, the electrode 173, the adhesive layer 175, the case 176, the wire 179, the sealing layer 178, the ball 189, and the LED chip 180A.

In the LED package 170A1 in FIG. 49B, the LED chip 180A includes the electrode 183A and a light-emitting diode provided over the electrode 183A. The light-emitting diode includes the semiconductor layer 182, the light-emitting layer 184, the semiconductor layer 185, the electrode 186, and the electrode 187.

As the electrode 183A, a conductive substrate can be used, for example. As a kind of the conductive substrate, a metal substrate is given, for example.

The semiconductor layer 182, the light-emitting layer 184, the semiconductor layer 185, the electrode 186, and the electrode 187 are formed in this order over the electrode 183A.

For the semiconductor layer 182, the light-emitting layer 184, the semiconductor layer 185, the electrode 186, and the electrode 187, description of the LED package 170 in FIG. 49A is referred to.

In the LED package 170A1 in FIG. 49B, the electrode 172 and the electrode 173 are formed on the top surface, the side surfaces, and the bottom surface of the substrate 171. In particular, the electrode 172 is also provided in a region of the substrate 171 where the LED chip 180A is provided. The electrode 172 formed on the top surface, the side surface, and the bottom surface of the substrate 171 serves as one wiring. Similarly, the electrode 173 formed on the top surface, the side surface, and the bottom surface of the substrate 171 serves as another wiring. Note that electrical continuity is not established between the electrode 172 and the electrode 173.

The LED chip 180A is attached above the substrate 171 with the adhesive layer 175. Specifically, the electrode 183A of the LED chip 180A is provided to overlap with a region of the electrode 172 provided on the substrate 171, with the adhesive layer 175 positioned therebetween. Note that the adhesive layer 175 is an adhesive having conductivity.

As described above, in the case where the LED chip 180A in which the light-emitting diode is formed over the conductive substrate is employed, the pixel electrode of the LED chip 180A and the electrode 172 of the substrate 171 are attached not with the wire 177 but with the adhesive layer 175, whereby an LED package 170A2 can be formed.

Next, a structure example of an LED package which can be used as the LED package 170R, the LED package 170G, and the LED package 170B of the display apparatus 1000H and is different from the LED package 170 in FIG. 49A and the LED package 170A1 in FIG. 49B is described.

Figure 49C:
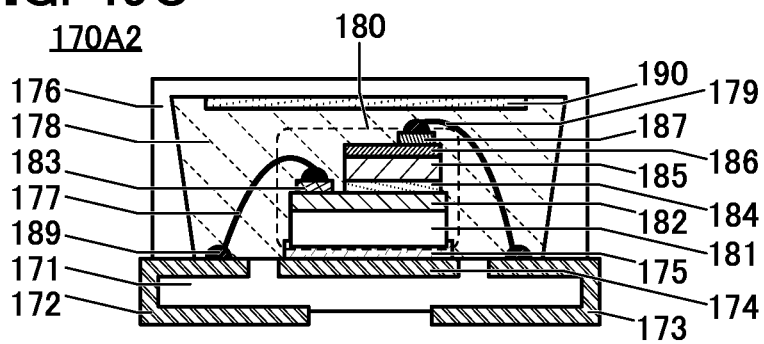

The LED package 170A2 illustrated in FIG. 49C is different from the LED package in FIG. 49A in that a color conversion layer 190 is provided inside the case 176.

Note that although a structure in which the color conversion layer 190 is provided above the sealing layer 178 is illustrated in FIG. 49C, the position of the color conversion layer 190 is not limited thereto. For example, the color conversion layer 190 may be separated inside the sealing layer 178.

As the color conversion layer 190, a phosphor or a quantum dot (QD) is preferably used. In particular, a quantum dot has an emission spectrum with a narrow peak, so that emission with high color purity can be obtained. The use of a quantum dot for the color conversion layer 190 can improve the display quality of the display apparatus 1000H.

The color conversion layer 190 has a function of converting light emitted by the light-emitting layer 184 included in the LED chip 180 of the LED package 170A2 into light of another color.

For example, as the color conversion layer 190, a color conversion layer converting blue light into green light or a conversion layer converting blue light into red light can be used. For example, in the case where a blue light-emitting diode is provided in a red subpixel, blue light emitted by the blue light-emitting diode passes through the color conversion layer 190, thereby being converted into red light and emitted to the upside of the case 176, that is, the outside of the display apparatus 1000H. For example, in the case where a blue light-emitting diode is provided in a green subpixel, blue light emitted by the blue light-emitting diode passes through the color conversion layer 190, thereby being converted into green light and emitted to the upside of the case 176, that is, the outside of the display apparatus 1000H.

The color conversion layer 190 can be formed by a droplet discharge method (e.g., an ink-jet method), a coating method, an imprinting method, a variety of printing methods (screen printing or offset printing), or the like. Alternatively, for the color conversion layer 190, a color conversion film such as a quantum dot film can be used.

As the phosphor, an organic resin layer having a surface on which a phosphor is printed or which is coated with a phosphor or an organic resin layer mixed with a phosphor can be used.

There is no limitation on a material of quantum dots, and examples include a Group 14 element, a Group 15 element, a Group 16 element, a compound of a plurality of Group 14 elements, a compound of an element belonging to any of Group 4 to Group 14 and a Group 16 element, a compound of a Group 2 element and a Group 16 element, a compound of a Group 13 element and a Group 15 element, a compound of a Group 13 element and a Group 17 element, a compound of a Group 14 element and a Group 15 element, a compound of a Group 11 element and a Group 17 element, iron oxides, titanium oxides, spinel chalcogenides, and semiconductor clusters.

Specific examples include cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; iron oxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and a combinations thereof. What is called an alloyed quantum dot, whose composition is represented by a given ratio, may be used.

Examples of the quantum dot include a core-type quantum dot, a core-shell quantum dot, and a core-multishell quantum dot. Quantum dots have a high proportion of surface atoms and thus have high reactivity and easily cohere together. For this reason, it is preferable that a protective agent be attached to, or a protective group be provided at the surfaces of quantum dots. The attachment of the protective agent or the provision of the protective group can prevent cohesion and increase solubility in a solvent. It can also reduce reactivity and improve electrical stability.

Since band gaps of quantum dots are increased as their size (diameter) is decreased, the size is adjusted as appropriate so that light with a desired wavelength can be obtained. Light emission from the quantum dots is shifted to a blue color side, i.e., a high energy side, as the crystal size is decreased; thus, emission wavelengths of the quantum dots can be adjusted over a wavelength range in the spectrum of an ultraviolet region, a visible light region, and an infrared region by changing the size of quantum dots. The size (diameter) of quantum dots is, for example, greater than or equal to 0.5 nm and less than or equal to 20 nm, preferably greater than or equal to 1 nm and less than or equal to 10 nm. The emission spectra are narrowed as the size distribution of quantum dots gets smaller, and thus light can be obtained with high color purity. The shape of quantum dots is not particularly limited and may be a spherical shape, a rod shape, a circular shape, or other shapes. A quantum rod, which is a rod-shaped quantum dot, has a function of emitting directional light.

Alternatively, a stacked-layer structure of the color conversion layer 190 and a coloring layer may be provided inside or above the LED package 170A2. Thus, light that has been converted by the color conversion layer 190 passes through the coloring layer, whereby the color purity of light can be increased. A coloring layer of the same color as light emitted by the light-emitting layer 184 may be provided in a position overlapping with the LED chip 180 (the substrate 181, the semiconductor layer 182, the electrode 183, the light-emitting layer 184, the semiconductor layer 185, the electrode 186, and the electrode 187). Providing a coloring layer of the same color can increase the color purity of light emitted by the light-emitting layer 184. Furthermore, in the case where a coloring layer is not provided in the LED package 170A2, the manufacturing process can be simplified.

The coloring layer is a colored layer that transmits light in a specific wavelength range. For example, a color filter for transmitting light in a red, green, blue, or yellow wavelength range can be used. Examples of a material that can be used for the coloring layer include a metal material, a resin material, and a resin material containing a pigment or dye.

As described above, the color conversion layer provided above the LED chip 180 enables the LED package 170A2 to emit light with a high color purity.

Next, a structure example of an LED package which can be used as the LED package 170R, the LED package 170G, and the LED package 170B of the display apparatus 1000H and is different from the LED package 170 in FIG. 49A, the LED package 170A1 in FIG. 49B, and the LED package 170A2 in FIG. 49C is described.

Figure 49D:
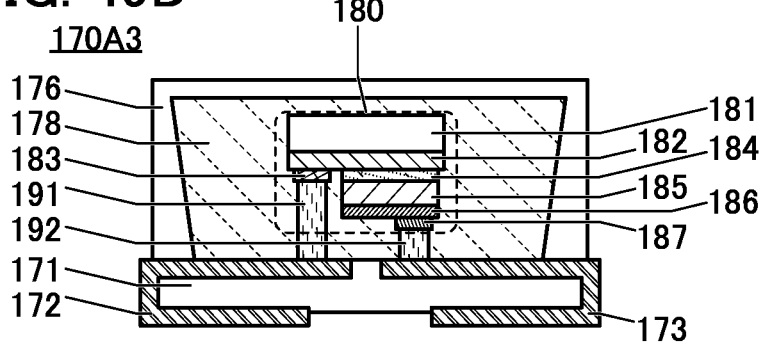

An LED package 170A3 illustrated in FIG. 49D is different from the LED package 170 in FIG. 49A in that the substrate 181 of the LED chip 180 provided over the substrate 171 is positioned in an upper portion, and the electrode 183 and the electrode 187 are positioned in a lower portion.

With this structure, light emitted by the light-emitting layer 184 is emitted to the upside of the LED package 170A3; thus, the substrate 181 preferably has a light-transmitting property.

In the LED package 170A3 in FIG. 49D, since the top surfaces of the electrodes 183 and 187 in the LED chip 180 face the substrate 171 side, bonding between the electrode 183 and the electrode 172 and bonding between the electrode 187 and the electrode 173 are performed not by a wire but by a conductor serving as a bump. Specifically, the electrode 183 and the electrode 172 are bonded by a conductor 191, and the electrode 187 and the electrode 173 are bonded by a conductor 192.

For the conductor 191 and the conductor 192, a material usable for the conductor 117a or the conductor 117b can be used.

Figure 50A:
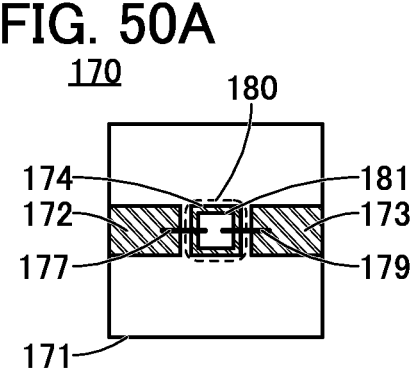
FIG. 50A and FIG. 50B are schematic plan views each illustrating a structure example of an LED package.

Next, the number of LED chips 180 that can be provided in the LED package 170 is described. FIG. 50A is an example of a plan view of the LED package 170 in FIG. 49A. FIG. 50A illustrates the substrate 181 which is a component of the LED chip 180. Although the LED package 170 including one LED chip 180 over the substrate 171 is described above as an example as illustrated in FIG. 50A, one embodiment of the present invention is not limited to this structure. For example, the LED package 170 may include not one LED chip but a plurality of LED chips over the substrate 171.

Figure 50B:
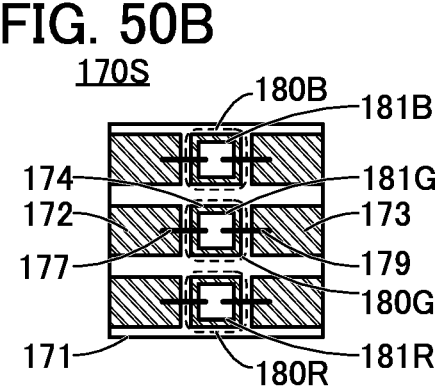

FIG. 50B illustrates a structure of an LED package 170S in which three LED chips 180R, 180G, and 180B are provided over the substrate 171. FIG. 50B illustrates a substrate 181R which is a component of the LED chip 180R, a substrate 181G which is a component of the LED chip 180G, and a substrate 181B which is a component of the LED chip 180B. Light-emitting layers of light-emitting diodes included in the LED chip 180R, the LED chip 180G, and the LED chip 180B provided in the LED package 170S may emit light of different colors. For example, the substrate 181R is provided with a light-emitting diode emitting red light, the substrate 181G is provided with a light-emitting diode emitting green light, and the substrate 181B is provided with a light-emitting diode emitting blue light, whereby the LED package 170S can emit light of three colors, red, green, and blue.

The light-emitting diodes (the LED chip 180R, the LED chip 180G, and the LED chip 180B) in the LED package 170, the LED package 170A1, the LED package 170A2, the LED package 170A3, and the LED package 170S, which are described above, may be driven by transistors with the same structure, or may be driven by transistors with different structures. For example, in the display apparatus 1000H in FIG. 48, a transistor that drives the LED chip 180R included in the LED package 170R, a transistor that drives the LED chip 180G included in the LED package 170G, and a transistor that drives the LED chip 180B included in the LED package 170B may be different from one another in one or more selected from a transistor size, a channel length, a channel width, and a structure. Specifically, depending on the amount of current required for light emission with desired luminance, one or both of the channel length and the channel width of the transistor may be changed for each color.

In the display apparatus 1000H in FIG. 48, the top surface of the protective layer 116, the top surface and side surface of the conductor 117a, the top surface and side surface of the conductor 117b, and the side surfaces of the LED package 170R, the LED package 170G, and the LED package 170B may be covered with the resin layer 148. Use of a black resin for the resin layer 148 can enhance the display contrast of the display apparatus 1000H. One or more selected from the top surface of the resin layer 148 and the top surfaces of the LED package 170R, the LED package 170G, and the LED package 170B may be provided with a surface protective layer, an impact absorption layer, or both. Since each of the LED package 170R, the LED package 170G, and the LED package 170B has a structure in which light is emitted upward, a layer provided on each of the top surfaces of the LED package 170R, the LED package 170G, and the LED package 170B preferably has a visible-light-transmitting property.

All the conductor 112a to the conductor 112c, the conductor 117a, and the electrode 172 in the LED package 170R, the LED package 170G, and the LED package 170B are referred to as pixel electrodes in some cases. Furthermore, parts of the conductor 112a to the conductor 112c, the conductor 117a, and the electrode 172 are referred to as pixel electrodes in some cases.

Note that the structure of the display apparatus of one embodiment of the present invention is not limited to the structure of the display apparatus 1000G illustrated in FIG. 47 or the display apparatus 1000H illustrated in FIG. 48. The display apparatus of one embodiment of the present invention may have the structure of the display apparatus 1000G illustrated in FIG. 47 or the display apparatus 1000H illustrated in FIG. 48, on which some modification is performed as appropriate.

For example, the display apparatus of one embodiment of the present invention may have not a structure in which a plurality of LED packages 170 are mounted above the substrate 310 but a structure in which a substrate provided with a plurality of light-emitting diodes are attached above the substrate 310.

FIG. 51A illustrates a display apparatus 1000I formed by attaching a substrate 410 where a plurality of light-emitting diodes are formed to the structure in which the components up to the protective layer 116 of the display apparatus 1000H in FIG. 48 have been formed (hereinafter this structure is referred to as a stack SST). FIG. 51B illustrates a plurality of light-emitting diodes and the substrate 410 provided with the plurality of light-emitting diodes.

A light-emitting diode 420R, a light-emitting diode 420G, and a light-emitting diode 420B are illustrated as the plurality of light-emitting diode in FIG. 51A and FIG. 51B. The light-emitting diode 420R, the light-emitting diode 420G, and the light-emitting diode 420B are collectively referred to as a light-emitting diode 420 in some cases.

The light-emitting diode 420R includes an electrode 183a, a semiconductor layer 182a, a light-emitting layer 184a, a semiconductor layer 185a, and an electrode 186a, for example. The light-emitting diode 420G includes an electrode 183b, a semiconductor layer 182b, a light-emitting layer 184b, a semiconductor layer 185b, and an electrode 186b, for example. The light-emitting diode 420B includes an electrode 183c, a semiconductor layer 182c, a light-emitting layer 184c, a semiconductor layer 185c, and an electrode 186c, for example.

A semiconductor layer 185a to a semiconductor layer 185c are formed over the substrate 410 in FIG. 51B. A light-emitting layer 184a to a light-emitting layer 184c are formed over some regions of the semiconductor layer 185a to the semiconductor layer 185c, respectively. The semiconductor layer 182a is formed over the light-emitting layer 184a, the semiconductor layer 182b is formed over the light-emitting layer 184b, and the semiconductor layer 182c is formed over the light-emitting layer 184c. A protective layer 411 is formed to cover the top surface of the substrate 410, the top surfaces and side surfaces of the semiconductor layer 185a to the semiconductor layer 185c, the side surfaces of the light-emitting layer 184a to the light-emitting layer 184c, and the top surfaces and side surfaces of the semiconductor layer 182a to the semiconductor layer 182.

Note that an opening portion is formed in the protective layer 411 in a region overlapping with part of the semiconductor layer 182a, and the electrode 183a is formed to cover part of the protective layer 411 and the top surface of the semiconductor layer 182a which corresponds to the bottom surface of the opening portion. Similarly, an opening portion is formed in the protective layer 411 in a region overlapping with part of the semiconductor layer 182b, and the electrode 183b is formed to cover part of the protective layer 411 and the top surface of the semiconductor layer 182b which corresponds to the bottom surface of the opening portion. Similarly, an opening portion is formed in the protective layer 411 in a region overlapping with part of the semiconductor layer 182c, and the electrode 183c is formed to cover part of the protective layer 411 and the top surface of the semiconductor layer 182c which corresponds to the bottom surface of the opening portion.

An opening portion is formed in the protective layer 411 in a region overlapping with part of the semiconductor layer 185a and not overlapping with the semiconductor layer 182a or the light-emitting layer 184a, and an electrode 186a is formed to cover part of the protective layer 411 and the semiconductor layer 185a which corresponds to the bottom surface of the opening portion. Similarly, an opening portion is formed in the protective layer 411 in a region overlapping with part of the semiconductor layer 185b and not overlapping with the semiconductor layer 182b or the light-emitting layer 184b, and an electrode 186b is formed to cover part of the protective layer 411 and the semiconductor layer 185b which corresponds to the bottom surface of the opening portion. Similarly, an opening portion is formed in the protective layer 411 in a region overlapping with part of the semiconductor layer 185c and not overlapping with the semiconductor layer 182c or the light-emitting layer 184c, and an electrode 186c is formed to cover part of the protective layer 411 and the semiconductor layer 185c which corresponds to the bottom surface of the opening portion.

The display apparatus 1000I has atop-emission structure. Light from the light-emitting diode 420R, the light-emitting diode 420G, and the light-emitting diode 420B are emitted to the substrate 410 side. For this reason, a material having a high visible-light-transmitting property is preferably used for the substrate 410. For example, a substrate having a high visible-light-transmitting property may be selected as the substrate 410 among substrates usable as the substrate BS.

As illustrated in FIG. 51A and FIG. 51B, the light-emitting layer 184a is sandwiched between the semiconductor layer 182a and the semiconductor layer 185a. In the light-emitting layer 184a, electrons and holes are combined to emit light. One of the semiconductor layer 182a and the semiconductor layer 185a is an n-type semiconductor layer, and the other of the semiconductor layer 182a and the semiconductor layer 185a is a p-type semiconductor layer. Similarly, the light-emitting layer 184b is sandwiched between the semiconductor layer 182b and the semiconductor layer 185b. In the light-emitting layer 184b, electrons and holes are combined to emit light. One of the semiconductor layer 182b and the semiconductor layer 185b is an n-type semiconductor layer, and the other of the semiconductor layer 182b and the semiconductor layer 185b is a p-type semiconductor layer. Similarly, the light-emitting layer 184c is sandwiched between the semiconductor layer 182c and the semiconductor layer 185c. In the light-emitting layer 184c, electrons and holes are combined to emit light. One of the semiconductor layer 182c and the semiconductor layer 185c is an n-type semiconductor layer, and the other of the semiconductor layer 182c and the semiconductor layer 185c is a p-type semiconductor layer.

Each of the light-emitting diode 420R, the light-emitting diode 420G, and the light-emitting diode 420B provided in the display apparatus 1000I in FIG. 51A has a stacked-layer structure including a pair of semiconductor layers and a light-emitting layer sandwiched between the pair of semiconductor layers, and the stacked-layer structure is formed to emit red light, green light, or blue light. Thus, colors of light emitted can be freely determined separately in the light-emitting diode 420R, the light-emitting diode 420G, and the light-emitting diode 420B. For example, the light-emitting diode 420R can be a light-emitting diode that emits red light, the light-emitting diode 420G can be a light-emitting diode that emits green light, and the light-emitting diode 420B can be a light-emitting diode that emits blue light. As the stacked-layer structure, the stacked-layer structure applicable to the light-emitting diode included in the LED package 170 in FIG. 48.

The color of light, other than red, green, and blue, emitted by the light-emitting diode 420 can be cyan, magenta, yellow, or white.

For the protective layer 411, an inorganic insulating film that can be used as the insulator 105 or an organic insulating film can be used, for example. Alternatively, for the protective layer 411, a material usable for the sealing layer 178 of the LED package 170 in FIG. 49A can be used, for example.

The substrate 410 is attached to the stack SST with use of a conductor 193a to a conductor 193c and a conductor 194a to a conductor 194c each serving as a bump. Specifically, the conductor 112a included in the stack SST and the electrode 183a of the light-emitting diode 420R are bonded through the conductor 194a; the conductor 111a included in the stack SST and the electrode 186a of the light-emitting diode 420R are bonded through the conductor 193a; the conductor 112b included in the stack SST and the electrode 183b of the light-emitting diode 420G are bonded through the conductor 194b; the conductor 111b included in the stack SST and the electrode 186b of the light-emitting diode 420G are bonded through the conductor 193b; the conductor 112c included in the stack SST and the electrode 183c of the light-emitting diode 420B are bonded through the conductor 194c; and the conductor 111c included in the stack SST and the electrode 186c of the light-emitting diode 420B are bonded through the conductor 193c.

For the conductor 193a to the conductor 193c and the conductor 194a to the conductor 194c, a material usable for the conductor 117a or the conductor 117b can be used.

The color conversion layer 190 used in the LED package 170A2 in FIG. 49C can be used for the display apparatus 1000I. Specifically, the color conversion layer 190 is provided between the substrate 410 and one or more selected from the semiconductor layer 185a to the semiconductor layer 185c in the path of light emitted by the light-emitting diode 420R, the light-emitting diode 420G, or the light-emitting diode 420B, whereby the color conversion layer 190 can convert the color of light emitted by the light-emitting layer into a different color.

Note that the structure examples of the display apparatuses described above may be combined with one another as appropriate.

Structure Example of Light-Emitting Device

Next, a structure example of a light-emitting device that can be used for the above-described display apparatus is described.

Figure 52A:
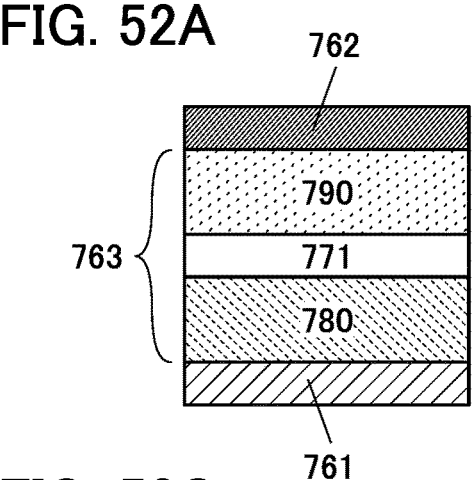
FIG. 52A to FIG. 52F each illustrate a structure example of a light-emitting device.

As illustrated in FIG. 52A, the light-emitting device includes an EL layer 763 between a pair of electrodes (a lower electrode 761 and an upper electrode 762). The EL layer 763 can be formed of a plurality of layers such as a layer 780, a light-emitting layer 771, and a layer 790.

The light-emitting layer 771 contains at least a light-emitting substance (also referred to as a light-emitting material).

In the case where the lower electrode 761 is an anode and the upper electrode 762 is a cathode, the layer 780 includes one or more of a layer containing a substance with a high hole-injection property (a hole-injection layer), a layer containing a substance with a high hole-transport property (a hole-transport layer), and a layer containing a substance with a high electron-blocking property (an electron-blocking layer). Furthermore, the layer 790 includes one or more of a layer containing a substance with a high electron-injection property (an electron-injection layer), a layer containing a substance with a high electron-transport property (an electron-transport layer), and a layer containing a substance with a high hole-blocking property (a hole-blocking layer). In the case where the lower electrode 761 is a cathode and the upper electrode 762 is an anode, the above structures of the layer 780 and the layer 790 are replaced with each other.

The structure including the layer 780, the light-emitting layer 771, and the layer 790, which is provided between a pair of electrodes, can function as a single light-emitting unit, and the structure in FIG. 52A is referred to as a single structure in this specification.

Figure 52B:
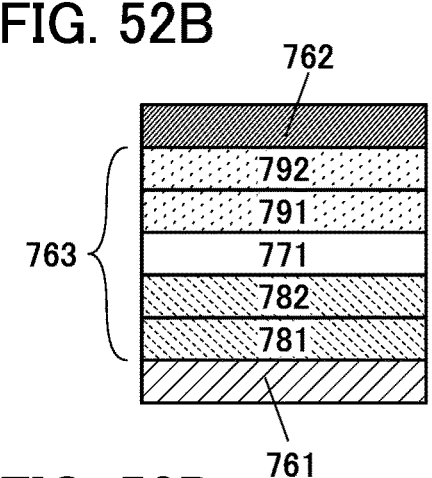

FIG. 52B is a modification example of the EL layer 763 included in the light-emitting device illustrated in FIG. 52A. Specifically, the light-emitting device illustrated in FIG. 52B includes a layer 781 over the lower electrode 761, a layer 782 over the layer 781, the light-emitting layer 771 over the layer 782, a layer 791 over the light-emitting layer 771, a layer 792 over the layer 791, and the upper electrode 762 over the layer 792.

In the case where the lower electrode 761 is an anode and the upper electrode 762 is a cathode, the layer 781 can be a hole-injection layer, the layer 782 can be a hole-transport layer, the layer 791 can be an electron-transport layer, and the layer 792 can be an electron-injection layer, for example. In the case where the lower electrode 761 is a cathode and the upper electrode 762 is an anode, the layer 781 can be an electron-injection layer, the layer 782 can be an electron-transport layer, the layer 791 can be a hole-transport layer, and the layer 792 can be a hole-injection layer. With such a layer structure, carriers can be efficiently injected to the light-emitting layer 771, and the efficiency of the recombination of carriers in the light-emitting layer 771 can be increased.

Figure 52C:
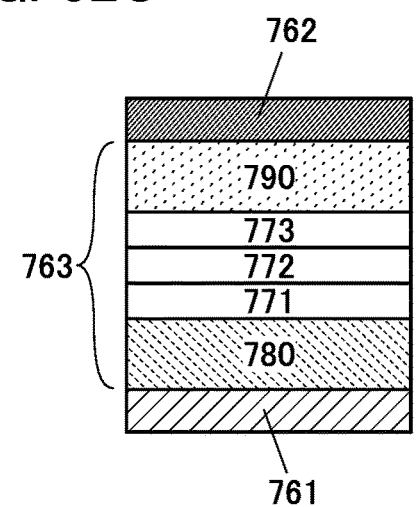
Figure 52D:
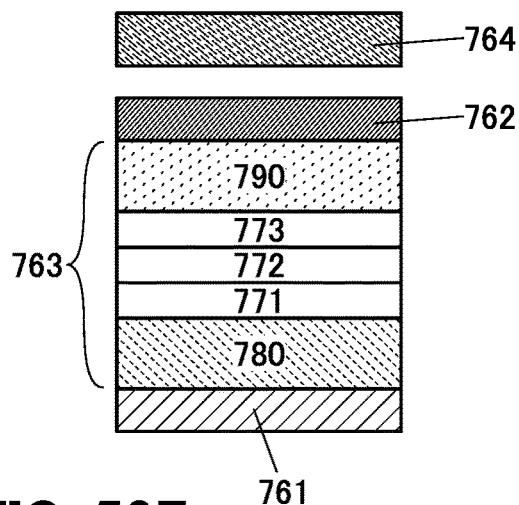

Note that structures in which a plurality of light-emitting layers (the light-emitting layer 771, a light-emitting layer 772, and a light-emitting layer 773) are provided between the layer 780 and the layer 790 as illustrated in FIG. 52C and FIG. 52D are variations of the single structure. Although FIG. 52C and FIG. 52D illustrate the examples where three light-emitting layers are included, the light-emitting device having a single structure may include two or four or more light-emitting layers. In addition, the light-emitting device having a single structure may include a buffer layer between two light-emitting layers.

Figure 52E:
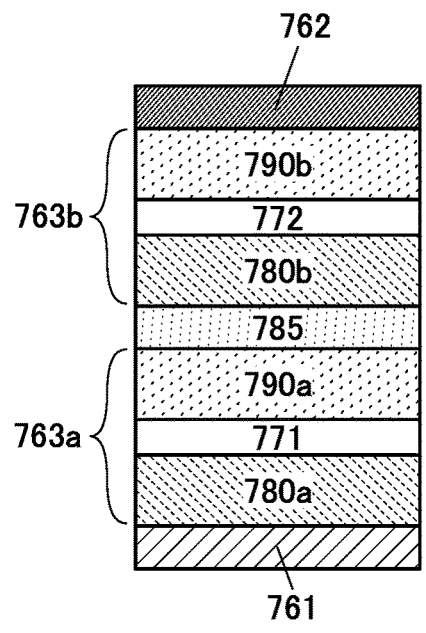
Figure 52F:
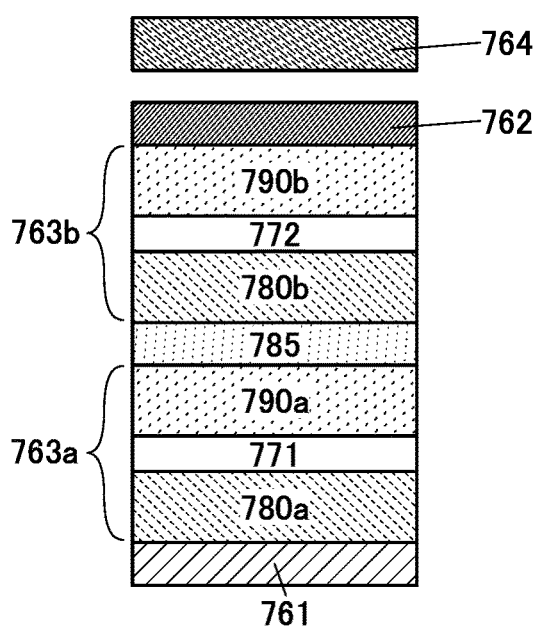

A structure in which a plurality of light-emitting units (a light-emitting unit 763a and a light-emitting unit 763b) are connected in series with a charge-generation layer 785 (also referred to as an intermediate layer) therebetween as illustrated in FIG. 52E and FIG. 52F is referred to as a tandem structure in this specification. Note that the tandem structure may be referred to as a stack structure. The tandem structure enables a light-emitting device capable of high-luminance light emission. Furthermore, the tandem structure reduces the amount of current needed for obtaining the same luminance as compared with a single structure, and thus can improve the reliability.

Note that FIG. 52D and FIG. 52F illustrate examples where the display apparatus includes a layer 764 overlapping with the light-emitting device. FIG. 52D illustrates an example where the layer 764 overlaps with the light-emitting device illustrated in FIG. 52C, and FIG. 52F illustrates an example where the layer 764 overlaps with the light-emitting device illustrated in FIG. 52E.

One or both of a color conversion layer and a color filter (coloring layer) can be used as the layer 764.

In FIG. 52C and FIG. 52D, light-emitting substances that emit light of the same color, or moreover, the same light-emitting substance may be used for the light-emitting layer 771, the light-emitting layer 772, and the light-emitting layer 773. For example, a light-emitting substance that emits blue light may be used for the light-emitting layer 771, the light-emitting layer 772, and the light-emitting layer 773. In a subpixel that emits blue light, blue light emitted from the light-emitting device can be extracted. In a subpixel that emits red light and a subpixel that emits green light, by providing a color conversion layer as the layer 764 illustrated in FIG. 52D, blue light emitted from the light-emitting device can be converted into light with a longer wavelength, and red light or green light can be extracted.

Alternatively, light-emitting substances that emit light of different colors may be used for the light-emitting layer 771, the light-emitting layer 772, and the light-emitting layer 773. The light-emitting device preferably enables white light emission by combining light emitted by the light-emitting layer 771, the light-emitting layer 772, and the light-emitting layer 773. The light-emitting device having a single structure preferably includes a light-emitting layer containing a light-emitting substance that emits blue light and a light-emitting layer containing a light-emitting substance that emits visible light with a longer wavelength than blue light, for example.

In the case where the light-emitting device having a single structure includes three light-emitting layers, for example, a light-emitting layer containing a light-emitting substance that emits red (R) light, a light-emitting layer containing a light-emitting substance that emits green (G) light, and a light-emitting layer containing a light-emitting substance that emits blue (B) light are preferably included. The stacking order of the light-emitting layers can be, for example, a red (R) light-emitting layer, a green (G) light-emitting layer, and a blue (B) light-emitting layer from the anode side, or a red (R) light-emitting layer, a blue (B) light-emitting layer, and a green (G) light-emitting layer from the anode side. At this time, a buffer layer may be provided between a red (R) light-emitting layer and a green (G) light-emitting layer or between a red (R) light-emitting layer and a blue (B) light-emitting layer.

For example, in the case where the light-emitting device having a single structure includes two light-emitting layers, the light-emitting device preferably includes a light-emitting layer containing a light-emitting substance that emits blue (B) light and a light-emitting layer containing a light-emitting substance that emits yellow (Y) light. Such a structure may be referred to as a BY single structure.

A color filter may be provided as the layer 764 illustrated in FIG. 52D. When white light passes through the color filter, light of a desired color can be obtained.

The light-emitting device that emits white light preferably contains two or more kinds of light-emitting substances. To obtain white light emission, two light-emitting substances may be selected such that the emission colors of the two light-emitting substances are complementary colors. For example, when an emission color of a first light-emitting layer and an emission color of a second light-emitting layer are complementary colors, the light-emitting device can be configured to emit white light as a whole. To obtain white light emission by using three or more light-emitting layers, the light-emitting device is configured to emit white light as a whole by combining emission colors of the three or more light-emitting layers.

In FIG. 52E and FIG. 52F, light-emitting substances that emit light of the same color, or moreover, the same light-emitting substance may be used for the light-emitting layer 771 and the light-emitting layer 772.

For example, in light-emitting devices included in subpixels emitting light of different colors, a light-emitting substance that emits blue light may be used for each of the light-emitting layer 771 and the light-emitting layer 772. In a subpixel that emits blue light, blue light emitted from the light-emitting device can be extracted. In the subpixel that emits red light and the subpixel that emits green light, by providing a color conversion layer as the layer 764 illustrated in FIG. 52F, blue light emitted from the light-emitting device can be converted into light with a longer wavelength, and red light or green light can be extracted.

In the case where the light-emitting device having the structure illustrated in FIG. 52E or FIG. 52F is used for the subpixels emitting different colors, the subpixels may use different light-emitting substances. Specifically, in the light-emitting device included in the subpixel emitting red light, a light-emitting substance that emits red light may be used for each of the light-emitting layer 771 and the light-emitting layer 772. Similarly, in the light-emitting device included in the subpixel emitting green light, a light-emitting substance that emits green light may be used for each of the light-emitting layer 771 and the light-emitting layer 772. In the light-emitting device included in the subpixel emitting blue light, a light-emitting substance that emits blue light may be used for each of the light-emitting layer 771 and the light-emitting layer 772. A display apparatus having such a structure can be regarded as employing a light-emitting device with the tandem structure and the SBS structure. Thus, advantages of both the tandem structure and the SBS structure can be achieved. Accordingly, a display apparatus being capable of high-luminance light emission and having high reliability can be obtained.

In FIG. 52E and FIG. 52F, light-emitting substances that emit light of different colors may be used for the light-emitting layer 771 and the light-emitting layer 772. White light emission can be obtained when the light-emitting layer 771 and the light-emitting layer 772 emit light of complementary colors. A color filter may be provided as the layer 764 illustrated in FIG. 52F. When white light passes through the color filter, light of a desired color can be obtained.

Although FIG. 52E and FIG. 52F illustrate examples where the light-emitting unit 763a includes one light-emitting layer 771 and the light-emitting unit 763b includes one light-emitting layer 772, one embodiment of the present invention is not limited thereto. Each of the light-emitting unit 763a and the light-emitting unit 763b may include two or more light-emitting layers.

In addition, although FIG. 52E and FIG. 52F each illustrate the light-emitting device including two light-emitting units as an example, one embodiment of the present invention is not limited thereto. The light-emitting device may include three or more light-emitting units.

Figure 53A:
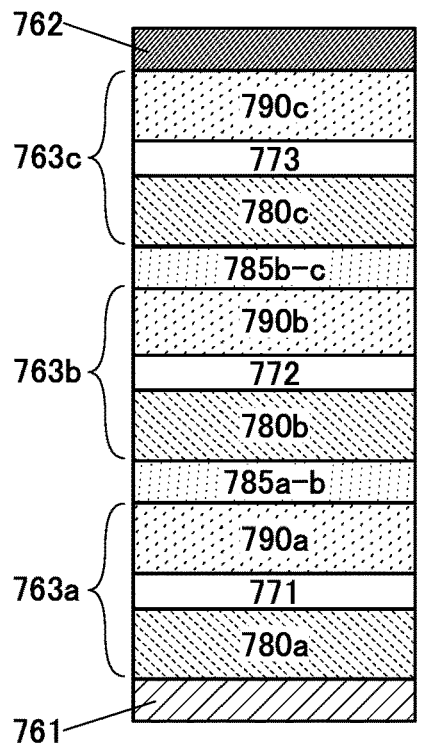
FIG. 53A to FIG. 53C each illustrate a structure example of a light-emitting device.
Figure 53B:
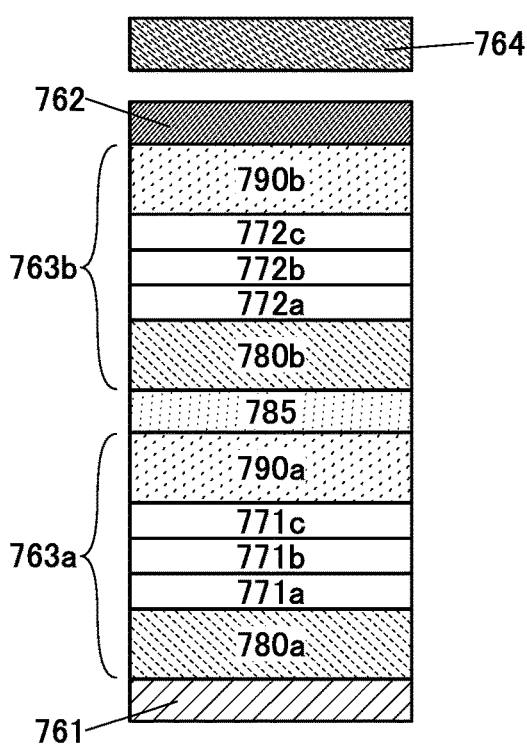
Figure 53C:
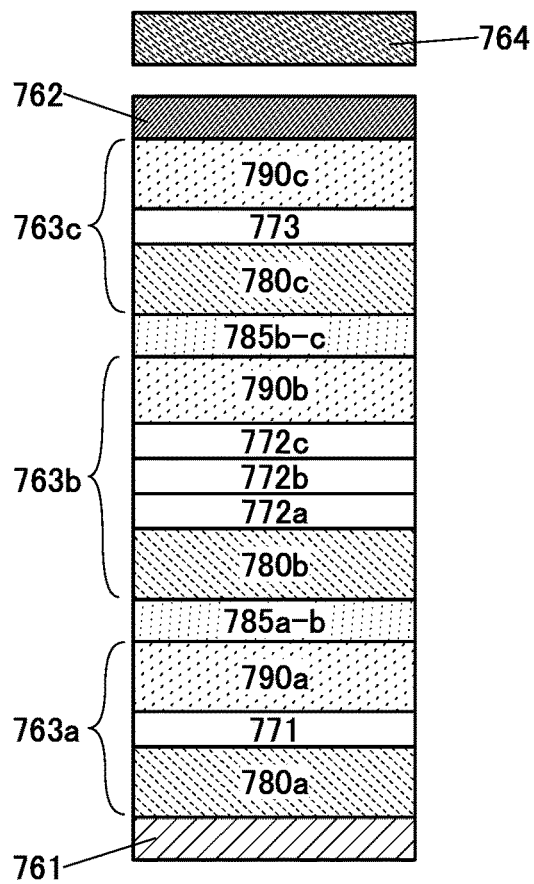

Specifically, structures of the light-emitting device illustrated in FIG. 53A and FIG. 53C can be given.

FIG. 53A illustrates a structure including three light-emitting units. Note that a structure including two light-emitting units and a structure including three light-emitting units may be referred to as a two-unit tandem structure and a three-unit tandem structure, respectively.

As illustrated in FIG. 53A, a plurality of light-emitting units (the light-emitting unit 763a, the light-emitting unit 763b, and a light-emitting unit 763c) are connected in series through charge-generation layers (a charge-generation layer 785a-b and a charge-generation layer 785b-c). Specifically, in the light-emitting device illustrated in FIG. 53A, the light-emitting unit 763a, the charge-generation layer 785a-b, the light-emitting unit 763b, the charge-generation layer 785b-c, and the light-emitting unit 763c are stacked in this order. The light-emitting unit 763a includes a layer 780a, the light-emitting layer 771, and a layer 790a. The light-emitting unit 763b includes a layer 780b, the light-emitting layer 772, and a layer 790b. The light-emitting unit 763c includes a layer 780c, the light-emitting layer 773, and a layer 790c.

For the charge-generation layer 785a-b and the charge-generation layer 785b-c, the above description of the charge-generation layer 785 is referred to.

In the structure illustrated in FIG. 53A, the light-emitting layer 771, the light-emitting layer 772, and the light-emitting layer 773 preferably contain light-emitting substances that emit light of the same color. Specifically, the light-emitting layer 771, the light-emitting layer 772, and the light-emitting layer 773 can each contain a light-emitting substance that emits red (R) light (what is called an R\R\R three-unit tandem structure); the light-emitting layer 771, the light-emitting layer 772, and the light-emitting layer 773 can each contain a light-emitting substance that emits green (G) light (what is called a G\G\G three-unit tandem structure); or the light-emitting layer 771, the light-emitting layer 772, and the light-emitting layer 773 can each contain a light-emitting substance that emits blue (B) light (what is called a B\B\B three-unit tandem structure). Note that in the structure illustrated in FIG. 53A, the light-emitting layer 771, the light-emitting layer 772, and the light-emitting layer 773 may contain light-emitting substances that emit light of different colors. The structure illustrated in FIG. 53A may exhibit white (W) light by mixing light emitted from the light-emitting layer 771, the light-emitting layer 772, and the light-emitting layer 773. In the structure illustrated in FIG. 53A, the layer 764 may be provided as a color filter as in FIG. 52D or FIG. 52F.

Note that the structure containing the light-emitting substances that emit light of the same color is not limited to the above structure. For example, a light-emitting device having a tandem structure may be employed in which light-emitting units each including a plurality of light-emitting substances are stacked as illustrated in FIG. 53B. FIG. 53B illustrates a structure in which a plurality of light-emitting units (the light-emitting unit 763a and the light-emitting unit 763b) are connected in series with the charge-generation layer 785 therebetween. The light-emitting unit 763a includes the layer 780a, a light-emitting layer 771a, a light-emitting layer 771b, a light-emitting layer 771c, and the layer 790a. The light-emitting unit 763b includes the layer 780b, a light-emitting layer 772a, a light-emitting layer 772b, a light-emitting layer 772c, and the layer 790b.

In the structure illustrated in FIG. 53B, white (W) light can be obtained by combining colors of light emitted by the light-emitting layer 771a, the light-emitting layer 771b, and the light-emitting layer 771c. In addition, white (W) light can be obtained by combining colors of light emitted by the light-emitting layer 772a, the light-emitting layer 772b, and the light-emitting layer 772c. That is, the structure illustrated in FIG. 53B is a two-unit tandem structure of W\W. Note that there is no particular limitation on the stacking order of the light-emitting layer 771a, the light-emitting layer 771b, and the light-emitting layer 771c. Similarly, there is no particular limitation on the stacking order of the light-emitting layer 772a, the light-emitting layer 772b, and the light-emitting layer 772c. The practitioner can select the optimal stacking order as appropriate. Although not illustrated, the structure illustrated in FIG. 53(B) may be a three-unit tandem structure of W\W\W or a tandem structure with four or more units.

In the case of using a light-emitting device having a tandem structure, the following structure can be given: a B\Y two-unit tandem structure including a light-emitting unit that emits yellow (Y) light and a light-emitting unit that emits blue (B) light; an RG\B two-unit tandem structure including a light-emitting unit that emits red (R) light and green (G) light and a light-emitting unit that emits blue (B) light; a B\Y\B three-unit tandem structure including a light-emitting unit that emits blue (B) light, a light-emitting unit that emits yellow (Y) light, and a light-emitting unit that emits blue (B) light in this order; a B\YG\B three-unit tandem structure including a light-emitting unit that emits blue (B) light, a light-emitting unit that emits yellowish-green (YG) light, and a light-emitting unit that emits blue (B) light in this order; and a B\G\B three-unit tandem structure including a light-emitting unit that emits blue (B) light, a light-emitting unit that emits green (G) light, and a light-emitting unit that emits blue (B) light in this order.

As illustrated in FIG. 53C, a light-emitting unit including one light-emitting substance and a light-emitting unit including a plurality of light-emitting substances may be used in combination.

Specifically, in the structure illustrated in FIG. 53C, a plurality of light-emitting units (the light-emitting unit 763a, the light-emitting unit 763b, and the light-emitting unit 763c) are connected in series through the charge-generation layers (the charge-generation layer 785a-b and the charge-generation layer 785b-c). The light-emitting unit 763a includes the layer 780a, the light-emitting layer 771, and the layer 790a. The light-emitting unit 763b includes a layer 780b, the light-emitting layer 772a, the light-emitting layer 772b, the light-emitting layer 772c, and the layer 790b. The light-emitting unit 763c includes the layer 780c, the light-emitting layer 773, and the layer 790c.

As the structure illustrated in FIG. 53C, for example, a three-unit tandem structure of B\R·G·YG\B in which the light-emitting unit 763a is a light-emitting unit that emits blue (B) light, the light-emitting unit 763b is a light-emitting unit that emits red (R), green (G), and yellowish-green (YG) light, and the light-emitting unit 763c is a light-emitting unit that emits blue (B) light can be employed.

Examples of the number of stacked light-emitting units and the order of colors from the anode side include a two-unit structure of B and Y, a two-unit structure of B and a light-emitting unit X, a three-unit structure of B, Y, and B, and a three-unit structure of B, the light-emitting unit X, and B. Examples of the number of light-emitting layers stacked in the light-emitting unit X and the order of colors from the anode side include a two-layer structure of R and Y, a two-layer structure of R and G, a two-layer structure of G and R, a three-layer structure of G, R, and G, and a three-layer structure of R, G, and R. Another layer may be provided between two light-emitting layers.

Also in FIG. 52C and FIG. 52D, the layer 780 and the layer 790 may each independently have a stacked-layer structure of two or more layers as illustrated in FIG. 53B.

In FIG. 52E and FIG. 52F, the light-emitting unit 763a includes the layer 780a, the light-emitting layer 771, and the layer 790a, and the light-emitting unit 763b includes the layer 780b, the light-emitting layer 772, and the layer 790b.

In the case where the lower electrode 761 is an anode and the upper electrode 762 is a cathode, the layer 780a and the layer 780b each include one or more of a hole-injection layer, a hole-transport layer, and an electron-blocking layer. The layer 790a and the layer 790b each include one or more of an electron-injection layer, an electron-transport layer, and a hole-blocking layer. In the case where the lower electrode 761 is a cathode and the upper electrode 762 is an anode, the structures of the layer 780a and the layer 790a are replaced with each other, and the structures of the layer 780b and the layer 790b are also replaced with each other.

In the case where the lower electrode 761 is an anode and the upper electrode 762 is a cathode, for example, the layer 780a includes a hole-injection layer and a hole-transport layer over the hole-injection layer, and may further include an electron-blocking layer over the hole-transport layer. The layer 790a includes an electron-transport layer, and may further include a hole-blocking layer between the light-emitting layer 771 and the electron-transport layer. The layer 780b includes a hole-transport layer, and may further include an electron-blocking layer over the hole-transport layer. The layer 790b includes an electron-transport layer and an electron-injection layer over the electron-transport layer, and may further include a hole-blocking layer between the light-emitting layer 772 and the electron-transport layer. In the case where the lower electrode 761 is a cathode and the upper electrode 762 is an anode, for example, the layer 780a includes an electron-injection layer and an electron-transport layer over the electron-injection layer, and may further include a hole-blocking layer over the electron-transport layer. The layer 790a includes a hole-transport layer, and may further include an electron-blocking layer between the light-emitting layer 771 and the hole-transport layer. The layer 780b includes an electron-transport layer, and may further include a hole-blocking layer over the electron-transport layer. The layer 790b includes a hole-transport layer and a hole-injection layer over the hole-transport layer, and may further include an electron-blocking layer between the light-emitting layer 772 and the hole-transport layer.

In the case of fabricating a light-emitting device having a tandem structure, two light-emitting units are stacked with the charge-generation layer 785 therebetween. The charge-generation layer 785 includes at least a charge-generation region. The charge-generation layer 785 has a function of injecting electrons into one of the two light-emitting units and injecting holes into the other when voltage is applied between the pair of electrodes.

Next, materials that can be used for the light-emitting device will be described.

A conductive film transmitting visible light is used as the electrode through which light is extracted, which is either the lower electrode 761 or the upper electrode 762. A conductive film reflecting visible light is preferably used as the electrode through which light is not extracted. In the case where a display apparatus includes a light-emitting device emitting infrared light, it is preferable that a conductive film transmitting visible light and infrared light be used as the electrode through which light is extracted, and a conductive film reflecting visible light and infrared light be used as the electrode through which light is not extracted.

A conductive film transmitting visible light may be used as the electrode through which light is not extracted. In that case, the electrode is preferably placed between a reflective layer and the EL layer 763. In other words, light emitted from the EL layer 763 may be reflected by the reflective layer to be extracted from the display apparatus.

As a material that forms the pair of electrodes of the light-emitting device, a metal, an alloy, an electrically conductive compound, a mixture thereof, or the like can be used as appropriate. Specific examples of the material include metals such as aluminum, titanium, chromium, manganese, iron, cobalt, nickel, copper, gallium, zinc, indium, tin, molybdenum, tantalum, tungsten, palladium, gold, platinum, silver, yttrium, and neodymium, and an alloy containing any of these metals in appropriate combination. Examples of the material include indium tin oxide (In—Sn oxide, also referred to as ITO), In—Si—Sn oxide (also referred to as ITSO), indium zinc oxide (In—Zn oxide), and In—W—Zn oxide. Another example of the material is an alloy containing aluminum (an aluminum alloy). An example of the alloy containing aluminum is an alloy (Al—Ni—La) of aluminum (Al), nickel (Ni), and lanthanum (La). Another example of the material is an alloy (Ag—Pd—Cu, also referred to as APC) of silver, palladium, and copper. Other example of the material include elements belonging to Group 1 or Group 2 of the periodic table, which are not exemplified above (e.g., lithium, cesium, calcium, and strontium), rare earth metals such as europium and ytterbium, an alloy containing any of these metals in appropriate combination, and graphene.

The light-emitting device preferably employs a microcavity structure. Therefore, one of the pair of electrodes of the light-emitting device preferably includes an electrode having properties of transmitting and reflecting visible light (a transflective electrode), and the other preferably includes an electrode having a property of reflecting visible light (a reflective electrode). When the light-emitting device has a microcavity structure, light obtained from the light-emitting layer can be resonated between the electrodes, whereby light emitted from the light-emitting device can be intensified.

The transflective electrode is preferably formed with, for example, a conductor having properties of transmitting and reflecting visible light. Alternatively, for example, the transflective electrode may have a stacked-layer structure of a conductive layer that can be used as a reflective electrode and a conductive layer that can be used as an electrode having a property of transmitting visible light (also referred to as a transparent electrode).

The transparent electrode has a light transmittance higher than or equal to 40%. For example, an electrode having a visible light (light with a wavelength longer than or equal to 400 nm and shorter than 750 nm) transmittance higher than or equal to 40% is preferably used as the transparent electrode of the light-emitting device. The transflective electrode has a visible light reflectance higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes preferably have a resistivity less than or equal to $1 \times 10^{-2}$ Ωcm.

The light-emitting device includes at least the light-emitting layer. The light-emitting device may further include, as a layer other than the light-emitting layer, a layer containing a substance with a high hole-injection property, a substance with a high hole-transport property, a hole-blocking material, a substance with a high electron-transport property, an electron-blocking material, a substance with a high electron-injection property, or a substance with a bipolar property (a substance with a high electron-transport property and a high hole-transport property). For example, the light-emitting device can include one or more of a hole-injection layer, a hole-transport layer, a hole-blocking layer, a charge-generation layer, an electron-blocking layer, an electron-transport layer, and an electron-injection layer in addition to the light-emitting layer.

Either a low molecular compound or a high molecular compound can be used in the light-emitting device, and an inorganic compound may be included. Each layer included in the light-emitting device can be formed by any of the following methods: an evaporation method (including a vacuum evaporation method), a transfer method, a printing method, an ink-jet method, and a coating method.

The light-emitting layer contains one or more kinds of light-emitting substances. As the light-emitting substance, for example, a substance exhibiting an emission color of blue, violet, bluish violet, green, yellowish green, yellow, orange, or red is used as appropriate. Alternatively, as the light-emitting substance, a substance that emits near-infrared light can be used.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (e.g., a host material and an assist material) in addition to the light-emitting substance (a guest material). As one or more kinds of organic compounds, one or both of a substance with a high hole-transport property (a hole-transport material) and a substance with a high electron-transport property (an electron-transport material) can be used. As the hole-transport material, it is possible to use a material having a high hole-transport property which can be used for the hole-transport layer and will be described later. As the electron-transport material, it is possible to use a material having a high electron-transport property which can be used for the electron-transport layer and will be described later. Alternatively, as one or more kinds of organic compounds, a bipolar material or a TADF material may be used.

The light-emitting layer preferably contains a phosphorescent material and a combination of a hole-transport material and an electron-transport material that easily forms an exciplex, for example. Such a structure makes it possible to efficiently obtain light emission using ExTET (Exciplex-Triplet Energy Transfer), which is energy transfer from an exciplex to a light-emitting substance (a phosphorescent material). When a combination is selected to form an exciplex that exhibits light emission whose wavelength overlaps with the wavelength of the lowest-energy-side absorption band of the light-emitting substance, energy can be transferred smoothly and light emission can be obtained efficiently. With this structure, high efficiency, low-voltage driving, and a long lifetime of the light-emitting device can be achieved at the same time.

The hole-injection layer is a layer injecting holes from the anode to the hole-transport layer, and is a layer containing a material with a high hole-injection property. Examples of a material with a high hole-injection property include an aromatic amine compound and a composite material containing a hole-transport material and an acceptor material (electron-accepting material).

As the hole-transport material, it is possible to use a material having a high hole-transport property which can be used for the hole-transport layer and will be described later.

As the acceptor material, an oxide of a metal belonging to Group 4 to Group 8 of the periodic table can be used, for example. Specific examples of the oxide of the metal include molybdenum oxide, vanadium oxide, niobium oxide, tantalum oxide, chromium oxide, tungsten oxide, manganese oxide, and rhenium oxide. Among these, molybdenum oxide is particularly preferable since it is stable in the air, has a low hygroscopic property, and is easy to handle. An organic acceptor material containing fluorine can be used. An organic acceptor material such as a quinodimethane derivative, a chloranil derivative, or a hexaazatriphenylene derivative can be used.

As the material having a high hole-injection property, a material that contains a hole-transport material and the above-described oxide of a metal belonging to any of Group 4 to Group 8 of the periodic table (typically, molybdenum oxide) may be used, for example.

The hole-transport layer is a layer transporting holes injected from the anode by the hole-injection layer, to the light-emitting layer. The hole-transport layer is a layer containing a hole-transport material. As the hole-transport material, a substance having a hole mobility higher than or equal to $1\times10^{-6}$ cm$^2$/Vs is preferable. Note that other substances can also be used as long as the substances have a hole-transport property higher than an electron-transport property. As the hole-transport material, a material with a high hole-transport property, such as a π-electron rich heteroaromatic compound (e.g., a carbazole derivative, a thiophene derivative, or a furan derivative) or an aromatic amine (a compound having an aromatic amine skeleton), is preferable.

The electron-blocking layer is provided in contact with the light-emitting layer. The electron-blocking layer has a hole-transport property and contains a material capable of blocking electrons. Any of the materials having an electron-blocking property among the above hole-transport materials can be used for the electron-blocking layer.

The electron-blocking layer has a hole-transport property, and thus can also be referred to as a hole-transport layer. A layer having an electron-blocking property among the hole-transport layers can also be referred to as an electron-blocking layer.

The electron-transport layer is a layer transporting electrons injected from the cathode by the electron-injection layer, to the light-emitting layer. The electron-transport layer is a layer containing an electron-transport material. As the electron-transport material, a substance having an electron mobility higher than or equal to $1\times10^{-6}$ cm$^2$/Vs is preferable. Note that other substances can also be used as long as the substances have an electron-transport property higher than a hole-transport property. As the electron-transport material, any of the following materials with a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and a π-electron deficient heteroaromatic compound such as a nitrogen-containing heteroaromatic compound.

The hole-blocking layer is provided in contact with the light-emitting layer. The hole-blocking layer has an electron-transport property and contains a material capable of blocking holes. Any of the materials having a hole-blocking property among the above electron-transport materials can be used for the hole-blocking layer.

The hole-blocking layer has an electron-transport property, and thus can also be referred to as an electron-transport layer. A layer having a hole-blocking property among the electron-transport layers can also be referred to as a hole-blocking layer.

The electron-injection layer is a layer injecting electrons from the cathode to the electron-transport layer, and is a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The difference between the lowest unoccupied molecular orbital (LUMO) level of the material with a high electron-injection property and the work function value of the material used for the cathode is preferably small (specifically, smaller than or equal to 0.5 eV).

For the electron-injection layer, for example, an alkali metal, an alkaline earth metal, or a compound thereof, such as lithium, cesium, ytterbium, lithium fluoride (LiF), cesium fluoride (CsF), calcium fluoride ($CaF_x$, where x is a given number), 8-(quinolinolato)lithium (abbreviation: Liq), 2-(2-pyridyl)phenolatolithium (abbreviation: LiPP), 2-(2-pyridyl)-3-pyridinolatolithium (abbreviation: LiPPy), 4-phenyl-2-(2-pyridyl)phenolatolithium (abbreviation: LiPPP), lithium oxide ($LiO_x$), or cesium carbonate can be used. The electron-injection layer may have a stacked-layer structure of two or more layers. The stacked-layer structure can be, for example, a structure in which lithium fluoride is used for the first layer and ytterbium is used for the second layer.

The electron-injection layer may contain an electron-transport material. For example, a compound having an unshared electron pair and an electron deficient heteroaromatic ring can be used as the electron-transport material. Specifically, a compound having one or more selected from a pyridine ring, a diazine ring (e.g., a pyrimidine ring, a pyrazine ring, or a pyridazine ring), and a triazine ring can be used.

Note that the LUMO level of the organic compound having an unshared electron pair is preferably higher than or equal to −3.6 eV and lower than or equal to −2.3 eV. In general, the highest occupied molecular orbital (HOMO) level and the LUMO level of an organic compound can be estimated by CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2',3'-c]phenazine (abbreviation: HATNA), or 2,4,6-tris[3'-(pyridin-3-yl)biphenyl-3-yl]-1,3,5-triazine (abbreviation: TmPPPyTz) can be used for the organic compound having an unshared electron pair. Note that NBPhen has a higher glass transition temperature (Tg) than BPhen and thus has high heat resistance.

As described above, the charge-generation layer includes at least a charge-generation region. The charge-generation region preferably contains an acceptor material, and for example, preferably contains a hole-transport material and an acceptor material which can be used for the hole-injection layer.

The charge-generation layer preferably includes a layer containing a material having a high electron-injection property. The layer can also be referred to as an electron-injection buffer layer. The electron-injection buffer layer is preferably provided between the charge-generation region and the electron-transport layer. By provision of the electron-injection buffer layer, an injection barrier between the charge-generation region and the electron-transport layer can be lowered; thus, electrons generated in the charge-generation region can be easily injected into the electron-transport layer.

The electron-injection buffer layer preferably contains an alkali metal or an alkaline earth metal, and for example, can contain an alkali metal compound or an alkaline earth metal compound. Specifically, the electron-injection buffer layer preferably contains an inorganic compound containing an alkali metal and oxygen or an inorganic compound containing an alkaline earth metal and oxygen, further preferably contains an inorganic compound containing lithium and oxygen (e.g., lithium oxide ($Li_2O$)). Alternatively, a material that can be used for the electron-injection layer can be suitably used for the electron-injection buffer layer.

The charge-generation layer preferably includes a layer containing a material having a high electron-transport property. The layer can also be referred to as an electron-relay layer. The electron-relay layer is preferably provided between the charge-generation region and the electron-injection buffer layer. In the case where the charge-generation layer does not include an electron-injection buffer layer, the electron-relay layer is preferably provided between the charge-generation region and the electron-transport layer. The electron-relay layer has a function of preventing interaction between the charge-generation region and the electron-injection buffer layer (or the electron-transport layer) and smoothly transferring electrons.

A phthalocyanine-based material such as copper(II) phthalocyanine (abbreviation: CuPc) or a metal complex having a metal-oxygen bond and an aromatic ligand is preferably used for the electron-relay layer.

Note that the charge-generation region, the electron-injection buffer layer, and the electron-relay layer cannot be clearly distinguished from each other in some cases on the basis of the cross-sectional shapes, the characteristics, or the like.

Note that the charge-generation layer may contain a donor material instead of an acceptor material. For example, the charge-generation layer may include a layer containing an electron-transport material and a donor material, which can be used for the electron-injection layer.

When the light-emitting units are stacked, provision of a charge-generation layer between two light-emitting units can inhibit an increase in driving voltage.

Structure Example of Pixel Circuit

Here, structure examples of a pixel circuit that can be included in the pixel layer PXAL are described.

Figure 54A:
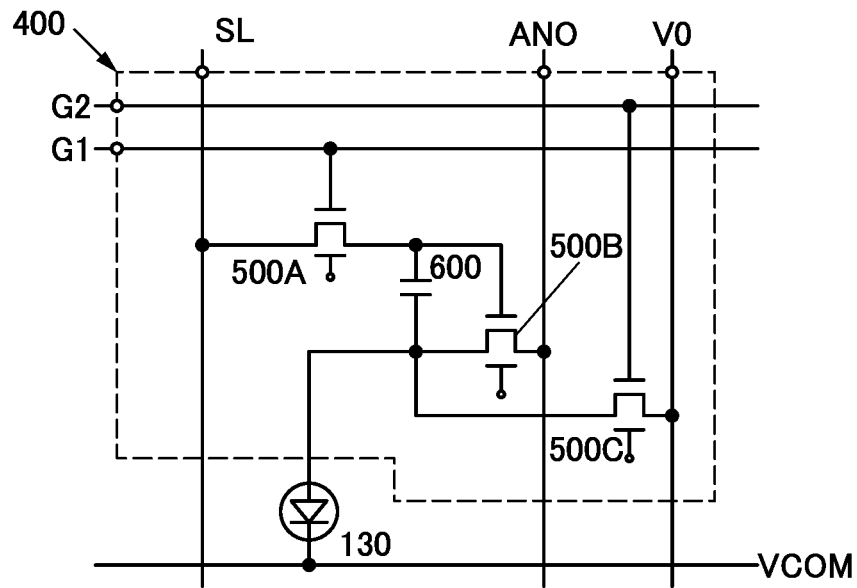
FIG. 54A is a circuit diagram illustrating a structure example of a pixel circuit included in a display apparatus.
Figure 54B:
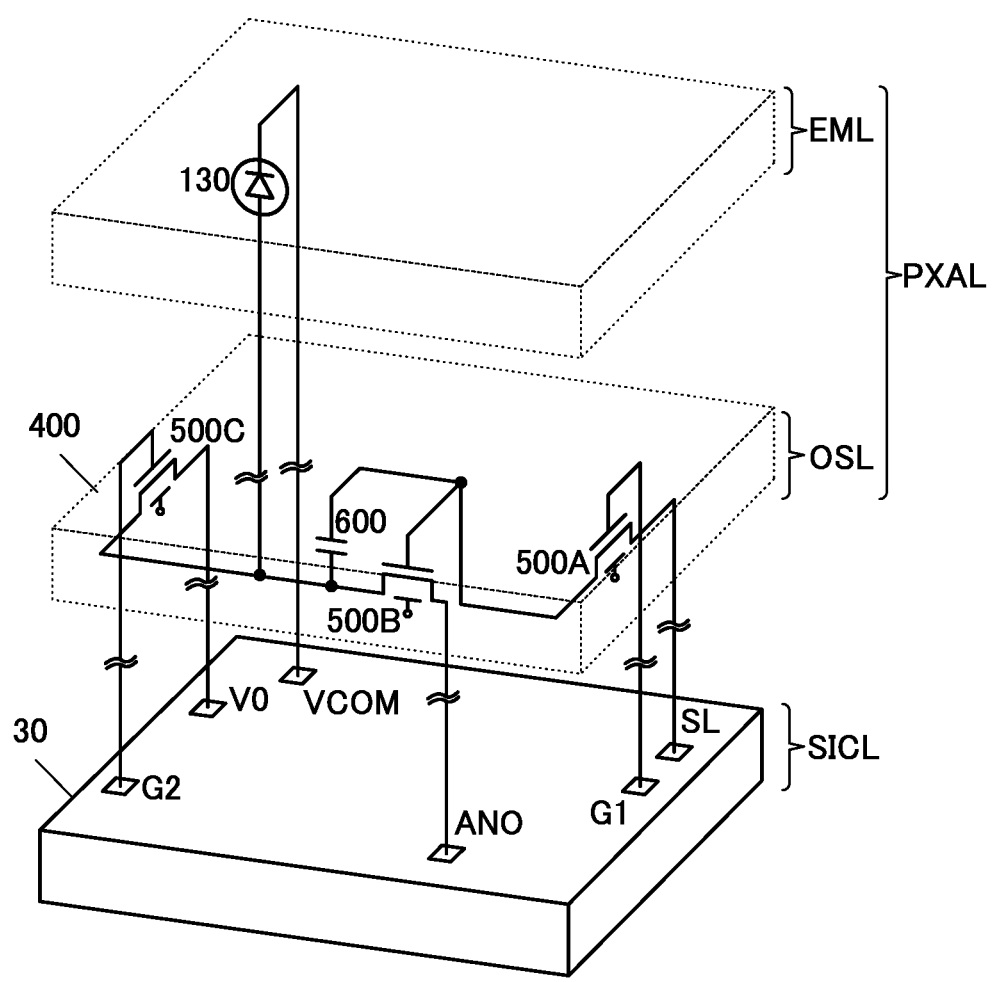
FIG. 54B is a schematic perspective view illustrating a structure example of a pixel circuit included in a display apparatus.

FIG. 54A and FIG. 54B illustrate a structure example of a pixel circuit that can be included in the pixel layer PXAL and the light-emitting device 130 connected to the pixel circuit. FIG. 54A is a diagram illustrating connection of circuit elements included in a pixel circuit 400 included in the pixel layer PXAL, and FIG. 54B is a diagram schematically illustrating the vertical relation of the circuit layer SICL including a driver circuit 30, a layer OSL including a plurality of transistors of the pixel circuit, and a layer EML including the light-emitting device 130. Note that the pixel layer PXAL of the display apparatus 1000 illustrated in FIG. 54B includes the layer OSL and the layer EML, for example. A transistor 500A, a transistor 500B, and a transistor 500C included in the layer OSL illustrated in FIG. 54B each correspond to the transistor 500 in FIG. 36 and the transistor 200 in FIG. 43, for example. The light-emitting device 130 included in the layer EML illustrated in FIG. 54B corresponds to the light-emitting device 130R, the light-emitting device 130G, or the light-emitting device 130B in FIG. 36.

The pixel circuit 400 illustrated as an example in FIG. 54A and FIG. 54B includes the transistor 500A, the transistor 500B, the transistor 500C, and a capacitor 600. The transistor 500A, the transistor 500B, and the transistor 500C can be, for example, transistors usable as the transistor 500 or the transistor 200 described above as examples. That is, the transistor 500A, the transistor 500B, and the transistor 500C can be OS transistors. Alternatively, the transistor 500A, the transistor 500B, and the transistor 500C can be, for example, Si transistors. In particular, in the case where the transistor 500A, the transistor 500B, and the transistor 500C are OS transistors, each of the transistor 500A, the transistor 500B, and the transistor 500C preferably includes a back gate, in which case the structure in which the back gate is supplied with the same signals as those supplied to the gate or the structure in which the back gate is supplied with signals different from those supplied to the gate can be used. Although each of the transistor 500A, the transistor 500B, and the transistor 500C illustrated in FIG. 54A and FIG. 54B includes a back gate, each of the transistor 500A, the transistor 500B, and the transistor 500C does not necessarily include a back gate.

The transistor 500B includes a gate electrically connected to the transistor 500A, a first electrode electrically connected to the light-emitting device 130, and a second electrode electrically connected to a wiring ANO. The wiring ANO is a wiring for supplying a potential for supplying current to the light-emitting device 130.

The transistor 500A includes a first electrode electrically connected to the gate of the transistor 500B, a second electrode electrically connected to the wiring SL functioning as a source line, and the gate having a function of controlling switching of the on state and the off state on the basis of the potential of a wiring G1 functioning as a gate line.

The transistor 500C includes a first electrode electrically connected to a wiring V0, a second electrode electrically connected to the light-emitting device 130, and the gate electrode having a function of controlling switching of the on state and the off state on the basis of the potential of a wiring G2 functioning as a gate line. The wiring V0 is a wiring for supplying a reference potential and a wiring for outputting a current flowing through the pixel circuit 400 to the driver circuit 30.

The capacitor 600 includes a conductive film electrically connected to the gate electrode of the transistor 500B and a conductive film electrically connected to a second electrode of the transistor 500C.

The light-emitting device 130 includes a first electrode electrically connected to the first electrode of the transistor 500B and a second electrode electrically connected to a wiring VCOM. The wiring VCOM is a wiring for supplying a potential for supplying current to the light-emitting device 130.

Accordingly, the intensity of light emitted from the light-emitting device 130 can be controlled in accordance with an image signal supplied to the gate electrode of the transistor 500B. Furthermore, variations in the gate-source voltage of the transistor 500B can be inhibited by the reference potential of the wiring V0 supplied through the transistor 500C.

A current value that can be used for setting pixel parameters can be output from the wiring V0. Specifically, the wiring V0 can function as a monitor line for outputting a current flowing through the transistor 500B or a current flowing through the light-emitting device 130 to the outside. A current output to the wiring V0 is converted into a voltage by, for example, a source follower circuit and output to the outside. Alternatively, for example, a current output to the wiring V0 can be converted into a digital signal by an A-D converter or the like and output to the AI accelerator included in the peripheral circuit PRPH, which is described in the above embodiment.

Note that in the structure illustrated as an example in FIG. 54B, the wirings electrically connecting the pixel circuit 400 and the driver circuit 30 can be shortened, so that wiring resistance of the wirings can be reduced. Thus, data writing can be performed at high speed, leading to high-speed driving of the display apparatus 1000. Therefore, even when the number of pixel circuits 400 included in the display apparatus 1000 is large, a sufficiently long frame period can be ensured and thus the pixel density of the display apparatus 1000 can be increased. In addition, the increased pixel density of the display apparatus 1000 can increase the resolution of an image displayed by the display apparatus 1000. For example, the pixel density of the display apparatus 1000 can be greater than or equal to 500 ppi, preferably greater than or equal to 1000 ppi, further preferably greater than or equal to 3000 ppi, still further preferably greater than or equal to 5000 ppi, still further preferably greater than or equal to 6000 ppi. Thus, the display apparatus 1000 can be, for example, a display apparatus for AR or VR and can be suitably used in an electronic device with a short distance between a display portion and the user, such as a head-mounted display (HMD).

<Pixel Layout>

Here, a pixel layout is described. There is no particular limitation on the arrangement of subpixels, and a variety of methods can be employed. Examples of the arrangement of subpixels include stripe arrangement, S-stripe arrangement, matrix arrangement, delta arrangement, Bayer arrangement, and pentile arrangement.

Examples of the top surface shape of the subpixel include polygons such as a triangle, a tetragon (including a rectangle and a square), and a pentagon; polygons with rounded corners; an ellipse; and a circle. Here, the top surface shape of the subpixel corresponds to the top surface shape of a light-emitting region of the light-emitting device.

Figure 55A:
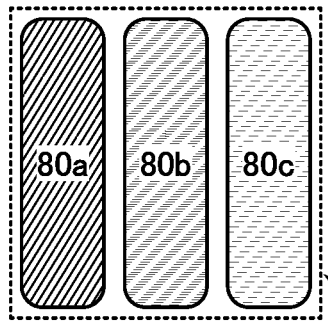
FIG. 55A to FIG. 55G are plan views each illustrating an example of a pixel.

A pixel 80 illustrated in FIG. 55A employs stripe arrangement. The pixel 80 illustrated in FIG. 55A is composed of three subpixels: a subpixel 80*a*, a subpixel 80*b*, and a subpixel 80*c*.

Figure 56A:
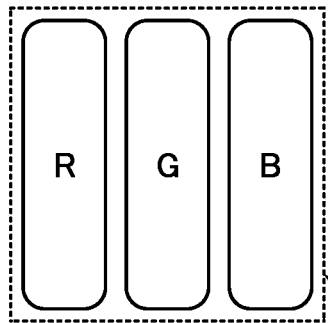
FIG. 56A to FIG. 56F are plan views each illustrating an example of a pixel.

For example, as illustrated in FIG. 56A, the subpixel 80*a* may be a red subpixel R, the subpixel 80*b* may be a green subpixel G, and the subpixel 80*c* may be a blue subpixel B.

Figure 55B:
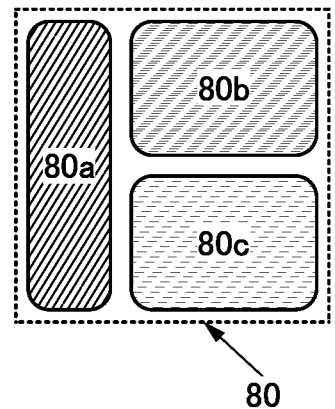
Figure 56B:
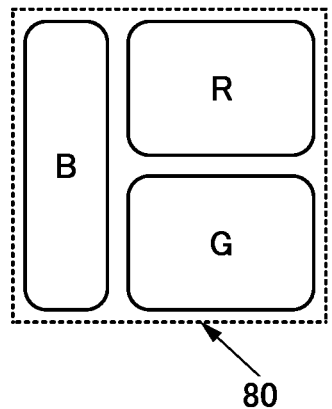

The pixel 80 illustrated in FIG. 55B employs S-stripe arrangement. The pixel 80 illustrated in FIG. 55B is composed of three subpixels: the subpixel 80*a*, the subpixel 80*b*, and the subpixel 80*c*. For example, as illustrated in FIG. 56B, the subpixel 80*a* may be the blue subpixel B, the subpixel 80*b* may be the red subpixel R, and the subpixel 80*c* may be the green subpixel G.

Figure 55C:
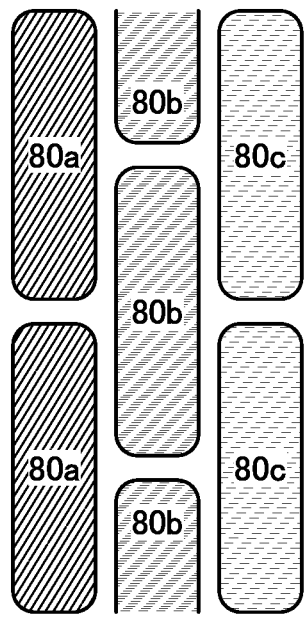
Figure 56C:
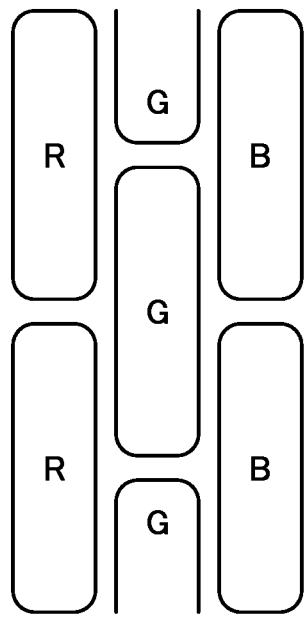

FIG. 55C illustrates an example where subpixels of different colors are arranged in a zigzag manner. Specifically, the positions of the top sides of two subpixels arranged in the column direction (e.g., the subpixel 80*a* and the subpixel 80*b* or the subpixel 80*b* and the subpixel 80*c*) are not aligned in the plan view. For example, as illustrated in FIG. 56C, the subpixel 80*a* may be the red subpixel R, the subpixel 80*b* may be the green subpixel G, and the subpixel 80*c* may be the blue subpixel B.

Figure 55D:
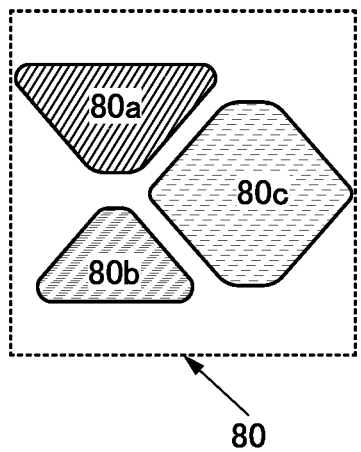
Figure 56D:
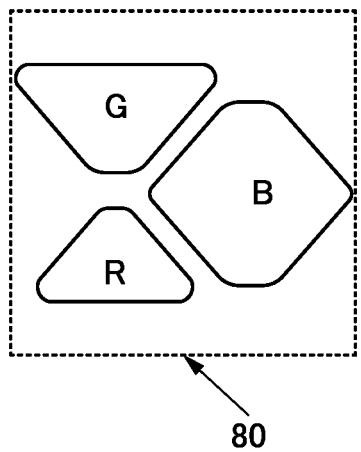

The pixel 80 illustrated in FIG. 55D includes the subpixel 80*a* whose top surface has a rough trapezoidal shape with rounded corners, the subpixel 80*b* whose top surface has a rough triangle shape with rounded corners, and the subpixel 80*c* whose top surface has a rough tetragonal or rough hexagonal shape with rounded corners. The subpixel 80*a* has a larger light-emitting area than the subpixel 80*b*. In this manner, the shapes and sizes of the subpixels can be determined independently. For example, the size of a subpixel including a light-emitting device with higher reliability can be smaller. For example, as illustrated in FIG. 56D, the subpixel 80*a* may be the green subpixel G, the subpixel 80*b* may be the red subpixel R, and the subpixel 80*c* may be the blue subpixel B.

Figure 55E:
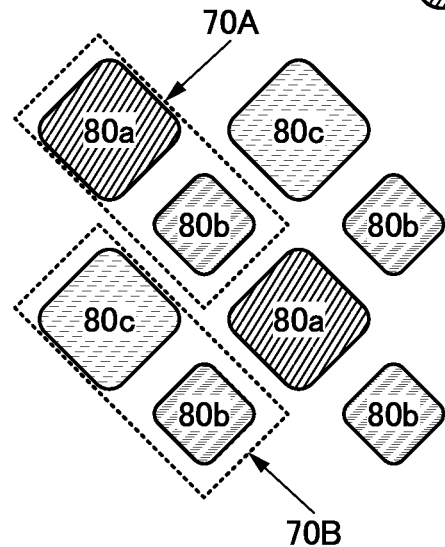
Figure 56E:
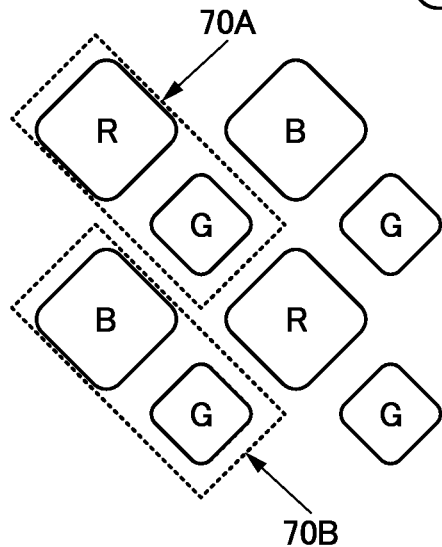

A pixel 70A and a pixel 70B illustrated in FIG. 55E employ pentile arrangement. FIG. 55E illustrates an example where the pixels 70A including the subpixel 80*a* and the subpixel 80*b* and the pixels 70B including the subpixel 80*b* and the subpixel 80*c* are alternately arranged. For example, as illustrated in FIG. 56E, the subpixel 80*a* may be the red subpixel R, the subpixel 80*b* may be the green subpixel G, and the subpixel 80*c* may be the blue subpixel B.

Figure 55F:
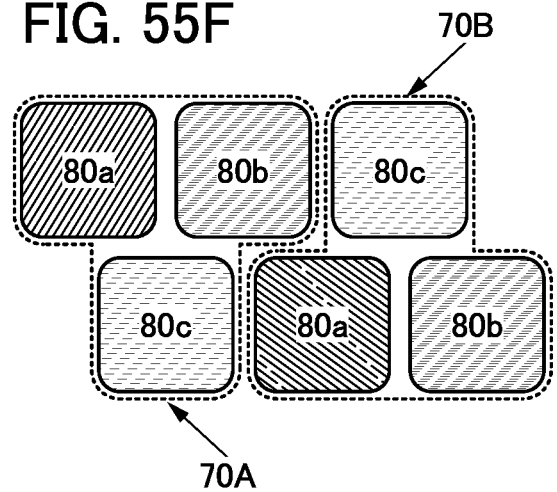
Figure 55G:
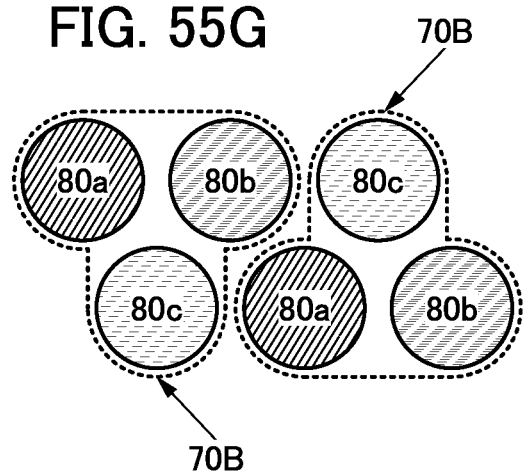
Figure 56F:
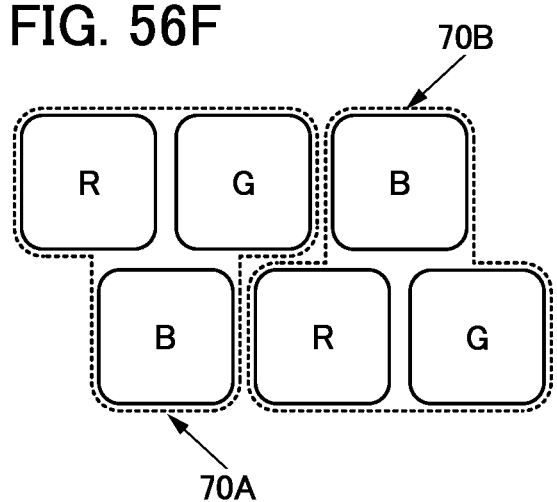

The pixel 70A and the pixel 70B illustrated in FIG. 55F and FIG. 55G employ delta arrangement. The pixel 70A includes two subpixels (the subpixel 80*a* and the subpixel 80*b*) in the upper row (first row) and one subpixel (the subpixel 80*c*) in the lower row (second row). The pixel 70B includes one subpixel (the subpixel 80*c*) in the upper row (first row) and two subpixels (the subpixel 80*a* and the subpixel 80*b*) in the lower row (second row). For example, as illustrated in FIG. 56F, the subpixel 80*a* may be the red subpixel R, the subpixel 80*b* may be the green subpixel G, and the subpixel 80*c* may be the blue subpixel B.

FIG. 55F illustrates an example where the top surface of each subpixel has a rough tetragonal shape with rounded corners, and FIG. 55G illustrates an example where the top surface of each subpixel has a circular shape.

In a photolithography method, as a pattern to be processed becomes finer, the influence of light diffraction becomes more difficult to ignore; therefore, the fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a subpixel has a polygonal shape with rounded corners, an elliptical shape, or a circular shape in some cases.

Furthermore, in the method for manufacturing the display apparatus of one embodiment of the present invention, the EL layer is processed into an island shape with the use of a resist mask. A resist film formed over the EL layer needs to be cured at a temperature lower than the upper temperature limit of the EL layer. Therefore, the resist film is insufficiently cured in some cases depending on the upper temperature limit of the material of the EL layer and the curing temperature of the resist material. An insufficiently cured resist film may have a shape different from a desired shape by processing. As a result, the top surface of the EL layer may have a polygonal shape with rounded corners, an elliptical shape, or a circular shape. For example, when a resist mask with a square top surface is intended to be formed, a resist mask with a circular top surface may be formed, and the top surface of the EL layer may be circular.

To obtain a desired top surface shape of the EL layer, a technique of correcting a mask pattern in advance so that a transferred pattern agrees with a design pattern (an OPC (Optical Proximity Correction) technique) may be used. Specifically, with the OPC technique, a pattern for correction is added to a corner portion or the like of a figure on a mask pattern.

Figure 57A:
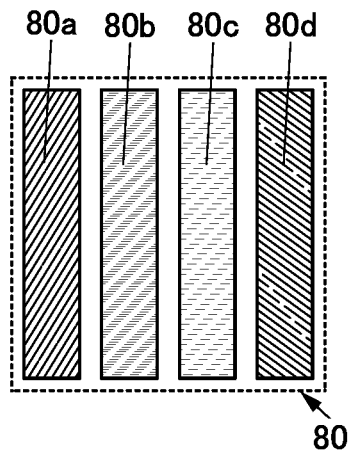
FIG. 57A to FIG. 57H are plan views each illustrating an example of a pixel.
Figure 57B:
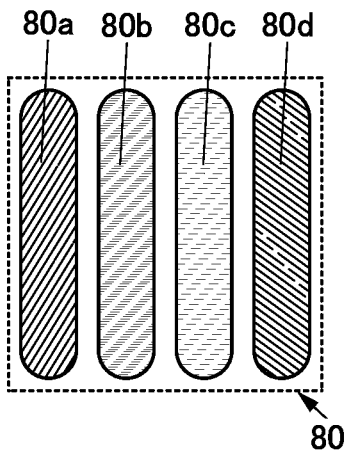
Figure 57C:
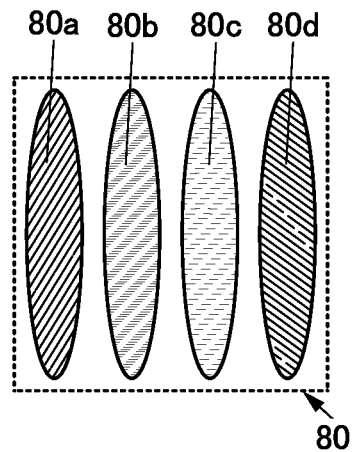

The pixels 80 illustrated in FIG. 57A to FIG. 57C employ stripe arrangement.

FIG. 57A illustrates an example where each subpixel has a rectangular top surface shape, FIG. 57B illustrates an example where each subpixel has a top surface shape formed by combining two half circles and a rectangle, and FIG. 57C illustrates an example where each subpixel has an elliptical top surface shape.

Figure 57D:
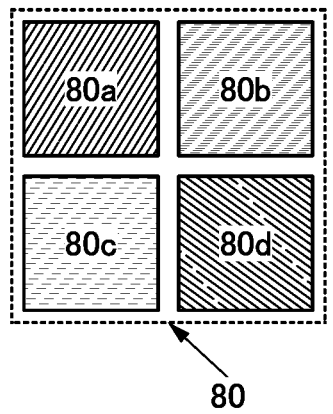
Figure 57E:
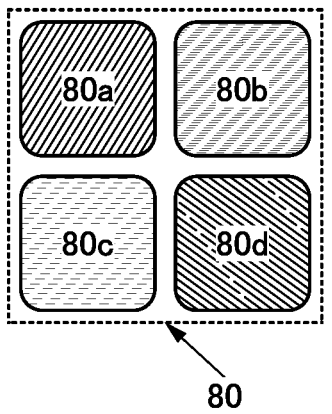
Figure 57F:
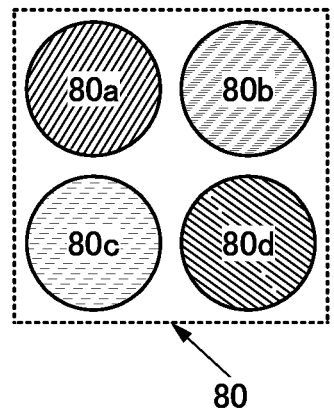

The pixels 80 illustrated in FIG. 57D to FIG. 57F employ matrix arrangement.

FIG. 57D illustrates an example where each subpixel has a square top surface shape, FIG. 57E illustrates an example where each subpixel has a substantially square top surface shape with rounded corners, and FIG. 57F illustrates an example where each subpixel has a circular top surface shape.

Figure 58A:
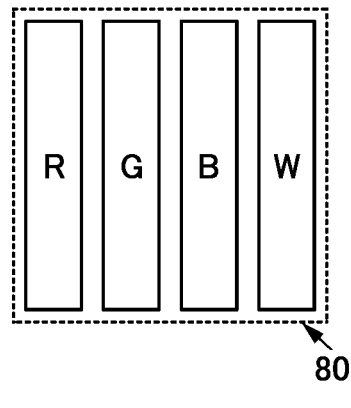
FIG. 58A to FIG. 58D are plan views each illustrating an example of a pixel.
Figure 58B:
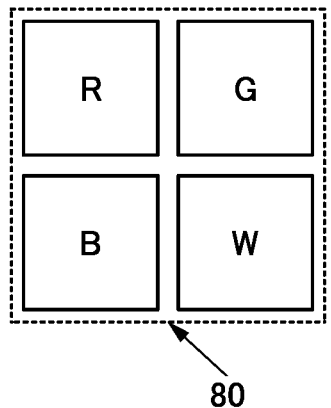

The pixels 80 illustrated in FIG. 57A to FIG. 57F are each composed of four subpixels: the subpixel 80*a*, the subpixel 80*b*, the subpixel 80*c*, and a subpixel 80*d*. The subpixel 80*a*, the subpixel 80*b*, the subpixel 80*c*, and the subpixel 80*d* emit light of different colors. For example, the subpixel 80*a*, the subpixel 80*b*, the subpixel 80*c*, and the subpixel 80*d* can be red, green, blue, and white subpixels, respectively. For example, the subpixel 80*a*, the subpixel 80*b*, the subpixel 80*c*, and the subpixel 80*d* can be red, green, blue, and white subpixels, respectively, as illustrated in FIG. 58A and FIG. 58B. Alternatively, the subpixel 80*a*, the subpixel 80*b*, the subpixel 80*c*, and the subpixel 80*d* can be red, green, blue, and infrared-light subpixels, respectively.

The subpixel 80*d* includes a light-emitting device. The light-emitting device includes, for example, a pixel electrode, an EL layer, and a common electrode. Note that for the pixel electrode, a material similar to those of the conductor 112*a* to the conductor 112*c* or the conductor 126*a* to the conductor 126*c* is used. For the EL layer, a material similar to that of the first layer 113*a*, the second layer 113*b*, or the third layer 113*c* is used, for example.

Figure 57G:
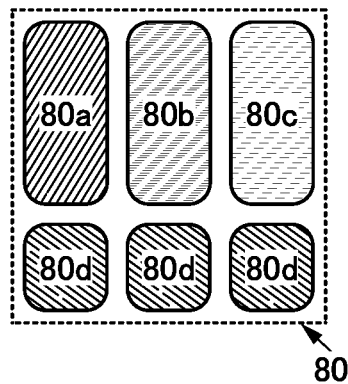

FIG. 57G illustrates an example where one pixel 80 is composed of two rows and three columns. The pixel 80 includes three subpixels (the subpixel 80*a*, the subpixel 80*b*, and the subpixel 80*c*) in the upper row (first row) and three subpixels 80*d* in the lower row (second row). In other words, the pixel 80 includes the subpixel 80*a* and the subpixel 80*d* in the left column (first column), the subpixel 80*b* and another subpixel 80*d* in the center column (second column), and the subpixel 80*c* and another subpixel 80*d* in the right column (third column). Matching the positions of the subpixels in the upper row and the lower row as illustrated in FIG. 57G enables dust and the like that would be produced in the manufacturing process to be removed efficiently. Thus, a display apparatus with high display quality can be provided.

Figure 57H:
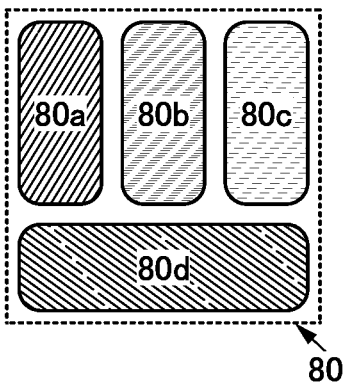

FIG. 57H illustrates an example where one pixel 80 is composed of two rows and three columns. The pixel 80 includes three subpixels (the subpixel 80*a*, the subpixel 80*b*, and the subpixel 80*c*) in the upper row (first row) and one subpixel (the subpixel 80*d*) in the lower row (second row). In other words, the pixel 80 includes the subpixel 80*a* in the left column (first column), the subpixel 80*b* in the center column (second column), the subpixel 80*c* in the right column (third column), and the subpixel 80*d* across these three columns.

Figure 58C:
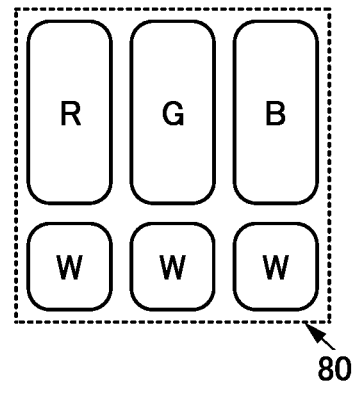
Figure 58D:
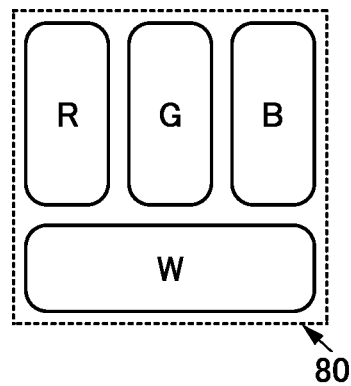

In the pixel 80 illustrated in each of FIG. 57G and FIG. 57H, for example, the subpixel 80*a* can be the red subpixel R, the subpixel 80*b* can be the green subpixel G, the subpixel 80*c* can be the blue subpixel B, and the subpixel 80*d* can be a white subpixel W, as illustrated in FIG. 58C and FIG. 58D.

Next, an example of a pixel layout applicable to the display apparatus 1000H in FIG. 48 and the display apparatus 1000G in FIG. 47 is described. In other words, the pixel layout of the display apparatus 1000H and the display apparatus 1000G can be regarded as a plan view of the LED chip 150*a* to the LED chip 150*c* of the display apparatus 1000G in FIG. 47 or the LED chip 180R, the LED chip 180G, and the LED chip 180B of the display apparatus 1000H in FIG. 48.

Figure 59A:
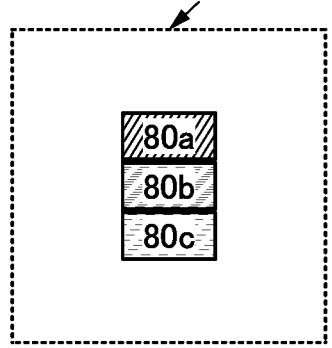
FIG. 59A to FIG. 59G are plan views each illustrating an example of a pixel.

In the pixel 80 illustrated in FIG. 59A, subpixels each have a rectangular top surface and are arranged such that long sides of the subpixels are adjacent to one another. Note that the subpixels may be arranged to be in contact with each other or may be arranged not to be in contact with each other.

The pixel 80 illustrated in FIG. 59A includes three subpixels: the subpixel 80*a*, the subpixel 80*b*, and the subpixel 80*c*. As an example, the subpixel 80*a*, the subpixel 80*b*, and the subpixel 80*c* emit light of different colors. The different colors here can be, for example, red (R), green (G), and blue (B). Thus, the subpixel 80*a*, the subpixel 80*b*, and the subpixel 80*c* can be subpixels for red (R), green (G), and blue (B), respectively, as illustrated in FIG. 59B.

Figure 59B:
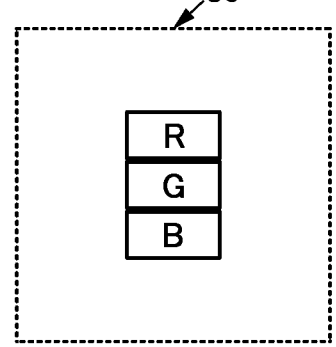

Note that in FIG. 59B, the colors of light emitted by the subpixel 80*a*, the subpixel 80*b*, and the subpixel 80*c* can be cyan (C), magenta (M), yellow (Y), or white (W) in addition to red (R), green (G), and blue (B).

Figure 59C:
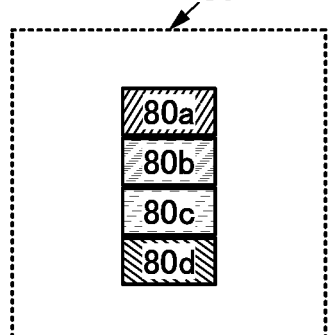

The number of subpixels included in the pixel 80 illustrated in FIG. 59A is three, but the number of subpixels included in the pixel 80 illustrated in FIG. 59A may be one, two, or four or more. For example, as illustrated in FIG. 59C, the pixel 80 includes four subpixels: the subpixel 80*a*, the subpixel 80*b*, the subpixel 80*c*, and the subpixel 80*d*. The subpixel 80*a*, the subpixel 80*b*, the subpixel 80*c*, and the subpixel 80*d* in the pixel 80 in FIG. 59C can be configured to emit light of different colors in a manner similar to that of the pixel 80 in FIG. 59A. The different colors here can be, for example, red (R), green (G), blue (B), and white (W). Accordingly, the subpixel 80*a*, the subpixel 80*b*, the subpixel 80*c*, and the subpixel 80*d* can be subpixels for red (R), green (G), blue (B), and white (W), respectively, as illustrated in FIG. 59D.

Figure 59D:
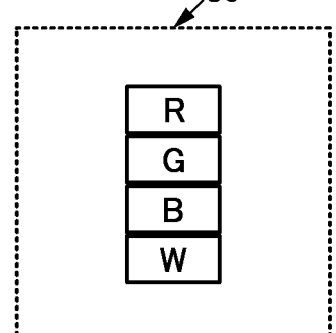

Note that in FIG. 59D, the colors of light emitted by the subpixel 80*a*, the subpixel 80*b*, the subpixel 80*c*, and the subpixel 80*d* can be cyan (C), magenta (M), or yellow (Y) in addition to red (R), green (G), blue (B), and white (W).

Although FIG. 59A and FIG. 59C illustrate examples where the subpixels in the pixel 80 are arranged such that the long sides are adjacent to one another as an example, the subpixels in the pixel 80 may be arranged such that the short sides are adjacent to one another.

Figure 59E:
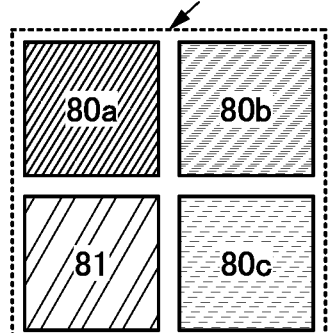

FIG. 59E illustrates an example where each subpixel has a square top surface and an electrode is formed.

The pixel 80 illustrated in FIG. 59E includes a conductor 81 serving as an electrode and three subpixels: the subpixel 80*a*, the subpixel 80*b*, and the subpixel 80*c*.

As an example, the subpixel 80*a*, the subpixel 80*b*, and the subpixel 80*c* emit light of different colors. The different colors here can be, for example, red (R), green (G), and blue (B). Thus, the subpixel 80*a*, the subpixel 80*b*, and the subpixel 80*c* can be subpixels for red (R), green (G), and blue (B), respectively, as illustrated in FIG. 59F.

Figure 59F:
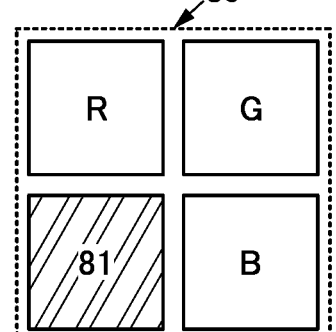

Note that in FIG. 59F, the colors of light emitted by the subpixel 80*a*, the subpixel 80*b*, and the subpixel 80*c* can be cyan (C), magenta (M), yellow (Y), or white (W) in addition to red (R), green (G), and blue (B).

The conductor 81 has a function of a common electrode of light-emitting diodes provided in the subpixel 80*a*, the subpixel 80*b*, and the subpixel 80*c*, for example. In particular, the common electrode preferably serves as a cathode electrode of the light-emitting diode included in each of the subpixel 80*a*, the subpixel 80*b*, and the subpixel 80*c*.

The conductor 81 corresponds to the electrode 172 or the electrode 173 in the LED package 170 in FIG. 49A, for example. Thus, a material usable for the electrode 172 or the electrode 173 can be used as a material for the conductor 81, for example.

Figure 59G:
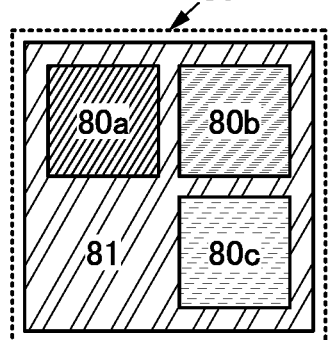

Note that the conductor 81 may be provided such that the subpixel 80*a*, the subpixel 80*b*, and the subpixel 80*c* are positioned above the conductor 81 as illustrated in FIG. 59G. That is, the subpixel 80*a*, the subpixel 80*b*, and the subpixel 80*c* are provided over the conductor 81. The conductor 81 of the pixel 80 in FIG. 59G corresponds the electrode 172 of the LED package 170A1 in FIG. 49B.

Although a conductor corresponding to the electrode 173 of the LED package 170A1 in FIG. 49B is not illustrated in the pixel 80 in FIG. 59G, the pixel 80 in FIG. 59G may include the conductor corresponding to the electrode 173.

The number of electrodes of the pixel 80 illustrated in FIG. 59E is one, but the number of electrodes of the pixel 80 illustrated in FIG. 59E may be two or more. For example, the number of electrodes of the pixel 80 may be determined in accordance with the number of subpixels. For example, in the case where an anode electrode and a cathode electrode are provided in each of three subpixels in the pixel 80 in FIG. 59E, the number of electrodes provided in the pixel 80 can be six. For another example, in the case where an anode electrode and a common electrode serving as a cathode electrode are provided in each of three subpixels in the pixel 80 in FIG. 59E, the number of electrodes provided in the pixel 80 can be four.

The top surface of the conductor 81 of the pixel 80 has a square shape in FIG. 59E, but the top surface of the conductor 81 may have a variety of shapes such as a rough trapezoid shape with rounded corners, a rough square shape with rounded corners, a rough hexagonal shape with rounded corners, a shape formed by combining a half circle and a rectangle, a circular shape, or an elliptical shape.

One of the plurality of subpixels included in the pixel 80 illustrated in each of FIG. 55A to FIG. 55G, FIG. 57A to FIG. 57H, FIG. 59A, and FIG. 59C may be replaced with the conductor 81.

Note that the insulators, the conductors, and the semiconductors disclosed in this specification and the like can be formed by a PVD (Physical Vapor Deposition) method or a CVD method. Examples of a PVD method include a sputtering method, a resistance heating evaporation method, an electron beam evaporation method, an MBE (Molecular Beam Epitaxy) method, and a PLD method. Examples of the CVD method include a plasma CVD method and a thermal CVD method. In particular, examples of a thermal CVD method include a metal organic chemical vapor deposition (MOCVD) method and an ALD method.

A thermal CVD method is a deposition method not using plasma, and thus has an advantage that no defect due to plasma damage is generated.

Deposition by a thermal CVD method may be performed in such a manner that a source gas and an oxidizer are supplied into a chamber at a time, the pressure in the chamber is set to an atmospheric pressure or a reduced pressure, and they are made to react with each other in the vicinity of the substrate or over the substrate to be deposited over the substrate.

Deposition by an ALD method may be performed in such a manner that pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves); in order to avoid mixing of the plurality of kinds of source gases, an inert gas (e.g., argon or nitrogen) or the like is introduced at the same time as or after introduction of a first source gas and then a second source gas is introduced. Note that in the case where the first source gas and the inert gas are introduced at a time, the inert gas serves as a carrier gas, and the inert gas may also be introduced at the same time as the introduction of the second source gas. Alternatively, the second source gas may be introduced after the first source gas is exhausted by vacuum evacuation instead of the introduction of the inert gas. The first source gas is adsorbed on the surface of the substrate to deposit a first thin layer; then the second source gas is introduced to react with the first thin layer; as a result, a second thin layer is stacked over the first thin layer, so that a thin film is formed. The sequence of the gas introduction is controlled and repeated a plurality of times until a desired thickness is obtained, so that a thin film with excellent step coverage can be formed. The thickness of the thin film can be adjusted by the number of repetition times of the sequence of the gas introduction; therefore, an ALD method makes it possible to accurately adjust the thickness and is thus suitable for manufacturing a minute FET.

A variety of films such as the metal film, the semiconductor film, and the inorganic insulating film disclosed in the above-described embodiments can be formed by a thermal CVD method such as an MOCVD method and an ALD method; for example, in the case of depositing an In—Ga—Zn—O film, trimethylindium ($In(CH_3)_3$), trimethylgallium ($Ga(CH_3)_3$), and dimethylzinc ($Zn(CH_3)_2$) are used. Without limitation to the above combination, triethylgallium ($Ga(C_2H_5)_3$) can also be used instead of trimethylgallium, and diethylzinc ($Zn(C_2H_5)_2$) can also be used instead of dimethylzinc.

For example, in the case where a hafnium oxide film is formed with a deposition apparatus using an ALD method, two kinds of gases, ozone ($O_3$) as an oxidizer and a source gas which is obtained by vaporizing liquid containing a solvent and a hafnium precursor compound (e.g., hafnium alkoxide and hafnium amide such as tetrakis(dimethylamide)hafnium (TDMAH, $Hf[N(CH_3)_2]_4$)), are used. Examples of another material include tetrakis(ethylmethylamide)hafnium.

For example, in the case where an aluminum oxide film is formed with a deposition apparatus using an ALD method, two kinds of gases, $H_2O$ as an oxidizer and a source gas which is obtained by vaporizing liquid containing a solvent and an aluminum precursor compound (e.g., trimethylaluminum (TMA, $Al(CH_3)_3$)) are used. Examples of another material include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface on which a film is to be formed, and radicals of an oxidizing gas (e.g., $O_2$ or dinitrogen monoxide) are supplied to react with the adsorbate.

For example, in the case where a tungsten film is deposited by a deposition apparatus using an ALD method, a $WF_6$ gas and a $B_2H_6$ gas are sequentially and repeatedly introduced to form an initial tungsten film, and then a $WF_6$ gas and an $H_2$ gas are sequentially and repeatedly introduced to form a tungsten film. Note that an $SiH_4$ gas may be used instead of a $B_2H_6$ gas.

In the case where an In—Ga—Zn—O film is deposited as an oxide semiconductor film with a deposition apparatus using an ALD method, a precursor (generally referred to as a metal precursor or the like in some cases) and an oxidizer (generally referred to as a reactant, a non-metal precursor, or the like in some cases) are sequentially and repetitively introduced.

Specifically, for example, an $In(CH_3)_3$ gas as a precursor and an $O_3$ gas) as an oxidizer are introduced to form an In-0 layer; a $Ga(CH_3)_3$ gas as a precursor and an $O_3$ gas) as an oxidizer are introduced to form a GaO layer; and then, a $Zn(CH_3)_2$ gas as a precursor and an $O_3$ gas) as an oxidizer are introduced to form a ZnO layer. Note that the order of these layers is not limited to this example. A mixed oxide layer such as an In—Ga—O layer, an In—Zn—O layer, or a Ga—Zn—O layer may be formed with the use of these gases. Note that although an $H_2O$ gas which is obtained by bubbling water with an inert gas (e.g., Ar) may be used instead of an $O_3$ gas), it is preferable to use an $O_3$ gas) which does not contain H. Furthermore, instead of an $In(CH_3)_3$ gas, an $In(C_2H_5)_3$ gas may be used. Furthermore, instead of a $Ga(CH_3)_3$ gas, a $Ga(C_2H_5)_3$ gas may be used. Furthermore, instead of a $Zn(CH_3)_2$ gas, a $Zn(C_2H_5)_2$ gas may be used.

There is no particular limitation on the screen ratio (aspect ratio) of the display portion of the electronic device of one embodiment of the present invention. For example, the display portion is compatible with a variety of screen ratios such as 1:1 (a square), 4:3, 16:9, 16:10, 21:9, and 32:9.

There is no particular limitation on the shape of the display portion of the electronic device of one embodiment of the present invention. The display portion can have any of various shapes such as a rectangular shape, a polygonal shape (e.g., an octagonal shape), a circular shape, and an elliptical shape.

Note that this embodiment can be combined with any of the other embodiments described in this specification as appropriate.

Embodiment 5

In this embodiment, a transistor that can be used in the semiconductor device of one embodiment of the present invention, specifically, the transistor 500 described in Embodiment 4 will be described.

Structure Example of Transistor

Figure 60A:
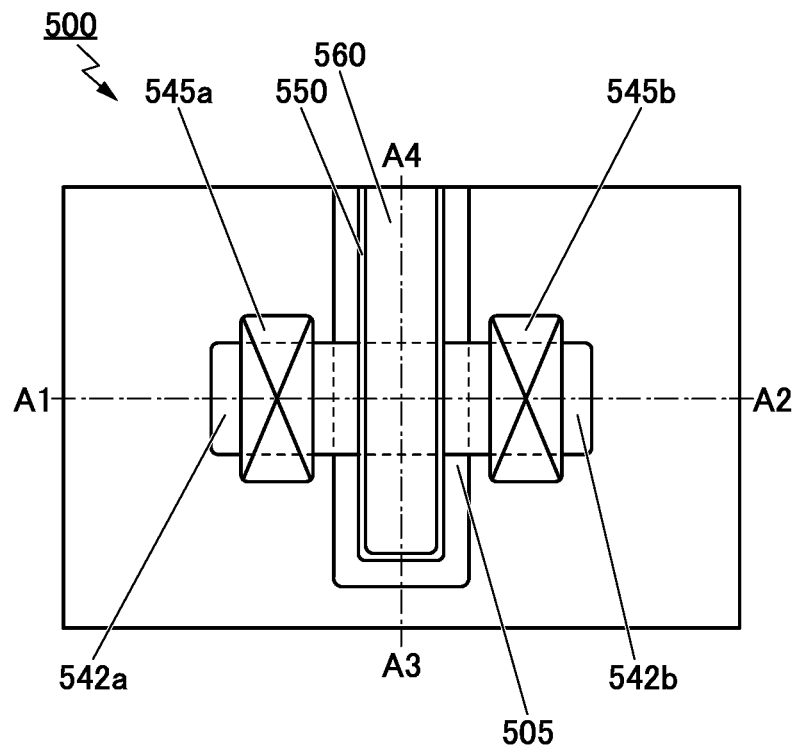
FIG. 60A is a schematic plan view illustrating a structure example of a transistor.
Figure 60C:
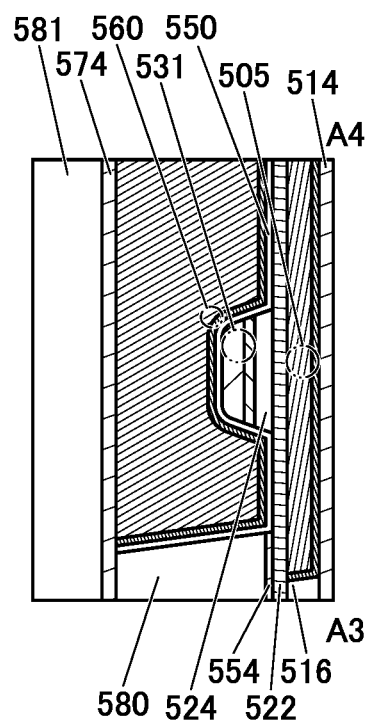
FIG. 60B and FIG. 60C are schematic cross-sectional views each illustrating a structure example of the transistor.
Figure 60B:
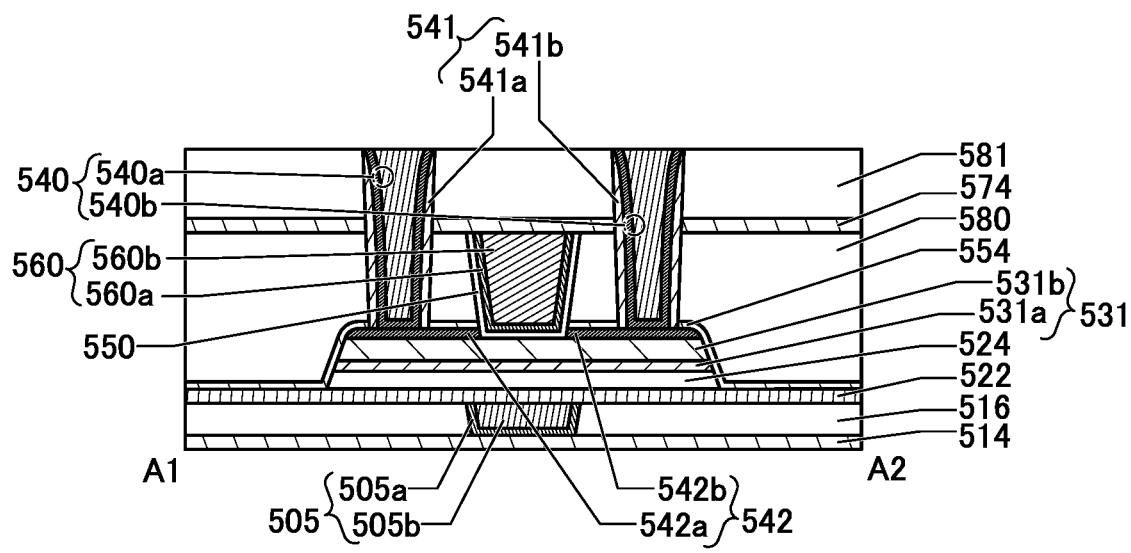

FIG. 60A, FIG. 60B, and FIG. 60C are a plan view and cross-sectional views of the transistor 500 that can be used in the semiconductor device of one embodiment of the present invention. The transistor 500 can be used in the semiconductor device of one embodiment of the present invention.

FIG. 60A is the plan view of the transistor 500. FIG. 60B and FIG. 60C are the cross-sectional views of the transistor 500. Here, FIG. 60B is a cross-sectional view of a portion indicated by the dashed-dotted line A1-A2 in FIG. 60A and is a cross-sectional view of the transistor 500 in the channel length direction. FIG. 60C is a cross-sectional view of a portion indicated by the dashed-dotted line A3-A4 in FIG. 60A and is a cross-sectional view of the transistor 500 in the channel width direction. Note that some components are omitted in the plan view of FIG. 60A for clarity of the drawing.

As illustrated in FIG. 60A to FIG. 60C, the transistor 500 includes a metal oxide 531a, a metal oxide 531b, a conductor 542a, a conductor 542b, an insulator 580, a conductor 560, and an insulator 550.

The metal oxide 531a is placed over a substrate (not illustrated), for example. The metal oxide 531b is placed over the metal oxide 531a. The conductor 542a and the conductor 542b are placed to be apart from each other over the metal oxide 531b. The insulator 580 is placed over the conductor 542a and the conductor 542b. Specifically, an opening portion is formed in the insulator 580 in a region between the conductor 542a and the conductor 542b. The conductor 560 is placed in the opening portion. The insulator 550 is provided between the conductor 560 and the metal oxide 531b, the conductor 542a, the conductor 542b, and the insulator 580. Here, as illustrated in FIG. 60B and FIG. 60C, preferably, the top surface of the conductor 560 is substantially level with the top surfaces of the insulator 550 and the insulator 580.

Hereinafter, the metal oxide 531a and the metal oxide 531b may be collectively referred to as a metal oxide 531. The conductor 542a and the conductor 542b may be collectively referred to as a conductor 542.

In the transistor 500 illustrated in FIG. 60A to FIG. 60C, the side surfaces of the conductor 542a and the conductor 542b on the conductor 560 side are substantially perpendicular. Note that the transistor 500 illustrated in FIG. 60A to FIG. 60C is not limited thereto, and the angle formed between the side surfaces and bottom surfaces of the conductor 542a and the conductor 542b may be greater than or equal to 100 and less than or equal to 80°, preferably greater than or equal to 30° and less than or equal to 60°. The side surfaces of the conductor 542a and the conductor 542b that face each other may have a plurality of surfaces.

In the transistor 500, two layers of the metal oxide 531a and the metal oxide 531b are stacked in and around a region where a channel is formed (hereinafter also referred to as a channel formation region); however, the present invention is not limited thereto. For example, a single-layer structure of the metal oxide 531b or a stacked-layer structure of three or more layers may be employed. Furthermore, each of the metal oxide 531a and the metal oxide 531b may have a stacked-layer structure of two or more layers.

Here, the conductor 560 functions as a gate electrode of the transistor, and the conductor 542a and the conductor 542b function as a source electrode and a drain electrode. As described above, the conductor 560 is formed to be embedded in the opening of the insulator 580 and the region sandwiched between the conductor 542a and the conductor 542b. Here, the positions of the conductor 560, the conductor 542a, and the conductor 542b are selected in a self-aligned manner with respect to the opening of the insulator 580. In other words, in the transistor 500, the gate electrode can be placed between the source electrode and the drain electrode in a self-aligned manner. Therefore, the conductor 560 can be formed without an alignment margin, resulting in a reduction in the area occupied by the transistor 500. Accordingly, the display apparatus can have high resolution. In addition, the display apparatus can have a narrow bezel.

As illustrated in FIG. 60B, the conductor 560 preferably includes a conductor 560a provided inside the insulator 550 and a conductor 560b provided to be embedded inside the conductor 560a. Although the conductor 560 having a stacked-layer structure of two layers is illustrated in FIG. 60B and FIG. 60C, the present invention is not limited thereto. For example, the conductor 560 may have a single-layer structure or a stacked-layer structure of three or more layers.

The transistor 500 preferably includes the insulator 514 placed over the substrate (not illustrated); an insulator 516 placed over the insulator 514; a conductor 505 placed to be embedded in the insulator 516; an insulator 522 placed over the insulator 516 and the conductor 505; and the insulator 524 placed over the insulator 522. The metal oxide 531a is preferably placed over the insulator 524.

As illustrated in FIG. 60B and FIG. 60C, the insulator 554 is preferably placed between the insulator 580 and the insulator 522, the insulator 524, the metal oxide 531a, the metal oxide 531b, the conductor 542a, the conductor 542b, and the insulator 550. Here, as illustrated in FIG. 60B and FIG. 60C, the insulator 554 is preferably in contact with the side surface of the insulator 550, the top surface and side surface of the conductor 542a, the top surface and side surface of the conductor 542b, the side surfaces of the metal oxide 531a, the metal oxide 531b, and the insulator 524, and the top surface of the insulator 522.

The insulator 574 and the insulator 581 functioning as interlayer films are preferably placed over the transistor 500. Here, the insulator 574 is preferably placed in contact with the top surfaces of the conductor 560, the insulator 550, and the insulator 580.

The insulator 522, the insulator 554, and the insulator 574 preferably have a function of inhibiting diffusion of hydrogen (e.g., one or both of a hydrogen atom and a hydrogen molecule). For example, the insulator 522, the insulator 554, and the insulator 574 preferably have a lower hydrogen permeability than the insulator 524, the insulator 550, and the insulator 580. Moreover, the insulator 522 and the insulator 554 preferably have a function of inhibiting diffusion of oxygen (e.g., one or both of an oxygen atom and an oxygen molecule). For example, the insulator 522 and the insulator 554 preferably have a lower oxygen permeability than the insulator 524, the insulator 550, and the insulator 580.

A conductor 540 (a conductor 540a and a conductor 540b) that is electrically connected to the transistor 500 and functions as a plug is preferably provided. Note that an insulator 541 (an insulator 541a and an insulator 541b) is provided in contact with the side surface of the conductor 540 functioning as a plug. In other words, the insulator 541 is provided in contact with the inner wall of an opening in the insulator 554, the insulator 580, the insulator 574, and the insulator 581. In addition, a structure may be employed in which a first conductor of the conductor 540 is provided in contact with the side surface of the insulator 541 and a second conductor of the conductor 540 is provided on the inner side of the first conductor. Here, the top surface of the conductor 540 and the top surface of the insulator 581 can be substantially level with each other. Although the transistor 500 has a structure in which the first conductor of the conductor 540 and the second conductor of the conductor 540 are stacked, the present invention is not limited thereto. For example, the conductor 540 may have a single-layer structure or a stacked-layer structure of three or more layers. In the case where a component has a stacked-layer structure, layers may be distinguished by ordinal numbers given corresponding to the formation order.

In the transistor 500, a metal oxide functioning as an oxide semiconductor (hereinafter, also referred to as an oxide semiconductor) is preferably used as the metal oxide 531 including the channel formation region (the metal oxide 531a and the metal oxide 531b). For example, it is preferable to use a metal oxide having a band gap of 2 eV or more, preferably 2.5 eV or more as the metal oxide to be the channel formation region of the metal oxide 531.

The metal oxide preferably contains at least indium (In) or zinc (Zn). In particular, indium (In) and zinc (Zn) are preferably contained. In addition to them, an element M is preferably contained. As the element M, one or more selected from aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). The element M further preferably contains one or both of Ga and Sn.

The metal oxide 531b in a region that does not overlap with the conductor 542 sometimes has a smaller thickness than the metal oxide 531b in a region that overlaps with the conductor 542. The thin region is formed when part of the top surface of the metal oxide 531b is removed at the time of forming the conductor 542a and the conductor 542b. When a conductive film to be the conductor 542 is formed, a low-resistance region is sometimes formed on the top surface of the metal oxide 531b in the vicinity of the interface with the conductive film. Removing the low-resistance region positioned between the conductor 542a and the conductor 542b on the top surface of the metal oxide 531b in the above manner can prevent formation of the channel in the region.

According to one embodiment of the present invention, a display apparatus that includes small-size transistors and has high resolution can be provided. A display apparatus that includes a transistor with a high on-state current and has high luminance can be provided. A display apparatus that includes a transistor operating at high speed and thus operates at high speed can be provided. A display apparatus that includes a transistor having stable electrical characteristics and is highly reliable can be provided. A display apparatus that includes a transistor with a low off-state current and has low power consumption can be provided.

The structure of the transistor 500 that can be used in the display apparatus of one embodiment of the present invention is described in detail.

The conductor 505 is placed to include a region overlapping with the metal oxide 531 and the conductor 560. Furthermore, the conductor 505 is preferably provided to be embedded in the insulator 516.

The conductor 505 includes a conductor 505a and a conductor 505b. The conductor 505a is provided in contact with the bottom surface and the sidewall of the opening provided in the insulator 516. The conductor 505b is provided to be embedded in a depression portion formed by the conductor 505a. Here, the top surface of the conductor 505b is substantially level with the top surface of the conductor 505a and the top surface of the insulator 516.

For the conductor 505a, it is preferable to use a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., one or both of an oxygen atom and an oxygen molecule).

When a conductive material having a function of inhibiting diffusion of hydrogen is used for the conductor 505a, impurities such as hydrogen contained in the conductor 505b can be inhibited from diffusing into the metal oxide 531 through the insulator 524. When a conductive material having a function of inhibiting diffusion of oxygen is used for the conductor 505a, the conductivity of the conductor 505b can be inhibited from being lowered because of oxidation.

Examples of the conductive material having a function of inhibiting diffusion of oxygen include titanium, titanium nitride, tantalum, tantalum nitride, ruthenium, and ruthenium oxide. Thus, the conductor 505a is a single layer or stacked layers of the above conductive materials. For example, titanium nitride is used for the conductor 505a.

For the conductor 505b, a conductive material containing tungsten, copper, or aluminum as its main component is preferably used. For example, tungsten is used for the conductor 505b.

Here, the conductor 560 sometimes functions as a first gate (sometimes also referred to as top gate) electrode. The conductor 505 sometimes functions as a second gate (sometimes also referred to as bottom gate) electrode. In that case, $V_{th}$ of the transistor 500 can be controlled by changing a potential applied to the conductor 505 independently of a potential applied to the conductor 560. In particular, by applying a negative potential to the conductor 505, $V_{th}$ of the transistor 500 can be made higher and the off-state current can be made low. Thus, a drain current at the time when a potential applied to the conductor 560 is 0 V can be lower in the case where a negative potential is applied to the conductor 505 than in the case where a negative potential is not applied to the conductor 505.

The conductor 505 is preferably provided to be larger than the channel formation region in the metal oxide 531. In particular, it is preferable that the conductor 505 extend beyond an end portion of the metal oxide 531 that intersects with the channel width direction, as illustrated in FIG. 60C.

In other words, the conductor 505 and the conductor 560 preferably overlap with each other with the insulator positioned therebetween, in a region outside the side surface of the metal oxide 531 in the channel width direction.

With the above structure, the channel formation region of the metal oxide 531 can be electrically surrounded by electric fields of the conductor 560 having a function of the first gate electrode and electric fields of the conductor 505 having a function of the second gate electrode.

As illustrated in FIG. 60C, the conductor 505 extends to function as a wiring as well. However, without limitation to this structure, a structure in which a conductor functioning as a wiring is provided below the conductor 505 may be employed.

The insulator 514 preferably functions as a barrier insulating film that inhibits the entry of impurities such as water and hydrogen to the transistor 500 from the substrate side. Accordingly, it is preferable to use, for the insulator 514, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, $NO$, and $NO_2$), and a copper atom (an insulating material through which the impurities are unlikely to pass). Alternatively, it is preferable to use an insulating material having a function of inhibiting diffusion of oxygen (e.g., one or both of an oxygen atom and an oxygen molecule) (an insulating material through which the oxygen is unlikely to pass).

For example, aluminum oxide or silicon nitride is preferably used for the insulator 514. Accordingly, it is possible to inhibit diffusion of impurities such as water and hydrogen to the transistor 500 side from the substrate side through the insulator 514. Alternatively, it is possible to inhibit diffusion of oxygen contained in the insulator 524 and the like to the substrate side through the insulator 514.

The permittivity of each of the insulator 516, the insulator 580, and the insulator 581 functioning as an interlayer film is preferably lower than that of the insulator 514. When a material with a low permittivity is used for an interlayer film, the parasitic capacitance generated between wirings can be reduced. For the insulator 516, the insulator 580, and the insulator 581, for example, silicon oxide, silicon oxynitride, silicon nitride oxide, or silicon nitride can be used. For the insulator 516, the insulator 580, and the insulator 581, for example, silicon oxide to which fluorine is added, silicon oxide to which carbon is added, silicon oxide to which carbon and nitrogen are added, or porous silicon oxide can be used. A material usable for the insulator 516, the insulator 580, and the insulator 581 may be an appropriate combination of materials described above.

The insulator 522 and the insulator 524 each have a function of a gate insulator.

Here, oxygen preferably has been released by heating from the insulator 524 in contact with the metal oxide 531. In this specification and the like, oxygen that is released by heating is referred to as excess oxygen in some cases. For example, silicon oxide or silicon oxynitride is used as appropriate for the insulator 524. When an insulator containing oxygen is provided in contact with the metal oxide 531, oxygen vacancies in the metal oxide 531 can be reduced, leading to improved reliability of the transistor 500.

Specifically, an oxide material that releases part of oxygen by heating is preferably used for the insulator 524. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS analysis. Note that the temperature of the film surface in the TDS analysis is preferably within the range of 100° C. to 700° C. or 100° C. to 400° C.

Like the insulator 514, the insulator 522 preferably functions as a barrier insulating film that inhibits the entry of impurities such as water and hydrogen into the transistor 500 from the substrate side. For example, the insulator 522 preferably has a lower hydrogen permeability than the insulator 524. When the insulator 524, the metal oxide 531, and the insulator 550 are surrounded by the insulator 522, the insulator 554, and the insulator 574, the entry of impurities such as water and hydrogen into the transistor 500 from the outside can be inhibited.

Furthermore, it is preferable that the insulator 522 have a function of inhibiting diffusion of oxygen (e.g., one or both of an oxygen atom and an oxygen molecule) (it is preferable that the oxygen be less likely to pass through the insulator 522). For example, the insulator 522 preferably has a lower oxygen permeability than the insulator 524. The insulator 522 preferably has a function of inhibiting diffusion of oxygen and impurities such as water and hydrogen, in which case oxygen contained in the metal oxide 531 is less likely to diffuse to the substrate side. Moreover, the conductor 505 can be inhibited from reacting with oxygen contained in the insulator 524 and the metal oxide 531.

As the insulator 522, an insulator containing an oxide of one or both of aluminum and hafnium, which is an insulating material, is preferably used. Examples of the insulator containing an oxide of one or both of aluminum and hafnium include aluminum oxide, hafnium oxide, and an oxide containing aluminum and hafnium (hafnium aluminate). In the case where the insulator 522 is formed using such a material, the insulator 522 functions as a layer inhibiting release of oxygen from the metal oxide 531 and entry of impurities such as hydrogen into the metal oxide 531 from the periphery of the transistor 500.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over any of the above insulators.

The insulator 522 may be a single layer or a stacked layer using an insulator containing what is called a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST). With further miniaturization and higher integration of a transistor, a problem such as generation of a leakage current may arise because of a thinned gate insulator. When a high-k material is used for the insulator functioning as a gate insulator, a gate potential at the time of the operation of the transistor can be reduced while the physical thickness is maintained.

Note that the insulator 522 and the insulator 524 may each have a stacked-layer structure of two or more layers. In that case, without limitation to a stacked-layer structure formed of the same material, a stacked-layer structure formed of different materials may be employed. For example, an insulator similar to the insulator 524 may be provided below the insulator 522.

The metal oxide 531 includes the metal oxide 531a and the metal oxide 531b over the metal oxide 531a. When the metal oxide 531a is provided under the metal oxide 531b, it is possible to inhibit diffusion of impurities into the metal oxide 531b from the components formed below the metal oxide 531a.

Note that the metal oxide 531 preferably has a stacked-layer structure of a plurality of oxide layers that differ in the atomic ratio of metal atoms. For example, in the case where the metal oxide 531 contains at least indium (In) and the element M, the proportion of the number of atoms of the element M contained in the metal oxide 531a to the number of atoms of all elements that constitute the metal oxide 531a is preferably higher than the proportion of the number of atoms of the element M contained in the metal oxide 531b to the number of atoms of all elements that constitute the metal oxide 531b. In addition, the atomic ratio of the element M to In in the metal oxide 531a is preferably greater than the atomic ratio of the element M to In in the metal oxide 531b.

The energy of the conduction band minimum of the metal oxide 531a is preferably higher than the energy of the conduction band minimum of the metal oxide 531b. In other words, the electron affinity of the metal oxide 531a is preferably smaller than the electron affinity of the metal oxide 531b.

Here, the energy level of the conduction band minimum gently changes at junction portions between the metal oxide 531a and the metal oxide 531b. In other words, at junction portions between the metal oxide 531a and the metal oxide 531b, the energy level of the conduction band minimum continuously changes or the energy levels are continuously connected. This can be achieved by decreasing the density of defect states in a mixed layer formed at the interface between the metal oxide 531a and the metal oxide 531b.

Specifically, when the metal oxide 531a and the metal oxide 531b contain the same element (as a main component) in addition to oxygen, a mixed layer with a low density of defect states can be formed. For example, an In—Ga—Zn oxide, a Ga—Zn oxide, gallium oxide, or the like can be used as the metal oxide 531a, in the case where the metal oxide 531b is an In—Ga—Zn oxide.

Specifically, as the metal oxide 531a, a metal oxide with In:Ga:Zn=1:3:4 [atomic ratio] or 1:1:0.5 [atomic ratio] is used. As the metal oxide 531b, a metal oxide with In:Ga:Zn=1:1:1 [atomic ratio], 4:2:3 [atomic ratio], or 3:1:2 [atomic ratio] is used.

In this case, the metal oxide 531b serves as a main carrier path. When the metal oxide 531a has the above structure, the density of defect states at the interface between the metal oxide 531a and the metal oxide 531b can be made low. Thus, the influence of interface scattering on carrier conduction is small, and the transistor 500 can have a high on-state current and high frequency characteristics.

The conductor 542 (the conductor 542a and the conductor 542b) functioning as the source electrode and the drain electrode is provided over the metal oxide 531b. For the conductor 542, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing two or more selected from the above metal elements; or an alloy containing a combination of two or more selected from the above metal elements. For example, for the conductor 542, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, or an oxide containing lanthanum and nickel. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen.

When the conductor 542 is provided in contact with the metal oxide 531, the oxygen concentration of the metal oxide 531 in the vicinity of the conductor 542 sometimes decreases. In addition, a metal compound layer that contains the metal contained in the conductor 542 and the component of the metal oxide 531 is sometimes formed in the metal oxide 531 in the vicinity of the conductor 542. In such cases, the carrier density of the region in the metal oxide 531 in the vicinity of the conductor 542 increases, and the region becomes a low-resistance region.

Here, the region between the conductor 542a and the conductor 542b is formed to overlap with the opening of the insulator 580. Accordingly, the conductor 560 can be placed in a self-aligned manner between the conductor 542a and the conductor 542b.

The insulator 550 functions as a gate insulator. The insulator 550 is preferably positioned in contact with the top surface of the metal oxide 531b. For the insulator 550, silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable.

As in the insulator 524, the concentration of impurities such as water and hydrogen in the insulator 550 is preferably reduced. The thickness of the insulator 550 is preferably greater than or equal to 1 nm and less than or equal to 20 nm.

An insulator may be provided between the insulator 550 and the insulator 580, the insulator 554, the conductor 542, and the metal oxide 531b. For example, aluminum oxide or hafnium oxide is preferably used for the insulator. Providing the insulator can inhibit at least one of release of oxygen from the metal oxide 531b, excessive supply of oxygen to the metal oxide 531b, and oxidation of the conductor 542.

A metal oxide may be provided between the insulator 550 and the conductor 560. The metal oxide preferably inhibits diffusion of oxygen from the insulator 550 to the conductor 560. Accordingly, oxidation of the conductor 560 due to oxygen in the insulator 550 can be inhibited.

The metal oxide has a function of part of the gate insulator in some cases. Therefore, when silicon oxide or silicon oxynitride is used for the insulator 550, a metal oxide that is a high-k material with a high relative permittivity is preferably used as the metal oxide. When the gate insulator has a stacked-layer structure of the insulator 550 and the metal oxide, the stacked-layer structure can be thermally stable and have a high relative permittivity. Accordingly, a gate potential applied during the operation of the transistor can be reduced while the physical thickness of the gate insulator is maintained. In addition, the equivalent oxide thickness (EOT) of the insulator functioning as the gate insulator can be reduced.

Specifically, as the metal oxide, a metal oxide containing one kind or two or more kinds selected from hafnium, aluminum, gallium, yttrium, zirconium, tungsten, titanium, tantalum, nickel, germanium, and magnesium can be used, for example. It is particularly preferable to use, as the metal oxide, any of aluminum oxide, hafnium oxide, and an oxide containing aluminum and hafnium (hafnium aluminate), which are insulators each contain an oxide of one or both of aluminum and hafnium.

Although the conductor 560 has a two-layer structure in FIG. 60B and FIG. 60C, the conductor 560 may have a single-layer structure or a stacked-layer structure of three or more layers.

For the conductor 560a, it is preferable to use the above-described conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., one or both of an oxygen atom and an oxygen molecule).

When the conductor 560a has a function of inhibiting diffusion of oxygen, it is possible to inhibit a reduction in conductivity of the conductor 560b due to oxidation caused by oxygen contained in the insulator 550. Examples of the conductive material having a function of inhibiting diffusion of oxygen include tantalum, tantalum nitride, ruthenium, and ruthenium oxide.

For the conductor 560b, a conductive material containing tungsten, copper, or aluminum as its main component is preferably used. Furthermore, the conductor 560 also functions as a wiring and thus is preferably a conductor having high conductivity. For example, a conductive material containing tungsten, copper, or aluminum as its main component can be used. Moreover, the conductor 560b may have a stacked-layer structure, for example, a stacked-layer structure of the above conductive material and titanium or titanium nitride.

As illustrated in FIG. 60A and FIG. 60C, the side surface of the metal oxide 531 is placed to be covered with the conductor 560 in a region where the metal oxide 531b does not overlap with the conductor 542, that is, the channel formation region of the metal oxide 531. Accordingly, the electric field of the conductor 560 functioning as the first gate electrode is likely to act on the side surface of the metal oxide 531. Thus, the on-state current of the transistor 500 can be increased and the frequency characteristics can be improved.

Like the insulator 514, the insulator 554 preferably functions as a barrier insulating film that inhibits the entry of impurities such as water and hydrogen into the transistor 500 from the insulator 580 side. For example, the insulator 554 preferably has a lower hydrogen permeability than the insulator 524. Moreover, as illustrated in FIG. 60B and FIG. 60C, the insulator 554 is preferably in contact with the side surface of the insulator 550, the top surface and side surface of the conductor 542a, the top surface and side surface of the conductor 542b, and the side surfaces of the metal oxide 531a, the metal oxide 531b, and the insulator 524. Such a structure can inhibit the entry of hydrogen contained in the insulator 580 into the metal oxide 531 through the top surfaces or side surfaces of the conductor 542a, the conductor 542b, the metal oxide 531a, the metal oxide 531b, and the insulator 524.

Furthermore, it is preferable that the insulator 554 have a function of inhibiting diffusion of oxygen (e.g., one or both of an oxygen atom and an oxygen molecule) (it is preferable that the oxygen be unlikely to pass through the insulator 554). For example, the insulator 554 preferably has a lower oxygen permeability than the insulator 580 or the insulator 524.

The insulator 554 is preferably deposited by a sputtering method. When the insulator 554 is deposited by a sputtering method in an oxygen-containing atmosphere, oxygen can be added to the vicinity of a region of the insulator 524 that is in contact with the insulator 554. Thus, oxygen can be supplied from the region to the metal oxide 531 through the insulator 524. Here, with the insulator 554 having a function of inhibiting upward diffusion of oxygen, oxygen can be prevented from diffusing from the metal oxide 531 into the insulator 580. Moreover, with the insulator 522 having a function of inhibiting downward diffusion of oxygen, oxygen can be prevented from diffusing from the metal oxide 531 to the substrate side. In the above manner, oxygen is supplied to the channel formation region of the metal oxide 531. Accordingly, oxygen vacancies in the metal oxide 531 can be reduced, so that the transistor can be inhibited from having normally-on characteristics.

As the insulator 554, an insulator containing an oxide of one or both of aluminum and hafnium is preferably deposited, for example. Note that as the insulator containing an oxide of one or both of aluminum and hafnium, aluminum oxide, hafnium oxide, or an oxide containing aluminum and hafnium (hafnium aluminate) is preferably used.

The insulator 580 is provided over the insulator 524, the metal oxide 531, and the conductor 542 with the insulator 554 therebetween. For the insulator 580, for example, silicon oxide, silicon oxynitride, silicon nitride oxide, silicon oxide to which fluorine is added, silicon oxide to which carbon is added, silicon oxide to which carbon and nitrogen are added, or porous silicon oxide is preferably used. In particular, silicon oxide and silicon oxynitride, which are thermally stable, are preferable. In particular, materials such as silicon oxide, silicon oxynitride, and porous silicon oxide are preferably used, in which case a region containing oxygen to be released by heating can be easily formed.

The concentration of impurities such as water and hydrogen in the insulator 580 is preferably reduced. In addition, the top surface of the insulator 580 may be planarized.

Like the insulator 514, the insulator 574 preferably functions as a barrier insulating film that inhibits the entry of impurities such as water and hydrogen into the insulator 580 from above. As the insulator 574, for example, the insulator that can be used as the insulator 514 or the insulator 554 is used.

The insulator 581 functioning as an interlayer film is preferably provided over the insulator 574. As in the insulator 524, the concentration of impurities such as water and hydrogen in the insulator 581 is preferably reduced.

The conductor 540a and the conductor 540b are placed in opening portions formed in the insulator 581, the insulator 574, the insulator 580, and the insulator 554. The conductor 540a and the conductor 540b are provided to face each other with the conductor 560 therebetween. Note that the top surfaces of the conductor 540a and the conductor 540b may be on the same plane as the top surface of the insulator 581.

The insulator 541a is provided in contact with the inner wall of the opening portion in the insulator 581, the insulator 574, the insulator 580, and the insulator 554, and the first conductor of the conductor 540a is formed in contact with the side surface of the insulator 541a. The conductor 542a is positioned on at least part of the bottom portion of the opening portion, and the conductor 540a is in contact with the conductor 542a. Similarly, the insulator 541b is provided in contact with the inner wall of the opening portion in the insulator 581, the insulator 574, the insulator 580, and the insulator 554, and the first conductor of the conductor 540b is formed in contact with the side surface of the insulator 541b. The conductor 542b is positioned on at least part of the bottom portion of the opening portion, and the conductor 540b is in contact with the conductor 542b.

For the conductor 540a and the conductor 540b, a conductive material containing tungsten, copper, or aluminum as its main component is preferably used. The conductor 540a and the conductor 540b may have a stacked-layer structure.

In the case where the conductor 540 has a stacked-layer structure, the aforementioned conductor having a function of inhibiting diffusion of impurities such as water and hydrogen is preferably used as the conductor in contact with the conductor 542, the insulator 554, the insulator 580, the insulator 574, and the insulator 581. For example, tantalum, tantalum nitride, titanium, titanium nitride, ruthenium, or ruthenium oxide is preferably used for the conductor. The conductive material having a function of inhibiting diffusion of impurities such as water and hydrogen can be used as a single-layer structure or a stacked-layer structure. The use of the conductive material can inhibit oxygen added to the insulator 580 from being absorbed by the conductor 540a and the conductor 540b. Moreover, impurities such as water and hydrogen can be inhibited from entering the metal oxide 531 through the conductor 540a and the conductor 540b from a layer above the insulator 581.

As the insulator 541a and the insulator 541b, for example, the insulator that can be used as the insulator 554 can be used. Since the insulator 541a and the insulator 541b are provided in contact with the insulator 554, impurities such as water and hydrogen can be inhibited from entering the metal oxide 531 from the insulator 580 through the conductor 540a and the conductor 540b. Furthermore, oxygen contained in the insulator 580 can be inhibited from being absorbed by the conductor 540a and the conductor 540b.

Although not illustrated, a conductor functioning as a wiring may be placed in contact with the top surface of the conductor 540a and the top surface of the conductor 540b. For the conductor functioning as a wiring, a conductive material containing tungsten, copper, or aluminum as its main component is preferably used. Furthermore, the conductor may have a stacked-layer structure and may be a stack of titanium or titanium nitride and the above conductive material, for example. Note that the conductor may be formed to be embedded in an opening provided in an insulator.

<Materials for Transistor>

Materials that can be used for the transistor will be described.

[Substrate]

As a substrate where the transistor 500 is formed, an insulator substrate, a semiconductor substrate, or a conductor substrate is used, for example. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate containing silicon or germanium. Other examples of the semiconductor substrate include a compound semiconductor substrate containing silicon carbide, silicon germanium, gallium arsenide, indium phosphide, zinc oxide, or gallium oxide. Another example of the semiconductor substrate is a semiconductor substrate in which an insulator region is included in the above-described semiconductor substrate, e.g., an SOI substrate. Examples of the conductor substrate include a graphite substrate, a metal substrate, an alloy substrate, and a conductive resin substrate. Other examples of the conductor substrate include a substrate including a metal nitride and a substrate including a metal oxide. Other examples of the conductor substrate include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided for the substrates include a capacitor, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

With further miniaturization and higher integration of a transistor, for example, a problem of a leakage current may arise because of a thinned gate insulator. When a high-k material is used for the insulator functioning as a gate insulator, the voltage at the time of the operation of the transistor can be reduced while the physical thickness is maintained. By contrast, when a material with a low relative permittivity is used for the insulator functioning as an interlayer film, the parasitic capacitance generated between wirings can be reduced. Thus, a material is preferably selected depending on the function of an insulator.

Examples of the insulator having a high relative permittivity include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low relative permittivity include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulators having a function of inhibiting the passage of oxygen and impurities such as water and hydrogen (the insulator 514, the insulator 522, the insulator 554, and the insulator 574), the electrical characteristics of the transistor can be stable. An insulator having a function of inhibiting the passage of oxygen and impurities such as water and hydrogen can be formed to have a single layer or a stacked layer including an insulator containing one or more selected from boron, carbon, nitrogen, oxygen, fluorine, magnesium, aluminum, silicon, phosphorus, chlorine, argon, gallium, germanium, yttrium, zirconium, lanthanum, neodymium, hafnium, and tantalum, for example. Specific examples of the insulator having a function of inhibiting the passage of oxygen and impurities such as water and hydrogen include metal oxides such as aluminum oxide, magnesium oxide, gallium oxide, germanium oxide, yttrium oxide, zirconium oxide, lanthanum oxide, neodymium oxide, hafnium oxide, and tantalum oxide. Other examples of the insulator having a function of inhibiting the passage of oxygen and impurities such as water and hydrogen include metal nitrides such as aluminum nitride, aluminum titanium nitride, titanium nitride, silicon nitride oxide, and silicon nitride.

An insulator functioning as a gate insulator is preferably an insulator including a region containing oxygen to be released by heating. For example, when a structure is employed in which silicon oxide or silicon oxynitride that includes a region containing oxygen to be released by heating is provided in contact with the metal oxide 531, oxygen vacancies included in the metal oxide 531 can be compensated for.

[Conductor]

As the conductor, for example, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing two or more selected from the above metal elements; or an alloy containing a combination of two or more selected from the above metal elements. As the conductor, for example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, or an oxide containing lanthanum and nickel. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. As the conductor, a semiconductor having high electrical conductivity, typified by polycrystalline silicon containing an impurity element (e.g., phosphorus), or silicide (e.g., nickel silicide) may be used.

A plurality of conductors formed using any of the above materials may be stacked. For example, a stacked-layer structure combining a material containing the above metal element and a conductive material containing oxygen may be employed. In addition, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably has a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in the metal oxide where the channel is formed. A conductive material containing the above metal element and nitrogen may be used for the conductor, for example. As another example, a conductive material containing nitrogen, such as titanium nitride or tantalum nitride, may be used for the conductor. Alternatively, for the conductor, indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used, for example. For the conductor, indium gallium zinc oxide containing nitrogen may be used, for example. With the use of such a material, hydrogen contained in the metal oxide where the channel is formed can be captured in some cases. Alternatively, hydrogen entering from an external insulator or the like can be captured in some cases.

At least part of this embodiment can be implemented in combination with the other embodiments described in this specification as appropriate.

Embodiment 6

In this embodiment, a metal oxide (hereinafter also referred to as an oxide semiconductor) that can be used for the OS transistor described in the above embodiment will be described.

The metal oxide used for the OS transistor preferably contains at least indium or zinc, and further preferably contains indium and zinc. A metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. In particular, M is preferably one or more kinds selected from gallium, aluminum, yttrium, and tin, and is further preferably gallium.

The metal oxide can be formed by a sputtering method, a CVD method such as an MOCVD method, or an ALD method.

Hereinafter, an oxide containing indium (In), gallium (Ga), and zinc (Zn) is described as an example of the metal oxide. Note that an oxide containing indium (In), gallium (Ga), and zinc (Zn) may be referred to as an In—Ga—Zn oxide.

<Classification of Crystal Structure>

Amorphous (including a completely amorphous structure), CAAC (c-axis-aligned crystalline), nc (nanocrystalline), CAC (cloud-aligned composite), single crystal, and polycrystalline (poly crystal) structures can be given as examples of a crystal structure of an oxide semiconductor.

Note that a crystal structure of a film or a substrate can be evaluated with an X-ray diffraction (XRD) spectrum. For example, evaluation is possible using an XRD spectrum that is obtained by GIXD (Grazing-Incidence XRD) measurement. Note that a GIXD method is also referred to as a thin film method or a Seemann-Bohlin method. Hereinafter, an XRD spectrum obtained by GIXD measurement is simply referred to as an XRD spectrum in some cases.

For example, the XRD spectrum of a quartz glass substrate shows a peak with a substantially bilaterally symmetrical shape. On the other hand, the peak of the XRD spectrum of the In—Ga—Zn oxide film having a crystal structure has a bilaterally asymmetrical shape. The bilaterally asymmetrical peak of the XRD spectrum clearly shows the existence of crystals in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction (NBED) method (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the In—Ga—Zn oxide film deposited at room temperature. Thus, it is suggested that the In—Ga—Zn oxide deposited at room temperature is in an intermediate state, which is neither a single crystal nor polycrystal nor an amorphous state, and it cannot be concluded that the In—Ga—Zn oxide is in an amorphous state.

<<Structure of Oxide Semiconductor>>

Note that oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the CAAC-OS and the nc-OS. As the non-single-crystal oxide semiconductors, a polycrystalline oxide semiconductor, an amorphous-like oxide semiconductor (a-like OS), and an amorphous oxide semiconductor are given.

Here, the CAAC-OS, the nc-OS, and the a-like OS are described in detail.

[CAAC-OS]

The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. Note that when an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the orientation of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the maximum diameter of the crystal region may be approximately several tens of nanometers.

In the case of an In—Ga—Zn oxide, the CAAC-OS tends to have a layered crystal structure (also referred to as a layered structure) in which a layer containing indium (In) and oxygen (hereinafter, an In layer) and a layer containing gallium (Ga), zinc (Zn), and oxygen (hereinafter, a (Ga,Zn) layer) are stacked. Note that indium and gallium can be replaced with each other. Therefore, indium may be contained in the (Ga,Zn) layer. In addition, gallium may be contained in the In layer. Note that zinc may be contained in the In layer. Such a layered structure is observed as a lattice image in a high-resolution TEM (Transmission Electron Microscope) image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind or composition of the metal element contained in the CAAC-OS.

For example, a plurality of bright spots are observed in the electron diffraction pattern of the CAAC-OS film. Note that one spot and another spot are observed point-symmetrically with a spot of an incident electron beam passing through a sample (also referred to as a direct spot) as a symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (also referred to as grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called polycrystal. It is highly probable that the crystal grain boundary becomes a recombination center and traps carriers and thus decreases the on-state current and/or field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, it can be said that a reduction in electron mobility due to the crystal grain boundary is unlikely to occur. Moreover, since the crystallinity of an oxide semiconductor might be decreased by one or both of entry of impurities and formation of defects, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[a-like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has a higher hydrogen concentration in the film than the nc-OS and the CAAC-OS.

[Structure of Oxide Semiconductor]

Next, the above-described CAC-OS will be described in detail. Note that the CAC-OS relates to the material composition.

[CAC-OS]

The CAC-OS refers to one composition of a material in which elements included in a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide is a region having [In] higher than [In] in the composition of the CAC-OS film. Moreover, the second region is a region having [Ga] higher than [Ga] in the composition of the CAC-OS film. Alternatively, for example, the first region is a region having [In] higher than [In] in the second region and [Ga] lower than [Ga] in the second region. Moreover, the second region is a region having [Ga] higher than [Ga] in the first region and [In] lower than [In] in the first region.

Specifically, the first region is a region including indium oxide or indium zinc oxide as its main component. The second region is a region including gallium oxide or gallium zinc oxide as its main component. That is, the first region can be rephrased as a region containing In as its main component. The second region can be rephrased as a region containing Ga as its main component.

Note that a clear boundary between the first region and the second region cannot be observed in some cases.

In addition, in a material composition of a CAC-OS in an In—Ga—Zn oxide that contains In, Ga, Zn, and O, there are regions containing Ga as a main component in part of the CAC-OS and regions containing In as a main component in another part of the CAC-OS. These regions each form a mosaic pattern and are randomly present. Thus, it is suggested that the CAC-OS has a structure in which metal elements are unevenly distributed.

The CAC-OS can be formed by a sputtering method under a condition where a substrate is not heated, for example. Furthermore, in the case where the CAC-OS is formed by a sputtering method, any one or more selected from an inert gas (a typical example is argon), an oxygen gas, and a nitrogen gas is used as a deposition gas. The proportion of the flow rate of an oxygen gas in the total flow rate of the deposition gas during deposition is preferably as low as possible. For example, the proportion of the flow rate of an oxygen gas in the total flow rate of the deposition gas during deposition is preferably higher than or equal to 0% and lower than 30%, further preferably higher than or equal to 0% and lower than or equal to 10%.

For example, according to EDX mapping obtained using energy dispersive X-ray spectroscopy (EDX), the CAC-OS in the In—Ga—Zn oxide has a structure in which the region containing In as its main component (the first region) and the region containing Ga as its main component (the second region) are unevenly distributed and mixed.

Here, the first region is a region having higher conductivity than the second region. In other words, when carriers flow through the first region, the conductivity of a metal oxide is exhibited. Accordingly, when the first regions are distributed in a metal oxide like a cloud, high field-effect mobility (p) can be achieved.

The second region is a region having a higher insulating property than the first region. In other words, when the second regions are distributed in a metal oxide, a leakage current can be inhibited.

Thus, in the case where a CAC-OS is used for a transistor, by the complementary action of the conductivity due to the first region and the insulating property due to the second region, the CAC-OS can have a switching function (On/Off function). That is, the CAC-OS has a conducting function in part of the material and has an insulating function in another part of the material; as a whole, the CAC-OS has a function of a semiconductor. Separation of the conducting function and the insulating function can maximize each function. Accordingly, when a CAC-OS is used for a transistor, a high on-state current (Ion), a high field-effect mobility (p), and favorable switching operation can be achieved.

A transistor using the CAC-OS has high reliability. Thus, the CAC-OS is most suitable for a variety of semiconductor devices such as a display apparatus.

An oxide semiconductor has various structures with different properties. Two or more kinds among an amorphous oxide semiconductor, a polycrystalline oxide semiconductor, an a-like OS, a CAC-OS, an nc-OS, and a CAAC-OS may be included in an oxide semiconductor of one embodiment of the present invention.

<Transistor Including Oxide Semiconductor>

Next, the case where the above oxide semiconductor is used for a transistor will be described.

When the above oxide semiconductor is used for a transistor, a transistor with high field-effect mobility can be achieved. In addition, a transistor with high reliability can be achieved.

It is particularly preferable to use an oxide containing indium (In), gallium (Ga), and zinc (Zn) (also referred to as "IGZO") for the semiconductor layer where a channel is formed. Alternatively, an oxide containing indium (In), aluminum (Al), and zinc (Zn) (also referred to as "IAZO") may be used for the semiconductor layer. Further alternatively, an oxide containing indium (In), aluminum (Al), gallium (Ga), and zinc (Zn) (also referred to as "IAGZO") may be used for the semiconductor layer.

An oxide semiconductor having a low carrier concentration is preferably used for a transistor. For example, the carrier concentration of an oxide semiconductor is lower than or equal to $1 \times 10^{17}$ $cm^{-3}$, preferably lower than or equal to $1 \times 10^{15}$ $cm^3$, further preferably lower than or equal to $1 \times 10^{13}$ $cm^3$, still further preferably lower than or equal to $1 \times 10^{11}$ $cm^{-3}$, yet further preferably lower than $1 \times 10^{10}$ $cm^{-3}$, and higher than or equal to $1 \times 10^{-9}$ $cm^3$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon. Note that an impurity in an oxide semiconductor refers to, for example, elements other than the main components of the oxide semiconductor. For example, an element with a concentration lower than 0.1 atomic % can be regarded as an impurity.

<Impurity>

Here, the influence of each impurity in the oxide semiconductor will be described.

When silicon or carbon, which is one of Group 14 elements, is contained in the oxide semiconductor, defect states are formed in the oxide semiconductor. Thus, the concentration of silicon or carbon (the concentration obtained by secondary ion mass spectrometry (SIMS)) in the oxide semiconductor is set lower than or equal to $2 \times 10^{18}$ atoms/$cm^3$, preferably lower than or equal to $2 \times 10^{17}$ atoms/$cm^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is lower than or equal to $1 \times 10^{18}$ atoms/$cm^3$, preferably lower than or equal to $2 \times 10^{16}$ atoms/$cm^3$.

Furthermore, when the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5 \times 10^{19}$ atoms/$cm^3$, preferably lower than or equal to $5 \times 10^{18}$ atoms/$cm^3$, further preferably lower than or equal to $1 \times 10^{18}$ atoms/$cm^3$, still further preferably lower than or equal to $5 \times 10^{17}$ atoms/$cm^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. For this reason, hydrogen in the oxide semiconductor is preferably reduced as much as possible. Specifically, the concentration of hydrogen in the oxide semiconductor, which is measured by SIMS, is set lower than $1 \times 10^{20}$ atoms/$cm^3$, preferably lower than $1 \times 10^{19}$ atoms/$cm^3$, further preferably lower than $5 \times 10^{18}$ atoms/$cm^3$, still further preferably lower than $1 \times 10^{18}$ atoms/$cm^3$.

When an oxide semiconductor with sufficiently reduced impurities is used for the channel formation region of the transistor, stable electrical characteristics can be given.

The structure described in this embodiment can be used in an appropriate combination with any of the structures described in the other embodiments.

Embodiment 7

In this embodiment, a display module that can be used for the electronic device of one embodiment of the present invention will be described.

Structure Example of Display Module

First, a display module including the display apparatus that can be used for the electronic device of one embodiment of the present invention will be described.

Figure 61A:
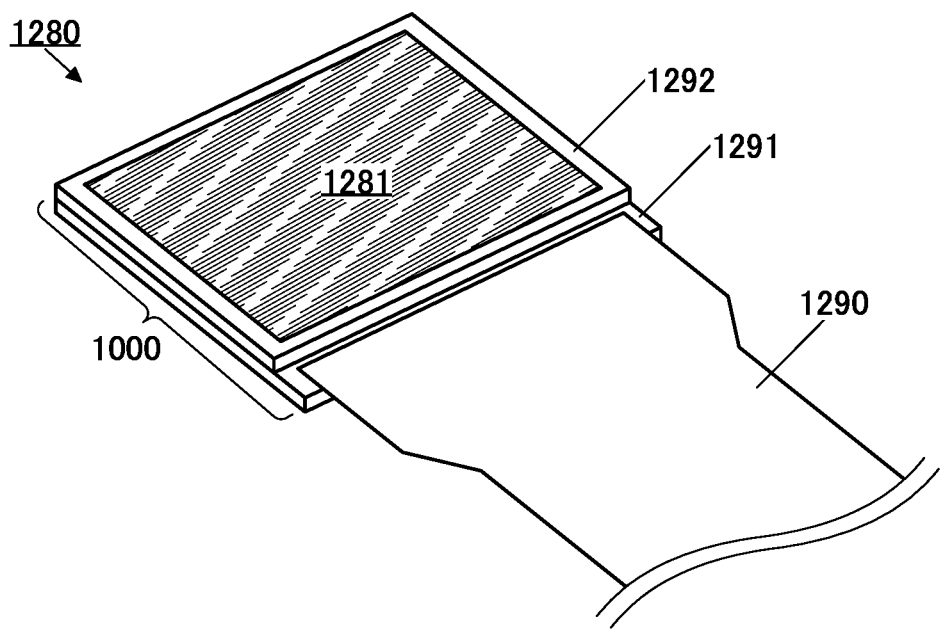
FIG. 61A and FIG. 61B illustrate structure examples of a display module.

FIG. 61A is a perspective view of a display module 1280. The display module 1280 includes the display apparatus 1000 and an FPC 1290.

The display module 1280 includes a substrate 1291 and a substrate 1292. The display module 1280 includes a display portion 1281. The display portion 1281 is a region of the display module 1280 where an image is displayed, and is a region where light emitted from pixels provided in a pixel portion 1284 described later can be seen.

Figure 61B:
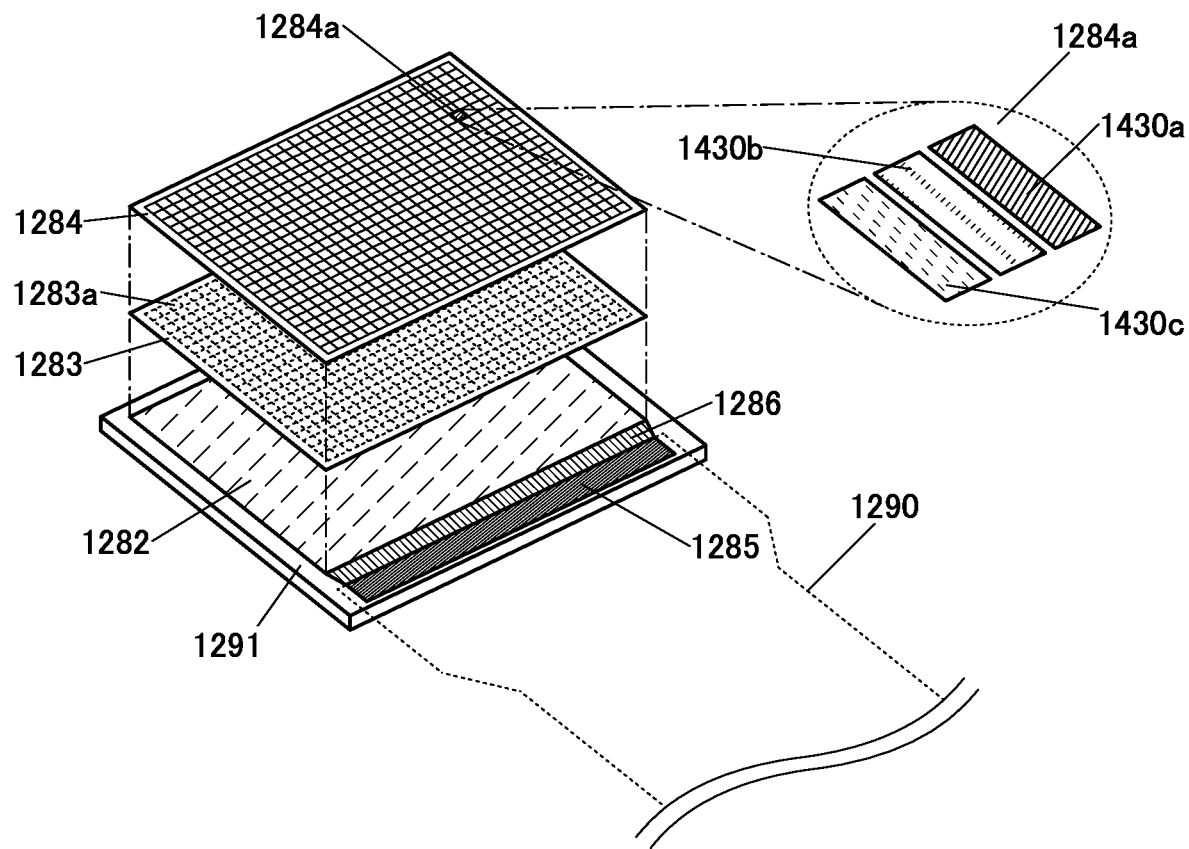

FIG. 61B is a perspective view schematically illustrating a structure on the substrate 1291 side. A circuit portion 1282, a pixel circuit portion 1283 over the circuit portion 1282, and the pixel portion 1284 over the pixel circuit portion 1283 are stacked over the substrate 1291. In addition, a terminal portion 1285 for connection to the FPC 1290 is provided in a portion not overlapping with the pixel portion 1284 over the substrate 1291. The terminal portion 1285 and the circuit portion 1282 are electrically connected to each other through a wiring portion 1286 formed of a plurality of wirings.

Note that the pixel portion 1284 and the pixel circuit portion 1283 correspond to the pixel layer PXAL described above, for example. The circuit portion 1282 corresponds to the circuit layer SICL described above, for example.

The pixel portion 1284 includes a plurality of pixels 1284a arranged periodically. An enlarged view of one pixel 1284a is illustrated on the right side in FIG. 61B. The pixel 1284a includes a light-emitting device 1430a, a light-emitting device 1430b, and a light-emitting device 1430c that emit light of different colors. Note that the light-emitting device 1430a, the light-emitting device 1430b, and the light-emitting device 1430c correspond to the light-emitting device 130R, the light-emitting device 130G, and the light-emitting device 130B described above, for example. The above-described light-emitting devices may be arranged in a stripe pattern as illustrated in FIG. 61B. Alternatively, a variety of arrangement methods, such as delta arrangement and pentile arrangement, can be employed.

The pixel circuit portion 1283 includes a plurality of pixel circuits 1283a arranged periodically.

One pixel circuit 1283a is a circuit that controls light emission from three light-emitting devices included in one pixel 1284a. One pixel circuit 1283a may be provided with three circuits each of which controls light emission from one light-emitting device. For example, the pixel circuit 1283a can include at least one selection transistor, one current control transistor (driving transistor), and a capacitor for one light-emitting device. In that case, a gate signal is input to a gate of the selection transistor, and a source signal is input to one of a source and a drain of the selection transistor. Thus, an active-matrix display apparatus is achieved.

The circuit portion 1282 includes a circuit for driving the pixel circuits 1283a in the pixel circuit portion 1283. For example, one or both of a gate line driver circuit and a source line driver circuit are preferably included. In addition, one or more selected from an arithmetic circuit, a memory circuit, and a power supply circuit may be included.

The FPC 1290 functions as a wiring for supplying a video signal or a power supply potential to the circuit portion 1282 from the outside. In addition, an IC may be mounted on the FPC 1290.

The display module 1280 can have a structure in which one or both of the pixel circuit portion 1283 and the circuit portion 1282 are stacked below the pixel portion 1284; thus, the aperture ratio (the effective display area ratio) of the display portion 1281 can be significantly high. For example, the aperture ratio of the display portion 1281 can be higher than or equal to 40% and lower than 100%, preferably higher than or equal to 50% and lower than or equal to 95%, further preferably higher than or equal to 60% and lower than or equal to 95%. Furthermore, the pixels 1284a can be arranged extremely densely and thus the display portion 1281 can have an extremely high resolution. For example, the pixels 1284a are preferably arranged in the display portion 1281 with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 1280 has an extremely high resolution and thus can be suitably used for a VR device such as a head-mounted display or a glasses-type AR device. For example, even with a structure in which the display portion of the display module 1280 is seen through a lens, pixels of the extremely-high-resolution display portion 1281 included in the display module 1280 are prevented from being perceived when the display portion is enlarged by the lens, so that display providing a strong sense of immersion can be performed. Without being limited thereto, the display module 1280 can be suitably used for electronic devices including relatively small display portions. For example, the display module 1280 can be suitably used for a display portion of a wearable electronic device such as a wristwatch.

Note that this embodiment can be combined with any of the other embodiments described in this specification as appropriate.

Embodiment 8

In this embodiment, examples of electronic devices each including a display apparatus will be described as examples of an electronic device of one embodiment of the present invention.

Figure 62A:
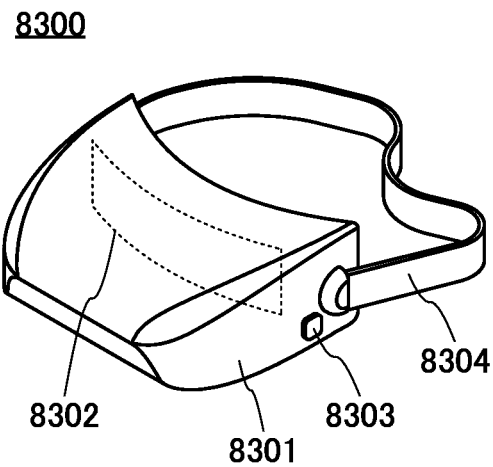
FIG. 62A to FIG. 62F illustrate structure examples of electronic devices.
Figure 62B:
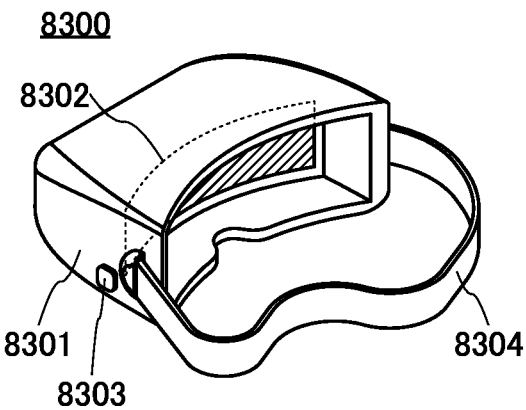

FIG. 62A and FIG. 62B each illustrate an appearance of an electronic device 8300 that is a head-mounted display.

The electronic device 8300 includes a housing 8301, a display portion 8302, an operation button 8303, and a band-shaped fixing unit 8304.

The operation button 8303 has a function of a power button or the like. The electronic device 8300 may include a button other than the operation button 8303.

Figure 62C:
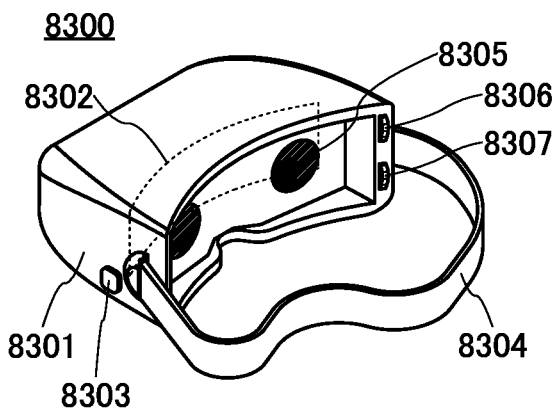

As illustrated in FIG. 62C, lenses 8305 may be included between the display portion 8302 and the positions of the user's eyes. The user can see magnified images on the display portion 8302 through the lenses 8305, leading to a higher realistic sensation. In that case, as illustrated in FIG. 62C, a dial 8306 for changing the positions of the lenses and adjusting visibility may be included.

For the display portion 8302, a display apparatus with an extremely high resolution is preferably used, for example. When a high-resolution display apparatus is used for the display portion 8302, it is possible to display a more realistic video that does not allow the user to perceive pixels even when the video is magnified using the lenses 8305 as illustrated in FIG. 62C.

FIG. 62A to FIG. 62C illustrate examples where one display portion 8302 is provided. Such a structure can reduce the number of components.

The display portion 8302 can display an image for the right eye and an image for the left eye side by side on a right region and a left region, respectively. Thus, a three-dimensional video using binocular disparity can be displayed.

One image that can be seen by both eyes may be displayed on the entire display portion 8302. A panorama video can thus be displayed from end to end of the field of view, which can provide a stronger sense of reality.

Here, the electronic device 8300 preferably has, for example, a mechanism for changing the curvature of the display portion 8302 to an optimal value in accordance with one or more selected from the size of the user's head and the positions of the user's eyes. For example, the user himself or herself may adjust the curvature of the display portion 8302 by operating a dial 8307 for adjusting the curvature of the display portion 8302. Alternatively, a sensor for detecting the size of the user's head or the positions of the user's eyes (e.g., a camera, a contact sensor, and a noncontact sensor) may be provided on the housing 8301, and a mechanism for adjusting the curvature of the display portion 8302 on the basis of detection data obtained by the sensor may be provided.

In the case where the lenses 8305 are used, a mechanism for adjusting the positions and angle of the lenses 8305 in synchronization with the curvature of the display portion 8302 is preferably provided. Alternatively, the dial 8306 may have a function of adjusting the angle of the lenses.

Figure 62D:
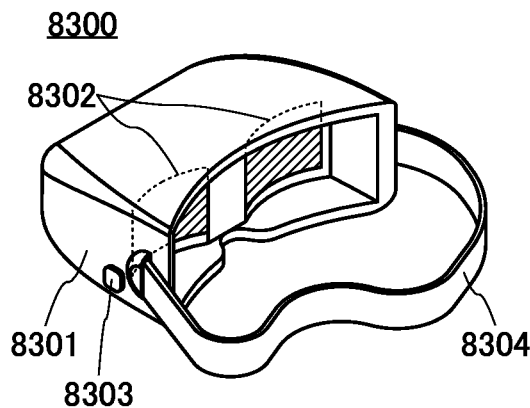
Figure 62E:
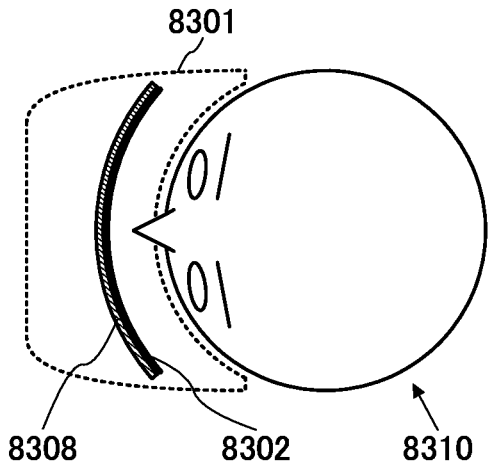
Figure 62F:
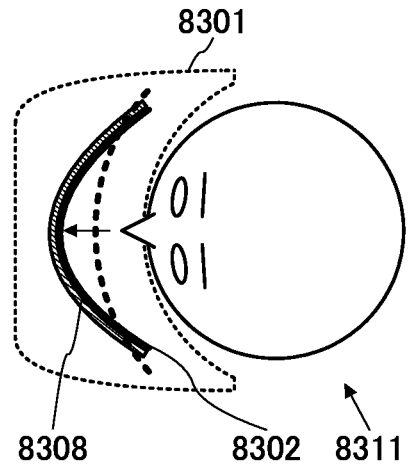

FIG. 62E and FIG. 62F illustrate an example where a driver portion 8308 controlling the curvature of the display portion 8302 is provided. The driver portion 8308 is fixed to part of the display portion 8302. The driver portion 8308 has a function of changing the shape of the display portion 8302 when the part that is fixed to the display portion 8302 changes in shape or moves.

FIG. 62E is a schematic view illustrating the case where a user 8310 having a relatively large head wears the housing 8301. In that case, the driver portion 8308 adjusts the shape of the display portion 8302 such that the curvature is relatively small (the radius of curvature is large).

By contrast, FIG. 62F illustrates the case where a user 8311 having a smaller head than the user 8310 wears the housing 8301. The user 8311 has a shorter distance between the eyes than the user 8310. In that case, the driver portion 8308 adjusts the shape of the display portion 8302 such that the curvature of the display portion 8302 is large (the radius of curvature is small). In FIG. 62F, the position and shape of the display portion 8302 in FIG. 62E are denoted by a dashed line.

When the electronic device 8300 has such a mechanism for adjusting the curvature of the display portion 8302, an optimal display can be offered to a variety of users of all ages and genders.

When the curvature of the display portion 8302 is changed in accordance with contents displayed on the display portion 8302, the user can have a more realistic sensation. For example, shaking can be expressed by fluctuating the curvature of the display portion 8302. In this way, it is possible to produce various effects depending on the scene in contents, and provide the user with new experiences. A further realistic display can be provided when the display portion 8302 operates in conjunction with a vibration module provided in the housing 8301.

Note that the electronic device 8300 may include two display portions 8302 as illustrated in FIG. 62D.

Since the two display portions 8302 are included, the user's eyes can see their respective display portions. This allows a high-definition video to be displayed even when three-dimensional display using parallax is performed. In addition, the display portion 8302 is curved around an arc with the user's eye as an approximate center. This allows a uniform distance between the user's eye and the display surface of the display portion; thus, the user can see a more natural video. Even when the luminance or chromaticity of light from the display portion is changed depending on the angle at which the user sees it, since the user's eye is positioned in a normal direction of the display surface of the display portion, the influence of the change can be substantially ignorable and thus a more realistic video can be displayed.

Figure 63A:
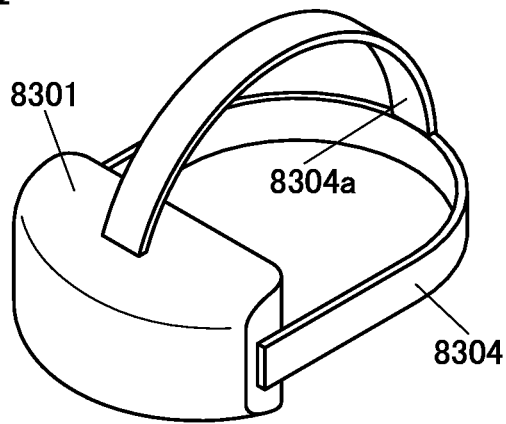
FIG. 63A to FIG. 63D illustrate structure example of electronic devices.
Figure 63B:
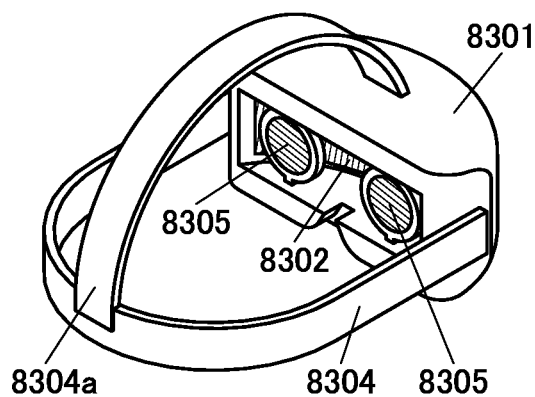
Figure 63C:
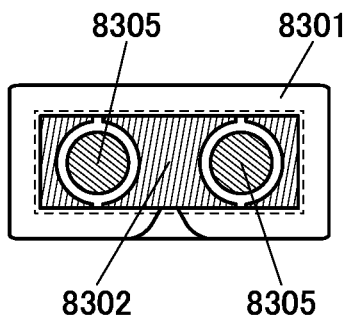

FIG. 63A to FIG. 63C are diagrams illustrating an appearance of another electronic device 8300, which is different from the electronic devices 8300 illustrated in FIG. 62A to FIG. 62D. Specifically, FIG. 63A to FIG. 63C are different from FIG. 62A to FIG. 62D in including a fixing unit 8304*a* worn on a head and a pair of lenses 8305, for example.

A user can see display on the display portion 8302 through the lenses 8305. The display portion 8302 is preferably curved so that the user can feel high realistic sensation. Another image displayed on another region of the display portion 8302 is seen through the lenses 8305, so that three-dimensional display using parallax can be performed.

Note that the structure is not limited to the structure in which one display portion 8302 is provided; two display portions 8302 may be provided and one display portion may be provided per eye of the user.

For the display portion 8302, a display apparatus with an extremely high resolution is preferably used, for example. When a high-resolution display apparatus is used for the display portion 8302, it is possible to display a more realistic video that does not allow the user to perceive pixels even when the video is magnified using the lenses 8305 as illustrated in FIG. 63C.

Figure 63D:
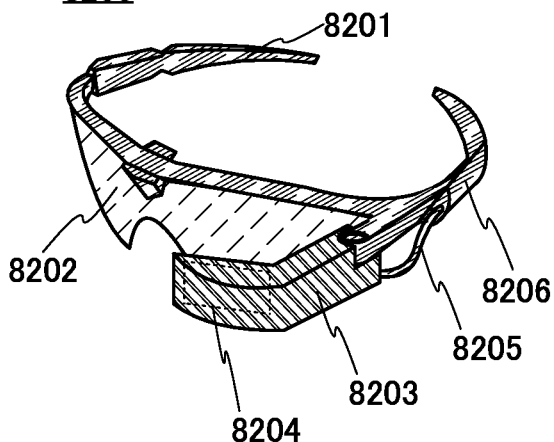

The head-mounted display, which is an electronic device of one embodiment of the present invention, may have a structure of an electronic device 8200 illustrated in FIG. 63D, which is a glasses-type head-mounted display.

The electronic device 8200 includes a mounting portion 8201, a lens 8202, a main body 8203, a display portion 8204, and a cable 8205. A battery 8206 is incorporated in the mounting portion 8201.

The cable 8205 supplies power from the battery 8206 to the main body 8203. The main body 8203 includes a wireless receiver and can display received video information on the display portion 8204. The main body 8203 includes a camera, and information on the movement of the eyeballs or the eyelids of the user can be used as an input means.

The mounting portion 8201 may include a plurality of electrodes capable of sensing a current flowing accompanying with the movement of the user's eyeballs at a position in contact with the user to recognize the user's sight line. The mounting portion 8201 may also have a function of monitoring the user's pulse with use of a current flowing through the electrodes. The mounting portion 8201 may include a variety of sensors such as a temperature sensor, a pressure sensor, and an acceleration sensor to have a function of displaying the user's biological information on the display portion 8204 or a function of changing a video displayed on the display portion 8204 in accordance with the movement of the user's head.

Figure 64A:
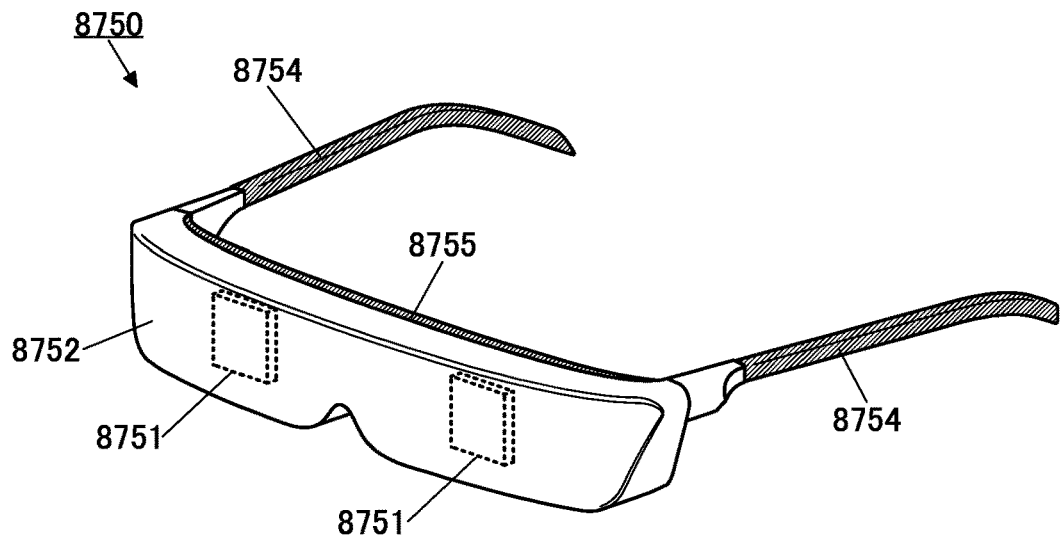
FIG. 64A to FIG. 64C illustrate structure examples of an electronic device.
Figure 64B:
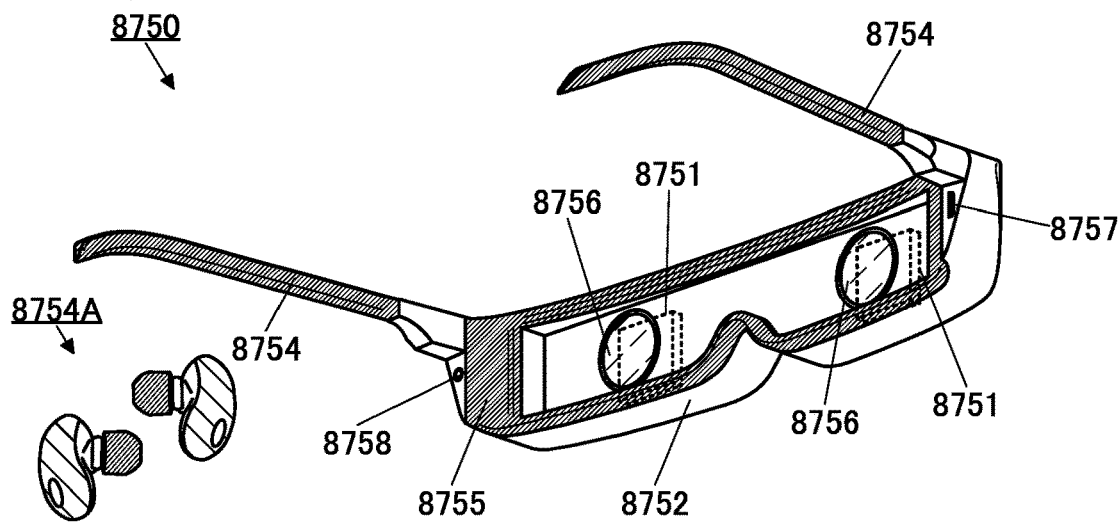
Figure 64C:
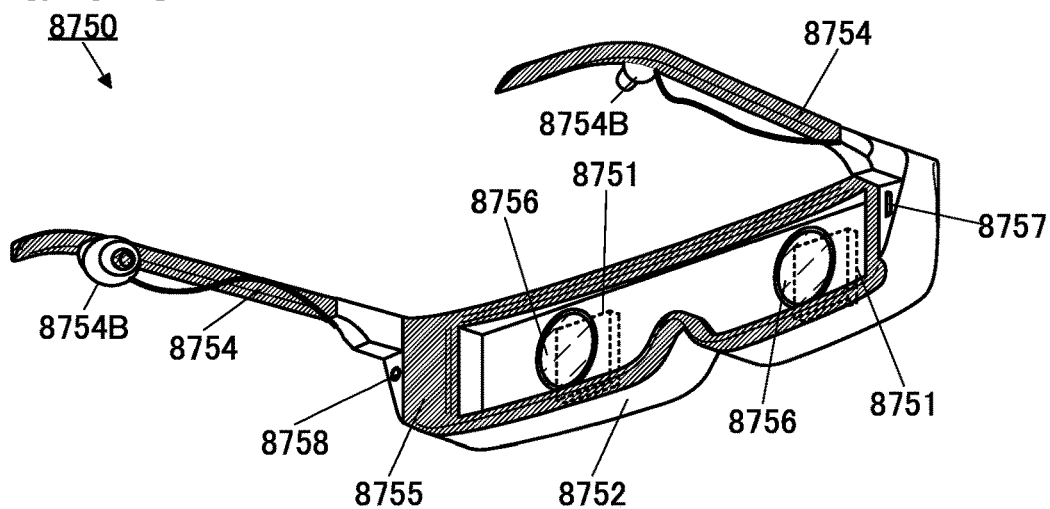

FIG. 64A to FIG. 64C are diagrams illustrating an appearance of an electronic device 8750, which is different from the electronic devices 8300 illustrated in FIG. 62A to FIG. 62D and FIG. 63A to FIG. 63C and the electronic device 8200 illustrated in FIG. 63D.

FIG. 64A is a perspective view illustrating the front surface, the top surface, and the left side surface of the electronic device 8750, and FIG. 64B and FIG. 64C are each a perspective view illustrating the back surface, the bottom surface, and the right side surface of the electronic device 8750.

The electronic device 8750 includes a pair of display apparatuses 8751, a housing 8752, a pair of mounting portions 8754, a cushion 8755, a pair of lenses 8756, and the like. The pair of display apparatuses 8751 is positioned to be seen through the lenses 8756 inside the housing 8752.

Here, one of the pair of display apparatuses 8751 corresponds to the display apparatus DSP0 illustrated in FIG. 1, for example. Although not illustrated, the electronic device 8750 illustrated in FIG. 64A to FIG. 64C includes an electronic component including the processing unit described in the above embodiment (e.g., the peripheral circuit PRPH described in Embodiment 3). Although not illustrated, the electronic device 8750 illustrated in FIG. 64A to FIG. 64C includes a camera. The camera can take an image of the user's eye and its periphery. Although not illustrated, in the housing 8752 of the electronic device 8750 illustrated in FIG. 64A to FIG. 64C, a motion detection portion, an audio, a control portion, a communication portion, and a battery are provided.

The electronic device 8750 is an electronic device for VR. A user wearing the electronic device 8750 can see an image displayed on the display apparatus 8751 through the lens 8756. Furthermore, the pair of display apparatuses 8751 may display different images, whereby three-dimensional display using parallax can be performed.

An input terminal 8757 and an output terminal 8758 are provided on the back side of the housing 8752. To the input terminal 8757, a cable for supplying a video signal from a video output device or the like or power for charging a battery provided in the housing 8752 can be connected. The output terminal 8758 can function as, for example, an audio output terminal to which earphones or headphones can be connected.

The housing 8752 preferably includes a mechanism by which the left and right positions of the lens 8756 and the display apparatus 8751 can be adjusted to the optimal positions in accordance with the position of the user's eye. In addition, the housing 8752 preferably includes a mechanism for adjusting focus by changing the distance between the lens 8756 and the display apparatus 8751.

With use of the camera, the display apparatus 8751, and the electronic component, the electronic device 8750 can estimate the state of a user of the electronic device 8750 and can display information on the estimated user's state on the display apparatus 8751. Alternatively, information on a state of a user of an electronic device connected to the electronic device 8750 through a network can be displayed on the display apparatus 8751.

The cushion 8755 is a portion in contact with the user's face (e.g., forehead and cheek). The cushion 8755 is in close contact with the user's face, so that light leakage can be prevented, which increases the sense of immersion. A soft material is preferably used for the cushion 8755 so that the cushion 8755 is in close contact with the face of the user wearing the electronic device 8750. For example, any of materials such as rubber, silicone rubber, urethane, and sponge can be used. Furthermore, when a sponge whose surface is covered with cloth or leather (e.g., natural leather or synthetic leather) is used, a gap is unlikely to be generated between the user's face and the cushion 8755, whereby light leakage can be suitably prevented. Furthermore, using such a material is preferable because it has a soft texture and the user does not feel cold when wearing the device in a cold season, for example. The member in contact with user's skin, such as the cushion 8755 or the mounting portion 8754, is preferably detachable because cleaning or replacement can be easily performed.

The electronic device in this embodiment may further include earphones 8754A. The earphones 8754A include a communication portion (not illustrated) and have a wireless communication function. The earphones 8754A can output audio data with the wireless communication function. Note that the earphones 8754A may include a vibration mechanism to function as bone-conduction earphones.

Like earphones 8754B illustrated in FIG. 64C, the earphones 8754A can be connected to the mounting portion 8754 directly or by wiring. The earphones 8754B and the mounting portion 8754 may each have a magnet. This is preferable because the earphones 8754B can be fixed to the mounting portion 8754 with magnetic force and thus can be easily housed.

The earphones 8754A may include a sensor portion. With use of the sensor portion, the state of the user of the electronic device can be estimated.

The electronic device of one embodiment of the present invention may include one or more selected from an antenna, a battery, a camera, a speaker, a microphone, a touch sensor, and an operation button, in addition to any one of the above structure examples.

The electronic device of one embodiment of the present invention may include a secondary battery, and it is preferable that the secondary battery be capable of being charged by contactless power transmission.

Examples of the secondary battery include a lithium ion secondary battery (such as a lithium polymer battery using a gel electrolyte (a lithium ion polymer battery)), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display a video, information, or the like on a display portion. When the electronic device includes an antenna and a secondary battery, the antenna may be used for contactless power transmission.

A display portion in an electronic device of one embodiment of the present invention can display a video with a definition of, for example, full high definition, 4K2K, 8K4K, 16K8K, or higher.

Note that this embodiment can be combined with any of the other embodiments described in this specification as appropriate.

Embodiment 9

In this embodiment, electronic devices each including a display apparatus fabricated using one embodiment of the present invention will be described.

Electronic devices described below as examples each include the display apparatus of one embodiment of the present invention in a display portion. Thus, the electronic devices achieve high resolution.

One embodiment of the present invention includes the display apparatus and one or more selected from an antenna, a battery, a housing, a camera, a speaker, a microphone, a touch sensor, and an operation button.

The electronic device of one embodiment of the present invention may include a secondary battery, and it is preferable that the secondary battery be capable of being charged by contactless power transmission.

For the secondary battery, for example, the description of the secondary battery described in Embodiment 8 can be referred to.

The electronic device of one embodiment of the present invention may include an antenna. For the antenna, for example, the description of the antenna described in Embodiment 8 can be referred to.

A display portion in an electronic device of one embodiment of the present invention can display a video with a definition of, for example, full high definition, 4K2K, 8K4K, 16K8K, or higher.

Examples of the electronic devices include electronic devices with relatively large screens, such as a television device, a laptop personal computer, a monitor device, digital signage, a pachinko machine, and a game machine. Examples of the electronic devices further include a digital camera, a digital video camera, a digital photo frame, a mobile phone, a portable game machine, a portable information terminal, and an audio reproducing device.

The electronic device using one embodiment of the present invention can be incorporated along a flat surface or a curved surface of an inside wall or an outside wall of a house or a building.

The electronic device can be incorporated along a flat surface or a curved surface of an interior or an exterior of a car or the like.

[Mobile Phone]

Figure 65A:
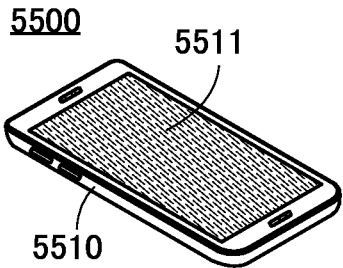
FIG. 65A to FIG. 65H illustrate structure examples of electronic devices.

An information terminal 5500 illustrated in FIG. 65A is a mobile phone (smartphone), which is a type of information terminal. The information terminal 5500 includes a housing 5510 and a display portion 5511, and as input interfaces, a touch panel is provided in the display portion 5511 and a button is provided in the housing 5510.

[Wearable Terminal]

Figure 65B:
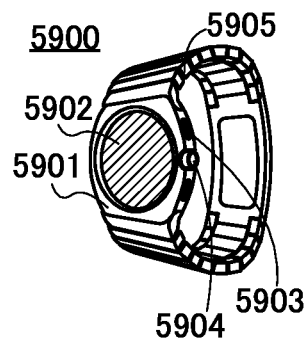

FIG. 65B is an external view of an information terminal 5900 that is an example of a wearable terminal. The information terminal 5900 includes a housing 5901, a display portion 5902, an operation button 5903, a crown 5904, and a band 5905.

[Information Terminal]

Figure 65C:
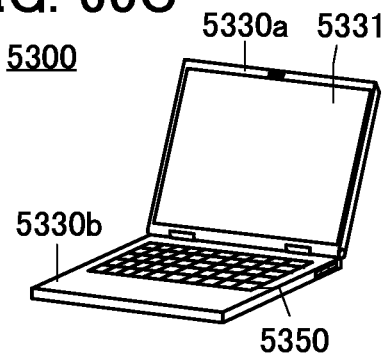

FIG. 65C illustrates a laptop information terminal 5300. The laptop information terminal 5300 illustrated in FIG. 65C includes, for example, a display portion 5331 in a housing 5330a and a keyboard portion 5350 in a housing 5330b.

Although the smartphone, the wearable terminal, and the laptop information terminal are respectively illustrated in FIG. 65A to FIG. 65C as examples of the electronic devices, one embodiment of the present invention can be used for information terminals other than a smartphone, a wearable terminal, and a laptop information terminal. Examples of information terminals other than a smartphone, a wearable terminal, and a laptop information terminal include a PDA (Personal Digital Assistant), a desktop information terminal, and a workstation.

[Camera]

Figure 65D:
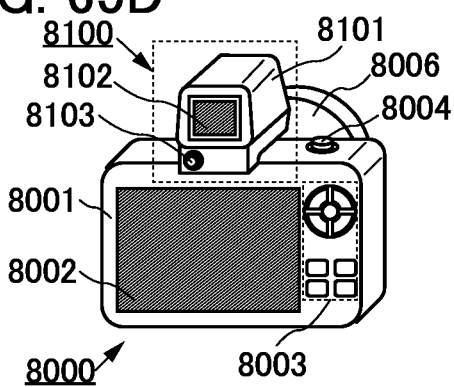

FIG. 65D is an external view of a camera 8000 to which a finder 8100 is attached.

The camera 8000 includes a housing 8001, a display portion 8002, operation buttons 8003, and a shutter button 8004. In addition, a detachable lens 8006 is attached to the camera 8000.

Note that the lens 8006 and the housing may be integrated with each other in the camera 8000.

The camera 8000 can take images by the press of the shutter button 8004 or touch on the display portion 8002 functioning as a touch panel.

The housing 8001 includes a mount including an electrode, so that, in addition to the finder 8100, for example, a stroboscope can be connected to the housing.

The finder 8100 includes a housing 8101, a display portion 8102, and a button 8103.

The housing 8101 is attached to the camera 8000 with the mount engaging with a mount of the camera 8000. In the finder 8100, a video received from the camera 8000 can be displayed on the display portion 8102.

The button 8103 has a function of a power button.

The display apparatus of one embodiment of the present invention can be used for the display portion 8002 of the camera 8000 and the display portion 8102 of the finder 8100. Note that a finder may be incorporated in the camera 8000.

[Game Machine]

Figure 65E:
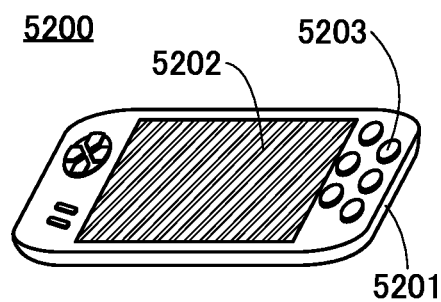

FIG. 65E is an external view of a portable game machine 5200 which is an example of a game machine. The portable game machine 5200 includes a housing 5201, a display portion 5202, and a button 5203.

Videos displayed on the portable game machine 5200 can be output with a display apparatus provided in a television device, a personal computer display, a game display, or a head-mounted display.

The portable game machine 5200 with low power consumption can be provided by applying the display apparatus described in the above embodiment to the portable game machine 5200. Moreover, heat generation from a circuit can be reduced owing to low power consumption; thus, the influence of heat generation on the circuit itself, a peripheral circuit, and a module can be reduced.

Although FIG. 65E illustrates the portable game machine as an example of a game machine, the electronic device of one embodiment of the present invention is not limited thereto.

Examples of the electronic device of one embodiment of the present invention include a stationary game machine, an arcade game machine installed in entertainment facilities (e.g., a game center and an amusement park), and a throwing machine for batting practice installed in sports facilities.

[Television Device]

Figure 65F:
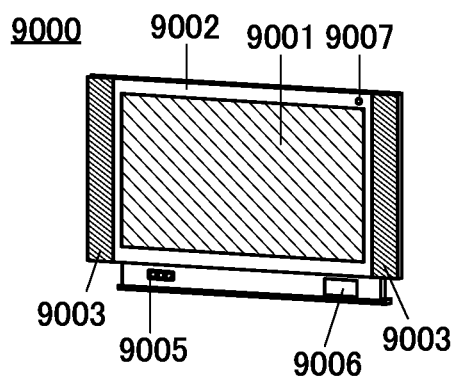

FIG. 65F is a perspective view illustrating a television device. A television device 9000 includes a housing 9002, a display portion 9001, speakers 9003, an operation key 9005 (including a power switch or an operation switch, for example), a connection terminal 9006, and a sensor 9007 (e.g., a sensor having a function of measuring force, displacement, a position, speed, acceleration, angular velocity, rotational frequency, distance, light, liquid, magnetism, temperature, a chemical substance, sound, time, hardness, an electric field, current, voltage, power, radiation, a flow rate, humidity, gradient, oscillation, an odor, or infrared rays or a function of sensing or detecting an odor or light (including visible light or invisible light (such as infrared rays or ultraviolet rays)). The memory device of one embodiment of the present invention can be provided in the television device. The television device can include the display portion 9001 of, for example, 50 inches or more or 100 inches or more.

The television device 9000 with low power consumption can be provided by applying the display apparatus described in the above embodiment to the television device 9000.

Moreover, heat generation from a circuit can be reduced owing to low power consumption; thus, the influence of heat generation on the circuit itself, a peripheral circuit, and a module can be reduced.

[Moving Vehicle]

The display apparatus of one embodiment of the present invention can be used around a driver's seat in a car, which is a moving vehicle.

Figure 65G:
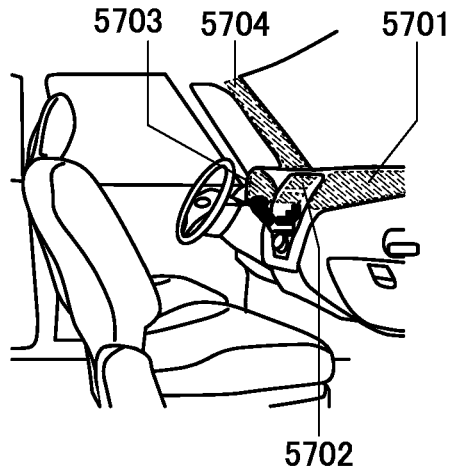

FIG. 65G is a diagram illustrating an area around a windshield inside a car. FIG. 65G illustrates a display panel 5701, a display panel 5702, and a display panel 5703 that are attached to a dashboard and a display panel 5704 that is attached to a pillar.

The display panel 5701 to the display panel 5703 can display one or more of navigation information, a speedometer, a tachometer, a mileage, a fuel meter, a gearshift indicator, and air-condition settings. The display content and layout displayed on the display panels can be changed appropriately to suit the user's preferences, so that the design can be improved. The display panel 5701 to the display panel 5703 can also be used as lighting devices.

The display panel 5704 can compensate for the view obstructed by the pillar (blind areas) by showing a video taken by an imaging unit provided for the car body. That is, showing an image taken by an imaging unit provided on the outside of the car body leads to elimination of blind areas and enhancement of safety. Display of a video that complements for a portion that cannot be seen makes it possible to confirm safety more naturally and comfortably. The display panel 5704 can also be used as a lighting device.

The display apparatus of one embodiment of the present invention can be used for the display panel 5701 to the display panel 5704, for example.

Although a car is described above as an example of a moving vehicle, the moving vehicle is not limited to a car. Examples of moving vehicles include a train, a monorail train, a ship, and a flying object (e.g., a helicopter, an unmanned aircraft (a drone), an airplane, and a rocket), and these moving vehicles can include the display apparatus of one embodiment of the present invention.

[Digital Signage]

Figure 65H:
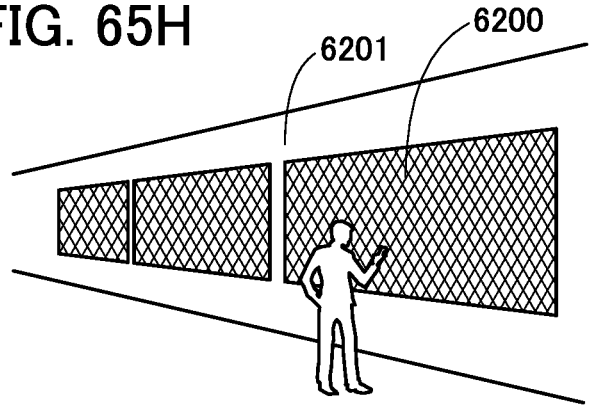

FIG. 65H illustrates an example of digital signage that can be attached to a wall. FIG. 65H illustrates a state where digital signage 6200 is attached to a wall 6201. The display apparatus of one embodiment of the present invention can be used in a display portion of the digital signage 6200, for example. An interface such as a touch panel may be provided in the digital signage 6200, for example.

Although the electronic device attachable to a wall is described above as an example of digital signage, the kind of digital signage is not limited thereto. Examples of the digital signage include digital signage attached to a pillar, freestanding digital signage placed on the ground, and digital signage mounted on a rooftop or a side wall of a building.

Note that this embodiment can be combined with any of the other embodiments described in this specification as appropriate.

REFERENCE NUMERALS

DSP: display apparatus, DSP0: display apparatus, DSP1A: display apparatus, DSP1B: display apparatus, DSP1C: display apparatus, DSP1D: display apparatus, DSP1DA: display apparatus, DSP1DB: display apparatus, DSP1E: display apparatus, DSP1F: display apparatus, DSP2A: display apparatus, DSP2AA: display apparatus, DSP2B: display apparatus, DSP2C: display apparatus, DSP2D: display apparatus, DSP2DA: display apparatus, DSP2E: display apparatus, DSP2F: display apparatus, DSP2G: display apparatus, DSP2H: display apparatus, PXAL: pixel layer, EML: layer, OSL: layer, LINL: wiring layer, SICL: circuit layer, LIA: region, BS: substrate, DIS: display portion, DRV: driver circuit region, ARA[1,1]: region, ARA[1,2]: region, ARA[1,$q$-1]: region, ARA[1,$q$]: region, ARA[2,1]: region, ARA[2,2]: region, ARA[2,$q$-1]: region, ARA[2,$q$]: region, ARA[p-1,1]: region, ARA[p-1,2]: region, ARA[p-1,q-1]: region, ARA[p-1,q]: region, ARA[p,1]: region, ARA[p,2]: region, ARA[p,q-1]: region, ARA[p,q]: region, ARD[1,1]: circuit region, ARD[1,2]: circuit region, ARD[1,$q$-1]: circuit region, ARD[1,$q$]: circuit region, ARD[2,1]: circuit region, ARD[2,2]: circuit region, ARD[2,$q$-1]: circuit region, ARD[2,$q$]: circuit region, ARD[p-1,1]: circuit region, ARD[p-1,2]: circuit region, ARD[p-1,q-1]: circuit region, ARD[p-1,q]: circuit region, ARD[p,1]: circuit region, ARD[p,2]: circuit region, ARD[p,q-1]: circuit region, ARD[p,q]: circuit region, PRPH: peripheral circuit, SD: driver circuit, SDS: circuit, DMS: distribution circuit, GD: driver circuit, GDS: circuit, DMG: distribution circuit, CTR: control unit, MD: memory device, PG: voltage generation circuit, GPS: image processing unit, CKS: clock signal generation circuit, TMC: timing controller, BW: bus wiring, CLM: column driver circuit, RWD: row driver circuit, CD: circuit, CD[1]: circuit, CD[j]: circuit, CD[n]: circuit, ALP: pixel array, PX: pixel, PX[1,1]: pixel, PX[m,1]: pixel, PX[1,$n$]: pixel, PX[m,n]: pixel, PX[i,j]: pixel, M1: transistor, M2: transistor, M3: transistor, M5: transistor, M6: transistor, M11: transistor, M12: transistor, SW1: switch, SW3: switch, SW4: switch, SW5: switch, SW6: switch, SW7: switch, SW8: switch, SW11: switch, SW11: switch, SW12: switch, SW12I: switch, SW13: switch, SW13I: switch, C1: capacitor, C2: capacitor, C3: capacitor, C4: capacitor, LD: light-emitting device, INV: inverter circuit, N1: node, N2: node, N3: node, NB: node, SL: wiring, SL[1]: wiring, SL[j]: wiring, SL[n]: wiring, GL: wiring, GL[1]: wiring, GL[i]: wiring, GL[m]: wiring, GL1: wiring, GL3: wiring, GL4: wiring, GL5: wiring, GL6: wiring, GL7: wiring, GL11: wiring, GL12: wiring, GL13: wiring, SWL11: wiring, SWL12: wiring, SWL13: wiring, VE0: wiring, VE1: wiring, VE2: wiring, VE3: wiring, VE4: wiring, VE5: wiring, VE6: wiring, G1: wiring, G2: wiring, ANO: wiring, VCOM: wiring, V0: wiring, GEM: conductor, SDMB: conductor, SDMT: conductor, PLG: conductor, EC: conductor, BGM: conductor, T11: period, T12: period, T13: period, T14: period, T15: period, T16: period, T17: period, T21: period, T22: period, T23: period, T24: period, T25: period, T26: period, T27: period, T28: period, T29: period, T30: period, 30: driver circuit, 70A: pixel, 70B: pixel, 80: pixel, 80$a$: subpixel, 80$b$: subpixel, 80$c$: subpixel, 80$d$: subpixel, 81: conductor, 103: insulator, 104: conductor, 105: insulator, 106: conductor, 107: adhesive layer, 110: substrate, 111$a$: conductor, 111$b$: conductor, 111$c$: conductor, 112$a$: conductor, 112$b$: conductor, 112$c$: conductor, 113$a$: first layer, 113$b$: second layer, 113$c$: third layer, 114: common layer, 115: common electrode, 116: protective layer, 117$a$: conductor, 117$b$: conductor, 118$a$: mask layer, 125: insulator, 126$a$: conductor, 126$b$: conductor, 126$c$: conductor, 127: insulator, 128: layer, 129$a$: conductor, 129$b$: conductor, 129$c$: conductor, 130: light-emitting device, 130R: light-emitting device, 130G: light-emitting device, 130B: light-emitting device, 131: protective layer, 131$a$: protective layer, 131$b$: protective layer, 131$c$: protective layer, 148: resin layer, 150$a$: LED chip, 150$b$: LED chip, 150$c$: LED chip, 152$a$: connection layer, 152$b$: connection layer, 152$c$: connection layer, 153$a$: substrate, 154$a$: connection layer, 155$a$: conductor, 156$a$: semiconductor layer, 157$a$: light-emitting layer, 158$a$: semiconductor layer, 166R: coloring layer, 166G: coloring layer, 166B: coloring layer, 140: connection portion, 147: resin layer, 171: substrate, 175: adhesive layer, 180: LED chip, 180R: LED chip, 180G: LED chip, 180B: LED chip, 180A: LED chip, 181: substrate, 181R: substrate, 181G: substrate, 181B: substrate, 182: semiconductor layer, 182$a$: semiconductor layer, 182$b$: semiconductor layer, 182$c$: semiconductor layer, 184: light-emitting layer, 184$a$: light-emitting layer, 184$b$: light-emitting layer, 184$c$: light-emitting layer, 185: semiconductor layer, 185$a$: semiconductor layer, 185$b$: semiconductor layer, 185$c$: semiconductor layer, 191: conductor, 192: conductor, 193$a$: conductor, 193$b$: conductor, 193$c$: conductor, 194$a$: conductor, 194$b$: conductor, 194$c$: conductor, 200: transistor, 200A: transistor, 200B: transistor, 211: insulator, 213: insulator, 214: insulator, 215: insulator, 218: insulator, 221: conductor, 222$a$: conductor, 222$b$: conductor, 223: conductor, 225: insulator, 231: semiconductor layer, 231$n$: low-resistance region, 231$i$: channel formation region, 300: transistor, 300A: transistor, 3000S: transistor, 300LT: transistor, 310: substrate, 310A: substrate, 312: element isolation layer, 313: semiconductor region, 314$a$: low-resistance region, 314$b$: low-resistance region, 315: insulator, 316: conductor, 317: insulator, 318A:

insulator, 319A: conductor, 320: insulator, 320A: insulator, 322: insulator, 322A: insulator, 324: insulator, 324A: insulator, 326: insulator, 326A: insulator, 328: conductor, 328A: conductor, 330: conductor, 330A: conductor, 350: insulator, 350A: insulator, 352: insulator, 354: insulator, 356: conductor, 358: conductor, 361: insulator, 362: insulator, 363: insulator, 364: insulator, 366: conductor, 367: conductor, 368: semiconductor layer, 368*i*: semiconductor region, 368*p*: low-resistance region, 369: conductor, 380: insulator, 382: insulator, 400: pixel circuit, 410: substrate, 411: protective layer, 500: transistor, 500A: transistor, 500B: transistor, 500C: transistor, 505: conductor, 505*a*: conductor, 505*b*: conductor, 512: insulator, 514: insulator, 516: insulator, 522: insulator, 524: insulator, 540: conductor, 540*a*: conductor, 540*b*: conductor, 541: insulator, 541*a*: insulator, 541*b*: insulator, 542: conductor, 542*a*: conductor, 542*b*: conductor, 550: insulator, 554: insulator, 560: conductor, 560*a*: conductor, 560*b*: conductor, 574: insulator, 580: insulator, 581: insulator, 592: insulator, 594: insulator, 596: conductor, 598: insulator, 599: insulator, 600: capacitor, 761: lower electrode, 762: upper electrode, 763: EL layer, 764: layer, 771: light-emitting layer, 771*a*: light-emitting layer, 771*b*: light-emitting layer, 771*c*: light-emitting layer, 772: light-emitting layer, 772*a*: light-emitting layer, 772*b*: light-emitting layer, 772*c*: light-emitting layer, 773: light-emitting layer, 780: layer, 780*a*: layer, 780*b*: layer, 780*c*: layer, 781: layer, 782: layer, 785: charge-generation layer, 785*a-b*: charge-generation layer, 785*b-c*: charge-generation layer, 790: layer, 790*a*: layer, 790*b*: layer, 790*c*: layer, 791: layer, 792: layer, 1000: display apparatus, 1000A: display apparatus, 1000B1: display apparatus, 1000B2: display apparatus, 1000B3: display apparatus, 1000B4: display apparatus, 1000C: display apparatus, 1000D: display apparatus, 1000E: display apparatus, 1000F: display apparatus, 1000G: display apparatus, 1000H: display apparatus, 1000I: display apparatus, 1280: display module, 1281: display portion, 1290: FPC, 1282: circuit portion, 1283: pixel circuit portion, 1283*a*: pixel circuit, 1284: pixel portion, 1284*a*: pixel, 1285: terminal portion, 1286: wiring portion, 1291: substrate, 1292: substrate, 1430*a*: light-emitting device, 1430*b*: light-emitting device, 1430*c*: light-emitting device, 5200: portable game machine, 5201: housing, 5202: display portion, 5203: button, 5300: laptop information terminal, 5330*a*: housing, 5330*b*: housing, 5331: display portion, 5350: keyboard portion, 5500: information terminal, 5510: housing, 5511: display portion, 5701: display panel, 5702: display panel, 5703: display panel, 5704: display panel, 5900: information terminal, 5901: housing, 5902: display portion, 5903: operation button, 5904: crown, 5905: band, 6200: digital signage, 6201: wall, 8000: camera, 8001: housing, 8002: display portion, 8003: operation button, 8004: shutter button, 8006: lens, 8100: finder, 8101: housing, 8102: display portion, 8103: button, 8200: electronic device, 8201: mounting portion, 8202: lens, 8203: main body, 8204: display portion, 8205: cable, 8206: battery, 8300: electronic device, 8301: housing, 8302: display portion, 8303: operation button, 8304: fixing unit, 8304*a*: fixing unit, 8305: lens, 8310: user, 8311: user, 8750: electronic device, 8751: display apparatus, 8752: housing, 8754: mounting portion, 8754A: earphone, 8754B: earphone, 8755: cushion, 8756: lens, 8757: input terminal, 8758: output terminal, 9000: television device, 9001: display portion, 9002: housing, 9003: speaker, 9005: operation key, 9006: connection terminal, 9007: sensor

The invention claimed is:

1. A display apparatus comprising:
a pixel; and
a circuit,
wherein the pixel comprises a light-emitting device, a driving transistor, a first switch, a second switch, a third switch, a fourth switch, and a first capacitor,
wherein the circuit comprises a fifth switch, a sixth switch, and a second capacitor,
wherein a gate of the driving transistor is electrically connected to a first terminal of the first switch, a first terminal of the second switch, and a first terminal of the first capacitor,
wherein one of a source and a drain of the driving transistor is electrically connected to a second terminal of the first capacitor, a first terminal of the fourth switch, and an anode of the light-emitting device,
wherein the other of the source and the drain of the driving transistor is electrically connected to a second terminal of the second switch and a first terminal of the third switch,
wherein a second terminal of the first switch is electrically connected to a first terminal of the second capacitor, and
wherein a first terminal of the fifth switch is electrically connected to a first terminal of the sixth switch and a second terminal of the second capacitor.

2. The display apparatus according to claim 1,
wherein the first switch comprises an n-channel first transistor,
wherein the second switch comprises an n-channel second transistor,
wherein the third switch comprises an n-channel third transistor,
wherein the fourth switch comprises an n-channel fourth transistor,
wherein one of a source and a drain of the n-channel first transistor is electrically connected to the first terminal of the first switch,
wherein the other of the source and the drain of the n-channel first transistor is electrically connected to the second terminal of the first switch,
wherein one of a source and a drain of the n-channel second transistor is electrically connected to the first terminal of the second switch,
wherein the other of the source and the drain of the n-channel second transistor is electrically connected to the second terminal of the second switch,
wherein one of a source and a drain of the n-channel third transistor is electrically connected to the first terminal of the third switch,
wherein the other of the source and the drain of the n-channel third transistor is electrically connected to a second terminal of the third switch,
wherein one of a source and a drain of the n-channel fourth transistor is electrically connected to the first terminal of the fourth switch, and
wherein the other of the source and the drain of the n-channel fourth transistor is electrically connected to a second terminal of the fourth switch.

3. A display apparatus comprising:
a pixel; and
a circuit,
wherein the pixel comprises a light-emitting device, a driving transistor, a first switch, a second switch, a third switch, a fourth switch, a fifth switch, a first capacitor, and a third capacitor,
wherein the circuit comprises a sixth switch, a seventh switch, an eighth switch, and a second capacitor, wherein the driving transistor comprises a first gate and a second gate,
wherein the first gate of the driving transistor is electrically connected to a first terminal of the first switch, a first terminal of the second switch, and a first terminal of the first capacitor,
wherein one of a source and a drain of the driving transistor is electrically connected to a second terminal of the first capacitor, a first terminal of the third capacitor, a second terminal of the second switch, a first terminal of the third switch, and a first terminal of the fourth switch,
wherein the second gate of the driving transistor is electrically connected to a second terminal of the third capacitor and a first terminal of the fifth switch,
wherein a second terminal of the third switch is electrically connected to an anode of the light-emitting device,
wherein a second terminal of the first switch is electrically connected to a first terminal of the second capacitor and a first terminal of the eighth switch, and
wherein a first terminal of the sixth switch is electrically connected to a first terminal of the seventh switch and a second terminal of the second capacitor.

4. The display apparatus according to claim 3,
wherein the first switch comprises an n-channel first transistor,
wherein the second switch comprises an n-channel second transistor,
wherein the third switch comprises an n-channel third transistor,
wherein the fourth switch comprises an n-channel fourth transistor,
wherein the fifth switch comprises an n-channel fifth transistor,
wherein one of a source and a drain of the n-channel first transistor is electrically connected to the first terminal of the first switch,
wherein the other of the source and the drain of the n-channel first transistor is electrically connected to the second terminal of the first switch,
wherein one of a source and a drain of the n-channel second transistor is electrically connected to the first terminal of the second switch,
wherein the other of the source and the drain of the n-channel second transistor is electrically connected to the second terminal of the second switch,
wherein one of a source and a drain of the n-channel third transistor is electrically connected to the first terminal of the third switch,
wherein the other of the source and the drain of the n-channel third transistor is electrically connected to the second terminal of the third switch,
wherein one of a source and a drain of the n-channel fourth transistor is electrically connected to the first terminal of the fourth switch,
wherein the other of the source and the drain of the n-channel fourth transistor is electrically connected to a second terminal of the fourth switch,
wherein one of a source and a drain of the n-channel fifth transistor is electrically connected to the first terminal of the fifth switch, and
wherein the other of the source and the drain of the n-channel fifth transistor is electrically connected to a second terminal of the fifth switch.

5. A display apparatus comprising:
a pixel; and
a circuit,
wherein the pixel comprises a light-emitting device, a driving transistor, a first switch, a third switch, a fourth switch, a fifth switch, a first capacitor, and a third capacitor,
wherein the circuit comprises a sixth switch, a seventh switch, an eighth switch, and a second capacitor,
wherein the driving transistor comprises a first gate and a second gate,
wherein the first gate of the driving transistor is electrically connected to a first terminal of the first switch and a first terminal of the first capacitor,
wherein one of a source and a drain of the driving transistor is electrically connected to a second terminal of the first capacitor, a first terminal of the third capacitor, a first terminal of the third switch, and a first terminal of the fourth switch,
wherein the second gate of the driving transistor is electrically connected to a second terminal of the third capacitor and a first terminal of the fifth switch,
wherein a second terminal of the third switch is electrically connected to an anode of the light-emitting device,
wherein a second terminal of the first switch is electrically connected to a first terminal of the second capacitor and a first terminal of the eighth switch, and
wherein a first terminal of the sixth switch is electrically connected to a first terminal of the seventh switch and a second terminal of the second capacitor.

6. The display apparatus according to claim 5,
wherein the first switch comprises an n-channel first transistor,
wherein the third switch comprises an n-channel third transistor,
wherein the fourth switch comprises an n-channel fourth transistor,
wherein the fifth switch comprises an n-channel fifth transistor,
wherein one of a source and a drain of the n-channel first transistor is electrically connected to the first terminal of the first switch,
wherein the other of the source and the drain of the n-channel first transistor is electrically connected to the second terminal of the first switch,
wherein one of a source and a drain of the n-channel third transistor is electrically connected to the first terminal of the third switch,
wherein the other of the source and the drain of the n-channel third transistor is electrically connected to the second terminal of the third switch,
wherein one of a source and a drain of the n-channel fourth transistor is electrically connected to the first terminal of the fourth switch,
wherein the other of the source and the drain of the n-channel fourth transistor is electrically connected to a second terminal of the fourth switch,
wherein one of a source and a drain of the n-channel fifth transistor is electrically connected to the first terminal of the fifth switch, and
wherein the other of the source and the drain of the n-channel fifth transistor is electrically connected to a second terminal of the fifth switch.

7. The display apparatus according to claim 1,
wherein the pixel comprises a third capacitor.

8. The display apparatus according to claim 1,
wherein the light-emitting device comprises an organic EL device.

9. An electronic device comprising the display apparatus according to claim 8, and a housing.

10. The display apparatus according to claim 3,
wherein the light-emitting device comprises an organic EL device.

11. An electronic device comprising the display apparatus according to claim 10, and a housing.

12. The display apparatus according to claim 5,
wherein the light-emitting device comprises an organic EL device.

13. An electronic device comprising the display apparatus according to claim 12, and a housing.

\* \* \* \* \*